(12) United States Patent
Okada

(10) Patent No.: US 7,780,168 B2
(45) Date of Patent: Aug. 24, 2010

(54) GAMING MACHINE

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 1316 days.

(21) Appl. No.: 11/274,282

(22) Filed: Nov. 16, 2005

(65) Prior Publication Data

US 2007/0111774 A1  May 17, 2007

(51) Int. Cl.
G06F 17/00 (2006.01)

(52) U.S. Cl. .................................................. 273/148 B

(58) Field of Classification Search ............. 273/148 B; 463/46; 345/161
See application file for complete search history.

(56) References Cited

U.S. PATENT DOCUMENTS

| | | | | |
|---|---|---|---|---|
| 5,662,523 A * | 9/1997 | Yasumaru et al. | ............. | 463/30 |
| 5,674,127 A * | 10/1997 | Horstmann et al. | ........... | 463/42 |
| 5,947,825 A * | 9/1999 | Horstmann et al. | ........... | 463/42 |
| 6,417,856 B1 * | 7/2002 | Tamura et al. | ............. | 345/474 |
| 6,902,481 B2 * | 6/2005 | Breckner et al. | ............. | 463/30 |
| 7,413,514 B2 * | 8/2008 | Saikawa et al. | ............... | 463/46 |
| 2005/0041161 A1 * | 2/2005 | Dowling et al. | ............. | 348/739 |

FOREIGN PATENT DOCUMENTS

| | | |
|---|---|---|
| CN | 2548485 Y | 5/2003 |
| EP | 0 479 422 A2 | 4/1992 |
| EP | 0 631 247 A2 | 12/1994 |
| EP | 1 236 488 A2 | 9/2002 |
| JP | 07-059947 A | 3/1995 |
| JP | 8-206355 A | 8/1996 |
| JP | 10-235021 A | 9/1998 |
| JP | 10-314450 A | 12/1998 |
| JP | 2002-035073 A | 2/2002 |
| RU | 2242796 C2 | 3/2004 |
| WO | WO 98/21682 A1 | 5/1998 |

* cited by examiner

Primary Examiner—Ronald Laneau
(74) Attorney, Agent, or Firm—Arent Fox LLP

(57) ABSTRACT

An object of the invention is to provide a game machine in which sensations are stimulated individually for each player and the enjoyment of each player is enhanced.

The game machine has a game controller for receiving input from a player; a monitor for receiving externally or generating internally and showing a game screen, generated according to a multi-player fighting game program; a seat for seating the player; and a sensation generating part for generating sensations according to input from said game controller and input from an opposing player.

19 Claims, 85 Drawing Sheets

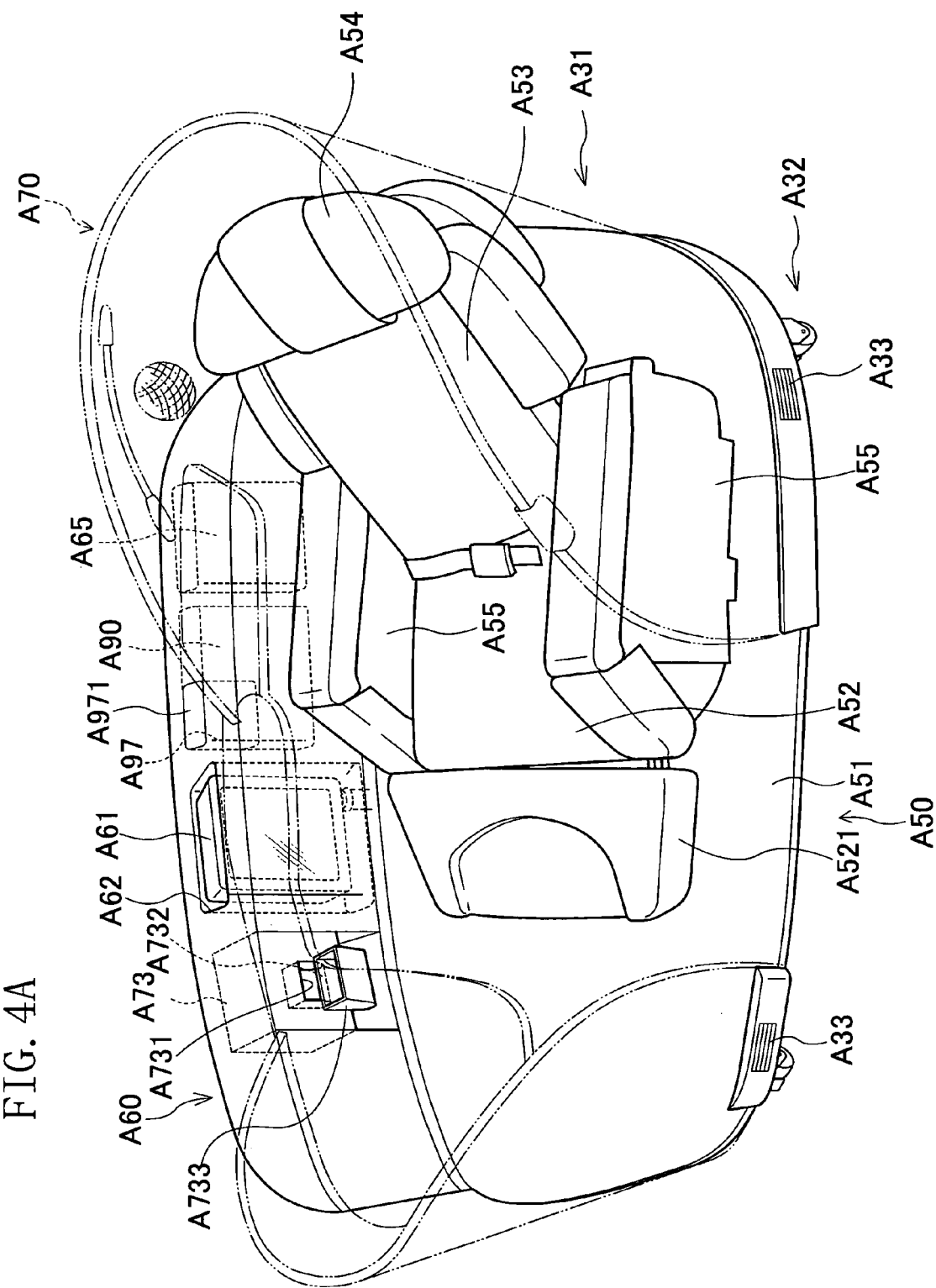

Sensation generating control signal selection table A87

| State | Sensation generating control signal |
|---|---|
| Confrontation | Smoke |
| Ocean | Ocean-scent |
| Forest | Forest-scent |
| Sky | Fog |
| Appearance of monster A | Body odor of monster A |
| ⋮ | ⋮ |

FIG. 12A

Lighting Aspect Table

| Lighting aspect number | Lighting aspect |
|---|---|
| 0 | Purple |
| 1 | Yellow |
| 2 | White |
| 3 | Green |
| 4 | Blue |
| 5 | Red |

FIG. 12B

Sensation generating control signal selection table A88

| State | Sensation generating control signal |
|---|---|
| Ocean area | Ocean-scent |
| Forest area | Forest-scent |
| Sky area | Fog |
| ⋮ | ⋮ |

FIG. 13A

Order Selection Screen (Display Example)

Order Management Screen (Display example)

Un-processed orders

| Light aspect | Order content |
|---|---|
| Green | Tea |
| White | Coffee |
| Yellow | Iced Coffee |
| Purple | Tea |

Completed orders

| Light aspect | Order content |
|---|---|
| Red | Coffee |
| Blue | Orange juice |

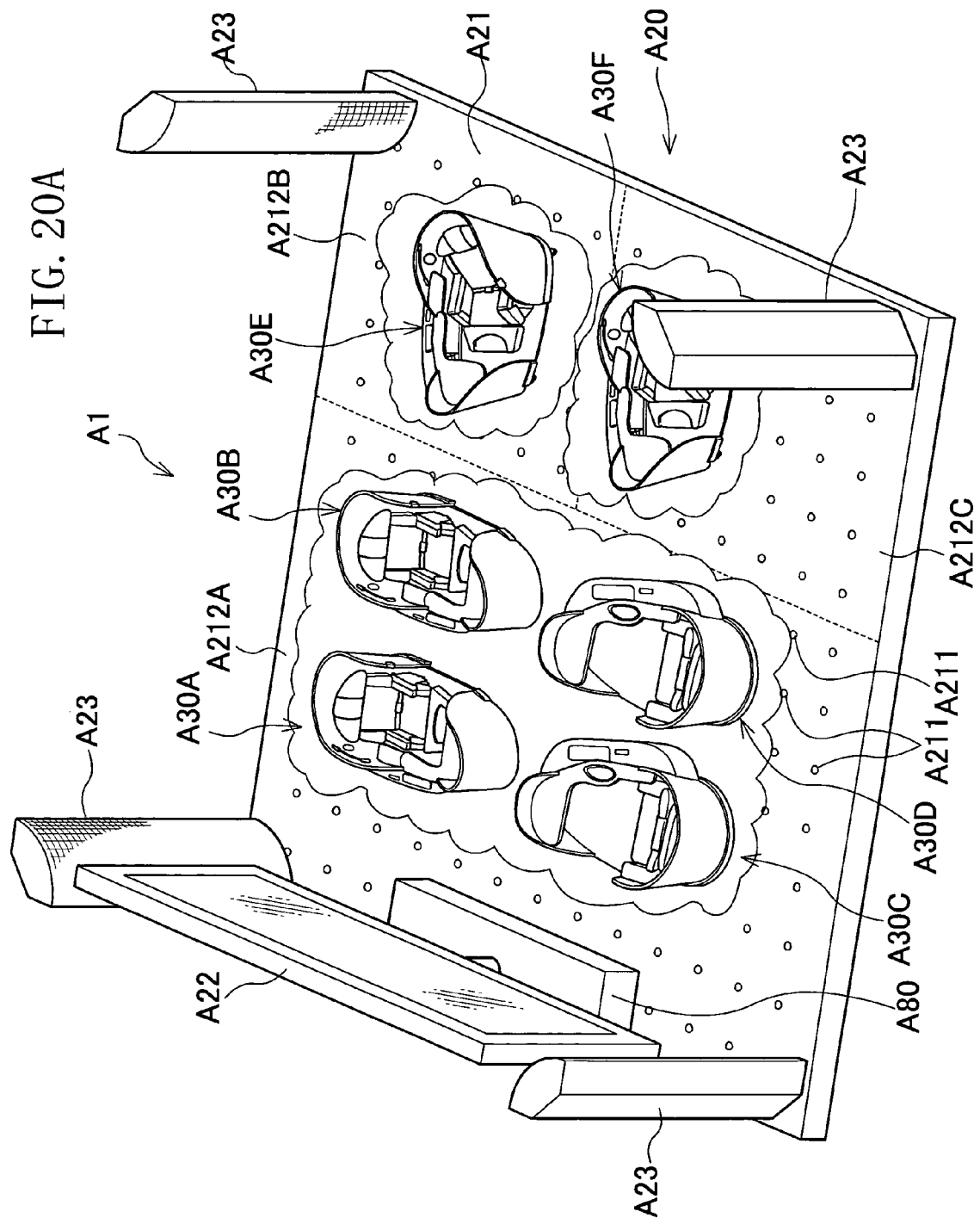

Lighting Aspect Determination Processing

FIG. 28B

| Coordinate data | Product acquisition event | Product data | |
|---|---|---|---|
| | | | Product image data 1 |
| Coordinate A | Product acquisition event A | Product group 1 (tea, cola) | Product image data 2 |
| Coordinate B | Product acquisition event B | Product group 2 (goods A and B) | |
| .. | .. | .. | .. |

| Product | Lighting aspect |
|---|---|
| Iced coffee | Red |
| Tea | Blue |
| : | : |

FIG. 30B

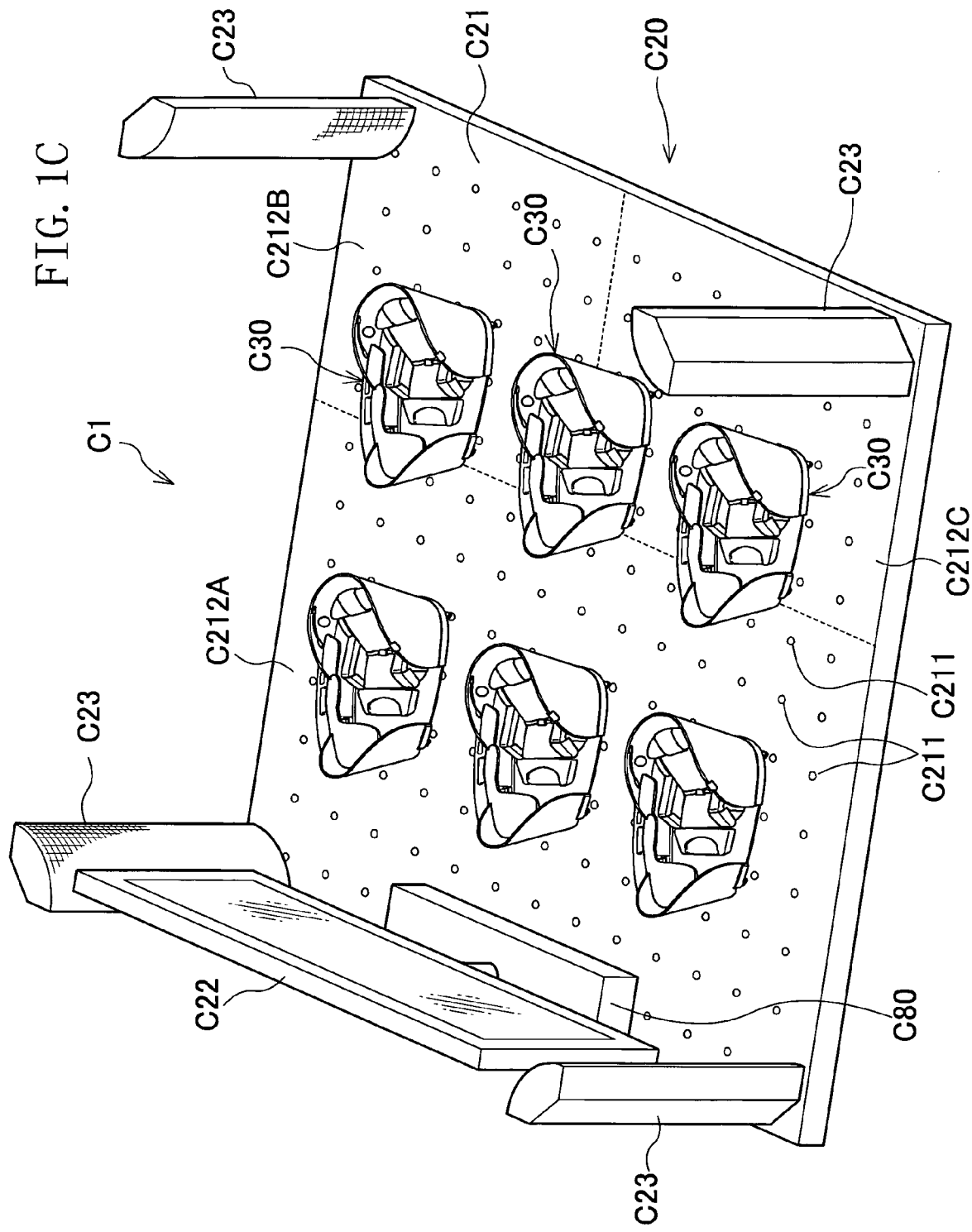

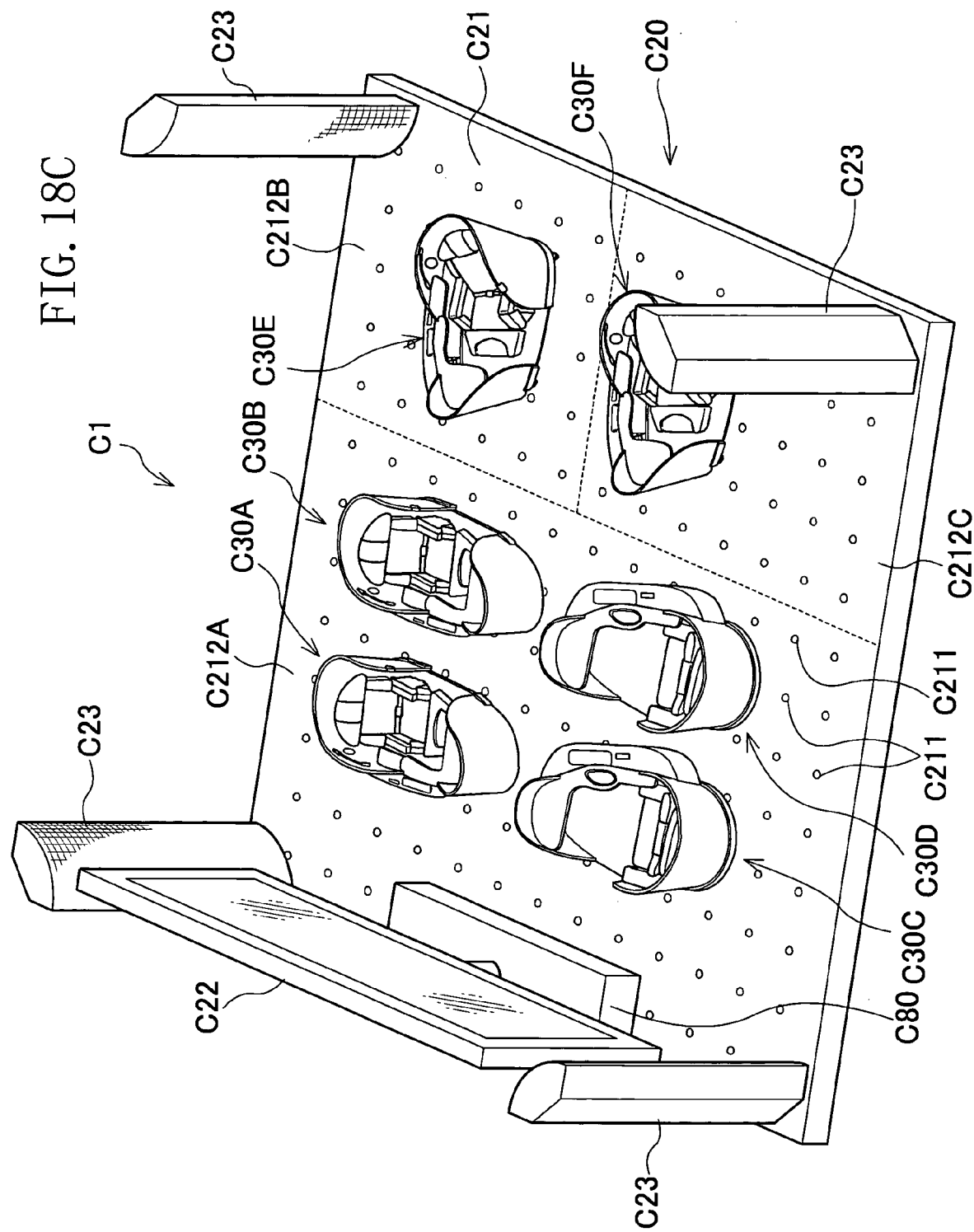

GAMING MACHINE

FIELD OF THE INVENTION

The present invention relates a multi-player-type game machine in which plural players participate.

RELATED ART

In a first aspect of the background art, conventionally, multi-player-type game machines for commercial use, in which numerous players participate, commonly referred to as multi-player game machines, are known. In recent years, there has been a horse-racing game machine as such a multi-player game machine. This horse-racing game machine includes, for example, a main game machine body to which a large main display part is provided and a plurality of terminal devices to which sub-display parts which are attached to the main game machine body are provided.

These plural terminal devices are respectively provided with seats which seat the players and face the main display part. In this terminal device, each player sits in the seat and performs various operations while watching the sub-display part.

In this horse-racing game machine, the race horses and the odds are shown in the main display part and the sub-display part. Each player selects a race horse from among the race horses shown and bets medals. Then, racing is performed by these race horses in the main display part and medals are paid out to each player according to the results, based on odds set beforehand.

In a horse-racing game machine such as this, a realistic feeling of being at the racetracks can be enjoyed by listening to the sounds output from a speaker while viewing a video shown in the main display part.

In addition, as a multi-player game, there is an integrated gaming system which includes a cockpit for seating a plurality of players within a theater which is provided with a large screen (refer to Patent Reference 1).

In this integrated game system a personal computer device provided in each cockpit is connected to an integrated computer device for gaming, and these devices operate together to run a game. In addition, a realistic feeling and tension which cannot be attained through a privately-owned game machine is provided by generating loud sounds and vibrating sensations among the players within the theater.

Patent Reference 1: Japanese Patent Application Laid-Open Publication Heisei 10-314450

In a second aspect of the background art, conventionally, multi-player-type game machines for commercial use, wherein numerous players participate, commonly referred to as multi-player game machines, are known. In recent years, there has been a horse-racing game machine as such a multi-player game machine. This horse-racing game machine includes, for example, a main game machine body to which a large main display part is provided and a plurality of terminal devices to which sub-display parts which are attached to the main game machine body are provided (Patent Reference 2).

These plural terminal devices are respectively provided with seats which seat the players and face the main display part. In this terminal device, each player sits in the seat and performs various operations while watching the sub-display part.

In this multi-player game machine, the race horses and the odds are shown in the main display part and the sub-display part. Each player selects a race horse from among the race horses shown and bets medals. Then, racing is performed by these race horses in the main display part and medals are paid out to each player according to the results, based on odds set beforehand.

In a multi-player game machine such as this, each terminal device is connected respectively to the main game machine body by a communication cable. Information necessary for gaming are exchanged by performing bidirectional communication via these communication cables (refer to Patent Reference 2).

Incidentally, in multi-player game machines such as this, it is assumed in most cased that the player will play the game for a long period of time, such as by using horse-racing as the theme of the game as in the foregoing. Therefore, high-quality seats which have been modified so that the person sitting does not get tired even when sitting for long periods of time are implemented as seats in which the players sit.

Patent Reference 2: Japanese Patent Application Laid-Open Publication Heisei 8-206355

In a third aspect of the background art, for example, multi-player-type game machines for commercial use, in which numerous players participate, commonly referred to as multi-player game machines, are known. In recent years, there has been a horse-racing game machine as such a multi-player game machine. This horse-racing game machine includes, for example, a main game machine body to which a large main display part is provided and a plurality of terminal devices to which sub-display parts which are attached to the main game machine body are provided.

These plural terminal devices are respectively provided with seats which seat the players and face the main display part. In this terminal device, each player sits in the seat and performs various operations while watching the sub-display part.

In this horse-racing game machine, the race horses and the odds are shown in the main display part and the sub-display part. Each player selects a race horse from among the race horses shown and bets medals. Then, racing is performed by these race horses in the main display part and medals are paid out to each player according to the results, based on odds set beforehand.

In a horse-racing game machine such as this, a realistic feeling of being at the racetracks can be enjoyed by listening to the sounds output from a speaker while viewing a video shown in the main display part.

In addition, as a multi-player game, there is an integrated gaming system which includes a cockpit for seating a plurality of players within a theater which is provided with a large screen (refer to Patent Reference 3). In this integrated game system a personal computer device provided in each cockpit is connected to an integrated computer device for gaming, and these devices operate together to run a game. In addition, a realistic feeling and tension which cannot be attained through a privately-owned game machine is provided by generating loud sounds and vibrating sensations among the players within the theater.

Patent Reference 3: Japanese Patent Application Laid-Open Publication Heisei 10-314450

In a fourth aspect of the background art, conventionally, multi-player-type game machines for commercial use, in which numerous players participate, commonly referred to as multi-player game machines, are known. In recent years, there has been a horse-racing game machine as such a multi-player game machine. A multi-player game machine such as this includes, for example, a main game machine body to which a large main display part is provided and a plurality of terminal devices to which sub-display parts which are attached to the main game machine body are provided (Patent Reference 4).

These plural terminal devices are provided with seats, respectively, which seat the players, and face the main display part. In this terminal device, each player sits in the seat and performs various operations while watching the sub-display part mounted on the seat.

In this multi-player game machine, the race horses and the odds are shown in the main display part and the sub-display part. Each player selects an arbitrary race horse out of the race horses shown and bets medals. Then, racing is performed by these race horses in the main display part and medals are paid out to each player according to the results, based on odds set beforehand.

In a multi-player game machine such as this, each terminal device is connected respectively to the main game machine body by a communication cable. Information necessary for gaming are exchanged by performing bidirectional communication via these communication cables (refer to Patent Reference 4).

Incidentally, in a communication game machine, which is a type of a multi-player game machine such as this, there are those which enable the player to play games while viewing the expressions of the opponent by providing a cameral in each terminal device and showing the face of the opponent in each other's display parts or, in combat games, those which enable the player to feel the damage received by his operation character through sensations such as vibrations. In addition, game machines per se which are characterized, not only by showing a game screen shared between other players in the display part, but also by providing further stimulation are proposed.

Patent Reference 4: Japanese Patent Application Laid-Open Publication Heisei 8-206355

SUMMARY OF THE INVENTION

However, in multi-player game machines such as those above, the players cannot stimulate sensations individually, and it was difficult to enhance the enjoyment of each player.

In light of the foregoing circumstances, as a first issue of the present invention, an object of the invention is to provide a game machine in which sensations are stimulated individually for each player and the enjoyment of each player is enhanced.

The present invention provides a game machine such as that below, in order to overcome the foregoing problems.

In a first aspect of the present invention, a game machine includes: a game controller (for example, an input operation part A72, described hereafter) for receiving input from a player; a monitor (for example, a sub-display part A61 and a main display device A22, described hereafter) for receiving externally or generating internally and showing a game screen, generated according to a multi-player fighting game program; and a seat (for example, a seat A31, described hereafter) for seating the player; in which the seat further includes a sensation generating part for generating sensations in relation to input from the game controller and input from an opposing player.

According to the foregoing game machine, in a game machine which includes a game controller for receiving input from a player, a monitor for receiving externally or generating internally and showing a game screen, generated according to a multi-player fighting game program, and a seat (for seating the player, because the seat further includes a sensation generating part for generating sensations in relation to input from the game controller and input from an opposing player, the player can view a game screen based on the multi-player fighting game program, and at the same time, sensations in relation to input from the game controller and input from an opposing player can be provided to the player. Therefore, through sensations by the sensation generating part, a game which is more realistic than conventional games can be experienced.

In a second aspect of the present invention, a game machine includes: a main game machine body (for example, a main game machine body A20, described hereafter) including a memory part (for example, a data base A84, described hereafter) for storing a game program and a main control part (for example, a main control device A80, described hereafter) for executing the game program stored in the memory part; and a plurality of terminal devices (for example, terminal device A30, described hereafter) including an input part (for example, an input operation part A72, described hereafter), a sensation generating device (for example, a sensation generating device A65, described hereafter) for generating sensations in a player, and a sub-control part (for example, a sub-control device A90, described hereafter), connected to the main game machine body through wireless or wired connection, for transmitting game input data according to input from the input part to the main game machine body; and a sub-display part (for example, a sub-display part A61, described hereafter) for showing image data; in which the main control part receives a plurality of game input data from the plurality of terminal devices, generates image data corresponding to each terminal device based on these game input data, transmits the generated image data to the corresponding terminal device; the sub-control part shows the received image data in the sub-display part; the terminal device includes a seat (for example, a seat A31, described hereafter) for enabling the player to operate the input part while seated; the sub-control part includes a sensation generating device control part (for example, a CPU A91, described hereafter) for controlling the sensation generating device; the game input data includes positional data of an operation character which can be moved over a single game area generated according to the game program; and, in order to drive the sensation generating devices in this terminal device and other terminal devices according to the positional data of the operation character and an environment data (for example, the situations in FIG. 12A are ocean and forest) set for each of a plurality of game areas in the game area, the main control part transmits, to respective sub-control parts, one or more sensation generating control signals stored according to the environment data set beforehand for each of a plurality of game areas.

According to the foregoing game machine, because the main game machine body of the game machine drives the sensation generating device of the terminal device based on the positional data of the operation character and the environment data of the game area generated according to the game program, sensations suitable for the game area can be provided to the player using the terminal device. For example, the sensation generating device can generate the scent of the ocean or trees if the environment data is of an ocean, forest or the like, generate fog if the environment data is of fog, and produce a feeling of flying in the air by strengthening the output of the fog if the environment data is of the sky, and thus, provide the player with sensations.

In a third aspect of the present invention, the game machine according to the second aspect of the invention has a sensation generating device in the terminal device which includes: a plurality of storage containers for storing plural types of fragrances of differing scents; a spray part for selectively spraying the fragrances stored in the plurality storage containers; a memory part for storing table data (for example, the sensation generating control signal selection table A87) in which the environment data set for each game area and the sensation generating control signal for providing sensation corresponding to this environment data are correlated; and a sensation generating device driving part for selecting one storage container from the storage containers, based on the sensation generating control signal, and spraying the fragrance stored in the selected storage container with the spray part.

According to the third aspect of the present invention, the sensation generating device includes a plurality of storage containers for storing plural types of fragrances of differing scents and a spray part for selectively spraying the fragrances stored in the plurality storage containers, in which one storage container is selected from the storage containers, based on the sensation generating control signal, and the fragrance stored in the selected storage container is sprayed with the spray part. Therefore, the player's olfactory sense is stimulated, various information on the game environment are transmitted to the player and the enjoyment of the player can be enhanced. For example, the regions in the game environment (game areas) in which scents are generated in the real world, such as oceans and forests in the game environment and the scent of food in a cafeteria, can be presented more realistically. In addition, a game world which is further realistic can be presented by generating body odors and perfume scents of the characters, the smell of monsters, and the like appearing in the game environment.

In a fourth aspect of the present invention, a game machine according to the second or third aspect of the invention has a terminal device which includes a traveling part (for example, a traveling part A32, described hereafter) for enabling movement in predetermined regions; in which the main control part transmits a movement-control signal to the terminal device so that the plurality of terminal devices have a predetermined positional relationship through the traveling part, and at the same time, outputs a spotlight lighting control signal for lighting a spotlight (for example, a spotlight A25, described hereafter) to the plurality of terminal devices.

According to the foregoing game machine, the main game machine body of the game machine transmits a movement-control signal to the terminal device, transmits a movement-control signal to the terminal device so that the plurality of terminal devices have a predetermined positional relationship (for example, a confrontational position), and at the same time, outputs a spotlight lighting control signal for lighting a spotlight (for example a spotlight A25, described hereafter) to the plurality of terminal devices. Therefore, for example, a terminal device which is positioned in a predetermined positional relationship (for example, a confrontational position) and lit by a spotlight can draw attention on the field, and a player operating a terminal device which is not lit by a spotlight can be notified that another player is in a confrontation, even when he is playing his own game.

In a fifth aspect of the present invention, a game machine according to the fourth aspect of the invention has: a sensation generating device in the terminal device which includes a mist generating device (for example, a spray device A68, described hereafter) for generating fog-like mist; and a sensation generating device driving part for driving the mist generating device driving part in response to the reception of a sensation generating control signal by the terminal device.

According to the foregoing game machine, in response to the reception of a sensation generating control signal by the terminal device of the game machine, the sensation generating device driving part drives the mist generating device. Therefore, for example, these terminal devices can draw attention of the field by the driving of the mist generating device, and a player operating a terminal device which is not lit by a spotlight can be made aware of other players through the generation of mist, even when he is playing his own game. Furthermore, the enjoyment of the player of the terminal device running the mist generating device can be enhanced and, for example, a feeling of floating the air can be produced by concealing the lower part of the main seat body from the view of the player with mist.

In a sixth aspect of the present invention, a game machine according to the fifth aspect of the invention has: a mist generating device which includes a water storage container for storing water and a mist spray part for spraying water stored in the water storage container from the lower part of the seat; and a sensation generating device driving part for driving the mist spray part based on the sensation generating control signal.

According to the sixth aspect of the present invention, the sensation generating device includes a storage container for storing water and a spray part for spraying water stored in the storage container from the lower part of the seat, as a mist spray part. Therefore, mist, fog and the like in the game environment can be presented realistically, various information on the game environment can be transmitted to the player, and the enjoyment of the player can be enhanced. For example, a feeling of floating the air can be produced by concealing the lower part of the main seat body from the view of the player with mist.

In a seventh aspect of the present invention, a game machine includes: a main game machine body (for example, a main game machine body A20, described hereafter) including a memory part (for example, a data base A84, described hereafter) for storing a game program and a main control part (for example, a main control device A80, described hereafter) for executing the game program stored in the memory part; and a plurality of terminal devices (for example, terminal device A30, described hereafter) including an input part (for example, an input operation part A72, described hereafter), a sensation generating device (for example, a sensation generating device A65, described hereafter) for generating sensations in a player, and a sub-control part (for example, a sub-control device A90, described hereafter), connected to the main game machine body through wireless or wired connection, for transmitting game input data according to input from the input part to the main game machine body;

and a sub-display part (for example, a sub-display part A61, described hereafter) for showing image data;

in which the main control part receives a plurality of game input data from the plurality of terminal devices, generates a single game data according to the game program based on this plurality of game input data, and generates and outputs to the display part image data which is shared by all terminal devices based on this single game data;

the terminal device includes a seat (for example, a seat A31, described hereafter) for enabling the player to operate the input part while seated;

the sub-control part includes a sensation generating device control part (for example, a CPU A91, described hereafter) for controlling the sensation generating device;

the single game data generated in the main control part includes positional data of a plurality of operation characters, which can be moved within a single game area generated according to the game program based on respective game input data input by the input part of the plurality of terminal devices; and when the positional data of one operation character which is motion-operated by one terminal device among the plurality of terminal devices and positional data of another operation character which is motion-operated by another terminal device among the plurality of terminal devices meet predetermined conditions, the main control part transmits one or more sensation generating control signals stored beforehand to respective sub-control parts, in order to drive the sensation generating devices in the one terminal device and the other terminal devices.

Here, the display part can be provided individually in each terminal device or shared therewith.

Predetermined conditions means, for example, to fall within threshold data in which the difference values of the positional data of the plurality of operation characters are determined beforehand. This indicates that a plurality of operation characters is in close proximity or has collided. When this condition is met, for example, the players are positioned within their mutual range enabling attack and fighting between the players start (fighting mode).

According to the seventh aspect of the present invention, the sensation generating device of the terminal devices of these players are driven when the positional data of the operation character a player operates and the operation character another player operates meet a predetermined condition, or in other words, the positional relationships of the operation characters meet a predetermined condition, in a single game area.

Therefore, because sensations are stimulated only for players whose operation character is in a predetermined positional relationship, sensations can be stimulated individually for each player and the enjoyment of each player can be enhanced.

In an eighth aspect of the present invention, a game machine according to the sixth or seventh embodiment in which: the main game body includes a play area (for example, a play area A21, described hereafter) in which the plurality of terminal devices is placed;

the terminal device includes a moving part (for example, a traveling part A32, described hereafter), which is provided on the lower part of the seat, for moving the terminal device on the play area;

the sub-control part includes a movement control part (for example, a CPU A91, described hereafter) for driving the moving part according to a movement-control signal from an external source and moving the terminal device to the predetermined position; and the main control part includes a movement-control signal transmitting part for transmitting the movement-control signal to the specified terminal device, when the positional data of the operation character of a specific terminal device among the plurality of terminal devices meet the predetermined condition.

According to the eighth aspect of the present invention, because a moving part is provided in the terminal device, this moving part is driven by a movement-control signal from the main control part, and the terminal device moves to a predetermined position, each player can play the game by changing the position of the terminal device.

In addition, by reflecting the positional relationship of a plurality of operation characters within the game area in the positional relationship of the plurality of terminal devices, the positional relationships between the operation characters in the game area can be presented more realistically on the play area, and thus, the enjoyment of the player is further enhanced. For example, if a plurality of players fight against each other, the players can be made aware that they are enemies by bringing the terminal devices of the competing players closer together, and tension between the opposing players can be enhanced.

According to the present invention, the enjoyment of the player can be enhanced by providing a game machine which stimulates sensations according to the game situation for the player operating the terminal device.

In addition, the multi-player game machine according to a second aspect of the background art has a second issue such as that below. For example, it is assumed that, if the player plays the game for a long period of time, the player will wish to purchase products such as drinks. In addition, it is also assumed that a problem will occur in the terminal device. However, in these cases, the enjoyment of the game may be reduced because the player must leave the seat within the terminal device each time.

In light of the foregoing second issue, an object of the present invention is to provide a game machine which enables the player operating the terminal device to smoothly and quickly call for the manager who manages the game hall without leaving the terminal device.

The present invention provides a game machine such as that below, in order to overcome the foregoing problems.

In a ninth aspect of the present invention, a game machine includes: a game controller (for example, an input operation part B72, described hereafter) for receiving input from a player; a monitor (for example, a sub-display part B61 and a main display device B22, described hereafter) for receiving externally or generating internally and showing a game screen, generated according to a multi-player fighting game program; and a seat (for example, a seat B31, described hereafter) for seating the player; in which the seat further includes a light display part for showing requests to the outside through light emissions in a plurality of distinct optical patterns.

According to the ninth aspect of the present invention, the game machine includes a seat which receives input from the player, receives externally or generates internally and shows a game screen, generated according to a game program, and enables the player to sit, in which this seat further includes a light display device for showing requests to the outside through light emissions in a plurality of distinct optical patterns. This game machine can show requests to the outside through light emissions in a plurality of distinct optical patterns.

In a tenth aspect of the present invention, a game machine includes: a main game machine body (for example, a main game machine body B20, described hereafter) including a memory part (for example, a data base B84, described hereafter) for storing a game program and a main control part (for example, a main control device B80, described hereafter) for executing the game program stored in the memory part; and a plurality of terminal devices (for example, terminal device B30, described hereafter) including an input part (for example, an input operation part B72, described hereafter), and a sub-control part (for example, a sub-control device B90, described hereafter), connected to the main game machine body through wireless or wired connection, for transmitting game input data according to input from the input part to the main game machine body; and a display part (for example, a main display device B22, a management display part B87, and a sub-display part B61, described hereafter) for showing images based on image data output from the main control part; in which the terminal device includes a seat (for example, a seat B31, described hereafter) for enabling the player to operate the input part while seated, and a light display part (a light display device B325, described hereafter)

for emitting light; the sub-control part includes a light control part (for example, a CPU B91, described hereafter) for lighting the light display part, based on input by the input part; and the light display part is provided in a position which can be viewed from outside of the terminal device to which the light display device is provided.

According to the tenth aspect of the present invention, because the game machine lights the light display part based on input from the input part and this light control part is provided in a position which can be viewed from outside of the terminal device to which the light display part is provided, for example, when the player calls for the manager who manages the game hall in order to receive services, such as delivery of products such as drinks, and repair work when a malfunction occurs in the terminal device, the player enters this into the input part, while seated in the seat of the terminal device. The light control part illuminates the light display part provided in the terminal device, based on the input of this input part. Because the light display part is provided in a position which can be viewed from outside of the terminal device to which the light display part is provided, there are instances when the manager notices the lighting of the light display part easily and, in response, goes to the player who called for the manager. In other words, the player can smoothly and easily call for the manager in some instances.

In an eleventh aspect of the present invention, a game machine according to the tenth aspect of the invention has a light display part which is lit in a plurality of lighting aspects (for example, purple, yellow, white, green, blue, and red) and a light control part which lights the light display part in a predetermine lighting aspect, according to the input from the input part.

According to the eleventh aspect of the present invention, the light display part is illuminated with differing lighting aspects, according to the input from the input part. Therefore, for example, the type of service desired by the player may be recognized by viewing the lighting aspects of this light display part. For example, the player enters into the input part the type of product he wants delivered, such as drinks, or the type of service he desires, such as repair work when a malfunction occurs in the terminal device, namely according to the content of the order. In response, the light control part is illuminated with differing lighting aspects, and thus, the manager can identify the type of service, the content of the order and the like.

In a twelfth aspect of the present invention, a game machine according to the eleventh aspect of the invention has: a terminal device which further includes a moving part (for example, a traveling part B32, described hereafter) which is provided on the lower part of the seat, for moving the terminal device on the play area; a sub-control part which includes a movement control part (for example, a CPU B91, described hereafter), connected to the main game machine body through wireless or wired connection, for driving the moving part according to an input from an input part; a light control part which illuminates the light display part according to lighting aspect data from an outer source; a main control part which further includes a lighting aspect determination part (for example, a lighting aspect determination processing shown in FIG. B25, described hereafter) for determined the lighting aspect of the light display part of the terminal device which transmitted the game input data, based on the game input data received from the sub-control part; in which the main control part transmits the determined lighting aspects as lighting aspect data.

According to the twelfth aspect of the present invention, the player enters into the input according to the desired service. The sub-control part transmits the game input data based on this input to the main control part. The lighting aspect determination part determined the lighting aspect of the light display part of the terminal device which transmitted the game input data, based on the received game input data. In addition, the lighting aspect determination part determines the lighting aspect so that the lighting aspects of the light display part provided in each of the plural terminal devices are not the same, when determining the lighting aspects of the light display part. Then, the main control part transmits the determined lighting aspects as the lighting aspect data to the sub-control part. The light control part illuminates the light display part according to the received lighting aspect data, which is based on the input from the input part. Therefore, the light display part provided in each terminal device is illuminated with differing lighting aspects, and thus, the manager can understand the content of the order and the lighting aspect of the light display part in pairs, in some instances.

In a thirteenth aspect of the present invention, a game machine according to the twelfth aspect of the invention has a light display part which includes an light emission part (for example, an LED chip, described hereafter) for emitting light of differing colors (for example, purple, yellow, white, green, blue, and red).

According to the thirteenth aspect of the present invention, because the light display part emits light of differing colors based on the input operations by the player, the manager can see the light display part with more clarity, in some instances. In addition, because light of differing colors are emitted, it can be effective as presentation of the game hall, in some instances.

In a fourteenth aspect of the present invention, a game machine according to the thirteenth aspect of the invention has: a terminal device which includes a sub-display part (for example, a sub-display part B61, described hereafter) for showing image data; a game program which includes a product acquisition event which is generated according to the operation of the input part; a main control part which includes a product memory part (for example, a data base B84, described hereafter) for storing the product data of a product corresponding to the product acquisition event, and in which the player operating the terminal device transmits product data according to the product acquisition event to the terminal device, within the game environment realized by the game program; a sub-control part which shows a product image data included in the product data in the sub-display part according to the received product data; and a light control part which illuminates the light display part with the lighting aspect corresponding to the product, according to the selection of the product made by the player, based on the product image data.

According to the fourteenth aspect of the present invention, in the game program executed by the main control part, within the game environment, the main control part transmits acquired product data to the terminal device, in response to the acquisition of the product by the user through the product acquisition event. The sub-control part of the terminal device which received this product data shows the product image data included in the product data in the sub-display part and illuminates the light display part with the lighting aspect corresponding to the product, when the player has selected this product. Therefore, for example, if the player selects a product acquired virtually in the game (for example, a drink, described hereafter) so as to exchange the acquired product with a real product, the manager (store staff, etc.) is notified by the illuminating of the light display part and an actual product can be received. Thus, this game machine can enhance the enjoyment of the game to the player, by correlating the virtual game contents with real products.

In a fifteenth aspect of the present invention, a game machine according to the fourteenth aspect of the invention has: a light display part which includes a light emission part (for example, an LED chip, described hereafter) for emitting light of differing colors; and a light control part which enables the light emission part of differing colors to illuminate according to the product acquired by the player in the game program.

According to the fifteenth aspect of the present invention, in the game program executed by the main control part, the light control part illuminated the light emission part according to the product, in response to the performance of a presentation in which the player acquired a product. Therefore, for example, the manager is notified accurately by the illumination of the light emission part that the product (for example, a drink, described hereafter) acquired virtually in the game by the player is one product among a plurality of types of products, and this one product can be received from the manager. Thus, this game machine can enhance the enjoyment of the game to the player, by correlating the virtual game contents with real products.

According to the present invention, the player enters into the input part, while seated in the seat of the terminal device, when calling for a manager who manages the game hall, in order to receive services such as the delivery of products such as drinks and repair work when a malfunction occurs in the terminal device. The light control part illuminated the light display part provided in the terminal device according to the input from the input part. Because the light display part is provided in a position which can be viewed from outside of the terminal device to which the light display part is provided, there are instances when the manager notices the lighting of the light display part easily and, in response, goes to the player who called for the manager. In other words, the player can smoothly and easily call for the manager in some instances.

However, the multi-player game machine according to a third aspect of the background art has a third issue such as that below, in particular. In other words, because the game machine provides the player with realistic feelings and tension for a long period of time, the player becomes tired psychologically or physically and wishes to take a short break. In cases such as this, it is known that the game machine halts the game by including an input part for halting the game (PAUSE button, etc.). However, after halting the game in this way, the player adjusts the seat for resting and manually switches the screen of the monitor showing the game.

In light of the foregoing third issue, an object of the present invention is to provide a game machine which halts the game or switches a game screen shown in a monitor to another image when the player operating the game machine merely changes the angle of the backrest of the seat in the game machine.

The present invention provides a game machine such as that below, in order to overcome the foregoing problems.

In a sixteenth aspect of the present invention, a game machine includes: a game controller (for example, an input operation part C72, described hereafter) for receiving input from a player; a monitor (for example, a sub-display part C61 and a main display device C22, described hereafter) for receiving externally or generating internally and showing a game screen, generated according to a game program; and a seat (for example, a seat C31, described hereafter) for seating the player; in which the seat includes reclining function, as well as a control part (for example, a reclining driving control device C35, described hereafter), having a sensor for detecting the angle at which the backrest of the seat is reclined by the reclining function, for halting the progress of the game by the game program or switching the game screen shown in the monitor to another image, according to the angle detected by the sensor.

According to the sixteenth aspect of the present invention, the game machine includes a seat having a reclining function, in which this seat is provided with a control part which has a sensor for detecting the angle at which the backrest of the seat is reclined by the reclining function and halts the progress of the game by the game program or switches the game screen shown in the monitor to another image, according to the angle detected by the sensor. Therefore, the player can halt the game or switch the game screen shown in the monitor to another image merely by changing the angle of the backrest of the seat in the game machine, in some instances.

In a seventeenth aspect of the present invention, a game machine includes: a main game machine body including a main control part for generating image data according to the game program regulating the progress of the game, game input data, and the progress of the game and a main display part for showing images based on the image data; and a terminal device including a reception part for receiving input from the player and outputting game input data, a sub-display part which is provided so as to face the player, and a seat which enables the player to operate the reception part while seated and includes a reclining function for changing the position of the player and position operation part for operating the reclining function; in which the seat includes reclining function, as well as a control part, having a sensor for detecting the angle at which the backrest of the seat is reclined by the reclining function, for halting the progress of the game by the game program or switching the game screen shown in the sub-display part to another image, according to the angle detected by the sensor.

According to the seventeenth aspect of the present invention, the game machine includes a seat having a reclining function, in which this seat is provided with a control part which has a sensor for detecting the angle at which the backrest of the seat is reclined by the reclining function and halts the progress of the game by the game program or switches the game screen shown in the monitor to another image, according to the angle detected by the sensor. Therefore, the player can halt the game or switch the game screen shown in the monitor to another image merely by changing the angle of the backrest of the seat in the game machine. For example, if a plurality of players is playing a game in a game machine such as this, the game time often becomes long because the game is played together with other players. In this game machine, there are instances in which each player can take a break easily, even in cases such as this. Furthermore, for example, there are instances in which other images such as television can be shown in the sub-display part by the operation of the reclining function. As a result, there are instances in which the player can, for example, halt the game, take a break, and enjoy the images shown in the sub-display part (for example, external images such as television).

In an eighteenth aspect of the present invention, a game machine according to the sixteenth or seventeenth aspect of the invention has a seat which further includes a backrest part for supporting the back of the player, a reclining driving part for tilting the backrest part, and a reclining operation part for operating the reclining driving part; in which the main control part is controlled when the gradient angle of the backrest part is within the range of a predetermined angle.

According to the sixteenth aspect of the present invention, because the game machine controls the main control part when the gradient angle of the backrest part is within the range of a predetermined angle, the player can control the progress of the game by reclining the backrest part. Therefore, for example, a game in progress can be halted or an input image by an external image data input part (for example, external image data such as television) can be provided to the player, when the player merely reclines the backrest part.

According to the present invention, the player operating the game machine can halt the game or switch the game screen shown in the monitor to another image merely by changing the angle of the backrest of the seat in the game machine.

The multi-player game machine according to a fourth aspect of the background art has a fourth issue such as that below.

First, in a multi-player game machine such as this, there are instances where empty seats are scattered. In this case, there is a problem in that, even if players want to newly participate in the same game with friends, they must play the game in seats away from each other. In addition, there are players who wish to operate the terminal device in a position of his choice to the main display part of the main game machine body.

Next, in regards to a multi-player-type game machine wherein numerous players participate, providing a game machine which includes functions for giving a sense of action never before achieved and enables further enhancement of enjoyment was considered. As a game which gives a sense of action such as this, there is a game, in amusement parks, having a ride which can move along a movement path and an input part shaped like a gun, in which the player competes for points by operating this input part to shoot targets provided along the movement path, while riding and moving on the ride. However, there are no game machines for commercial use placed in game arcades and the like, particularly multi-player game machines, which implement a construction which achieves a sense of action such as this.

In light of the foregoing issue, an object of the present invention is to provide a game machine which enables the game machine itself to move in correlation to the movement of the operation character which moves within the game environment by input to the game from the player operating the game machine.

The present invention provides a game machine such as that below, in order to overcome the foregoing problems.

In a nineteenth aspect of the present invention, a game machine includes: a game controller (for example, an input operation part D72, described hereafter) for receiving input from a player; a monitor (for example, a sub-display part D61 and a main display device D22, described hereafter) for receiving externally or generating internally and showing a game screen, generated according to a game program; and a seat for seating the player; in which the seat includes an engine mechanism (for example, a driving control device D32) for enabling the seat to self-propel while the player is seated, as well as a control part (for example, a sub-control device D90) for movement-controlling by the motive energy of the engine mechanism, in correlation with the movement of the operation character according to the game input from the game controller within the game environment generated based on the game program.

According to the nineteenth aspect of the present invention, the game monitor includes a game controller for receiving input from a player, a monitor for receiving externally or generating internally and showing a game screen, generated according to a game program, and a seat for seating the player, in which the seat includes an engine mechanism for enabling the seat to self-propel while the player is seated, as well as a control part for movement-controlling by the motive energy of the engine mechanism, in correlation with the movement of the operation character according to the game input from the game controller within the game environment generated based on the game program.

Therefore, because the game machine itself is movement-controlled in correlation to the movement of the operation character moving within the game environment according to input from the player, the game machine can move in conjunction with the movements within the game environment.

In a twentieth aspect of the present invention, a game machine includes: a main game machine body (for example, a main game machine body D20, described hereafter) including a memory part (for example, a data base D84, described hereafter) for storing a game program and a main control part (for example, a main control device D80, described hereafter) for executing the game program stored in the memory part; and a plurality of terminal devices (for example, terminal device D30, described hereafter) including an input part (for example, an input operation part D72, described hereafter), and a sub-control part (for example, a sub-control device D90, described hereafter), connected to the main game machine body through wireless or wired connection, for transmitting game input data according to input from the input part to the main game machine body; and a display part (for example, a main display device D22 and a sub-display part D61, described hereafter) for showing images based on image data output from the main control part; in which the main control part receives a plurality of game input data from the plurality of terminal devices, generates a single game data according to the game program based on this plurality of game input data, and generates and outputs to the display part image data which is shared by all terminal devices based on this single game data; the main game machine body includes a play area (for example, a play area D21, described hereafter) on which the plurality of terminal devices and the display part is placed; the terminal device includes a seat (for example, a seat D31, described hereafter) for enabling the player to operate the input part while seated and a moving part (for example, a traveling part D32, described hereafter) which is provided on the lower part of the seat, for moving the terminal device on the play area; the sub-control part includes a movement control part (for example, a CPU D91, described hereafter) for driving the moving part according to input from the input part and a identifier attachment part (for example, CPU D91) for attaching an identifier to identify individual terminal devices; the single game data generated in the main control part includes data of a plurality of operation characters, which can be moved within a single game field generated according to the game program, based on respective game input data of the plurality of terminal devices; and the main control part specifies the terminal device which transmitted the game input data, based on the identifier attached to the game input data, when a plurality of game input data is received from a plurality of terminal devices, and operates the operation character of the specified terminal device according to the game input data.

According to the twentieth aspect of the present invention, because a moving part is provided in each of the plurality of terminal devices within the game field, and this moving part is driven according to input from the input part, there are instances in which the terminal device can be moved to a position of the player's choice within the game field.

Therefore, for example, when every player operating a plurality of terminal devices shares a single game data by the main control part, each of the terminal devices of the plurality of players can be moved with the movement of each operation character.

In addition, because an identifier is attached to the game input data by the identifier attachment part in the terminal device and the terminal device which transmitted the game input data is specified by the main control part of the main game machine body, based on the identifier, there are instances in which the main game machine body can accurately identify each terminal device regardless of the position where the terminal device moves within the game field.

In a twenty-first aspect of the present invention, a game machine includes: a main game machine body (for example, a main game machine body D20, described hereafter) including a memory part (for example, a data base D84, described hereafter) for storing a game program and a main control part (for example, a main control device D80, described hereafter) for executing the game program stored in the memory part; and a plurality of terminal devices (for example, terminal device D30, described hereafter) including an input part (for example, an input operation part D72, described hereafter), and a sub-control part (for example, a sub-control device D90, described hereafter), connected to the main game machine body through wireless or wired connection, for transmitting game input data according to input from the input part to the main game machine body; and a display part (for example, a main display device D22 and a sub-display part D61, described hereafter) for showing images based on image data output from the main control part; in which the main control part receives a plurality of game input data from the plurality of terminal devices, generates a single game data according to the game program based on this plurality of game input data, and generates and outputs to the display part image data which is shared by all terminal devices based on this single game data; the main game machine body includes a play area (for example, a play area D21, described hereafter) on which the plurality of terminal devices and the display part is placed; the terminal device includes a seat (for example, a seat D31, described hereafter) for enabling the player to operate the input part while seated and a moving part (for example, a traveling part D32, described hereafter) which is provided on the lower part of the seat, for moving the terminal device on the play area; the sub-control part includes a movement control part (for example, a CPU D91, described hereafter) for driving the moving part according to movement signal data from an external source and moving the terminal device to a predetermined position, and a identifier attachment part (for example, CPU D91) for attaching an identifier to identify individual terminal devices; the single game data generated in the main control part includes positional data of a plurality of operation characters, which can be moved within a single game field generated according to the game program, based on respective game input data of the plurality of terminal devices; and, when the positional data of the operation character of a specific terminal among a plurality of terminal devices meets predetermined conditions, the main control part transmits movement signal data to the specific terminal device, using the identifier, and in response to the terminal device receiving the movement signal data, the movement control part drives the moving part based on the movements of the operation character.

According to the twenty-first aspect of the present invention, because a moving part is provided in each of the plurality of terminal devices within the game field, and this moving part is driven according to input from the input part, there are instances in which the terminal device can be moved to a position of the player's choice within the game field.

Therefore, for example, when every player operating a plurality of terminal devices shares a single game data by the main control part, each of the terminal devices of the plurality of players can be moved with the movement of each operation character.

In addition, by reflecting the positional relationship of a plurality of operation characters within the game field in the positional relationship of the plurality of terminal devices, the positional relationships between the operation characters in the game field can be presented more realistically on the play area, and thus, the enjoyment of the player is further enhanced. For example, if a plurality of players fight against each other, the players can be made aware that they are enemies by bringing the terminal devices of the competing players closer together, and tension between the opposing players can be enhanced.

Furthermore, because the main control part transmits movement signal data to the specific terminal device, using an identifier, there are instances in which each terminal device can accurately identify movement signal data from the main game machine body, regardless of the position the terminal device is placed on the play area.

In a twenty-second aspect of the present invention, a game machine according to the twenty-first aspect has a terminal device which includes a position detection part (for example, an IC tag detection part D324, described hereafter) for detecting the position of each terminal device on the play area as the current positional data; in which the movement signal data is data designating the position of the terminal device; and the movement control part in the terminal device drives the moving part to move the terminal device to a position designated by the movement signal data, based on the current positional data detected by the position detection part.

According to the twenty-second aspect of the present invention, because a position detection part is provided in the terminal device, for example, the terminal device can be moved accurately to a designated position by moving the terminal device closer to the position designated by the movement signal data, while verifying the current position of the terminal device by the current positional data detected by the position detection part.

According to the present invention, a game machine can be provided in which the game machine itself can be moved in correlation to the movement of the operation character which moves within the game environment by input to the game from the player operating the game machine.

Further features of the invention, its nature, and various advantages will be apparent from the accompanying drawings and the following detailed description of the invention.

BRIEF DESCRIPTION OF THE DRAWINGS

FIG. 4A is a perspective view of the of the seat of the terminal device in seat mode;

FIG. 12A is a sensation generating control signal selection table of the main game machine body;

FIG. 13A is another embodiment of the sensation generating control signal selection table of the main game machine body;

FIG. 20A is a perspective view showing a state in which a macroquest is generated in the game environment in the game program of the game machine;

FIG. 12B is a lighting aspect table referenced in the game machine;

FIG. 28B is an example of a product acquisition event corresponding table;

FIG. 30B is an example of a lighting aspect table.

FIG. 1C is a perspective view showing an outward aspect of the game machine according to an embodiment of the present invention;

FIG. 18C is a perspective view showing a state in which a macroquest is generated in the game field in the game program of the game machine.

DESCRIPTION OF THE PREFERRED EMBODIMENTS

A game machine in a preferred embodiment is described below.

Overall Configuration of the Game Machine

Figure 1A:
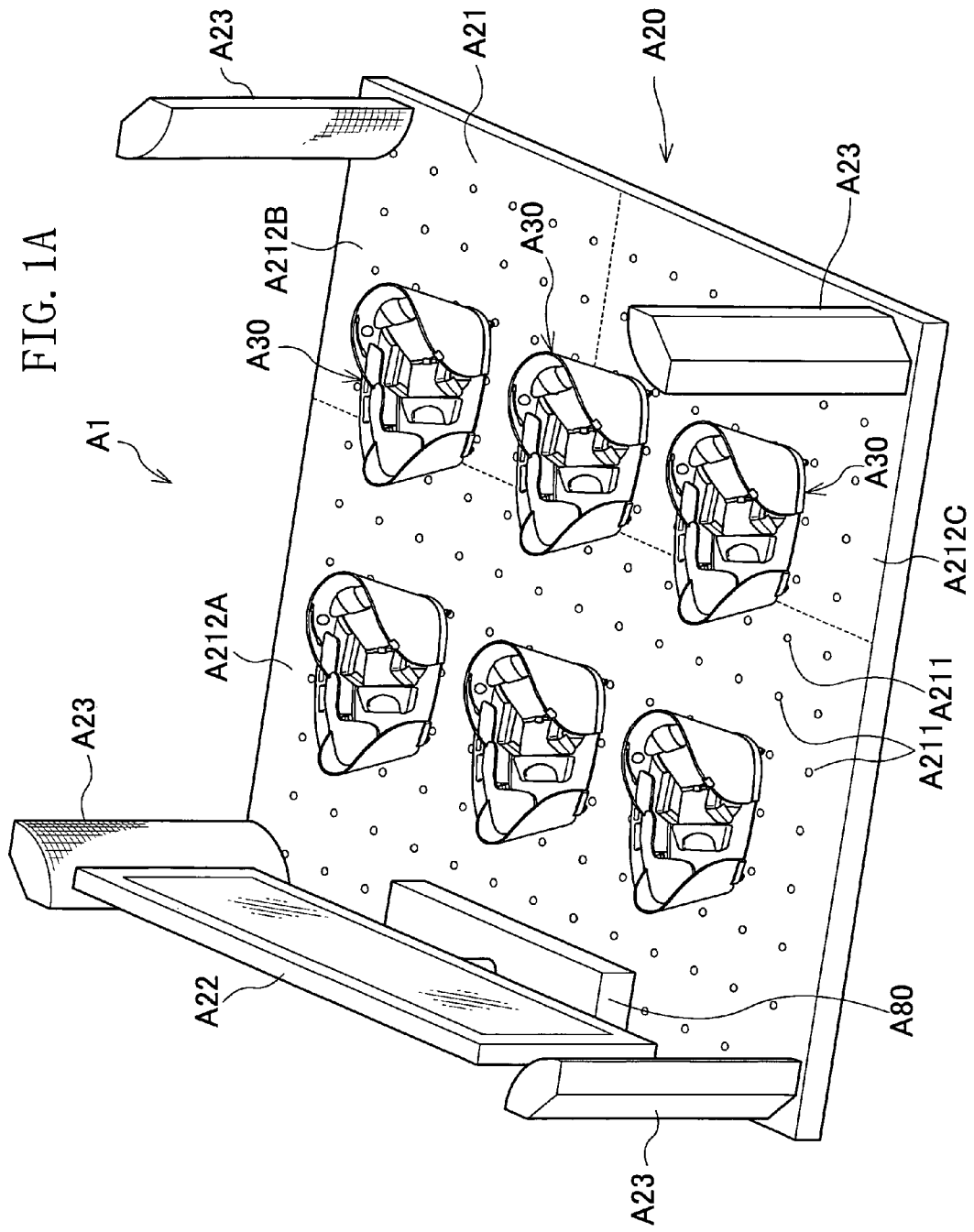
FIG. 1A is a perspective view showing an outward aspect of the game machine according to an embodiment of the present invention.

FIG. 1A is a perspective view showing an outward aspect of the game machine A1 according to an embodiment of the present invention.

The game machine A1 is a multi-player game machine, including a main game machine body A20 which includes a flat, rectangular play area A21 and a plurality of terminal devices A30 which are placed on this play area A21.

Aside form the play area A21, the main game machine body A20 includes a main display device A22 which is placed along one side of the play area A21, a speaker device A23 which is placed in the four corners of the play area A21, and a main control device A80 for controlling these main display device A22 and speaker device A23.

The play area A21 is divided into a plurality of sub-areas A212. As these sub-areas A212, there are city areas A212A, ocean areas A212B, and forest areas A212C. In addition, IC tags A211 are buried in grid-form in the play area A21. Positional information of the inside of the play area A21 is stored to this IC tag S211.

The main display device A22 is a large projector display device showing images based on image data output from the main control device A80. The main display device A22 is not limited thereto and can also be a large monitor.

The main control device A80 can communicate with each terminal device A30 bi-directionally through a wireless LAN and can provide each player with a common virtual space by executing the predetermined game program and bi-directionally communicating with each terminal device A30.

Each terminal device A30 is placed facing towards the main display device A22. This terminal device A30 is connected to the main control device A80 through wireless LAN and can be moved over the play area A21 according to the instructions from the main control device A80 or by player operation.

Figure 2A:
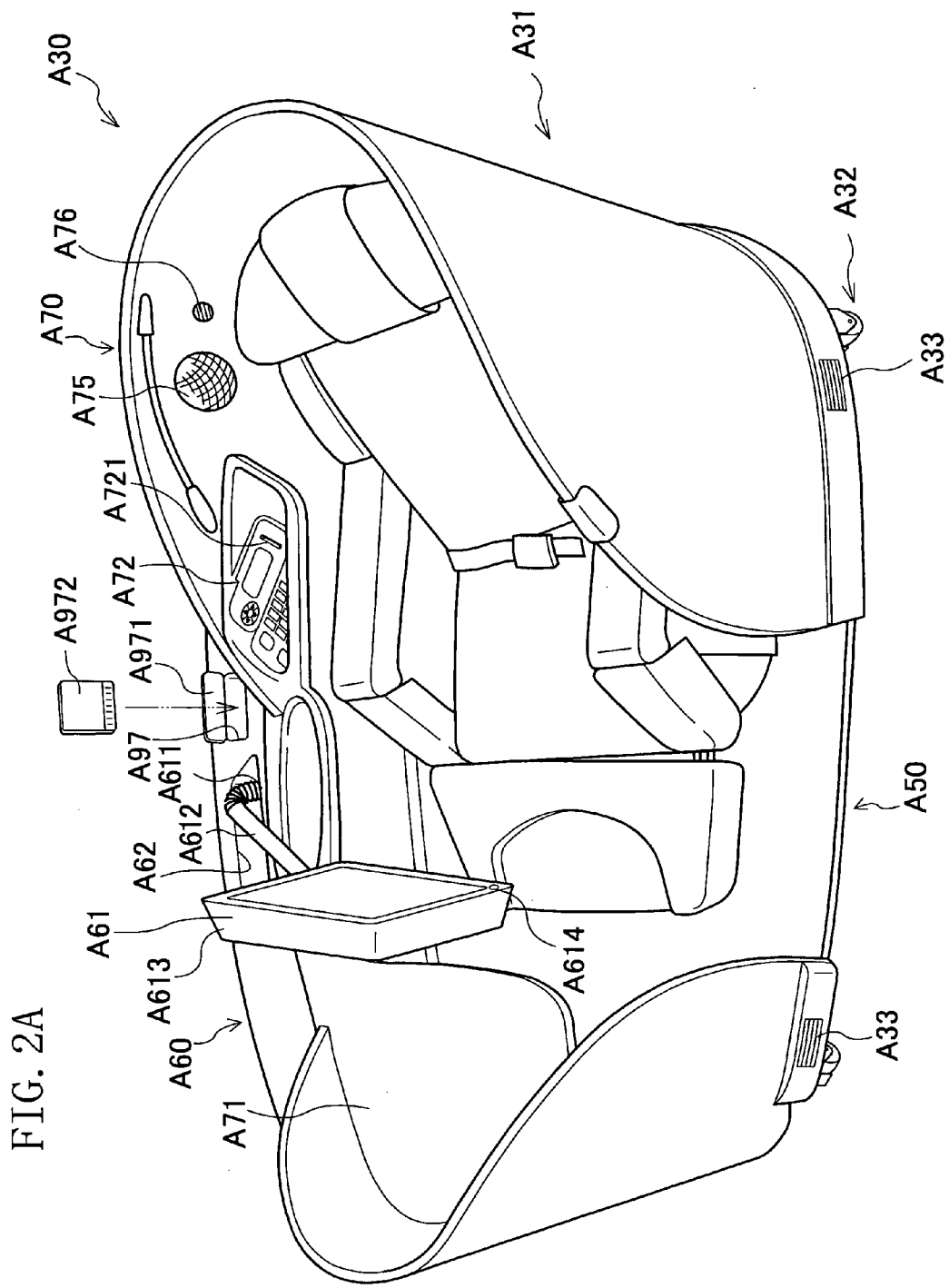
FIG. 2A is a perspective view showing an outward aspect of the terminal device of the game machine.

FIG. 2A is a perspective view showing an outward aspect of each terminal device A30.

The terminal device A30 includes a seat A31, and a traveling part A32, which is provided on the lower part of the seat A31, for moving the seat A31 over the play area A21.

Figure 3A:
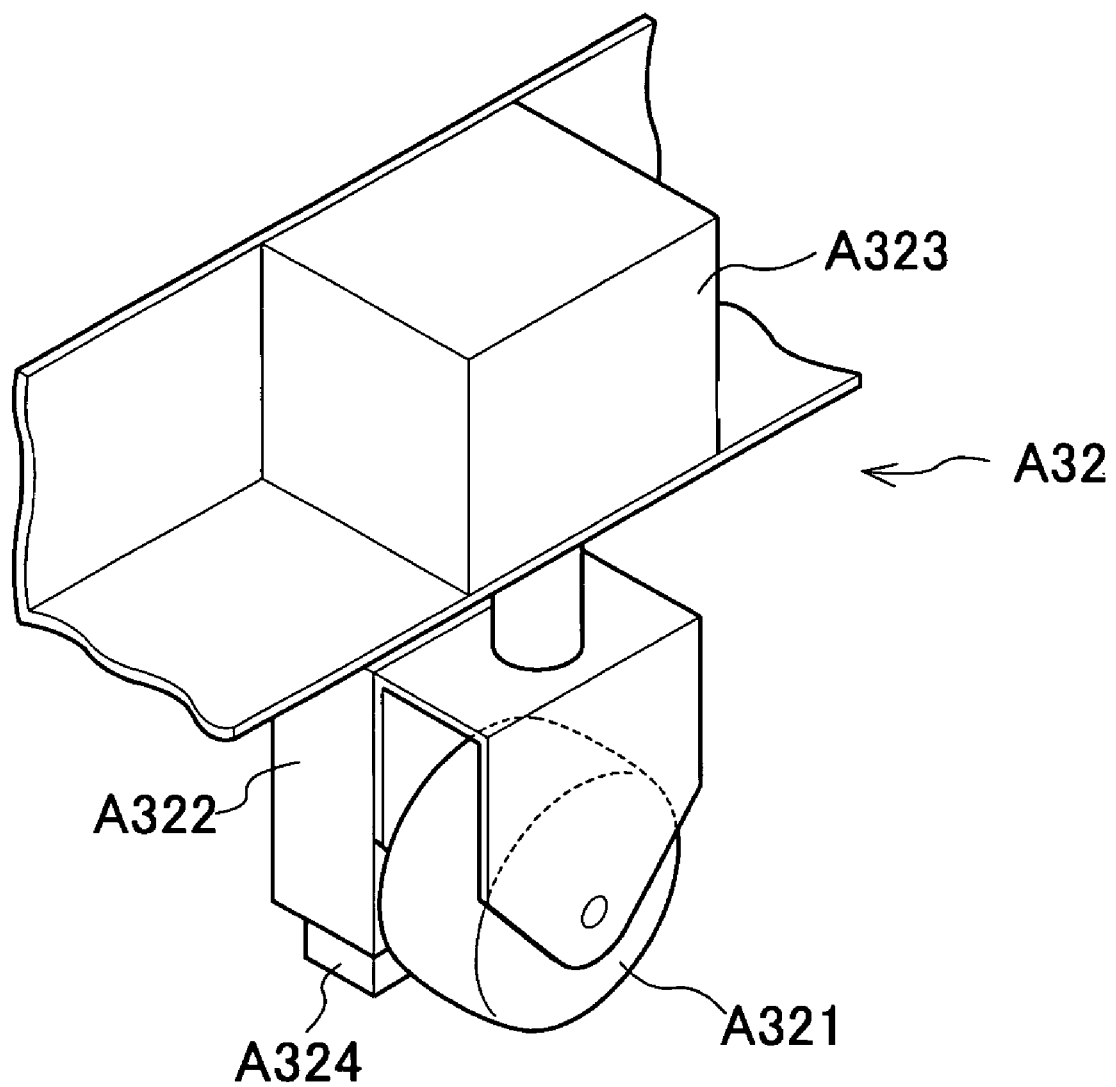
FIG. 3A is an enlarged perspective view of one section of a traveling part of the terminal device.

FIG. 3A is an enlarged perspective view of one section of the traveling part A32.

The traveling part A32 includes four traveling tires A321, a driving control device A322 for rotation-driving these traveling tires A321, a direction control device A323 for controlling the direction of the traveling tires A321, and a rechargeable battery, not shown, for supplying the driving control device A322 and direction control device A323 with power.

The traveling part A32 can move a seat A31 to an arbitrary position on the play area A21 by the driving control device A322 and the direction control device A323.

The foregoing rechargeable battery can be recharged through connection to an external power source, but is not limited thereto, and can be recharged by self-induced electromotive force due to a magnetic field, by embedding a magnetic field generating device in the play area A21 and generating a magnetic field by this magnetic field generating device.

In addition, an IC tag detection part A324 for detecting IC tags A211, which are buried in the play area A21, is provided below the driving control device A322 of the traveling part A32.

Configuration of the Seat

FIG. 4A is a perspective view of the seat A31 in seat mode. FIG. 5A is a perspective view of the seat A31 in bed mode.

Seat A31 includes a main seat body A50, a side unit A60 which is provided along one side surface of the main seat body A50, and a seat shell A70 which surrounds the main seat body A50 on three sides, excluding the other side surface side.

The mode of this seat A31 can be adjusted in multiple steps, between the seat mode shown in FIG. 4A and the bed mode shown in FIG. 5A.

The main seat body A50 includes a flat base part A51, a seating part A52 which is provided on this base part A51, a backrest A53 which is attached to enable changing of its angle to the seating part A52, a head rest A54 which is provided on the top part of the backrest A53, and a pair of side arms A55 which are provided in positions on the seat surface of the seating part A52 and both sides of the backrest A53.

A mist spray nozzle A33, constituting a sensation generating device A65, described hereafter, is provided in the four corners of the base part A51 and in the vicinity of the traveling tires A321 of the traveling part A32. Mist is released from this mist spray nozzle A33 and the traveling part A32 becomes hidden from the player.

The seating part A52 moves back and forth on the base part A51 when the player operates the input operation part A72. The main seat body A50 changes from the seat mode shown in FIG. 4A to the bed mode shown in FIG. 5A, when this seating part A52 is slid forward, and forms a bed.

The seating part A52 includes a leg rest A521 which is provided on the front surface side and a foot rest A522 which is stored in the tip of this leg rest A521. The leg rest A521 turns upward according to the sliding motion, when the seating part A52 is slid forward, and becomes a seat surface which continues from the seat surface of the seating part A52. At the same time, the foot rest A522 projects from the leg rest A521 and becomes a seat surface which continues from the leg rest A521.

The backrest A53 falls backward, according to the back and forth movement of the seat part A52 on the base part A51.

The front surface side of the side arm A55 turns slightly upward, when the main seat body A50 is placed in bed mode.

A bag component, into which air can be injected, is embedded respectively within the seat surface of the seating part A52, the lower part of the backrest A53 (which comes into contact with the lower back of the player) and the head rest A54. When air is injected into these bag components by an air pump, the surface swells and can support the user while accommodating the contours of the body surface of the user.

The sub-display part A61 which is configured to include a liquid crystal display panel is stored in the side unit A60.

As shown in FIG. 2A, the sub-display part A61 includes a first support arm A611 which is supported by the side unit A60, a second support arm A612 which is attached to the tip of the first support arm A611, and a flat, rectangular sub-monitor A613 which is attached to the tip of the second support arm A612 and performs liquid crystal display.

The first support arm A611 can be extended and retracted freely in the direction vertical to the side unit A60. The second support arm A612 can extend and retract freely and can be fixed to an arbitrary angle to the axis direction of the first support arm A611. The sub-monitor A613 can be fixed to an arbitrary angle to the axis direction of the second support arm A612.

A small CCD camera A614 is embedded into the sub-monitor A613. This CCD camera A614 is used when creating an avatar in the game environment.

The image taken by the CCD camera A614 is displayed constantly in the sub-display part A61 in the terminal device A30, by operating an input operation part A72 (described hereafter). Because the expressions of the player per se can be viewed during the game, in this way, enjoyment increases. In this case, the photographed image can be shown on the entire screen of the sub-monitor A613 or in one section of the screen.

A sub-monitor storage space A62 which extends in the vertical direction is provided in the side unit A60, and the foregoing first support arm A611, a second support arm A612, and a sub-monitor A613 are stored within the sub-monitor storage space A62.

The procedure by which the player pulls out the sub-monitor A613 from the storage space A62 is explained, with reference to FIG. 6A to FIG. 8A.

Figure 6A:
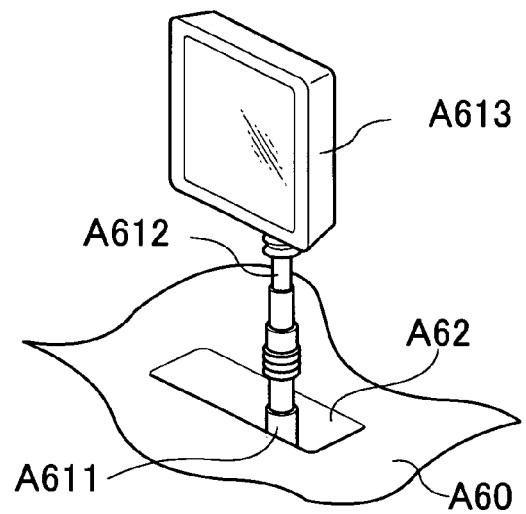
FIG. 6A is a perspective view showing a state in which a sub-monitor of the terminal device is pulled out from within a storage space.
Figure 7A:
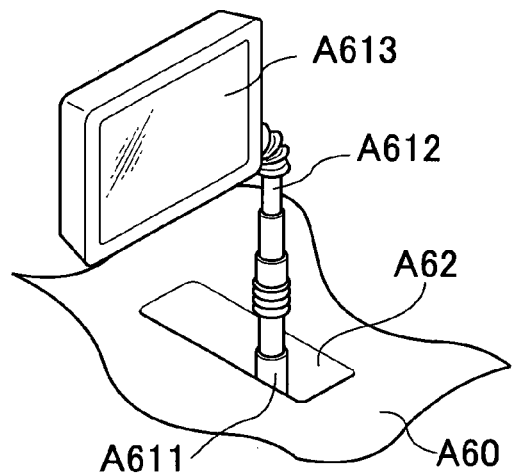
FIG. 7A is a perspective view showing a state in which the display screen of the sub-monitor of the terminal device is turned toward the player.
Figure 8A:
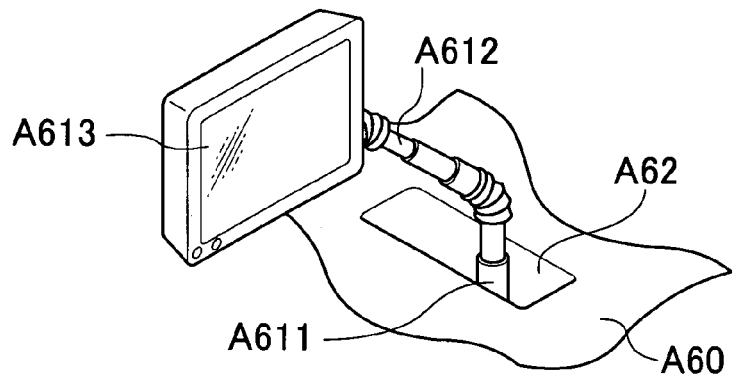
FIG. 8A is a perspective view showing a state in which the position of the sub-monitor of the terminal device is adjusted.

First, as shown in FIG. 6A, the player slides the sub-monitor A613 upward from the sub-monitor storage space A62 and extends the first support arm A611 and the second support arm A612, while seated in the main seat body A50. Then, as shown in FIG. 7A, the display screen of the sub-monitor A613 is turned toward the player by twisting the sub-monitor A613. Subsequently, as shown in FIG. 8A, the sub-monitor A613 is positioned to the player's eye level by adjusting the relative angles of the first support arm A611 and the second support arm A612 and the relative angles of the second support arm A612 and the sub-monitor A613.

A sub-control device A90 which is connected by wireless LAN to the main control device A80 and a plurality of board storage slots A97 which configure this sub-control device A90 are provided within the side unit A60.

The sub-control device A90 controls the sub-display part A61 and the traveling part A32, based on instructions from the main control device A80, as well as transmitting signals input by the input operation part A72 (described hereafter) to the main control device A80.

A cover part A971 is provided to open and close freely on the upper part of the board storage slots A97. By opening the cover part A971 and inserting a terminal control board A972 from above, as shown in FIG. 2A, the terminal control board A972 can be attached to the board storage slot A97.

The back-side of the seat shell A70 extends upward and can support the backrest A53 and the head rest A54. In addition, speakers A75 and a fragrance spray nozzle A76, constituting a sensation generating device A65, described hereafter, are provided on both sides of the head rest A54 of the seat shell A70. This fragrance spray nozzle A76 is provided in the vicinity of the head rest A54 so that scents are caught only by specific players.

The back-sides of the side surfaces of the seat shell A70 extends upward so that the player seated in the main seat body A50 cannot be viewed by other players.

A table A71 is attached from one side surface of the main seat body A50 to the front surface, on the upper edge of the seat shell A70. The space beneath this table A71 accepts the leg rest A521 and the foot rest A522 when the main seat body A50 is placed in bed mode.

The input operation part A72 is provided in the vicinity of the side arm A55 on the table A1, or in other words, a position wherein the player can perform operations while seated in the main seat body A50, and includes a keyboard, a jog dial and the like. A card slot A721 for inserting credit cards and membership cards is provided in this input operation part A72.

Although the input operation part A72 is provided on the table A71 in the present embodiment, this is not limited thereto, and can be provided as a touch-panel on the sub-monitor A613.

A medal payout opening A731 from which medals are paid out from a medal collection part A73 provided within the side unit A60, and a medal receiving part A732 for receiving the medals which are paid out are provided below the table A71 and in front of the side arm A55. A holder, not shown, for attaching a medal storage container A733 is provided in the medal reception part A732. Although medals are paid out from the medal payout opening A731 according to the game result, the amount of medals to be paid out can be configured so that, for example, predetermined odds (betting odds) are stipulated to the participants of a certain event (win/loss of horse-racing, combat, etc.), much like a book-maker, and the medals are paid out according to the odds, based on the win/loss results. The prize resulting from this book-maker is not limited to medals and can be items within the game environment.

Figure 9A:
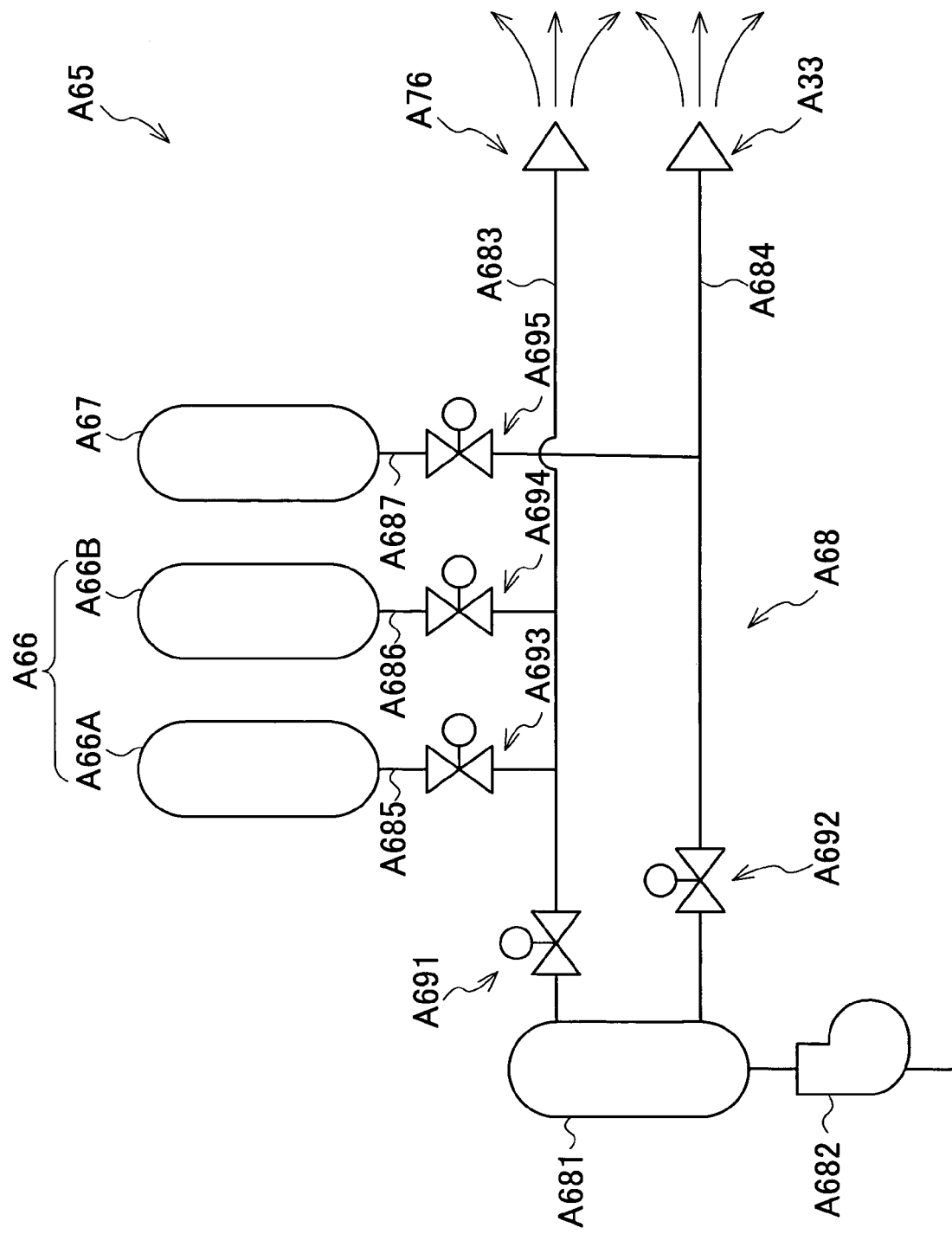
FIG. 9A is a block diagram showing a configuration of a sensation generating device of the terminal device.

FIG. 9A is a block diagram showing a configuration of the sensation generating device A65.

The sensation generating device A65 includes a plurality of storage containers A66A and A66B for storing a plurality of types of fragrances of differing scents, a storage container A67 for storing water, and a spray device A68 which selectively sprays fragrances stored in the storage containers A66A and A66B or water stored in the storage container A67 (as fog) from the head rest A54 or sprays water stored in the storage container A67 from the lower part of the seat A31 as mist.

Here, mist refers to water and gas resulting when a mist generating device (for example, a spray device A68) sprays water stored in the storage container A67 from the lower part of the seat A31.

The storage container A66A which stores ocean-scented fragrance and storage container A66B which stores forest-scented fragrance, for example, are storages containers A66.

The spray device A68 includes a compressed air tank A681 which stores compressed air, a compressor A682 which supplies compressed air to the compressed air tank A681, a duct A683 which extends from the compressor A682 to the fragrance spray nozzle. A76, a duct A684 which extends from the compressor A682 to the mist spray nozzle A33, a duct A685 which extends from the storage container A66A to the duct A683, a duct A686 which extends from the storage container A66AB to the duct A683, and a duct A687 which extends from the storage container A67 to the duct A684.

An electromagnetic open and close valve A691 is provided in the duct A683, an electromagnetic open and close valve A692 is provided in the duct A684, an electromagnetic open and close valve A693 is provided in the duct A685, an electromagnetic open and close valve A694 is provided in the duct A686, and an electromagnetic open and close valve A695 is provided in the duct A687.

The foregoing compressor A682 and electromagnetic open and close valves A691 to A695 are controlled by the sub-control device A90.

Figure 10A:
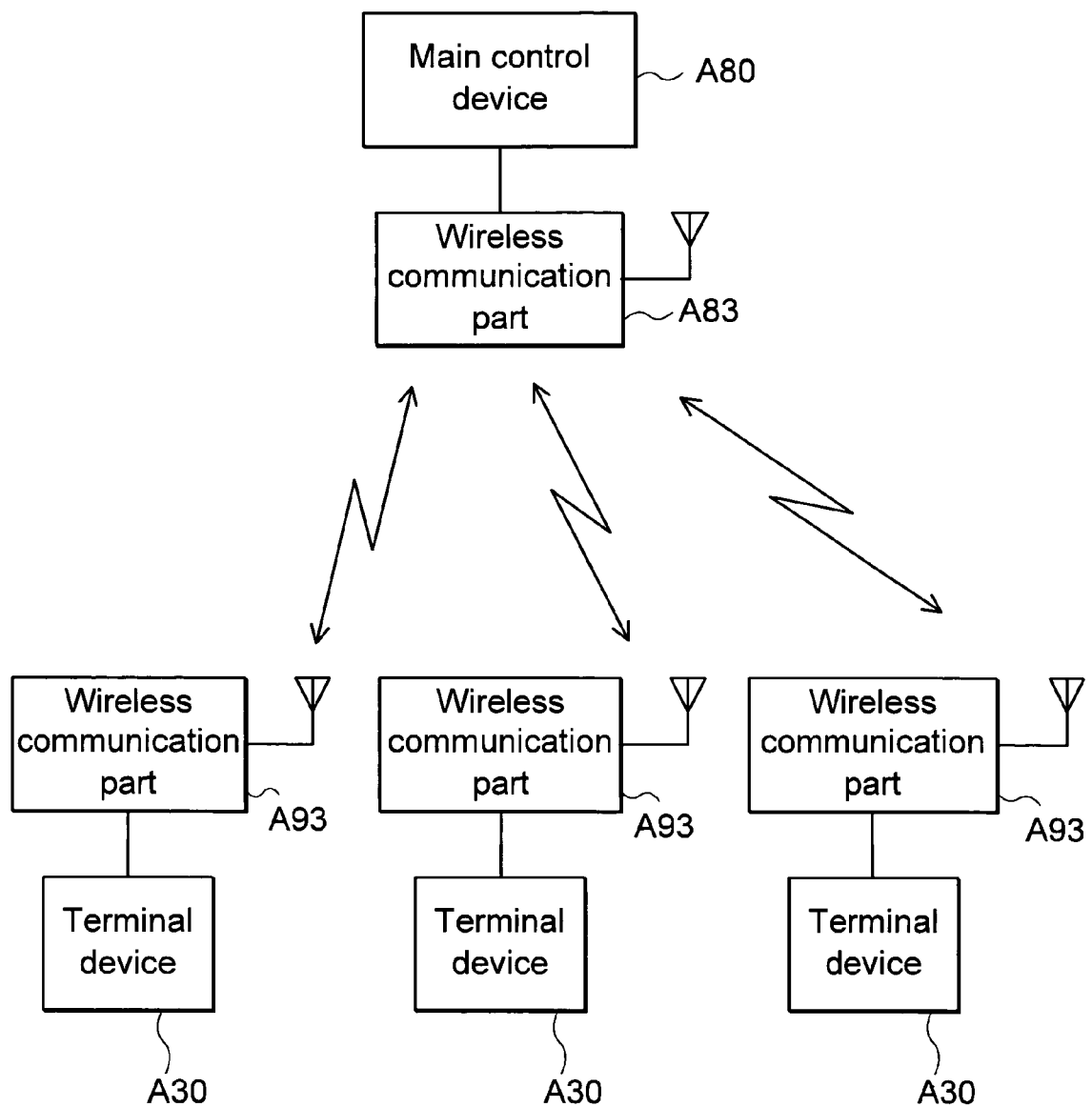
FIG. 10A is a block diagram showing an overall configuration of the game machine.

FIG. 10A is a block diagram of an overall configuration of the game machine A1.

In this game machine A1, the main control device A80 of the main game machine body A20 had a wireless communication part A83 and the sub-control device A90 of the terminal device A30 has a wireless communication part A93. These wireless communication parts A83 and A93 can be interconnected by a wireless LAN, and thus, the transfer of voice data and character data can be performed between the main control device A80 and the sub-control device A90.

Configuration of the Main Control Device

Figure 11A:
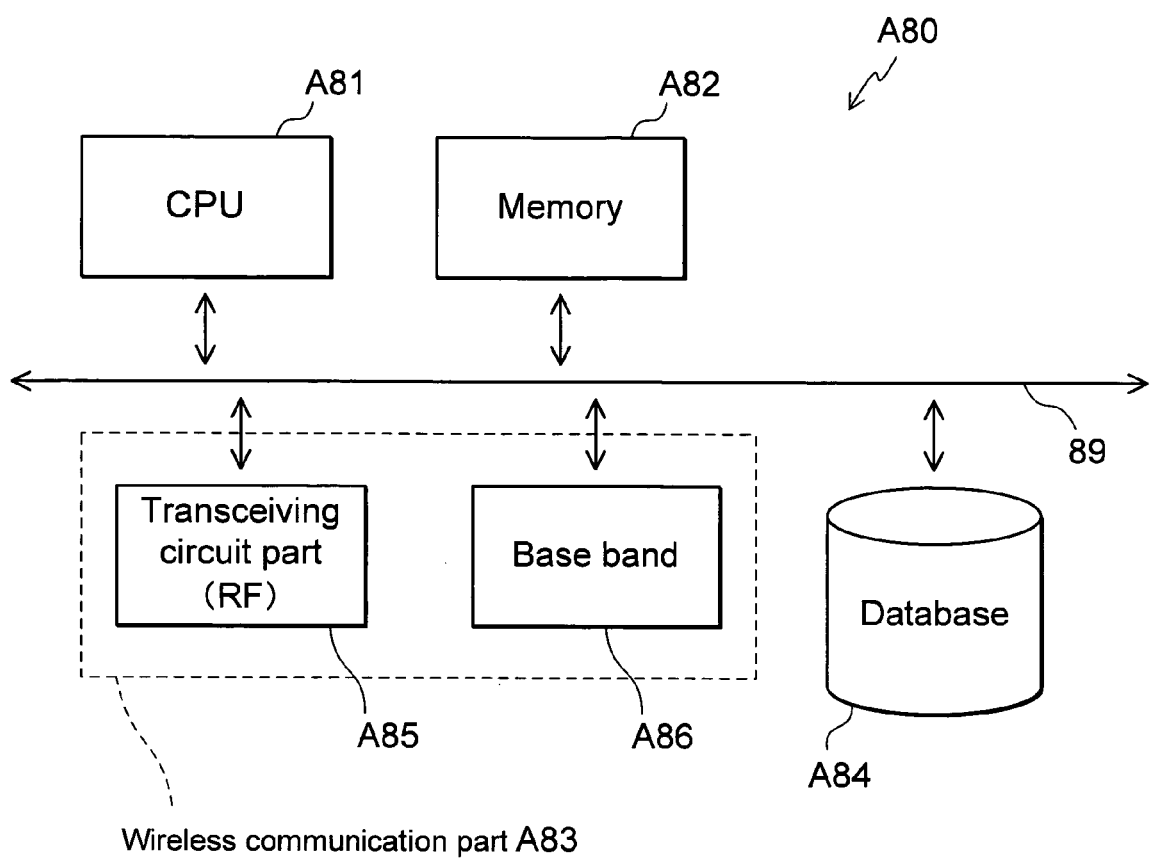
FIG. 11A is a block diagram showing a configuration of a main control device of the main game machine body.

FIG. 11A is a block diagram showing the configuration of the main control device A80.

The main control device A80 has a CPU A81, a memory A82, a wireless communication part A83 and a database A84 which are connected to a data bus A89.

The wireless communication part A83 includes a transceiving circuit part (RF) A85 for transmitting and receiving signals with the sub-control device A90, and a base band processing part A86 for converting RF (Radio Frequency) signals received by the transceiving circuit part A85 into base band signals and also converting base band signals to be transmitted into RF signals.

The database A84 is a circuit board which includes a memory part to which a game program is stored or a storage medium (for example, a hard disk or ROM cassette) to which the game program is stored.

A slot to which these circuit boards and storage mediums can be attached and removed is provided in the main control device A80. By attaching and removing these circuit boards and storage mediums from the slot, the game program stored to the database A84 can be replaced, accordingly, and other game programs can be executed. Replacing the game program is not limited to that via hardware, as such, and the game program can be replaced directly by downloading via a communication circuit.

CPU A81 transmits and receives data with the sub-control devices A90 of each terminal device A30, via the wireless communication part A83, by the procedure below.

Specifically, the CPU A81 converts data into packet data when transmitting data to the sub-control device A90 of the terminal device A30. At this time, the IP address of the identified terminal device A30, which is the destination, is added to the packet data.

In addition, the CPU A81 identifies the terminal device which is the transmission source of the data when receiving data from the sub-control device A90 of the terminal device A30, based on the IP address added to the packet data.

The foregoing CPU A81 executes the game program and performs various processing as a result. In other words, the CPU A81 reads the game program stored in database A84 to the memory A82 and runs the game according to this game program.

Specifically, the CPU A81 receives data including game input data, described hereafter, respectively, from the plurality of terminal devices A30, and generates a single game data according to the game program, based on these data. Then, the CPU A81 generates image data which is shared with all of the terminal devices A30, based on the generated single game data, and outputs this data to the main control device A80.

Here, the single game data includes a plurality of operation character data which can be moved within the single game field generated according to the game program, based on the respective game input data of the plurality of terminal devices A30, and the positional data of this plurality of operation characters.

If a plurality of game input data is received from a plurality of terminal devices A30, the CPU A81 identifies the terminal device A30 which transmitted the game input data, based on the IP address, and moves the operation character of this identified terminal device A30 based on this game input data.

Furthermore, if the positional data of operation character of the identified terminal device A30, out of the plurality of terminal devices A30, meets predetermined conditions, the CPU A81 transmits, to the identified terminal device A30, movement control signal which designates the position of the terminal device A30.

In addition, when the positional data of one operation character movement-operated by one terminal device, out of a plurality of terminal devices A30, and the positional data of another operation character movement-operated by another terminal device A30, out of the plurality of terminal devices A30, meet a predetermined condition, the CPU A81 selects at least one sensation generating control signal from the sensation generating control signal selection table A87 and transmits this as sensation generating control signals to the sub-control devices A90 of the one terminal device A30 and the other terminal device A30.

Specifically, for example, if the difference values of the positional data of one operation character movement-operated by one terminal device A30 and the positional data of another operation character movement-operated by another terminal device A30 fall within predetermined threshold data, it is determined that a plurality of operation characters is in close proximity or has collided (moved to fighting mode), within a single game area. The CPU A81 determined that a certain terminal device A30 has entered fighting mode from the positional data of one terminal device A30 and another opposing terminal device A30. In this case, as described hereafter in the flowchart in FIG. 22A, the main control device A80 transmits movement-control signals to the one terminal device A30 and the other terminal device A30. Then, the main control device A80 selects "mist", which is a sensation generating control signal for "confrontation", from the sensation generating control signal selection table A87 and transmits the sensation generating control signal to the one terminal device A30 and the other terminal device A30. Here, confrontation refers to a placement in which two or mode terminal devices A30 face each other.

During the game, the CPU A81 extracts the game program, information expressing the game status corresponding to the time-line in the game field at the time (namely, information expressing events and the like occurring in the game field) from the database A84 and transmits this to the terminal device A30, which is the request source, via wireless LAN. In addition, the CPU A81 receives information expressing the operation results of the player from each terminal device A30 and stores this in the memory A82.

The CPU A81 runs the game and stores the progress results of the game program to the database A84, based on the information expressing the operation results of the player stored to the memory A82.

Here, the information expressing the operation results of the player are, for example, selection results by the player from a selection shown to the player via the terminal device A30, based on the progress of the game program, or the results of the operation performed by the player of the character appearing in the game, and is information transmitted from the terminal device A30 as a result of the player operating their respective terminal devices A30. Other players can check the progress status of the current game stored to this database A84 (for example, high-score information, etc.)

Sensation Generating Control Signal Selection Table

FIG. 12A shows an example of the sensation generating control signal selection table A87. The main control device A80 receives the status of the terminal device A30 and transmits the sensation generating control according to the status to the terminal device A30. The terminal device A30 which received the sensation generating control signal provides the player with a sensation according to the received sensation generating control signal.

In the game program executed by the main control device A80, the player's avatar (character) is operated by the player. Then this avatar moves within a game area which is a simulated game environment. At this time, the environment (ocean, forest, fog, sky, etc.) presented as the game area constitutes a part of the game environment as environment data (data related to virtually presented environment in the progression of the game program). For example, according to the development in the game, videos and images of the ocean, forest, fog, and sky are shown in the main display device A22 or the sub-display part A61. In response to the displaying of environment data images such as these to the main display device A22 or the sub-display part A61, the main control device A80 transmits a sensation generating control signal corresponding to the corresponding terminal device, according to the operation of the avatar. Furthermore, as described hereafter, the environment data can include a state in which the environment changes due the appearance of a monster.

The sensation generating control signal selection table A87 is a table which correlates the state developed in the game environment and the sensation generating control signal transmitted to the terminal device A30 in response thereto.

In addition, for example, the main control device A80 can transmit a corresponding sensation generating control signal to the terminal device A30, in response to states in which scents are generated (for example, a state in which the avatar moves to a cafeteria, or a state in which the avatar encounters a monster or character which has body odor or smells of perfume). In other words, as shown in FIG. 12A, the main control device A80 can transmit a sensation generating control signal related to the body odor of monster A to the terminal device A30, in response to the appearance of the monster A.

Furthermore, for example, the main control device A80 transmits movement-control signals to the plurality of terminal devices A30 when, during the game progression, a plurality of terminal devices A30 enter a state in which they fight each other (fighting mode). The terminal devices A30 which received this movement-control signal move so as to confront each other. The confronting terminal devices A30 can be in a state in which one or more terminal devices A 30 are placed facing each other (a total of two or more terminal devices).

In this way, when the plurality of terminal devices A30 are in a confrontation, the main control device A80 determines that the terminal device A30 is in a confrontation and transmits a sensation generating control signal related to mist to the terminal device A30, with reference to the sensation generating control signal selection table A87. The each terminal device A30 which received the sensation generating control signal sprays fragrance, fog or mist from a spray device A68, as described hereafter.

FIG. 13A is a sensation generating control signal selection table A88 for selecting a sensation generating control signal. The sensation generating control signal selection table A88 is a table of correlation with a selection of fragrances that differ from that in FIG. 12A. According to this table, when the terminal device A30 moves to a predetermined area within the play area A21, the main control device A80 selects the sensation generating control signal corresponding thereto. For example, in response to the terminal device A30 moving to ocean area A212B, the main control device A80 selects the sensation generating control signal for ocean-scent.

Sensation Generating Control Signal Transmission Processing

Figure 22A:
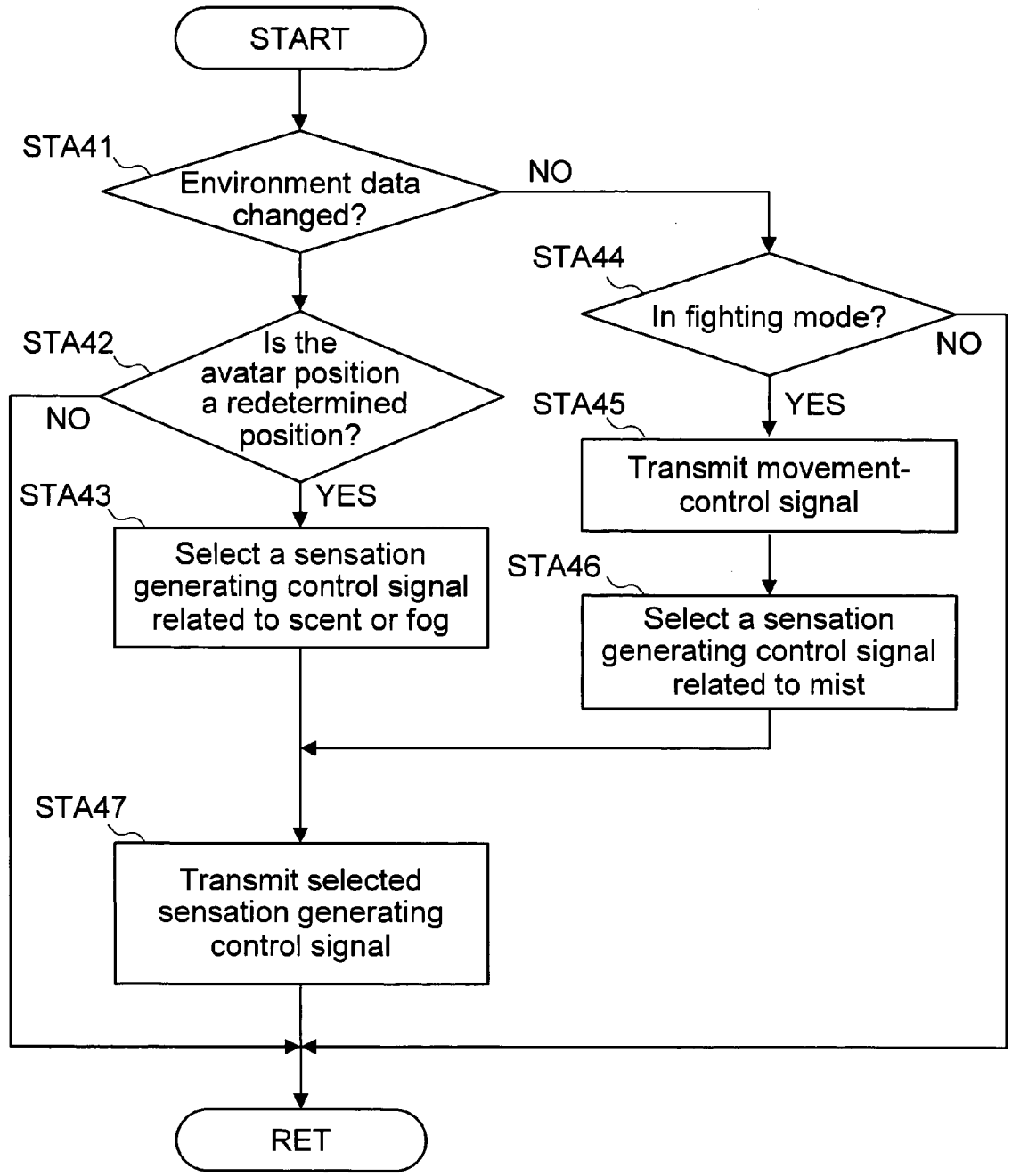
FIG. 22A is a flowchart of a sensation generating control signal transmission processing of the main game machine body.

A sensation generating control signal transmission processing performed by the main control device A80 is explained using the flowchart in FIG. 22A.

The main control device A 80 determines whether the environment data has changed (STA41). In other words, the main control device A80 determines whether the environment data has changed during the progress of the game. Then, if it is determined that the environment data has changed, the main control device A80 further determines whether the position of the avatar in the game environment, corresponding to each terminal device A30, is the predetermined position (STA4). Here, if the positional data indicating the position of the avatar is a predetermined value, a sensation generating control signal related to the fragrance or fog corresponding to this environment (position) is selected, based on the sensation generating control signal selection table A87 (STA43).

For example, if the environment data changes to ocean data which presents an ocean, during the progress of the game, the main control device A80 determines that the positional data of the avatar is near the ocean and selects a sensation generating control signal related to ocean-scents (salty scent, etc.). In addition, if the environment data changes to sky data which presents a sky, the main control device A80 determines that the positional data of the avatar is near the clouds and selects a sensation generating control signal related to fog. When the main control device selects the sensation generating control signal related to fog, the output of the fog to be sprayed can be adjusted accordingly.

Here, the main control device A80 can determine that the environment data has changed when a monster appears. In other words, the environment changes due to the appearance of a monster which generates scent. In this way, the environment data can include a state in which the environment differs due to the appearance of a monster. In this case, the environment data changes due to the appearance of the monster and a sensation generating control signal related to the monster-scent is selected.

If the main control device A80 determines that the position of the avatar is not the predetermined position (STA43), the processing is terminated.

If the main control device A80 determines that the environment data is not changed (STA41) but two or more terminal devices A30 are in fighting mode (STA44), the main control device A80 transmits a movement-control signal to the two or more terminal devices A30 which are in fighting mode (STA45). Next, the main control device A80 selects a sensation generating control signal related to mist (STA46).

When the main control device A80 determines that the environment data is not changed (STA41) and two or more terminal devices A30 are not in fighting mode, the processing is terminated.

When a sensation generating control signal is selected, the main control device A80 transits the selected sensation generating control signal to the terminal device A30 (STA47).

Configuration of the Sub-Control Device

Figure 14A:
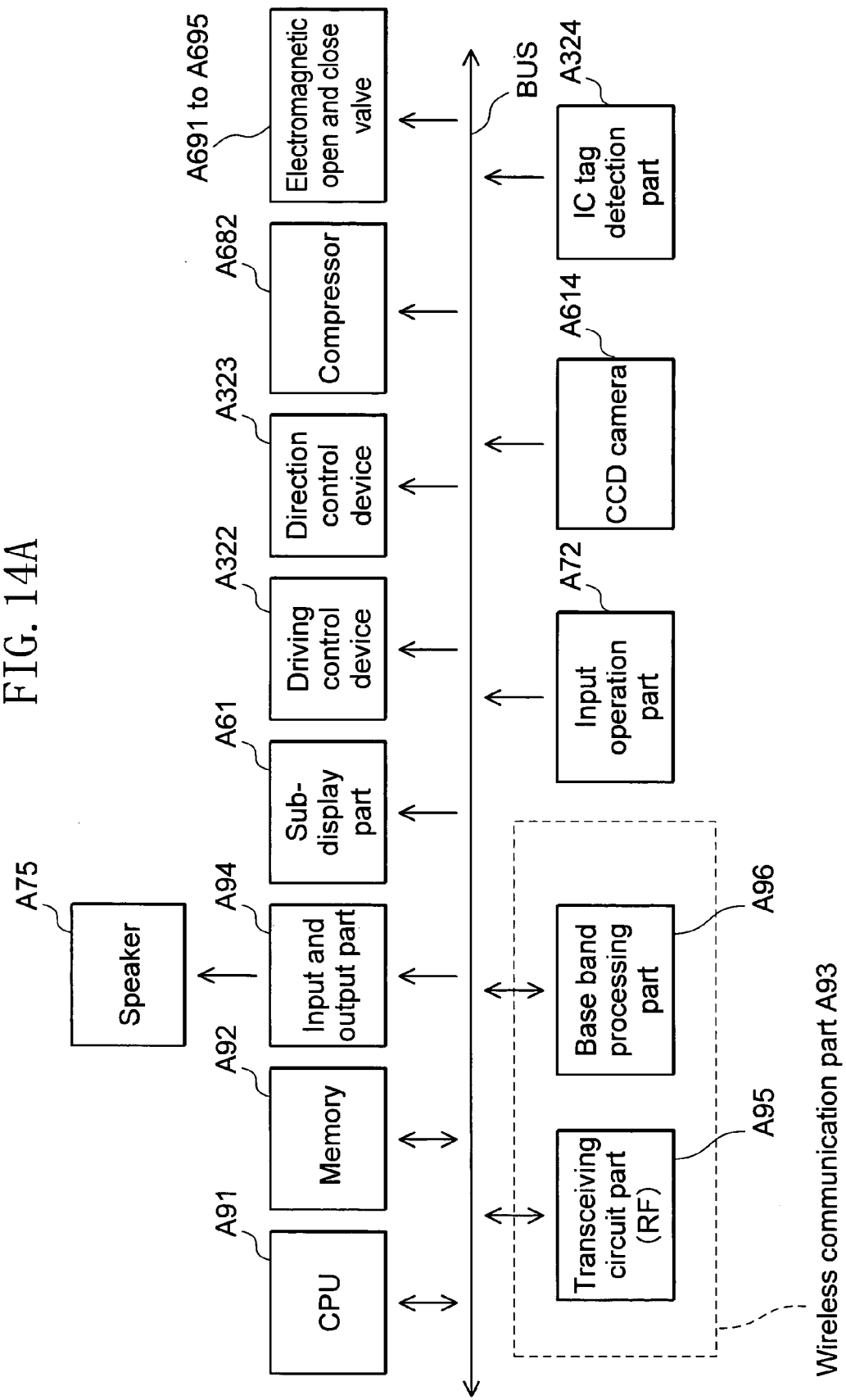
FIG. 14A is a block diagram showing a configuration of a sub-control device of the terminal device.

FIG. 14A is a block diagram showing the configuration of the sub-control device A90.

The sub-control device A90 has a CPU A91, a memory A92, a wireless communication part A93, and an input and output part A94 which is the interface with the speaker A75, which are connected to a data bus A99.

The wireless communication part A93 includes a transceiving circuit part (RF) A95 for transmitting and receiving signals with the main control device A80, and a base band processing part A96 for converting RF (Radio Frequency) signals received by the transceiving circuit part A95 into base band signals and also converting base band signals to be transmitted into RF signals.

The CPU A91 transmits and receives data with the main control device A80, via wireless communication part A93, by the procedure below.

Specifically, the CPU A91 divides data into packet data when transmitting data to the main control device A80. At this time, the IP address of the terminals device A30 which is the transmitting source is added to the packet data as an identifier for identifying respective terminal devices A30.

In addition, the CPU A91 receives the packet data if the IP address added to the packet data matches the IP address of the terminal device, when receiving data from the main control device A80, and destroys the packet data if it does not match.

The CPU A91 not only transmits and receives signals with the main control device A80, via the wireless communication part A93, but also controls the sub-display part A61, driving control device A322, direction control device A323, compressor A682, and electromagnetic open and close valves A691 to A695, based on the input signals from the input operation part A72, the CCD camera A614, and the IC tag detection part A324.

Specifically, the IC tag detection part A324 reads positional information from the IC tag A211 and outputs this as current-positional data. The CPU A91 transmits the game input data (data regarding character information, identified selection information, etc.) according to the input from the input operation part A72, the face image data taken by the CCD camera A614, and the current-positional data from the IC tag detection part A324 to the main control device A80.

Furthermore, when receiving movement-control signal which designates the position of the terminal device A30 from the main control device A80, the CPU A91 grasps the position of the terminal device A30 on the play area A21, based on current-positional data from the IC tag detection part A324, controls the driving control device A322 and the direction control device A323 of the traveling part A32, and moves the terminal device A30 to the position designated by the movement-control signal.

In addition, the CPU A91 can drive the driving control device A322 and the direction control device A323 of the traveling part A32, according to the game input data which is input by operating the input operation part A72.

The CPU A91 selects at least one storage container from the storage containers A66A, A66B, and A67 and sprays the fragrance stored within the selected storage container A66A, A66B, or A67 from the spray device A68.

In other words, the CPU A91 stores compressed air within the compressed air tank A681 by driving the compressor A682. Then, when a sensation generating control signal for "ocean-scent" is received, the CPU A91 opens the electromagnetic open and close valves A693 and A691, sends the compressed air stored within the compressed air tank A681 to ducts A683 and A685, and sprays the ocean-scent fragrance stored within the storage container A66A from the fragrance spray nozzle A76. Furthermore, when a sensation generating control signal for "forest-scent" is received, the CPU A91 opens the electromagnetic open and close valves A694 and A691, sends the compressed air stored within the compressed air tank A681 to ducts A683 and A686, and sprays the ocean-scent fragrance stored within the storage container A66B from the fragrance spray nozzle A76. Furthermore, when a sensation generating control signal for "mist" is received, the CPU A91 opens the electromagnetic open and close valves A695 and A692, sends the compressed air stored within the compressed air tank A681 to ducts A684 and A687, and sprays the moisture stored within the storage container A67 from the mist spray nozzle A33.

The CPU A91 executes the operation program stored in memory A92 and performs various processing, according to the program executed in CPU A81.

In other words, when receiving a game program or information expressing the status corresponding to the time-line in the game environment at that time from the main control device A80, after storing information on the game program and the like, transmitted by the main control device A80, to the memory A92, the CPU A91 presents the various occurrences, such as events, occurring in the game environment at this time, in the sub-display part A61 and outputs sound effects from the speaker A75.

In addition, by operating the input operation part A72 while viewing the game content (image, letter information, etc.) shown in the sub-display part A61, the players using respective terminal devices A30 can operate the characters shown in the main display device A22, participate in the progress of the game by operations such as selecting from a selection by letters, and move the terminal device A30 to an identified position on the play area A21.

Spotlight Processing

Figure 23A:
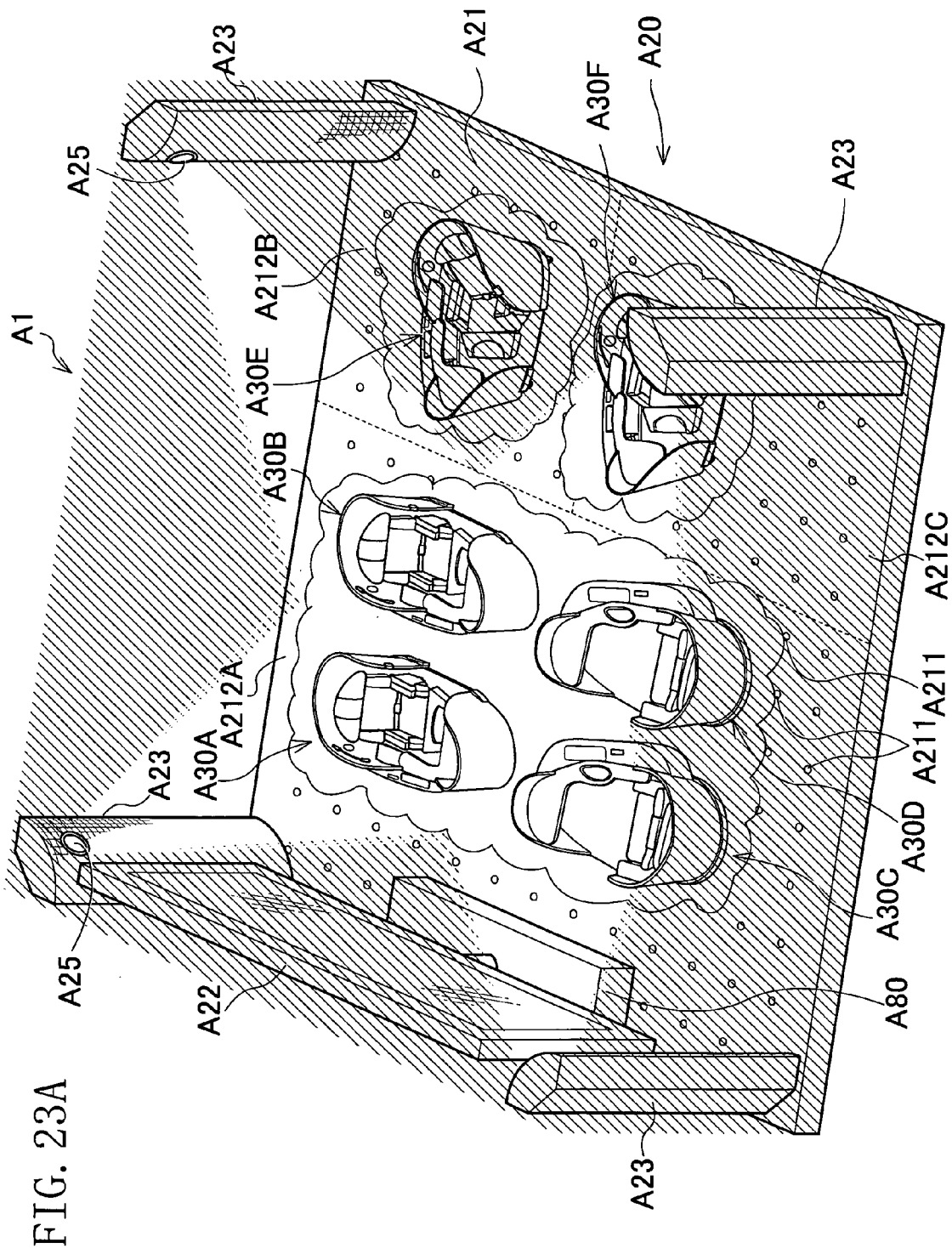
FIG. 23A is a perspective view showing an outward aspect of the game machine when a spotlight is lit.

FIG. 23A shows the game machine A1 when a spotlight A25 is illuminated onto confronting terminal devices A30. The spotlight A25 can be placed embedded into the speaker device A23 or can be a device separate from the speaker device A23. As shown in FIG. 23A, the terminal devices A30A ad A30C and terminal devices A30B and A30D are confronting each other and the spotlight is illuminated onto these terminal devices A30A to A30D.

Figure 24A:
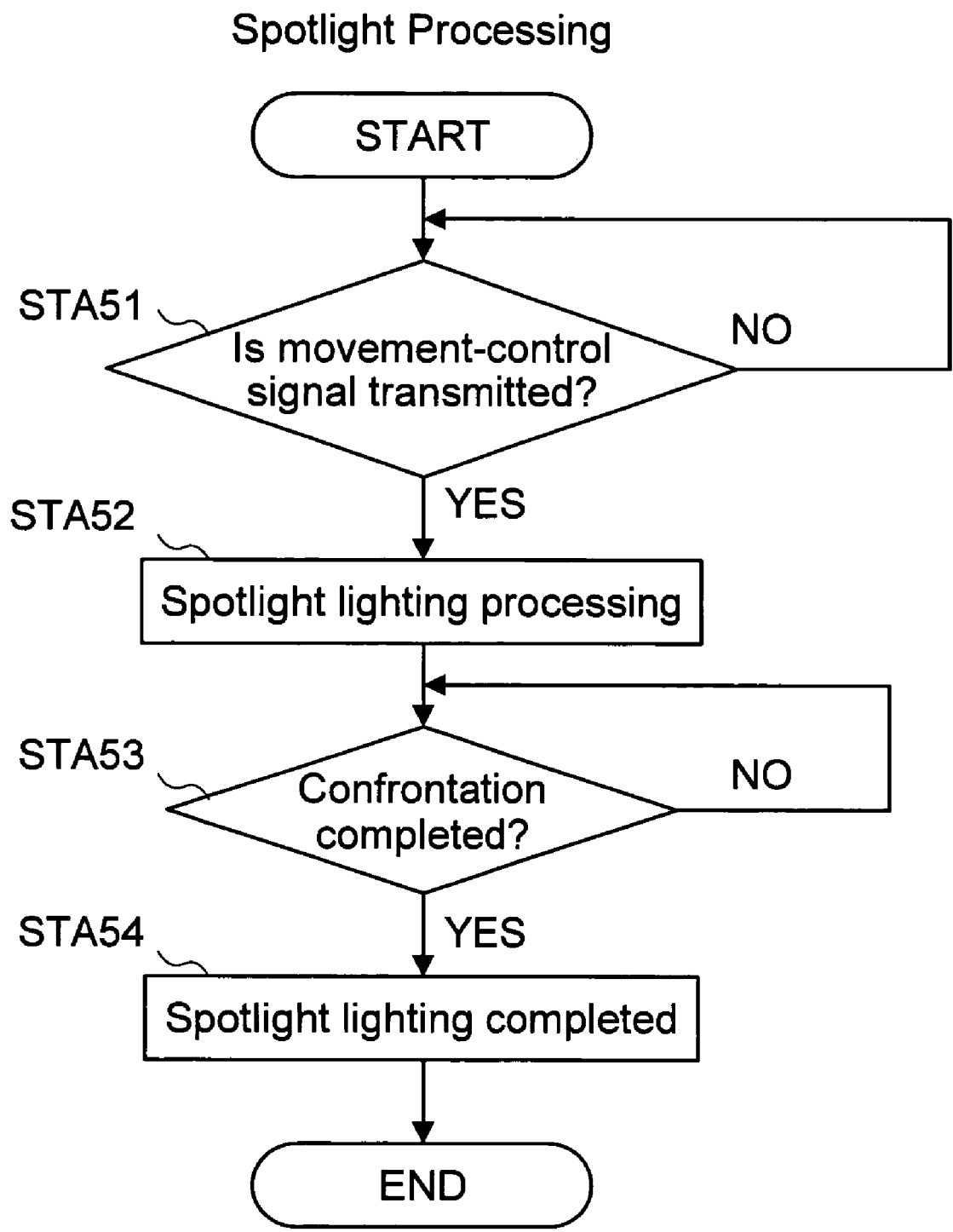
FIG. 24A is a flowchart of a spotlight processing of the game machine.

The processing by the main control device A80 for performing the spotlight processing is explained using FIG. 24A. The main control device A80 determines that the terminal device A30 has transmitted a movement-control signal (STA51) and illuminates the spotlight A25. Then, when the confrontation ends (STA53), during the game progression, the main control device A80 terminates the illumination of the spotlight A25 (STA54).

Configuration of the Game Program

Next, a game program provided by the game machine A1 is explained. This game program is a role-playing game which is set in a fictional game environment which runs continuously by its own time-line. A plurality of towns exists in this fictional game environment, and guilds are formed respectively in each town.

Each player becomes an adventurer, visits each town, and aims to clear numerous events (quests) waiting in each guild by operating the avatar.

On the other hand, this game program generates a plurality of large events (macroquests) in the game environment and forms a large plot of the story. Each player becomes involved in the large events (macroquests), while solving the foregoing events (quests), and solves the macroquest with other players while sometimes cooperating, sometimes fighting, and sometimes competing with each other.

This game program changes the plot of the game environment by the operations of the terminal devices A30 of the players (game-play). In other words, the accumulation of the game-play (adventures) of each individual player creates the history of this game environment.

In this way, this game program is a role-playing game wherein a plurality of players can all experience the flow of history in a fictional world. In addition, in this game environment, history is created by a unique time-line which cannot be stopped, and therefore, the people appearing within this game environment are not immortal, but will grow old as in the real world.

The game program is configured to write the name of the player who has solved an event in the macroquest or achieved accomplishments such as winning in a competition against another player to a chronology which is stored to the database A84. In this way, players who were successful in the macroquest can leave their name in the history of the game environment.

Figure 15A:
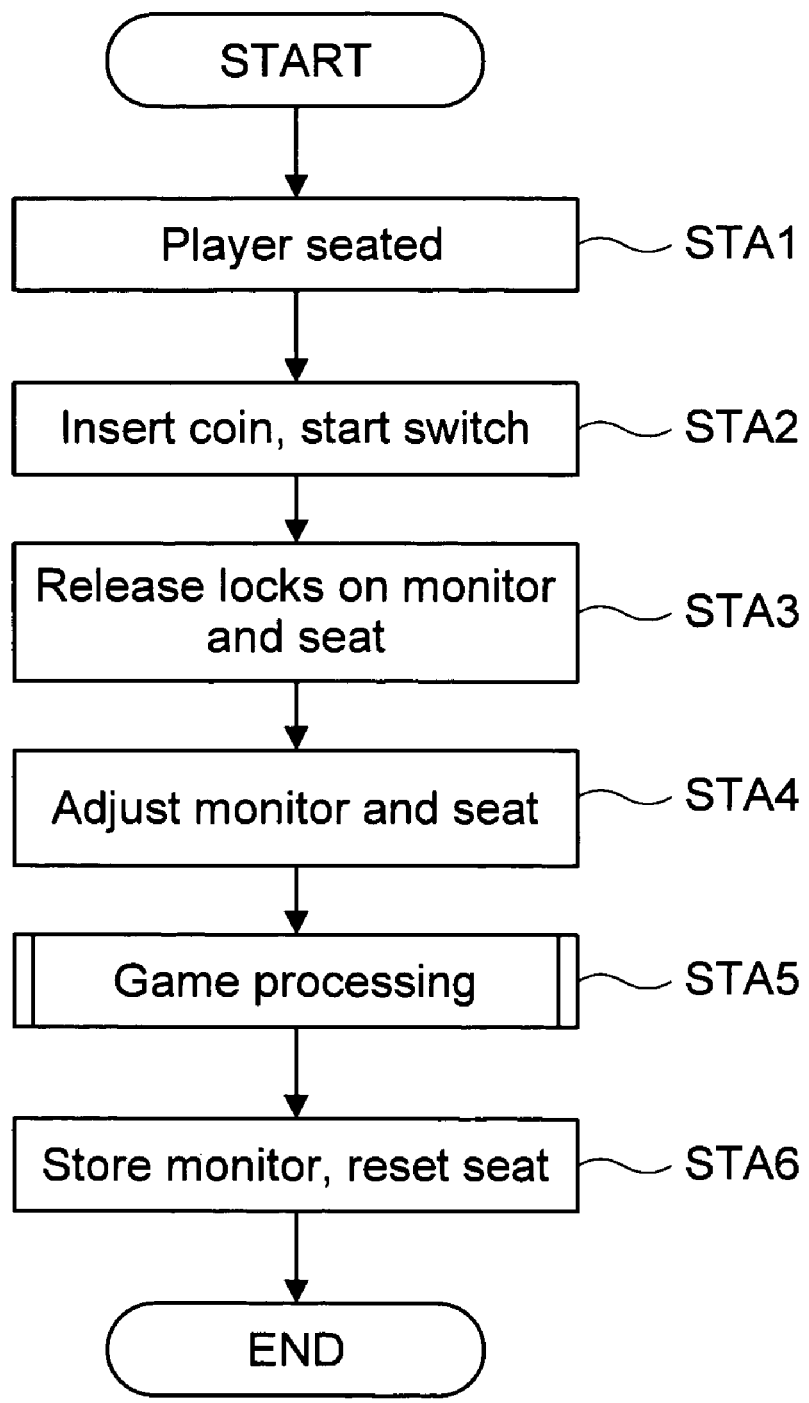
FIG. 15A is a main flowchart of a game executed in the game machine.

The operation of the game machine A1 is explained, with reference to the main flow chart shown in FIG. 15A.

In STA1, each player selects a terminal device A30 of their choice from the terminal devices A30 placed on the play area A21 and sits in the seat A31 of the selected terminal device A30. Next, in STA2, each player inserts a coin into a coin insertion opening in the input operation part A72 and presses the start switch. Then, in STA3, the locks of the sub-monitor A613 and the seat A31 of the game machine A1 are released and, in ST4, the player can pull out the sub-monitor A613 from the storage space A62 in the side unit A60 and adjust the mode of the seat A31.

In STA5, the game machine A1 performs a game processing described hereafter. After the game is completed, in STA6, the game machine A1 stores the sub-monitor A613 and also returns the mode of the seat A31 to seat mode.

Figure 16A:
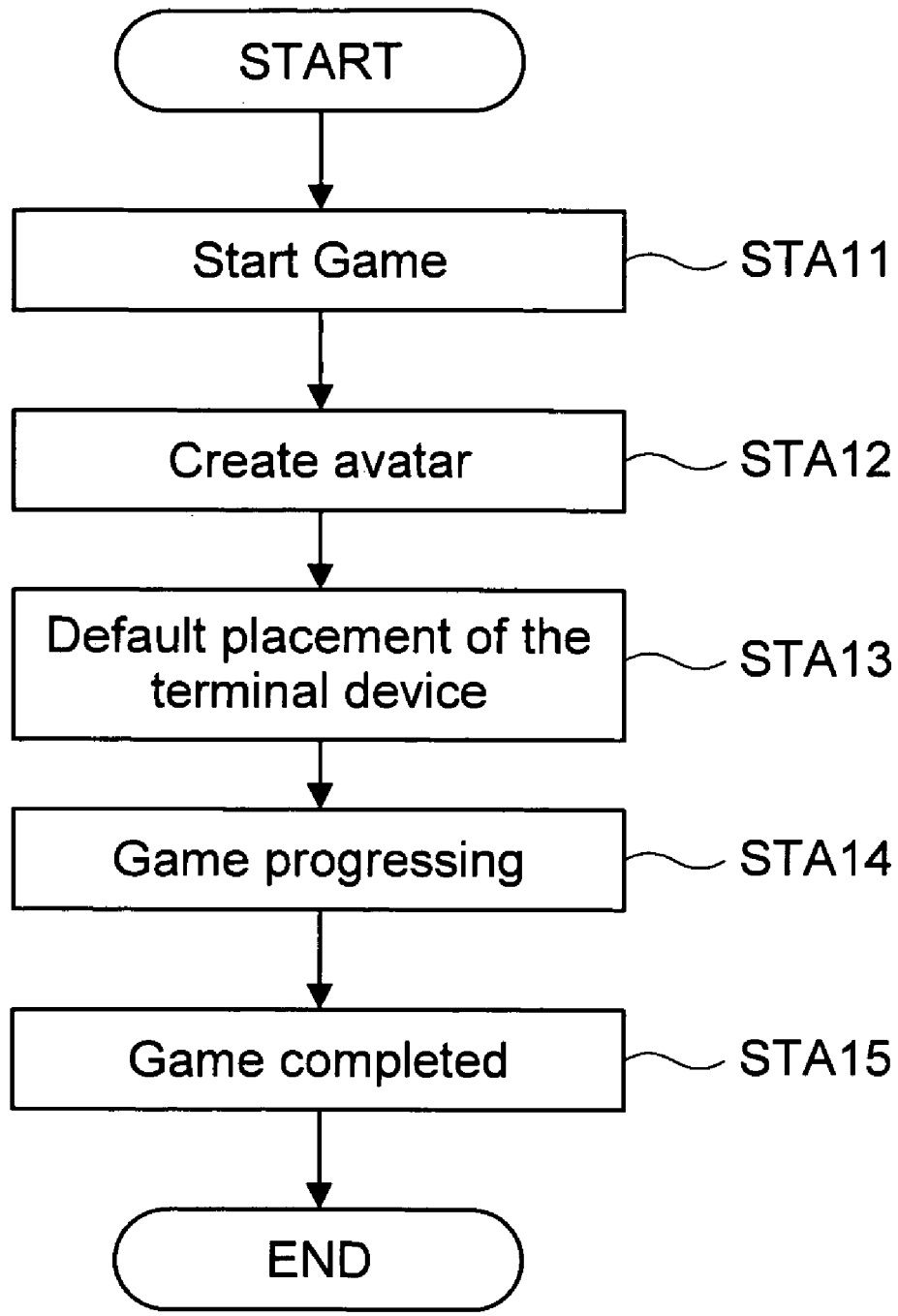
FIG. 16A is a flowchart of the game processing of the game program executed in the game machine.

FIG. 16A is a flowchart of the game processing. When the game is started in STA11, the game program creates an avatar of the player on STA12.

In other words, the game program shows an avatar creating screen in the sub-display part A61. In this avatar creation screen, the player creates an avatar, which is an alter-ego of the player, when participating in the game program. When an image of the players face is taken by the CCD camera A614 and the player enters personal information and the name to be used in the game environment to the input operation part A72, the game program creates an avatar based on this information and registers it to the database A84 of the main control device A80.

In STA13, the game program places the terminal device A30 in which the player is seated in the default position on the play area A21.

In other words, spaces developed by the game are divided into a plurality of game areas, and each game area has one town. Each game area is an ocean, a forest, or a large city. The play area A21 includes a plurality of sub-areas A212, such as a city area A212A, an ocean area A212B, and a forest area A212C, as stated earlier. These sub-areas A212 are quasi-spaces corresponding to the environment of the towns in the game environment.

In STA14, the game program runs the game according to a unique time-line, generating macroquests in which a plurality of players participate and quests in which only one player participates, and completed the game in STA15.

Figure 17A:
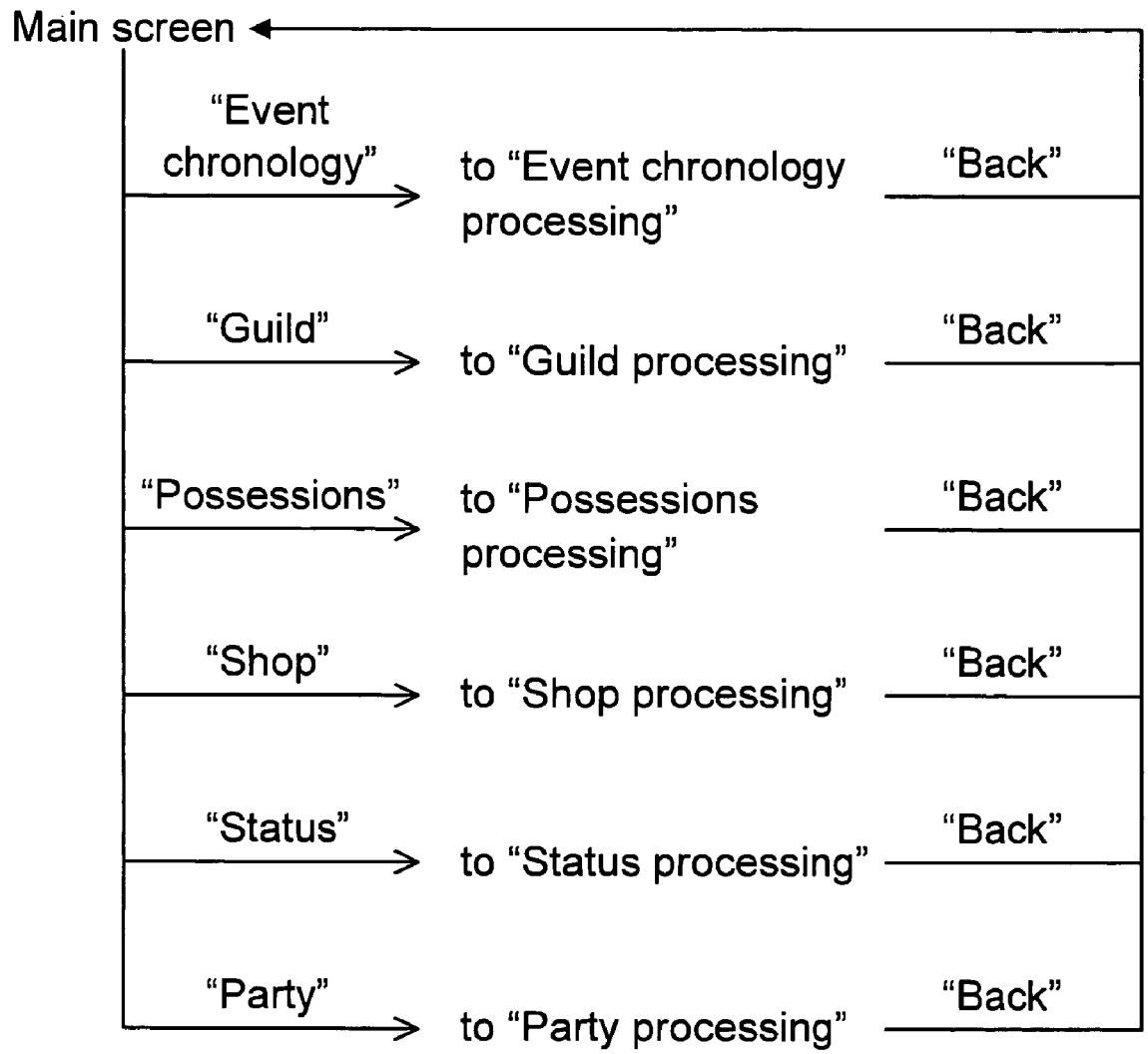
FIG. 17A is a flowchart of each player in the game program executed in the game machine.

FIG. 17A is a flowchart of each player in the game program.

Each player can perform an event chronology processing, guild processing, possessions processing, shop processing, status processing, and party processing.

When the player selects "event chronology processing", the game program shows the event chronology in the sub-display part A61 by reading the event chronology from the database A84 in the main control device A80 and performing event chronology processing.

In this event chronology, the respective dates and quest name of each quest solved in the game environment is shown. Furthermore, when the player selects a quest name (event name), the game program shows the details of the selected event. Here, the details of the event are, for example, showing the player who solved the quest most quickly, if the winner is the player who solves the event (quest) most quickly, and shows the party if the winner is the party with the most number of cooperating players who have solved the event (quest).

When the player selects "guild", the game program performs a guild processing and shows a guild screen in the sub-display part A61. In this guild screen, the player can view the quests the player can try in the guild and select to go to another town in the game environment.

When the player selects "quest" in the guild screen, the game program shows a list of selectable quests in the sub-display part A61. If the player selects the desired "quest" from this list, the game program executes the selected quest.

When the player selects "Go to another town" in the guild screen, the game program shows a list of towns which can be selected as a transfer destination in the sub-display part A61. If the player selects a desired town from this list, the game program moves the player to the selected town. When the game program moves the player to another town within the game environment, the terminal device of each player is moved to the sub-areas A212 of the corresponding transfer destination town. Here, scents corresponding to the transfer destination sub-area A212 can be generated using the spray device A68. Specifically, if the transfer destination is the ocean area A212B, an ocean-scent can be sprayed from the fragrance spray nozzle A76 and if the transfer destination is the forest area A212C, a forest-scent can be sprayed from the fragrance spray nozzle A76

The player can select menus such as "guild", "possessions", and "shop", even in the transfer destination town.

When the player selects "possessions", the game program performs a possessions processing and shows a possessions (list of contents) screen, of weapons, tools, shoes, and the like in the sub-display part A61. If the player selects a specific possession in this possessions (list of contents) screen, the game program shows a plurality of items included in the selected possessions in the sub-display part A61. The player selects the desired item from these items and either "wear" or "dispose of" the selected item.

When the player selects "shop", the game program performs a shop processing and shows a shop screen in the sub-display part A61. This shop screen is a screen for barter exchanging items in possession or acquiring information from the shop owner, and the player can select either "listen" or "exchange".

When the player selects "exchange" in the shop screen, the game program shows a list of products in the sub-display part A61. The player can select a desired item from this product list.

When the player selects the desired item, the game program shows the items possessed by the player for exchanging with the selected desired item. When the player selects an item in possession for exchange, the game program shows the item posses by the player and the price thereof in the sub-display part A61.

When the player selects the desired item for exchange from the items in possession, shown here, the desired items in possession to be exchange are collected, and the player selects "execute", the game program executes an exchange of the desired item and the desired item in possession to be exchanged.

On the other hand, if the player selects "listen" in the shop screen, the game program shows "rumors" in the sub-display part A61. The player can acquire information in the game environment by the "rumors" shown in this screen.

When the player selects "status", the game program performs a status processing and shows a status screen in the sub-display part A61. This status screen shows the results of the player's accomplishments in the game environment, the possessions thereof and the like. Specifically, it shows name, title, fame, power, intelligence, number of monsters slain, number of quests cleared, number of people saved, and the like.

If the player selects any one of the items above, the game program shows the rankings related to this item in the sub-display part A61.

When the player selects "party", the game program performs a party processing and shows the names of fellow players in the sub-display part A61, if there are fellow players, and furthermore, shows "read mail", "send mail", "exchange item", "view status" and the like.

By selecting any one of the items above, the player can send and receive mail with fellow players, exchange items with fellow players, and view the status of fellow players.

Figure 18A:
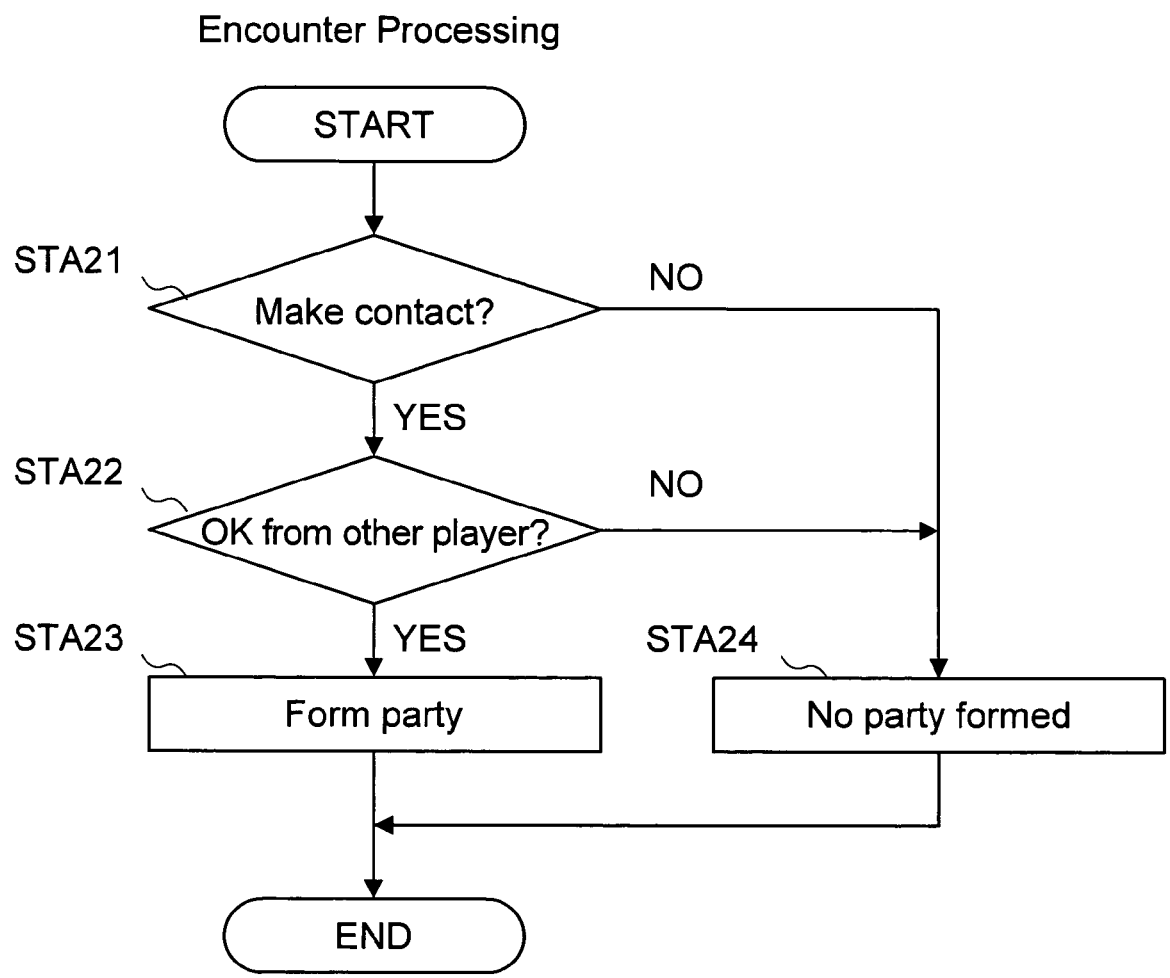
FIG. 18A is a flowchart of when a player encounters another player in a game area in the game program.

FIG. 18A is a flowchart of the encounter processing when the player encounters another player on the game environment.

In the progress of the game in STA14, the game program executes an encounter processing when the player encounters another player on the game environment.

In other words, in STA21, an encounter screen is shown in the sub-display part A61, and the player is prompted to select whether to make contact.

If the player selects "No", the process moves to STA24 and the encounter processing is terminated without forming a party. On the other hand, if the player selects "Yes", the process moves to STA22, and the game program transmits mail to the other player, and shows that the player is being invited to become a fellow player in the sub-display part A61 in the terminal device A30 of this player. Then, the game program prompts the other player to select whether to accept the invitation.

If the player receiving the invitation selects "Yes", the process moves to STA23 and the game program transmits the selected result to the player who is the inviter, shows that the player has become a fellow player in the sub-display part A61 of the player who is the inviter, a party is formed and the process is completed.

On the other hand, if the player receiving the invitation selects "No", the game program shows that the player could not be a fellow player to the player who is the inviter in the sub-display part A61, and the process moves to STA24, and terminates the encounter processing without forming a party.

Figure 19A:
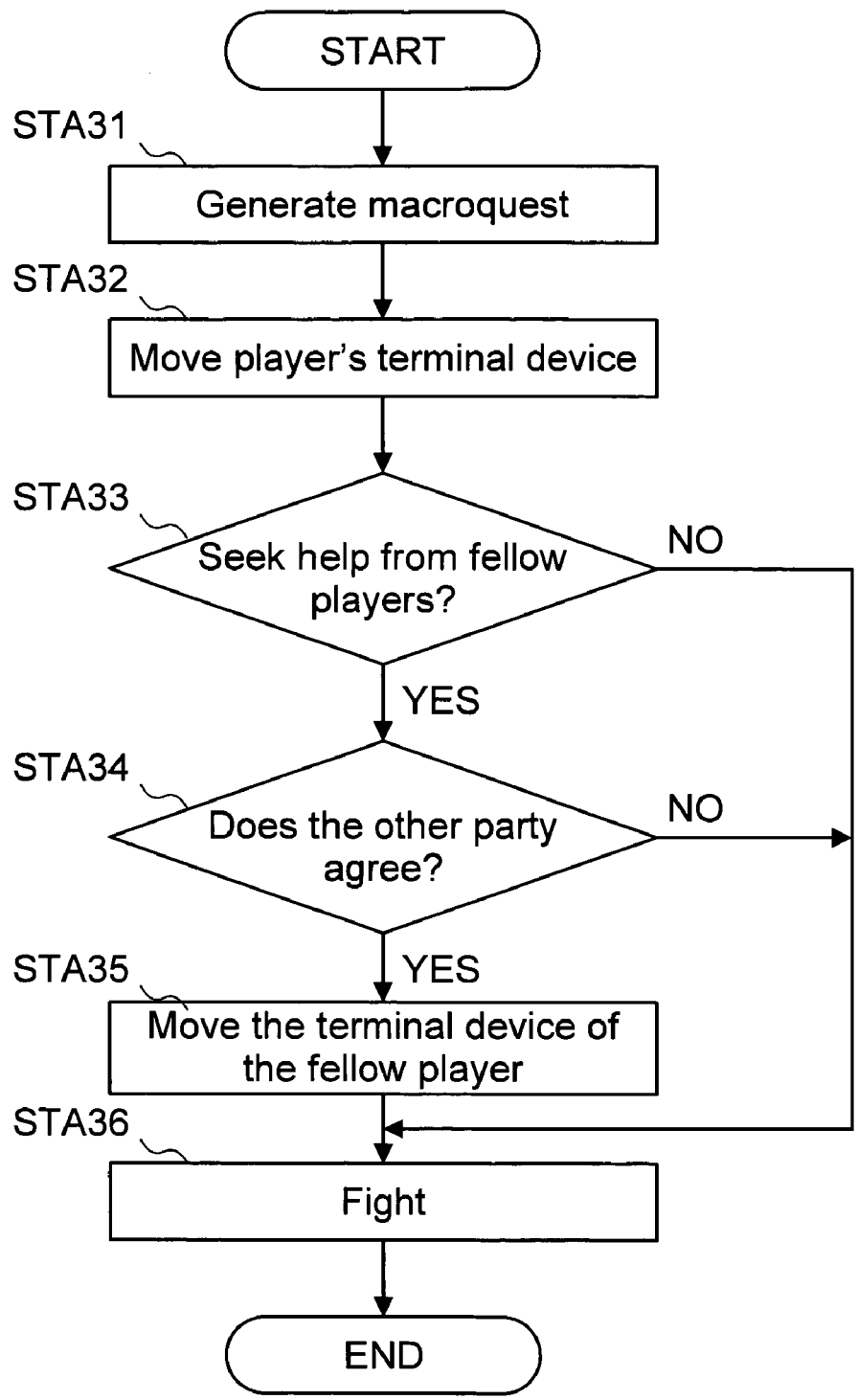
FIG. 19A is a flowchart of when a macroquest is generated in the game environment in the game program.

FIG. 19A is a flowchart of the macroquest processing when a macroquest is generated in the game environment.

If a macroquest involving a plurality of players is generated in STA31, the game program executes a macroquest processing.

In other words, if a macroquest is generated in STA31, the process moves to STA32, shows the players involved in this macroquest in the main display device A22, also moves the terminal devices A30 of the players involved in this macroquest to the sub-area A212A in front of the main display device A22, and places them so that the terminal devices A30 of opposing players are close to and facing each other. In this way, the players become aware that they are mutually enemies. At the same time, the terminal devices A30 of opposing players spray scents according to the transfer destination sub-area A212 from the fragrance spray nozzle A76 and also spray mist from the mist spray nozzle A33 using the spray device A68, enhancing the presentation effect.

Specifically, as shown in FIG. 20A, there are six terminal devices, A30A to A30F, placed on the play area A21. Among these, the players of terminal devices A30A, A30B, and A30E are one party, and the players of terminal devices A30C, A30D, and A30F are another party. Then, each player in terminal devices A30A to A30D are caught in the macroquest in the city area A212A and are placed such that the parties oppose each other. In contrast, because the players in terminal devices A30E and A30F are respectively in the ocean area A212B and the forest area A212C, they are not involved in the macroquest, and thus, view the battle between the terminal devices A30A to A30D.

In order to clear the macroquest, the players caught in the macroquest select whether to call for help from fellow players in STA33.

If the player selects "No", the process moves to STA36.

On the other hand, if the player selects "Yes", the process moves to STA34, the game program transmits mail calling for help to the fellow players, and shows that help is being called for in the sub-display part A61 in the terminal device A30 of the player. Then, the game program prompts the fellow players to select whether to help the player.

If the fellow player whose help is requested selects "Yes", the process moves to STA35, and the game program transmits the selection results to the player requesting help and that the fellow player will participate is shown in the sub-display part A61 of the player. In addition, the game program shows the status of the gathering of newly participating fellow players in the main display device A22, and the terminal devices A30 of the newly participating fellow players are moved to the sub-area A212A in front of the main display device A22 and placed such that the terminal devices A30 of opposing players are close to and facing each other. At the same time, the terminal devices A30 of newly participating players spray scents according to the transfer destination sub-area A212 from the fragrance spray nozzle A76 and also spray mist from the mist spray nozzle A33 using the spray device A68, enhancing the presentation effect.

Figure 21A:
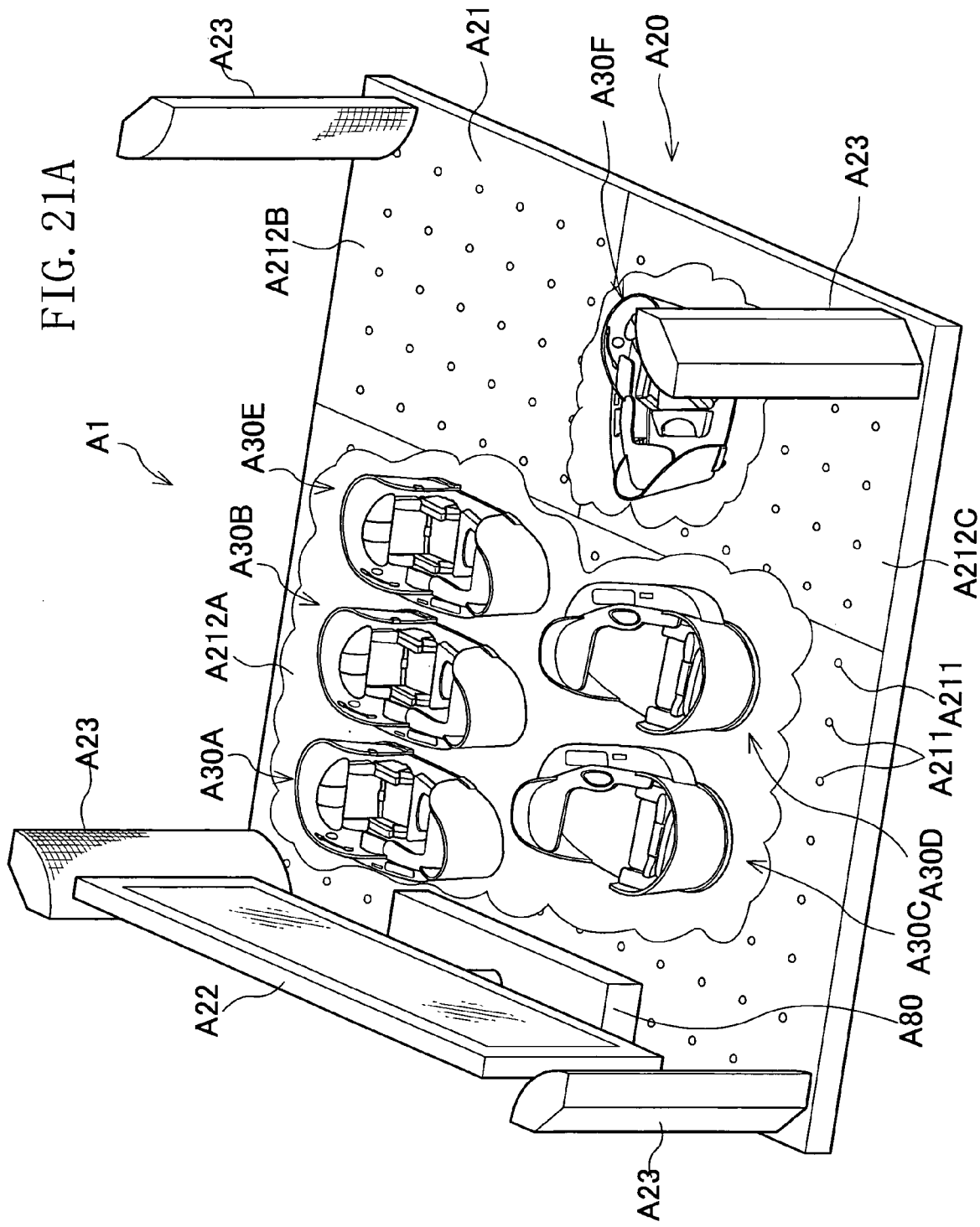
FIG. 21A is a perspective view showing a state in which fellow players participate in a macroquest generated in the game environment in the game program of the game machine.

On the other hand, if the player whose help is requested selects "No", the game program shows that help had been denied in the sub-display part A61 of the player requesting for help, and the process moves to STA36. Specifically, as shown in FIG. 21A, because the player in terminal device A30E is fellow players with the players in terminal devices A30A and A30B, this player's help is requested by the terminal devices A30A and 30B. The player in terminal device A30E, having agreed to help, is moved to the city area A212A and is placed in alignment with the terminal devices A30A and A30B.

On the other hand, although the player in terminal device A30F is fellow players with the players in terminal devices A30C and A30D, and this player's help is requested by the terminal devices A30C and A30D, he refuses to help and, therefore, remains in the forest area A212C.

In STA36, each player fights the opposing player or opposing party. Specifically, as shown in FIG. 21A, the players of terminal devices A30A, A30B, and A30E and the players of terminal devices A30C and A30D fight in the city area A212A.

In this way, each player gets caught in a macroquest or is requested to help by fellow players caught in the macroquest, and whether to watch the battle between other players or to personally participate can be selected.

According to the present embodiment, when entering fight mode, the main control device A80 can transmit a sensation generating control signal (mist) to the terminal device A30 and simultaneously transmit a spotlight lighting control signal to the spotlight A25, by transmitting a movement-control signal to the terminal device A30. Therefore, the player can experience the generation of mist from the terminal device A and also his game machine can be illuminated by the spotlight. The presentation of fight mode can be enhances, compared with that of conventional game machines, through multiple presentations such as these.

Furthermore, according to the present invention, the following operational effects can be attained.

If the difference value between the positional data of the operation character operated by one player and that of the operation character operated by another player falls within the predetermined threshold data, it is determined that the operation characters are close by. Then, these players fight through the macroquest.

At this time, the game machine A1 can spray scents according to the transfer destination sub-area A212 from the fragrance spray nozzle A76 and also spray mist from the mist spray nozzle A33 using the spray device A68, with regards to these terminal devices A30 of opposing players.

Therefore, because sensations are stimulated for only players of which the operation characters are in a predetermined positional relationship, sensations can be stimulated for each player individually, and there are instances in which the enjoyment of each player can be enhanced.

The sensation generating device A65 includes a plurality of storage containers A66A and A66B for storing a plurality of types of fragrances of differing scents, and a spray device A68 which selectively sprays fragrances stored in the plurality of storage containers A66A and A66B, in which one storage container is selected from storage containers A66A and A66B, and the fragrance stored within the selected storage container A66A or A66B is sprayed by the spray device A68. Thus, the player's olfactory sense is stimulated, various information on the virtual game area is transmitted to the player and the enjoyment of the player can be further enhanced. For example, the regions in the game area in which scents are generated in the real world, such as oceans and forests can be presented more realistically.

In addition, because the fragrances stored within the storage containers A66A and A66B are sprayed from the fragrance spray nozzle A76 of the head rest A54, the olfactory senses of each player are stimulated without fail.

The sensation generating device A65 includes a storage container A67 for storing water and a spray device A68 for spraying the water stored within the storage container A67 from the lower part of the seat S31. Therefore, fog and the like can be presented realistically in the game area, various information on the game area can be transmitted to the player and the enjoyment of the player can be further enhanced. For example, a feeling of floating in the air can be produced by concealing the lower part of the main seat body from the view of the player with mist.

Because a traveling part A32 is provided in the terminal device A30, this traveling part A32 is driven by a movement-control signal from the main control device A80, and the terminal device A30 moves to a predetermined position, each player can play the game by changing the position of the terminal device A30.

In addition, by reflecting the positional relationship of a plurality of operation characters within the game area in the positional relationship of the plurality of terminal devices, the positional relationships between the operation characters in the game area can be presented more realistically on the play area A21, and thus, the enjoyment of the player is further enhanced. For example, if a plurality of players fight against each other, the players can be made aware that they are enemies by bringing the terminal devices A30 of the competing players closer together, and tension between the opposing players can be enhanced.

The present invention is not limited to the foregoing embodiments and includes modifications, improvements and the like which achieve the objects of the present invention.

A game machine in a preferred embodiment is described below.

Overall Configuration of the Game Machine

Figure 1B:
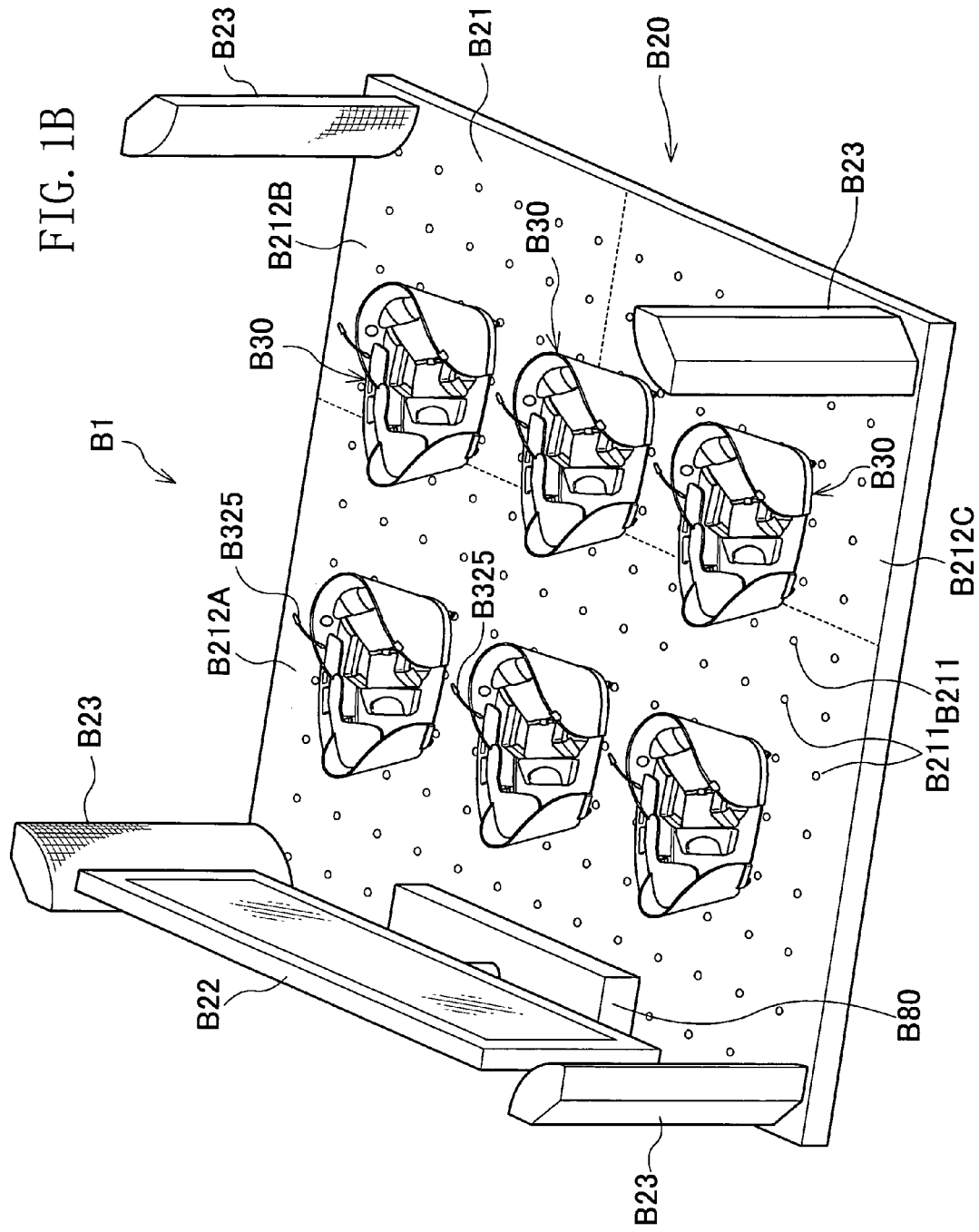
FIG. 1B is a perspective view showing an outward aspect of the game machine according to an embodiment of the present invention.

FIG. 1B is a perspective view showing an outward aspect of the game machine B1 according to an embodiment of the present invention.

The game machine B1 is a multi-player game machine, including a main game machine body B20 which includes a flat, rectangular play area B21 and a plurality of terminal devices B30 which are placed on this play area B21.

Aside form the play area B21, the main game machine body B20 includes a main display device B22 which is placed along one side of the play area B21, a speaker device B23 which is placed in the four corners of the play area B21, and a main control device B80 for controlling these main display device B22 and speaker device B23.

The play area B21 is divided into a plurality of sub-areas B212. As these sub-areas B212, there are city areas B212A, ocean areas B212B, and forest areas B212C. In addition, IC tags B211 are buried in grid-form in the play area B21. Positional information of the inside of the play area B21 is stored to this IC tag B211.

The main display device B22 is a large projector display device showing images based on image data output from the main control device B80. The main display device B22 is not limited thereto and can also be a large monitor.

The main control device B80 can communicate with each terminal device B30 bi-directionally through wireless LAN and can provide each player with a common virtual space by executing the predetermined game program and bi-directionally communicating with each terminal device B30.

Each terminal device B30 is placed facing towards the main display device B22. This terminal device B30 is connected to the main control device B80 through wireless LAN and can be moved over the play area B21 according to the instructions from the main control device B80 or by player operation.

Figure 2B:
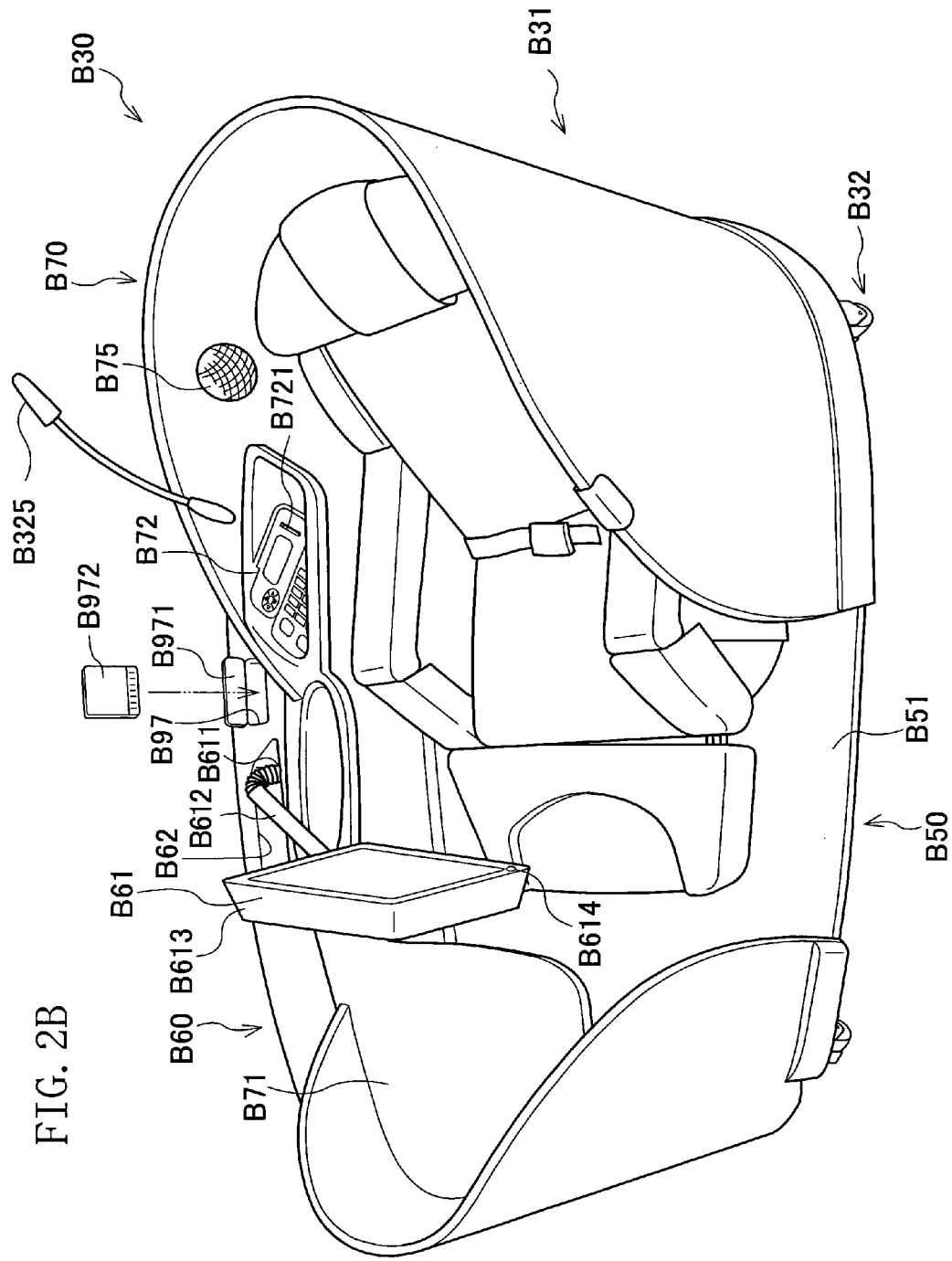
FIG. 2B is a perspective view showing an outward aspect of the terminal device of the game machine.

FIG. 2B is a perspective view showing an outward aspect of each terminal device B30.

The terminal device B30 includes a seat B31, and a traveling part B32, which is provided on the lower part of the seat B31, for moving the seat B31 over the play area B21.

Figure 3B:
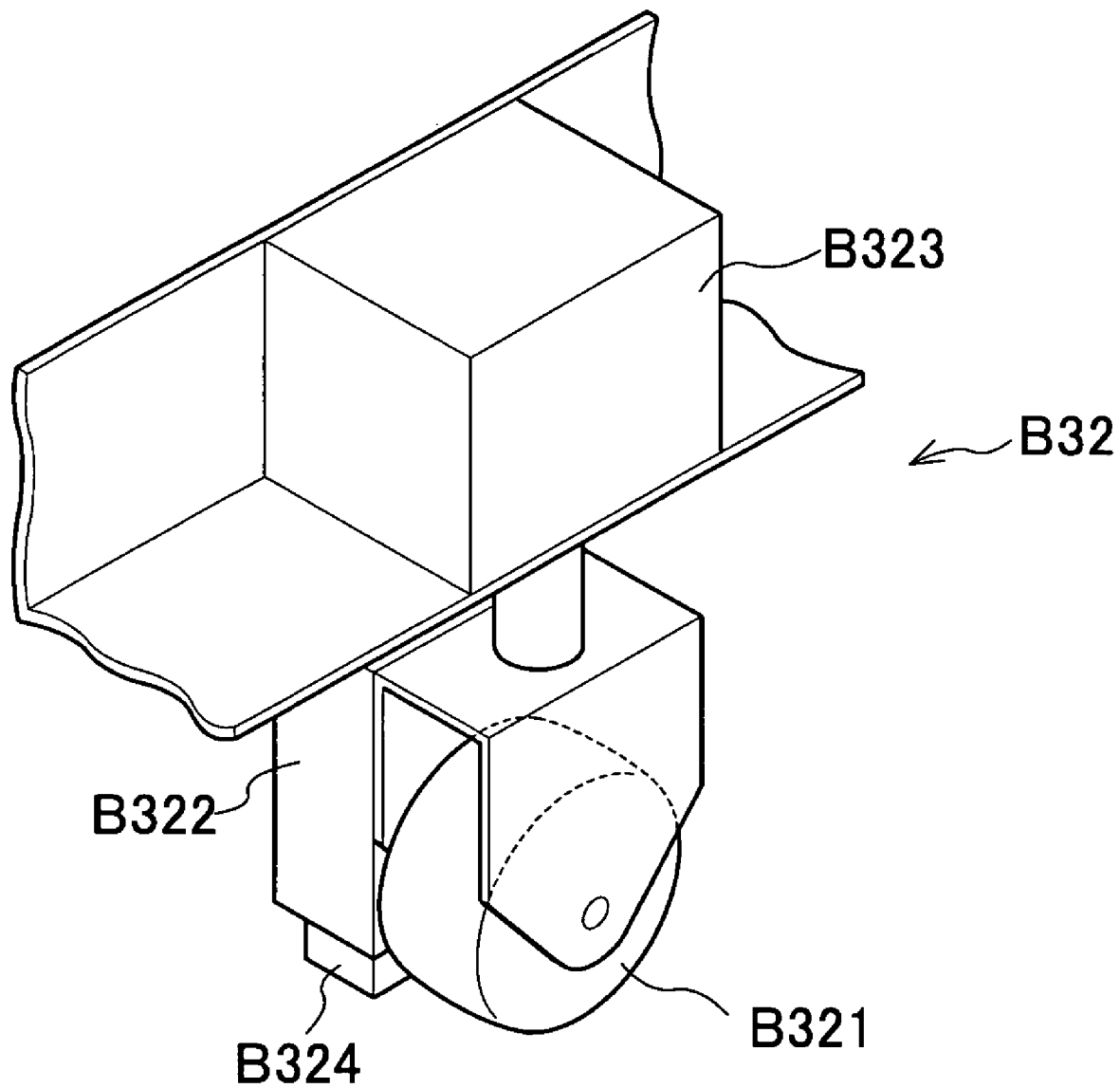
FIG. 3B is an enlarged perspective view of one section of a traveling part of the terminal device.

FIG. 3B is an enlarged perspective view of one section of the traveling part B32.

The traveling part B32 includes four traveling tires B321, a driving control device B322 for rotation-driving these traveling tires B321, a direction control device B323 for controlling the direction of the traveling tires B321, and a rechargeable battery, not shown, for supplying the driving control device B322 and direction control device B323 with power.

The traveling part B32 can move a seat B31 to an arbitrary position on the play area B21 by the driving control device B322 and the direction control device B323.

The foregoing rechargeable battery can be recharged through connection to an external power source, but is not limited thereto, and can be recharged by self-induced electromotive force due to a magnetic field, by embedding a magnetic field generating device in the play area B21 and generating a magnetic field by this magnetic field generating device.

In addition, an IC tag detection part B324 for detecting IC tags B211, which are buried in the play area B21, is provided below the driving control device B322 of the traveling part B32.

Configuration of the Seat

Figure 4B:
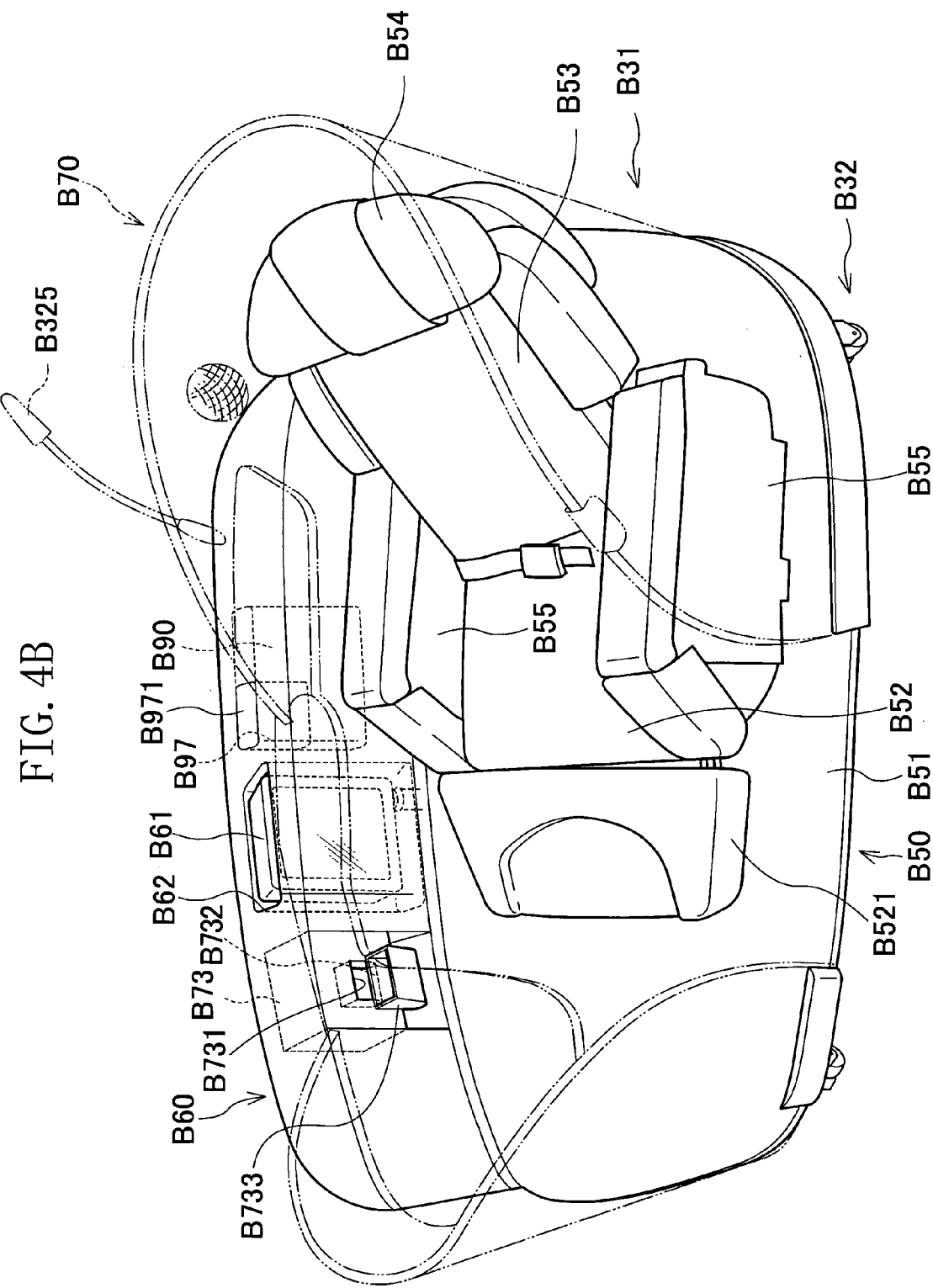
FIG. 4B is a perspective view of the of the seat of the terminal device in seat mode.
Figure 5A:
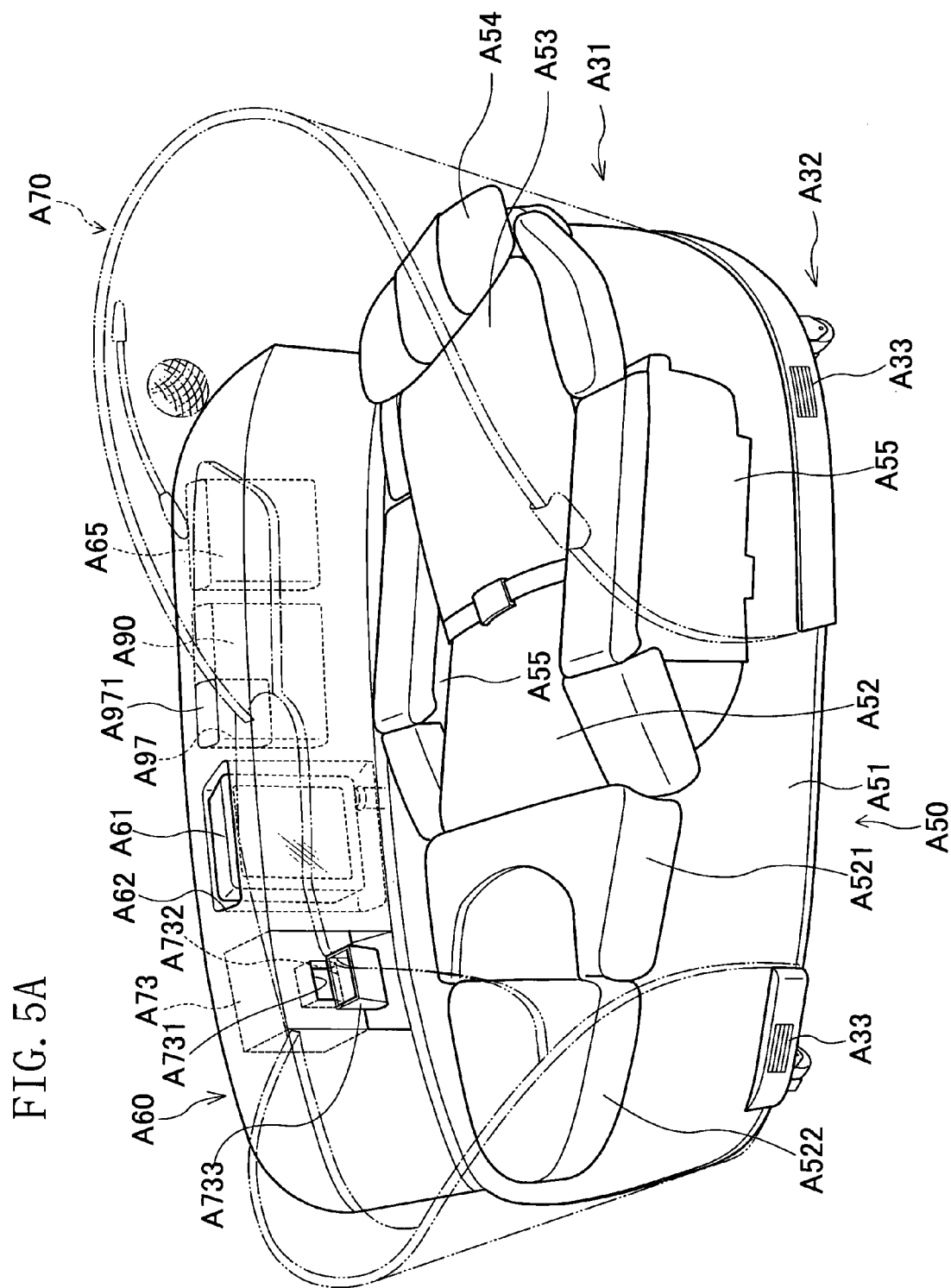
FIG. 5A is a perspective view of the seat of the terminal device in bed mode.
Figure 5B:
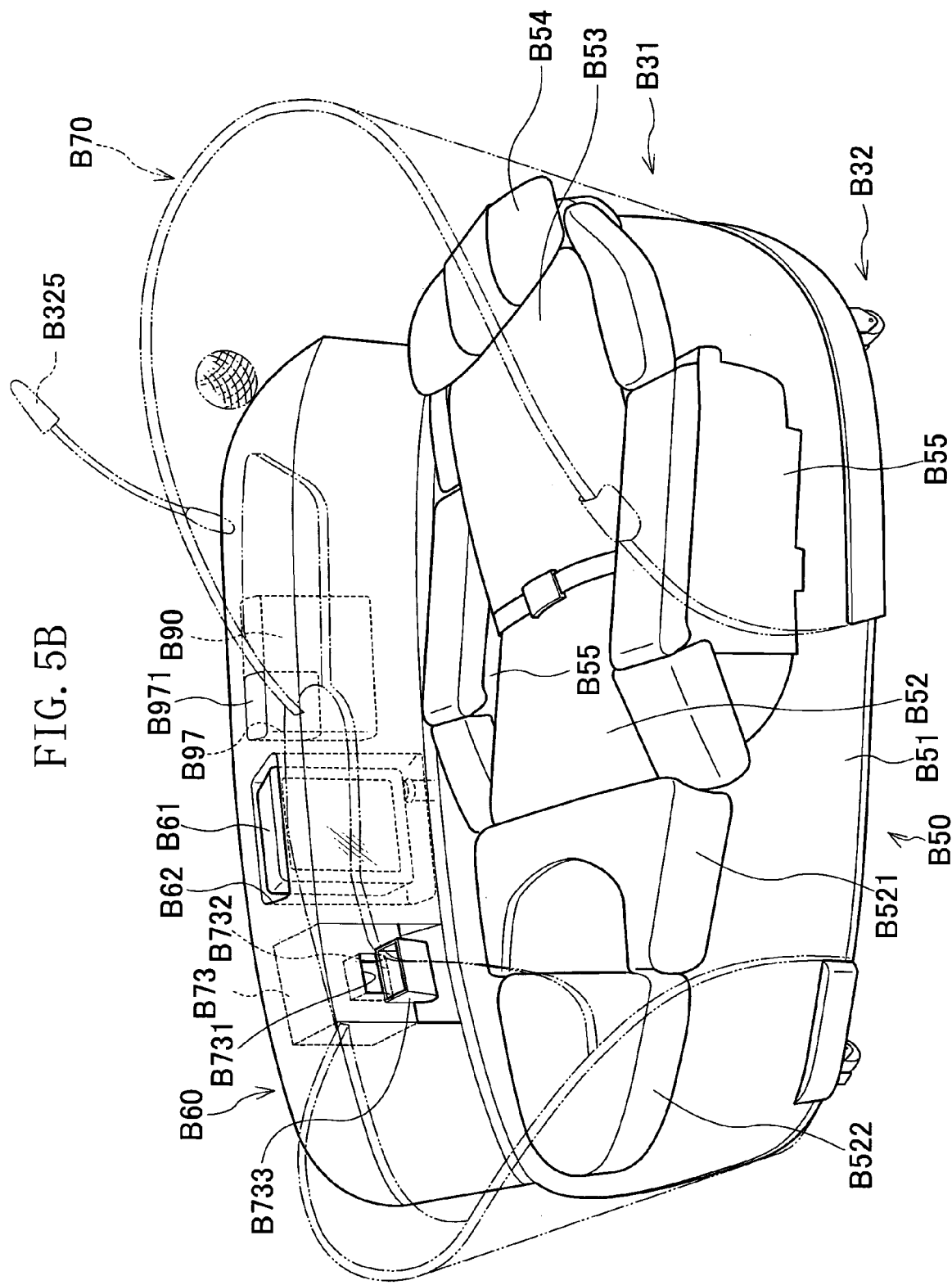
FIG. 5B is a perspective view of the seat of the terminal device in bed mode.

FIG. 4B is a perspective view of the seat B31 in seat mode. FIG. 5B is a perspective view of the seat B31 in bed mode.

Seat B31 includes a main seat body B50, a side unit B60 which is provided along one side surface of the main seat body B50, and a seat shell B70 which surrounds the main seat body B50 on three sides, excluding the other side surface side.

The mode of this seat B31 can be adjusted in multiple steps, between the seat mode shown in FIG. 4B and the bed mode shown in FIG. 5B.

The main seat body B50 includes a flat base part B51, a seating part B52 which is provided on this base part B51, a backrest B53 which is attached to enable changing of its angle to the seating part B52, a head rest B54 which is provided on the top part of the backrest B53, and a pair of side arms B55 which are provided in positions on the seat surface of the seating part B52 and both sides of the backrest B53.

The seating part B52 moves back and forth on the base part B51 when the player operates the input operation part B72. The main seat body B50 changes from the seat mode shown in FIG. 4B to the bed mode shown in FIG. 5B, when this seating part B52 is slid forward, and forms a bed.

The seating part B52 includes a leg rest B521 which is provided on the front surface side and a foot rest B522 which is stored in the tip of this leg rest B521. The leg rest B521 turns upward according to the sliding motion, when the seating part B52 is slid forward, and becomes a seat surface which continues from the seat surface of the seating part B52. At the same time, the foot rest B522 projects from the leg rest B521 and becomes a seat surface which continues from the leg rest B521.

The backrest B53 falls backward, according to the back and forth movement of the seat part B52 on the base part B51.

The front surface side of the side arm B55 turns slightly upward, when the main seat body B50 is placed in bed mode.

A bag component, into which air can be injected, is embedded respectively within the seat surface of the seating part B52, the lower part of the backrest B53 (which comes into contact with the lower back of the player) and the head rest B54. When air is injected into these bag components by an air pump, the surface swells and can support the user while accommodating the contours of the body surface of the user.

The sub-display part B61 which is configured to include a liquid crystal display panel is stored in the side unit B60.

As shown in FIG. 2B, the sub-display part B61 includes a first support arm B611 which is supported by the side unit B60, a second support arm B612 which is attached to the tip of the first support arm B611, and a flat, rectangular sub-monitor B613 which is attached to the tip of the second support arm B612 and performs liquid crystal display.

The first support arm B611 can be extended and retracted freely in the direction vertical to the side unit B60. The second support arm B612 can extend and retract freely and can be fixed to an arbitrary angle to the axis direction of the first support arm B611. The sub-monitor B613 can be fixed to an arbitrary angle to the axis direction of the second support arm B612.

A small CCD camera B614 is embedded into the sub-monitor B613. This CCD camera B614 is used when creating an avatar in the game field.

The image taken by the CCD camera B614 is displayed constantly in the sub-display part B61 in the terminal device B30, by operating an input operation part B72 (described hereafter). Because the expressions of the player per se can be viewed during the game in this way, enjoyment increases. In this case, the photographed image can be shown on the entire screen of the sub-monitor B613 or in one section of the screen.

A sub-monitor storage space B62 which extends in the vertical direction is provided in the side unit B60, and the foregoing first support arm B611, a second support arm B612, and a sub-monitor B613 are stored within the sub-monitor storage space B62.

The procedure by which the player pulls out the sub-monitor B613 from the storage space B62 is explained, with reference to FIG. 6B to FIG. 8B.

Figure 6B:
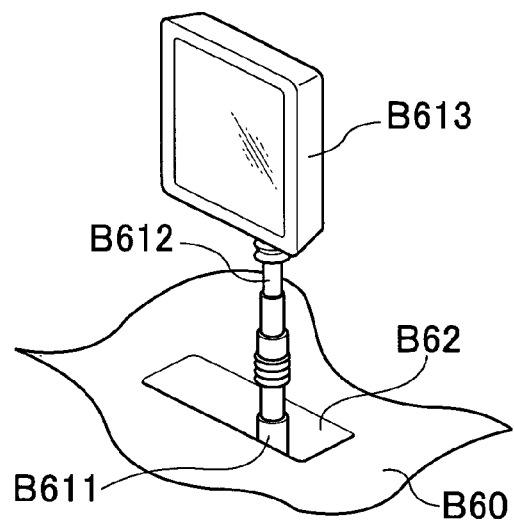
FIG. 6B is a perspective view showing a state in which a sub-monitor of the terminal device is pulled out from within a storage space.
Figure 7B:
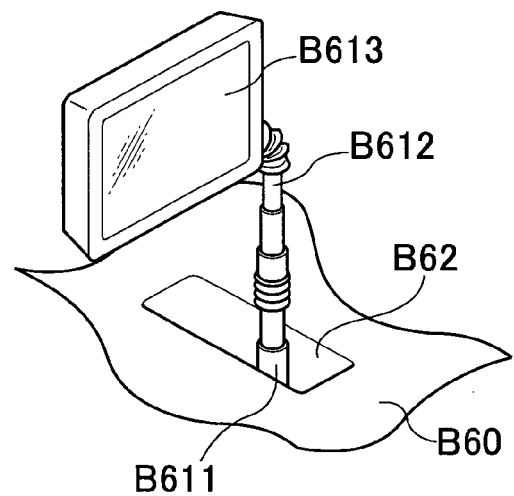
FIG. 7B is a perspective view showing a state in which the display screen of the sub-monitor of the terminal device is turned toward the player.
Figure 8B:
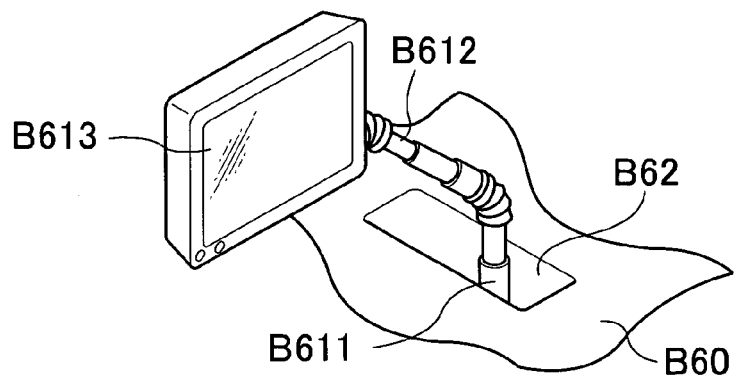
FIG. 8B is a perspective view showing a state in which the position of the sub-monitor of the terminal device is adjusted.

First, as shown in FIG. 6B, the player slides the sub-monitor B613 upward from the sub-monitor storage space B62 and extends the first support arm B611 and the second support arm B612, while seated in the main seat body B50. Then, as shown in FIG. 7B, the display screen of the sub-monitor B613 is turned toward the player by twisting the sub-monitor B613. Subsequently, as shown in FIG. 8B, the sub-monitor B613 is positioned to the player's eye level by adjusting the relative angles of the first support arm B611 and the second support arm B612 and the relative angles of the second support arm B612 and the sub-monitor B613.

A sub-control device B90 which is connected by wireless LAN to the main control device B80 and a plurality of board storage slots B97 which configure this sub-control device B90 are provided within the side unit B60.

The sub-control device B90 controls the sub-display part B61 and the traveling part B32, based on instructions from the main control device B80, as well as transmitting signals input by the input operation part B72 (described hereafter) to the main control device B80.

A cover part B971 is provided to open and close freely on the upper part of the board storage slots B97. By opening the cover part B971 and inserting a terminal control board B972 from above, as shown in FIG. 2B, the terminal control board B972 can be attached to the board storage slot B97.

The back-side of the seat shell B70 extends upward and can support the backrest B53 and the head rest B54. In addition, speakers B75 and a light display device B325 are provided on both sides of the head rest B54 of the seat shell B70.

The back-sides of the side surfaces of the seat shell B70 extends upward so that the player seated in the main seat body B50 cannot be viewed by other players.

A table B71 is attached from one side surface of the main seat body B50 to the front surface, on the upper edge of the seat shell B70. The space beneath this table B71 accepts the leg rest B521 and the foot rest B522 when the main seat body B50 is placed in bed mode.

The light display device B325 is provided on the tip of a rod-shaped support part attached to the side surface of the seat shell B70. This light display device B325 is provided in the highest position in the terminal device B30, which is a position visible from outside of the terminal device B30. By setting the light display device B325 in the highest position in the terminal device B30 in this way, it can be viewed by the manager of the game hall from any location outside of the play area B21.

This light display device B325 includes three types of LED chips, which emit red, blue, and green light, within, and additionally, a reflective frame is provided surrounding these LED chips. The red, blue, and green lights emitted from each LED chip are blended by the reflective frame, and thus, the light display device B325 illuminates with lighting aspects of six colors: purple, yellow, white, green, blue, and red, in the present embodiment.

The input operation part B72 is provided in the vicinity of the side arm B55 on the table B71, or in other words, a position wherein the player can perform operations while seated in the main seat body B50, and includes a keyboard, a jog dial and the like. A card slot B721 for inserting credit cards and membership cards is provided in this input operation part B72.

Although the input operation part B72 is provided on the table B71 in the present embodiment, this is not limited thereto, and can be provided as a touch-panel on the sub-monitor B613.

A medal payout opening B731 from which medals are paid out from a medal collection part B73 provided within the side unit B60, and a medal receiving part B732 for receiving the medals which are paid out are provided below the table B71 and in front of the side arm B55. A holder, not shown, for attaching a medal storage container B733 is provided in the medal reception part B732. For example, this medal can be paid out according to the odds of the win/loss of a certain event (win/loss of horse-racing, combat, etc.), such as a book-maker, within the game environment. In other words, predetermined odds (betting odds) are stipulated to the participants of the event by a book-maker within the game environment, and the player bets on the object of his choice. Then, medals are paid out based on the odds, according to the win/loss results. The prize resulting from this book-maker is not limited to medals and can be items within the game environment.

Figure 9B:
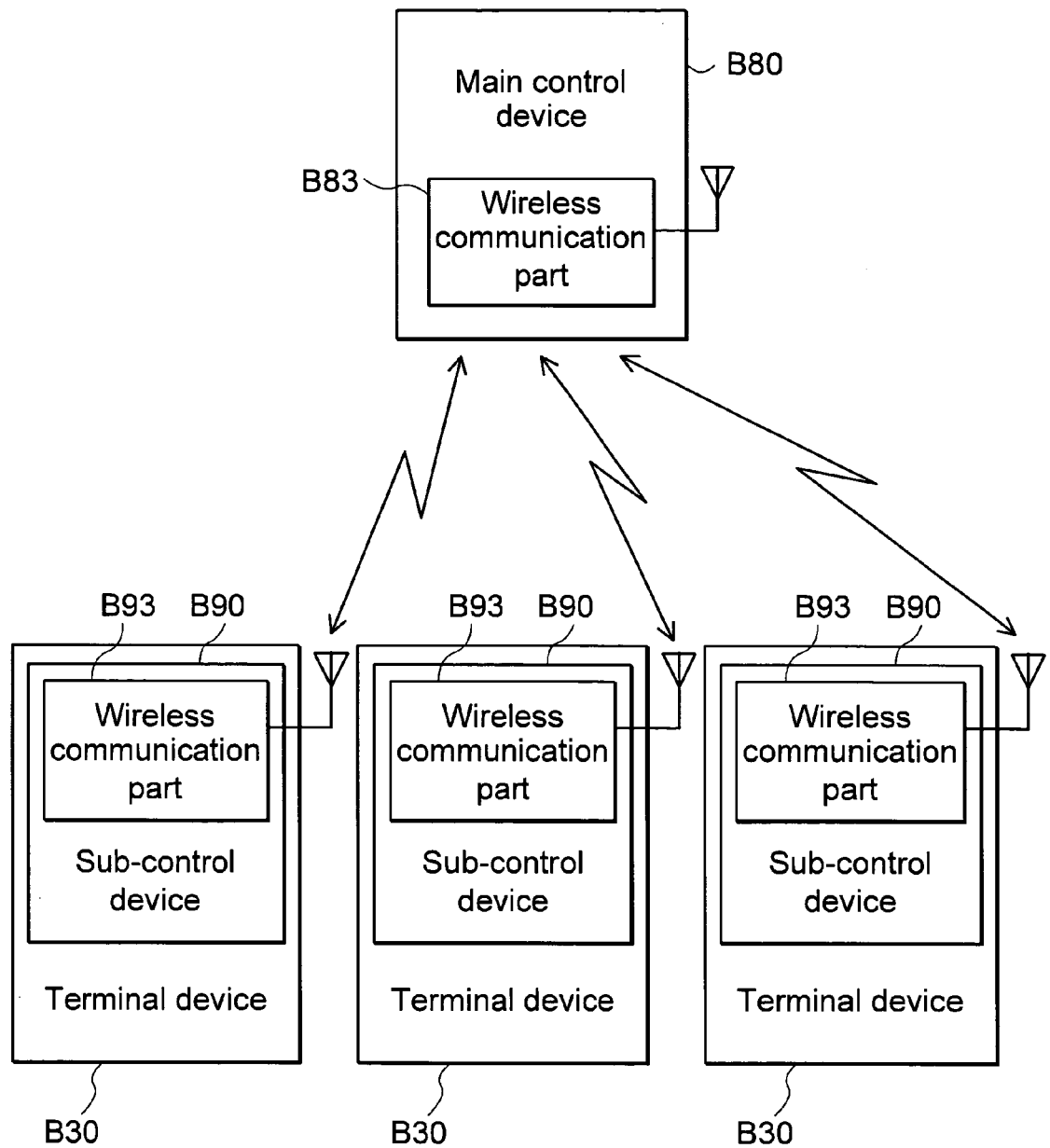
FIG. 9B is a block diagram showing an overall configuration of the game machine.

FIG. 9B is a block diagram of an overall configuration of the game machine B1.

In this game machine B1, the main control device B80 of the main game machine body B20 had a wireless communication part B83 and the sub-control device B90 of the terminal device B30 has a wireless communication part B93. These wireless communication parts B83 and B93 can be interconnected by a wireless LAN, and thus, the transfer of voice data and character data can be performed between the main control device B80 and the sub-control device B90.

Configuration of the Main Control Device

Figure 10B:
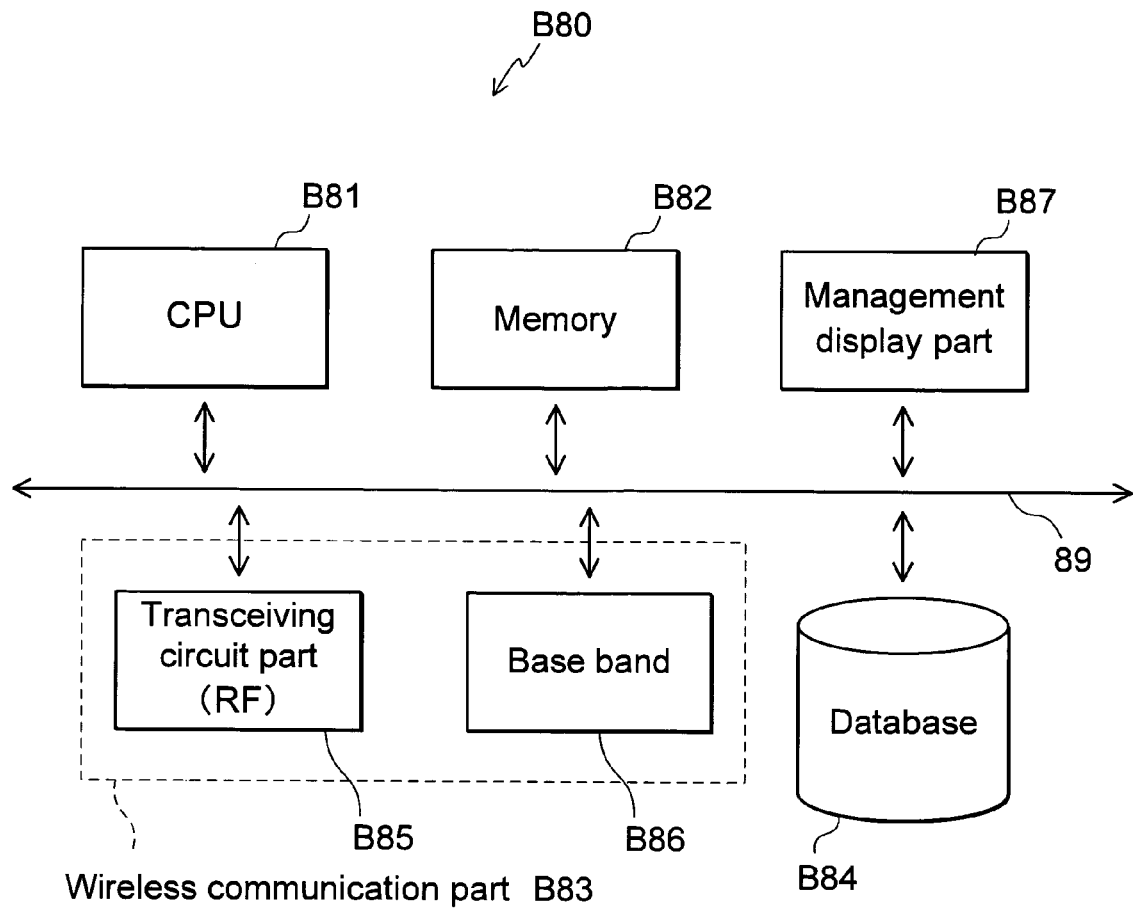
FIG. 10B is a block diagram showing a configuration of a main control device of the main game machine body.

FIG. 10B is a block diagram showing the configuration of the main control device B80.

The main control device B80 has a CPU B81, a memory B82, a wireless communication part B83, a database B84, and a management display part B87, which are connected to a data bus B89.

The wireless communication part B83 includes a transceiving circuit part (RF) B85 for transmitting and receiving signals with the sub-control device B90, and a base band processing part B86 for converting RF (Radio Frequency) signals received by the transceiving circuit part B85 into base band signals and also converting base band signals to be transmitted into RF signals.

The database B84 is a circuit board which includes a memory part to which a game program is stored or a storage medium (for example, a hard disk or ROM cassette) to which the game program is stored.

Specifically, a slot to which these circuit boards and storage mediums can be attached and removed is provided in the main control device B80. By attaching and removing these circuit boards and storage mediums from the slot, the game program stored to the database B84 can be replaced, accordingly, and other game programs can be executed. Replacing the game program is not limited to that via hardware, as such, and the game program can be replaced directly by downloading via a communication circuit.

CPU B81 transmits and receives data with the sub-control devices B90 of each terminal device B30, via the wireless communication part B83, by the procedure below.

Specifically, the CPU B81 converts data into packet data when transmitting data to the sub-control device B90 of the terminal device B30. At this time, the IP address of the identified terminal device B30, which is the destination, is added to the packet data.

In addition, the CPU B81 identifies the terminal device B30 which is the transmission source of the data when receiving data from the sub-control device B90 of the terminal device B30, based on the IP address added to the packet data.

The foregoing CPU B81 executes the game program and performs various processing as a result. In other words, the CPU B81 reads the game program stored in database B84 to the memory B82 and runs the game according to this game program.

Specifically, the CPU B81 receives data including game input data, described hereafter, respectively, from the plurality of terminal devices B30, and generates a single game data according to the game program, based on these data. Then, the CPU B81 generates image data which is shared with all of the terminal devices B30, based on the generated single game data, and outputs this data to the main control device B80.

Here, the single game data includes a plurality of operation character data which can be moved within the single game field generated according to the game program, based on the respective game input data of the plurality of terminal devices B30, and the positional data of this plurality of operation characters.

If a plurality of game input data is received from a plurality of terminal devices B30, the CPU B81 identifies the terminal device B30 which transmitted the game input data, based on the IP address, and moves the operation character of this identified terminal device B30 based on this game input data.

Furthermore, if the positional data of operation character of the identified terminal device B30, out of the plurality of terminal devices B30, meets predetermined conditions, the CPU B81 transmits, to the identified terminal device B30, movement signal data which designates the position of the terminal device B30.

In addition, during the game, the CPU B81 extracts the game program, information expressing the game status corresponding to the time-line in the game field at the time (namely, information expressing events and the like occurring in the game field) from the database B84 and transmits this to the terminal device B30, which is the request source, via wireless LAN. In addition, the CPU B81 receives information expressing the operation results of the player from each terminal device B30 and stores this in the memory B82.

The CPU B81 runs the game and stores the progress results of the game program to the database B84, based on the information expressing the operation results of the player stored to the memory B82.

Here, the information expressing the operation results of the player are, for example, selection results by the player from a selection shown to the player via the terminal device B30, based on the progress of the game program, or the results of the operation performed by the player of the character appearing in the game, and is information transmitted from the terminal device B30 as a result of the player operating their respective terminal devices B30. Other players can check the progress status of the current game stored to this database B84 (for example, high-score information, etc.)

The management display part B87 is a liquid crystal display device which includes a liquid crystal panel and a display control part for performing display control of this liquid crystal panel. This management display part B87 shows the contents of orders from the players operating each of the terminal devices B30 and the lighting aspects of the light display device B325 corresponding to the order contents. The manager of the game hall performs services to the player based on the content of the order and the lighting aspect shown in this management display part B87. Here, specific products which are order contents can be drinks or prizes and the like related to the game. The lighting aspects of the light display device B325 can be a lighted state differing by colors, such as red, blue and yellow, or can be lighted states such as flashing or indirect flashing. In addition, the types of colors illuminated by the light display device B325 can indicate the sequential order of product orders or the content of the product ordered, as described hereafter.

Configuration of the Sub-Control Device

Figure 11B:
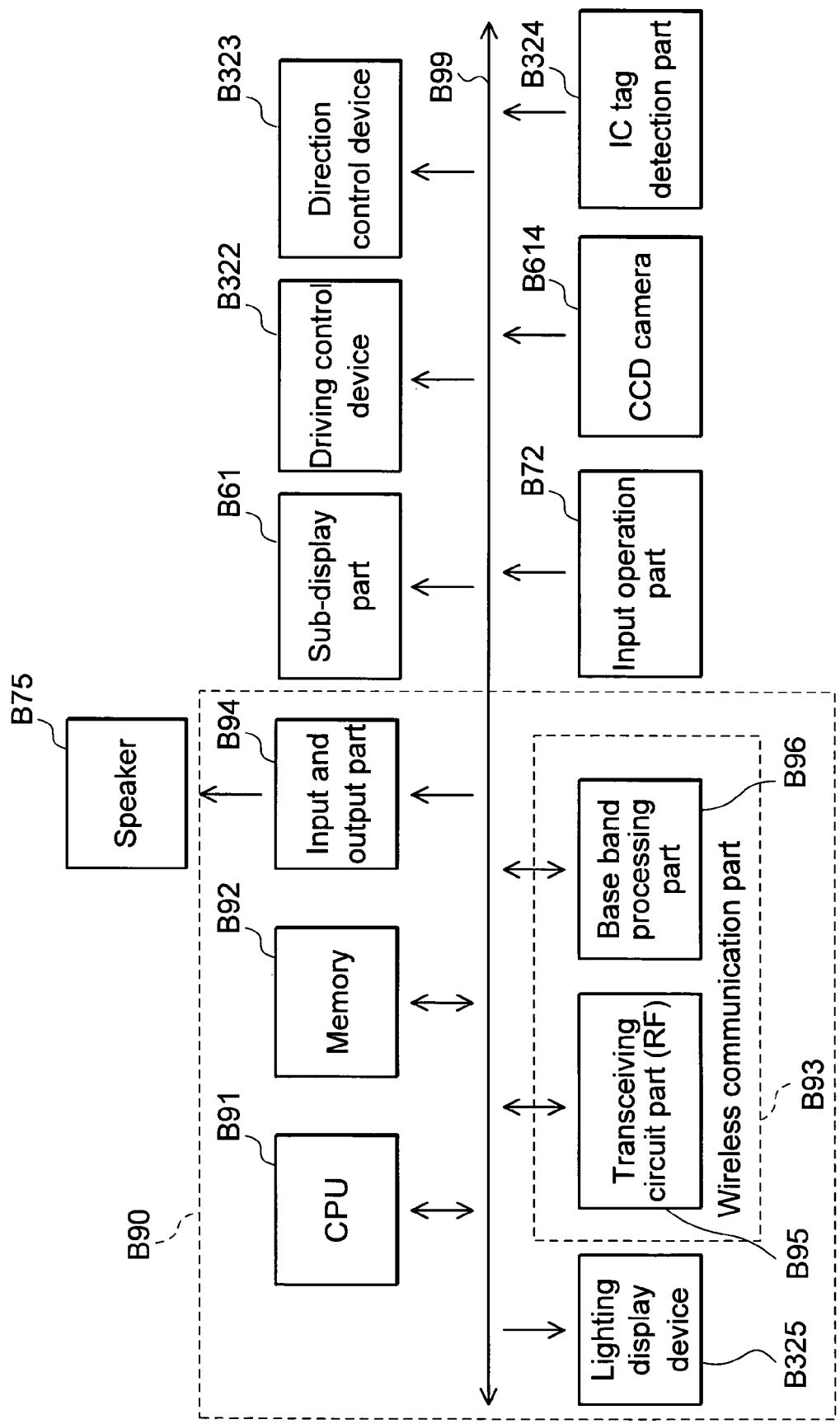
FIG. 11B is a block diagram showing a configuration of a sub-control device of the terminal device.

FIG. 11B is a block diagram showing the configuration of the sub-control device B90.

The sub-control device B90 has a CPU B91, a memory B92, a wireless communication part B93, and an input and output part B94 which is the interface with the speaker B75, which are connected to a data bus B99.

The wireless communication part B93 includes a transceiving circuit part (RF) B95 for transmitting and receiving signals with the main control device B80, and a base band processing part B96 for converting RF (Radio Frequency) signals received by the transceiving circuit part B95 into base band signals and also converting base band signals to be transmitted into RF signals.

The CPU B91 transmits and receives data with the main control device B80, via wireless communication part B93, by the procedure below.

Specifically, the CPU B91 divides data into packet data when transmitting data to the main control device B80. At this time, the IP address of the terminals device B30 which is the transmitting source is added to the packet data as an identifier for identifying respective terminal devices B30.

In addition, the CPU B91 receives the packet data if the IP address added to the packet data matches the IP address of the terminal device, when receiving data from the main control device B80, and destroys the packet data if it does not match.

The CPU B91 not only transmits and receives signals with the main control device B80, via the wireless communication part B93, but also controls the sub-display part B61, driving control device B322, direction control device B323, compressor A682, and electromagnetic open and close valves A691 to A695, based on the input signals from the input operation part B72, the CCD camera B614, and the IC tag detection part B324.

Specifically, the IC tag detection part B324 reads positional information from the IC tag B211 and outputs this as current-positional data. The CPU B91 transmits the game input data (data regarding character information, identified selection information, etc.) according to the input from the input operation part B72, the face image data taken by the CCD camera B614, and the current-positional data from the IC tag detection part B324 to the main control device B80.

Furthermore, when receiving movement signal data which designates the position of the terminal device B30 from the main control device B80, the CPU B91 grasps the position of the terminal device B30 on the play area B21, based on current-positional data from the IC tag detection part B324, controls the driving control device B322 and the direction control device B323 of the traveling part B32, and moves the terminal device B30 to the position designated by the movement signal data.

In addition, the CPU B91 can drive the driving control device B322 and the direction control device B323 of the traveling part B32, according to the game input data which is input by operating the input operation part B72.

The CPU B91 executes the operation program stored in memory B92 and performs various processing, according to the program executed in CPU B81.

In other words, when receiving a game program or information expressing the status corresponding to the time-line in the game environment at that time from the main control device B80, after storing information on the game program and the like, transmitted by the main control device B80, to the memory B92, the CPU B91 presents the various occurrences, such as events, occurring in the game environment at this time, in the sub-display part B61 and outputs sound effects from the speaker B75.

In addition, in response to receiving lighting aspect data transmitted from the main control device B80, the CPU 91 illuminates the light display device B325 with the lighting aspect corresponding to this lighting aspect data.

In addition, by operating the input operation part B72 while viewing the game content (image, letter information, etc.) shown in the sub-display part B61, the players using respective terminal devices B30 can operate the characters shown in the main display device B22, participate in the progress of the game by operations such as selecting from a selection by letters, and move the terminal device B30 to an identified position on the play area B21.

The lighting aspect table is explained, with reference to FIG. 12B.

The lighting aspect table is stored in a memory B82 of the main control device B80 and a memory B92 of the sub-control device B90, and includes lighting aspect numbers, 0 to 5, and information on the lighting aspects of the light display device B325, which are purple, yellow, white, green, blue and red, corresponding to each of the numbers. This lighting aspect table is referenced during a lighting display processing and an order management screen display processing, described hereafter.

A display example of an order selection screen is explained with reference to FIG. 13B.

Figures 13B, 14B:
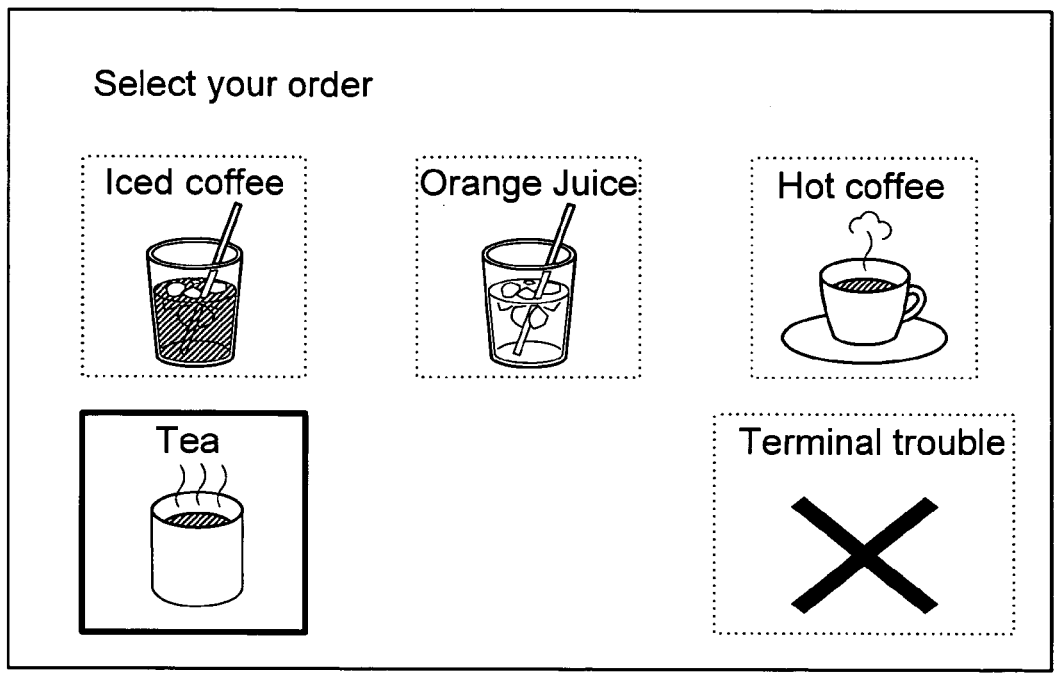
FIG. 13B is a display example of an order selection screen shown in the sub-display part of the terminal device.
FIG. 14B is a display example of an order management screen shown in the management display part of the main game machine body.

FIG. 13B shows a display example of the order selection screen shown in the sub-display part B61 of the sub-control device B90. When a calling operation is performed by an input from the input operation part B72, the order selection screen is shown in the sub-display part B61 in the order selection screen display processing, described hereafter. This order selection screen is shown continuously until the player performs an order selection. In this display example, iced coffee, orange juice, hot coffee, tea, and terminal trouble is shown as the order contents, and the player is prompted to select from any of the order contents.

A display example of an order management screen is explained, with reference to FIG. 14B.

FIG. 14B shows a display example of the order management screen shown in the management display part B87 of the main control device B80. The order management screen is shown in the management display part B8761 in the order management screen display processing, described hereafter, based on reception of order data and light-off data as game input data from the sub-control device B90. This order management screen is divided into an un-processed order column and a completed order column, and order contents included in the order data and the lighting aspects of the light display device B325 corresponding to the order contents are shown in each column.

The lighting aspects in this embodiment are correlated with the sequential order of the order, rather than the content of the products ordered (type of drink, etc.). In other words, as shown in FIG. 12B, the larger the lighting aspect number, the earlier the order, and the smaller the lighting aspect number, the later the order. As described hereafter, the main control device B80 performs the lighting aspect determination processing in FIG. 25B. This is because the main control device B80, which manages the sequential order of product orders, among the terminal devices B30, determined the lighting aspects. Because the selection count is set to 5, the lighting aspect number 5, "red", is selected as the lighting aspect when an order is first made. If orders are made subsequently, the lighting aspect becomes blue, and then, green.

The order content and the lighting aspect corresponding to the order content is shown continuously in the un-processed order column, from the reception of the order data until the reception of the lights-off data. After the lights-off data is received, the order is shown in the completed order column as a completed order.

Configuration of the Game Program

Next, a game program provided by the game machine B1 is explained. This game program is a role-playing game which is set in a fictional game environment which runs continuously by its own time-line. A plurality of towns exists in this fictional game environment, and guilds are formed respectively in each town.

Each player becomes an adventurer, visits each town, and aims to clear numerous events (quests) waiting in each guild by operating the avatar.

On the other hand, this game program generates a plurality of large events (macroquests) in the game field and forms a large plot of the story. Each player becomes involved in the large events (macroquests), while solving the foregoing events (quests), and solves the macroquest with other players while sometimes cooperating, sometimes fighting, and sometimes competing with each other.

This game program changes the plot of the game field by the operations of the terminal devices B30 of the players (game-play). In other words, the accumulation of the game-play (adventures) of each individual player creates the history of this game field.

In this way, this game program is a role-playing game wherein a plurality of players can all experience the flow of history in a fictional world. In addition, in this game field, history is created by a unique time-line which cannot be stopped, and therefore, the people appearing within this game field are not immortal, but will grow old as in the real world.

The game program is configured to write the name of the player who has solved an event in the macroquest or achieved accomplishments such as winning in a competition against another player to a chronology which is stored to the database B84. In this way, players who were successful in the macroquest can leave their name in the history of the game field.

Figure 15B:
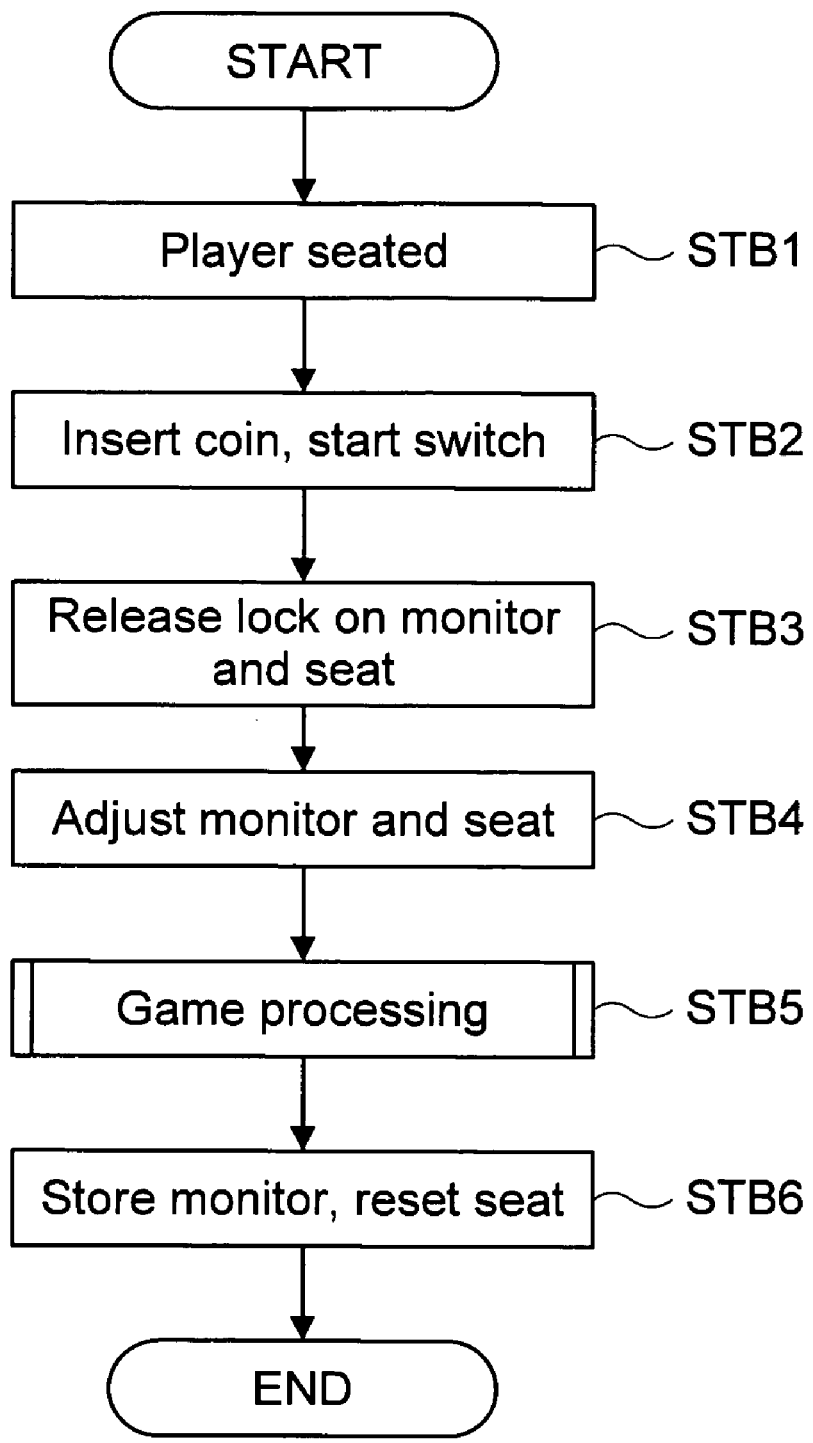
FIG. 15B is a main flowchart of a game executed in the game machine.

The operation of the game machine B1 is explained, with reference to the main flow chart shown in FIG. 15B.

In STB1, each player selects a terminal device B30 of their choice from the terminal devices B30 placed on the play area B21 and sits in the seat B31 of the selected terminal device B30. Next, in STB2, each player inserts a coin into a coin insertion opening in the input operation part B72 and presses the start switch. Then, in STB3, the locks of the sub-monitor B613 and the seat B31 of the game machine B1 are released and, in STB4, the player can pull out the sub-monitor B613 from the storage space B62 in the side unit B60 and adjust the mode of the seat B31.

In STB5, the game machine B1 performs a game processing described hereafter. After the game is completed, in STB6, the game machine B1 stores the sub-monitor B613 and also returns the mode of the seat B31 to seat mode.

Figure 16B:
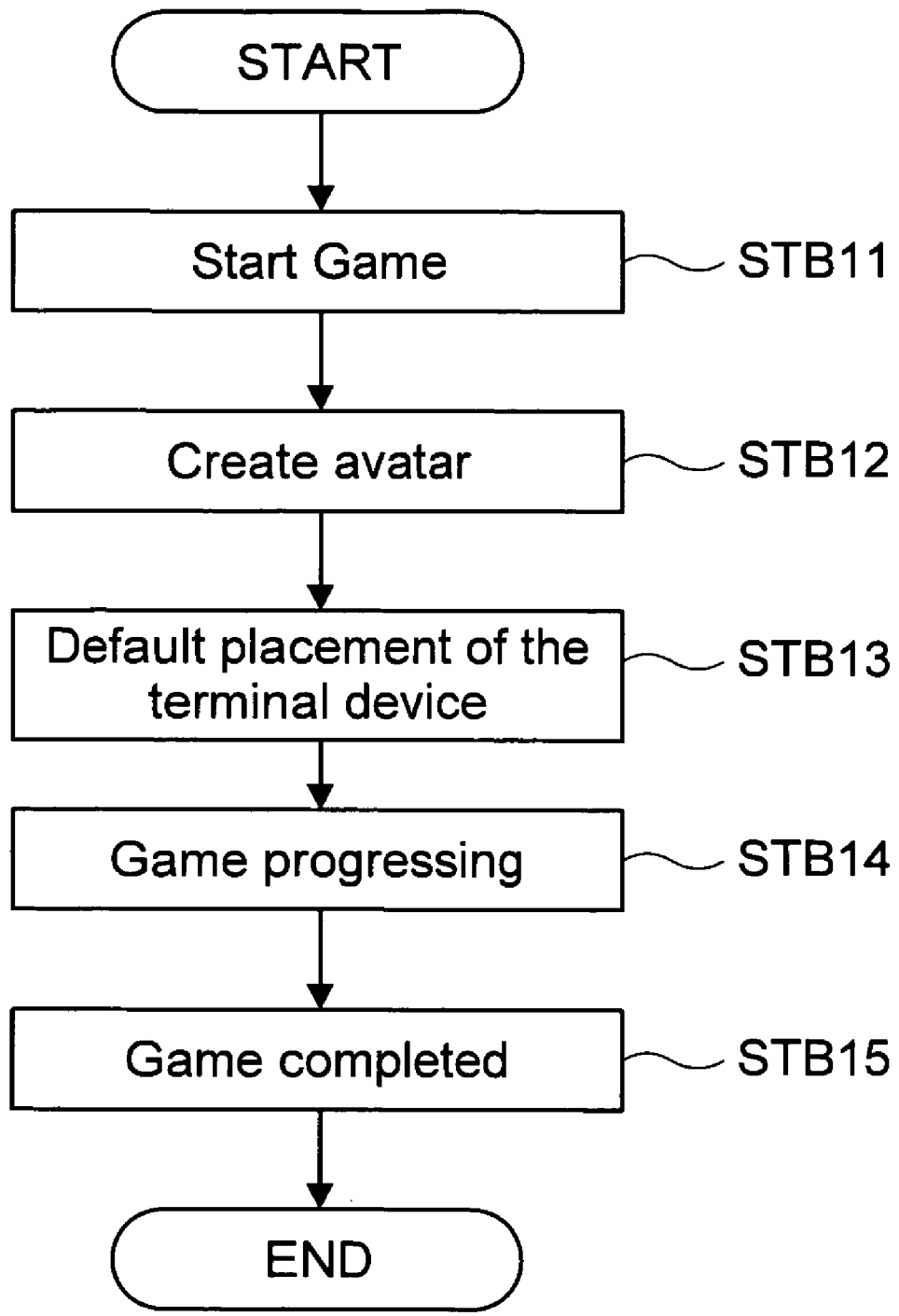
FIG. 16B is a flowchart of the game processing of the game program executed in the game machine.

FIG. 16B is a flowchart of the game processing. When the game is started in STB11, the game program creates an avatar of the player on STB12.

In other words, the game program shows an avatar creating screen in the sub-display part B61. In this avatar creation screen, the player creates an avatar, which is an alter-ego of the player, when participating in the game program. When an image of the player's face is taken by the CCD camera B614 and the player enters personal information and the name to be used in the game field to the input operation part B72, the game program creates an avatar based on this information and registers it to the database B84 of the main control device B80.

In STB13, the game program places the terminal device B30 in which the player is seated in the default position on the play area B21.

In other words, the towns in the game field are surrounded by the ocean or forests, or are large cities. Each game area is an ocean, a forest, or a large city. The play area B21 includes a plurality of sub-areas B212, such as a city area B212A, an ocean area B212B, and a forest area B212C, as stated earlier. These sub-areas B212 are quasi-spaces corresponding to the environment of the towns in the game environment.

Therefore, the game program sets the town each player is in, in the game field, and moves the terminal device B30 of the player to the sub-areas B212, corresponding to the town in which each player is, when the game begins. Alternatively, the terminal device B30 of the player is moved according to the operations of each player of the input operation part B72, and the town in which the player is in the game field is set according to this movement.

In STB14, the game program runs the game according to a unique time-line, generating macroquests in which a plurality of players participate and quests in which only one player participates, and completed the game in STB15.

Figure 17B:
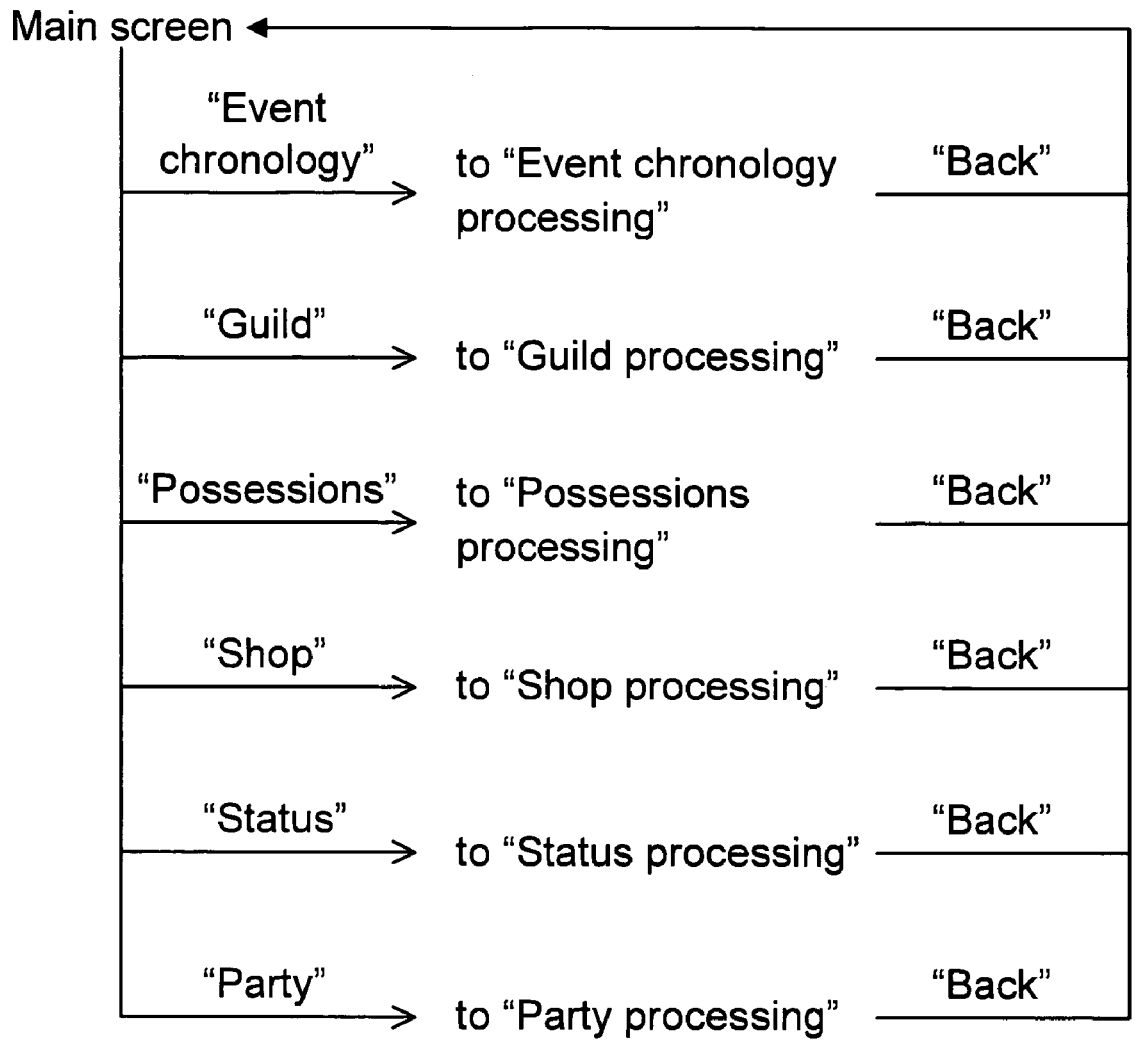
FIG. 17B is a flowchart of each player in the game program executed in the game machine.

FIG. 17B is a flowchart of each player in the game program.

Each player can perform an event chronology processing, guild processing, possessions processing, shop processing, status processing, and party processing.

When the player selects "event chronology processing", the game program shows the event chronology in the sub-display part B61 by reading the event chronology from the database B84 in the main control device B80 and performing event chronology processing.

In this event chronology, the respective dates and quest name of each quest solved in the game field is shown. Furthermore, when the player selects a quest name (event name), the game program shows the details of the selected event. Here, the details of the event are, for example, showing the player who solved the quest most quickly, if the winner is the player who solves the event (quest) most quickly, and shows the party if the winner is the party with the most number of cooperating players who have solved the event (quest).

When the player selects "guild", the game program performs a guild processing and shows a guild screen in the sub-display part B61. In this guild screen, the player can view the quests the player can try in the guild and select to go to another town in the game environment.

When the player selects "quest" in the guild screen, the game program shows a list of selectable quests in the sub-display part B61. If the player selects the desired "quest" from this list, the game program executes the selected quest.

When the player selects "Go to another town" in the guild screen, the game program shows a list of towns which can be selected as a transfer destination in the sub-display part B61. If the player selects a desired town from this list, the game program moves the player to the selected town. When the game program moves the player to another town within the game environment, the terminal device of each player is moved to the sub-areas B212 of the corresponding transfer destination town.

The player can select menus such as "guild", "possessions", and "shop", even in the transfer destination town.

When the player selects "possessions", the game program performs a possessions processing and shows a possessions (list of contents) screen, of weapons, tools, shoes, and the like in the sub-display part B61. If the player selects a specific possession in this possessions (list of contents) screen, the game program shows a plurality of items included in the selected possessions in the sub-display part B61. The player selects the desired item from these items and either "wear" or "dispose of" the selected item.

When the player selects "shop", the game program performs a shop processing and shows a shop screen in the sub-display part B61. This shop screen is a screen for barter exchanging items in possession or acquiring information from the shop owner, and the player can select either "listen" or "exchange".

When the player selects "exchange" in the shop screen, the game program shows a list of products in the sub-display part B61. The player can select a desired item from this product list.

When the player selects the desired item, the game program shows the items possessed by the player for exchanging with the selected desired item. When the player selects an item in possession for exchange, the game program shows the item posses by the player and the price thereof in the sub-display part B61.

When the player selects the desired item for exchange from the items in possession, shown here, the desired items in possession to be exchange are collected, and the player selects "execute", the game program executes an exchange of the desired item and the desired item in possession to be exchanged.

On the other hand, if the player selects "listen" in the shop screen, the game program shows "rumors" in the sub-display part B61. The player can acquire information in the game environment by the "rumors" shown in this screen.

When the player selects "status", the game program performs a status processing and shows a status screen in the sub-display part B61. This status screen shows the results of the player's accomplishments in the game environment, the possessions thereof and the like. Specifically, it shows name, title, fame, power, intelligence, number of monsters slain, number of quests cleared, number of people saved, and the like.

If the player selects any one of the items above, the game program shows the rankings related to this item in the sub-display part B61.

When the player selects "party", the game program performs a party processing and shows the names of fellow players in the sub-display part B61, if there are fellow players, and furthermore, shows "read mail", "send mail", "exchange item", "view status" and the like.

By selecting any one of the items above, the player can send and receive mail with fellow players, exchange items with fellow players, and view the status of fellow players.

Figure 18B:
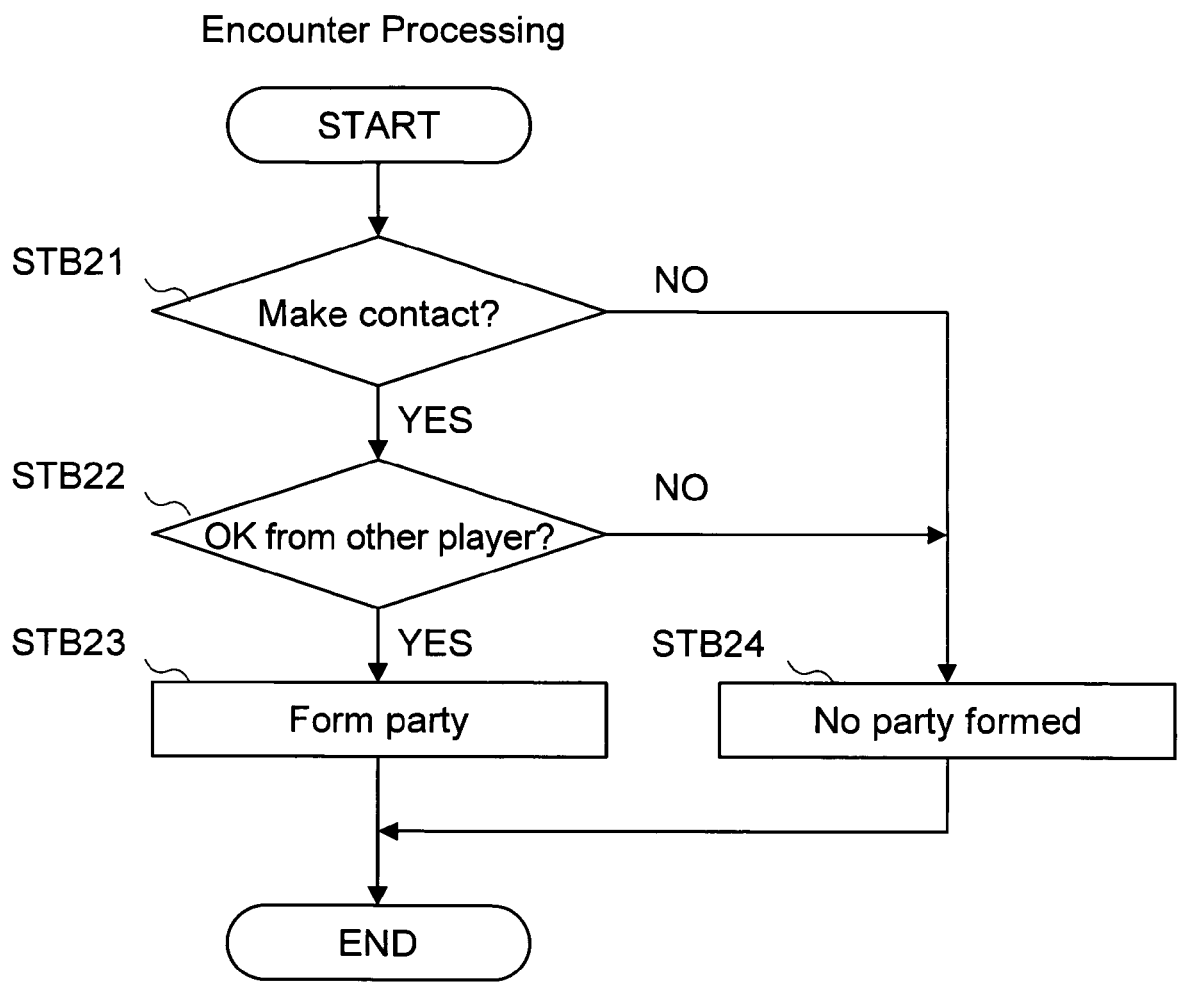
FIG. 18B is a flowchart of when a player encounters another player in a game field in the game program.

FIG. 18B is a flowchart of the encounter processing when the player encounters another player on the game field.

In the progress of the game in STB14, the game program executes an encounter processing when the player encounters another player on the game environment.

In other words, in STB21, an encounter screen is shown in the sub-display part B61, and the player is prompted to select whether to make contact.

If the player selects "No", the process moves to STB24 and the encounter processing is terminated without forming a party. On the other hand, if the player selects "Yes", the process moves to STB22, and the game program transmits mail to the other player, and shows that the player is being invited to become a fellow player in the sub-display part B61 in the terminal device B30 of this player. Then, the game program prompts the other player to select whether to accept the invitation.

If the player receiving the invitation selects "Yes", the process moves to STB23 and the game program transmits the selected result to the player who is the inviter, shows that the player has become a fellow player in the sub-display part B61 of the player who is the inviter, a party is formed and the process is completed.

On the other hand, if the player receiving the invitation selects "No", the game program shows that the player could not be a fellow player to the player who is the inviter in the sub-display part B61, and the process moves to STB24, and terminates the encounter processing without forming a party.

Figure 19B:
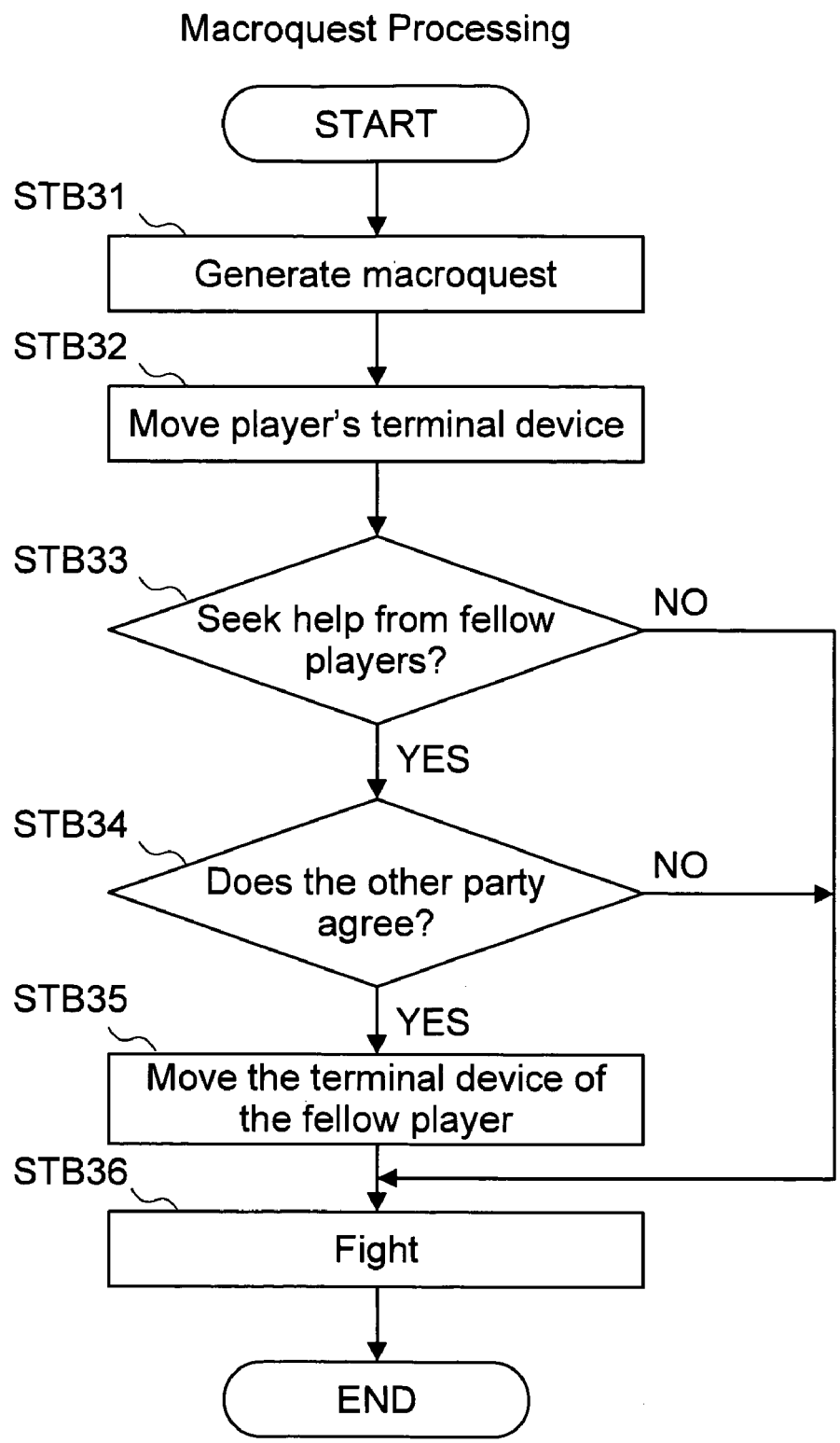
FIG. 19B is a flowchart of when a macroquest is generated in the game field in the game program.

FIG. 19B is a flowchart of the macroquest processing when a macroquest is generated in the game environment.

If a macroquest involving a plurality of players is generated in STB31, the game program executes a macroquest processing.

In other words, if a macroquest is generated in STB31, the process moves to STB32, shows the players involved in this macroquest in the main display device B22, also moves the terminal devices B30 of the players involved in this macroquest to the sub-area B212A in front of the main display device B22, and places them so that the terminal devices B30 of opposing players are close to and facing each other.

Figure 20B:
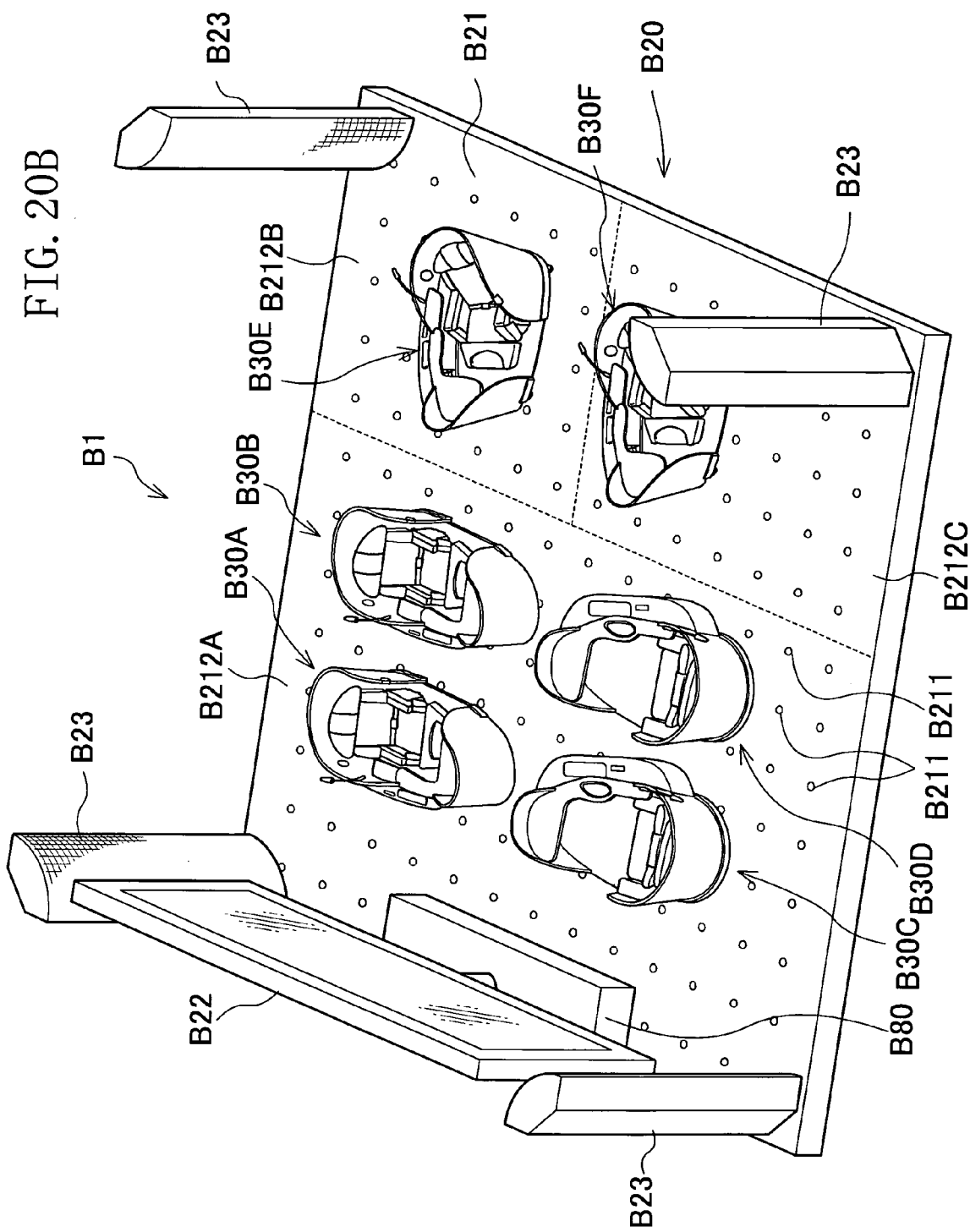
FIG. 20B is a perspective view showing a state in which a macroquest is generated in the game field in the game program of the game machine.

Specifically, as shown in FIG. 20B, there are six terminal devices, B30A to B30F, placed on the play area B21. Among these, the players of terminal devices B30A, B30B, and B30E are one party, and the players of terminal devices B30C, B30D, and B30F are another party. Then, each player in terminal devices B30A to B30D are caught in the macroquest in the city area B212A and are placed such that the parties oppose each other. In contrast, because the players in terminal devices B30E and B30F are respectively in the ocean area B212B and the forest area B212C, they are not involved in the macroquest, and thus, view the battle between the terminal devices B30A to A30D.

In order to clear the macroquest, the players caught in the macroquest select whether to call for help from fellow players in STB33.

If the player selects "No", the process moves to STB36.

On the other hand, if the player selects "Yes", the process moves to STB34, the game program transmits mail calling for help to the fellow players, and shows that help is being called for in the sub-display part B61 in the terminal device B30 of the player. Then, the game program prompts the fellow players to select whether to help the player.

If the fellow player whose help is requested selects "Yes", the process moves to STB35, and the game program transmits the selection results to the player requesting help and that the fellow player will participate is shown in the sub-display part B61 of the player. In addition, the game program shows the status of the gathering of newly participating fellow players in the main display device B22, and the terminal devices B30 of the newly participating fellow players are moved to the city area B212A in front of the main display device B22 and placed such that the terminal devices B30 of opposing players are close to and facing each other.

On the other hand, if the player whose help is requested selects "No", the game program shows that help had been denied in the sub-display part B61 of the player requesting for help, and the process moves to STB36.

Figure 21B:
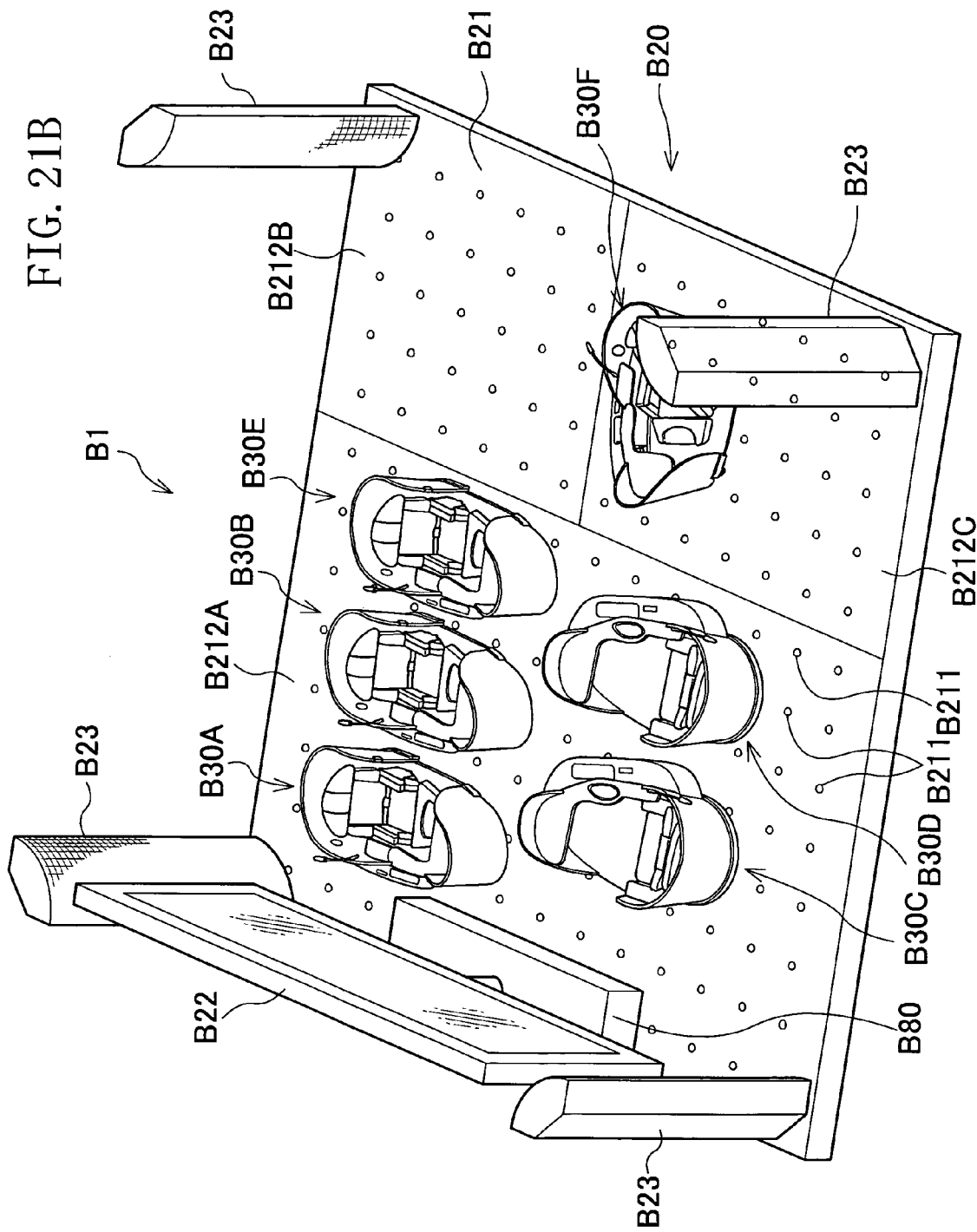
FIG. 21B is a perspective view showing a state in which fellow players participate in a macroquest generated in the game field in the game program of the game machine.

Specifically, as shown in FIG. 21B, because the player in terminal device B30E is fellow players with the players in terminal devices B30A and B30B, this player's help is requested by the terminal devices B30A and B30B. The player in terminal device B30E, having agreed to help, is moved to the city area B212A and is placed in alignment with the terminal devices B30A and B30B.

On the other hand, although the player in terminal device B30F is fellow players with the players in terminal devices B30C and B30D, and this player's help is requested by the terminal devices B30C and B30D, he refuses to help and, therefore, remains in the forest area B212C.

In STB36, each player fights the opposing player or opposing party. Specifically, as shown in FIG. 21B, the players of terminal devices B30A, B30B, and B30E and the players of terminal devices B30C and B30D fight in the city area B212A.

In this way, each player gets caught in a macroquest or are requested to help by fellow players caught in the macroquest, and whether to watch the battle between other players or to personally participate can be selected.

The control operations of the sub-control device B90 is explained, with reference to the flowcharts shown in FIG. 22B to FIG. 24B. The processings performed in the flowcharts shown below are interrupt processings by the CPU B91 in the sub-control device B90 and are performed at predetermined intervals.

Figure 22B:
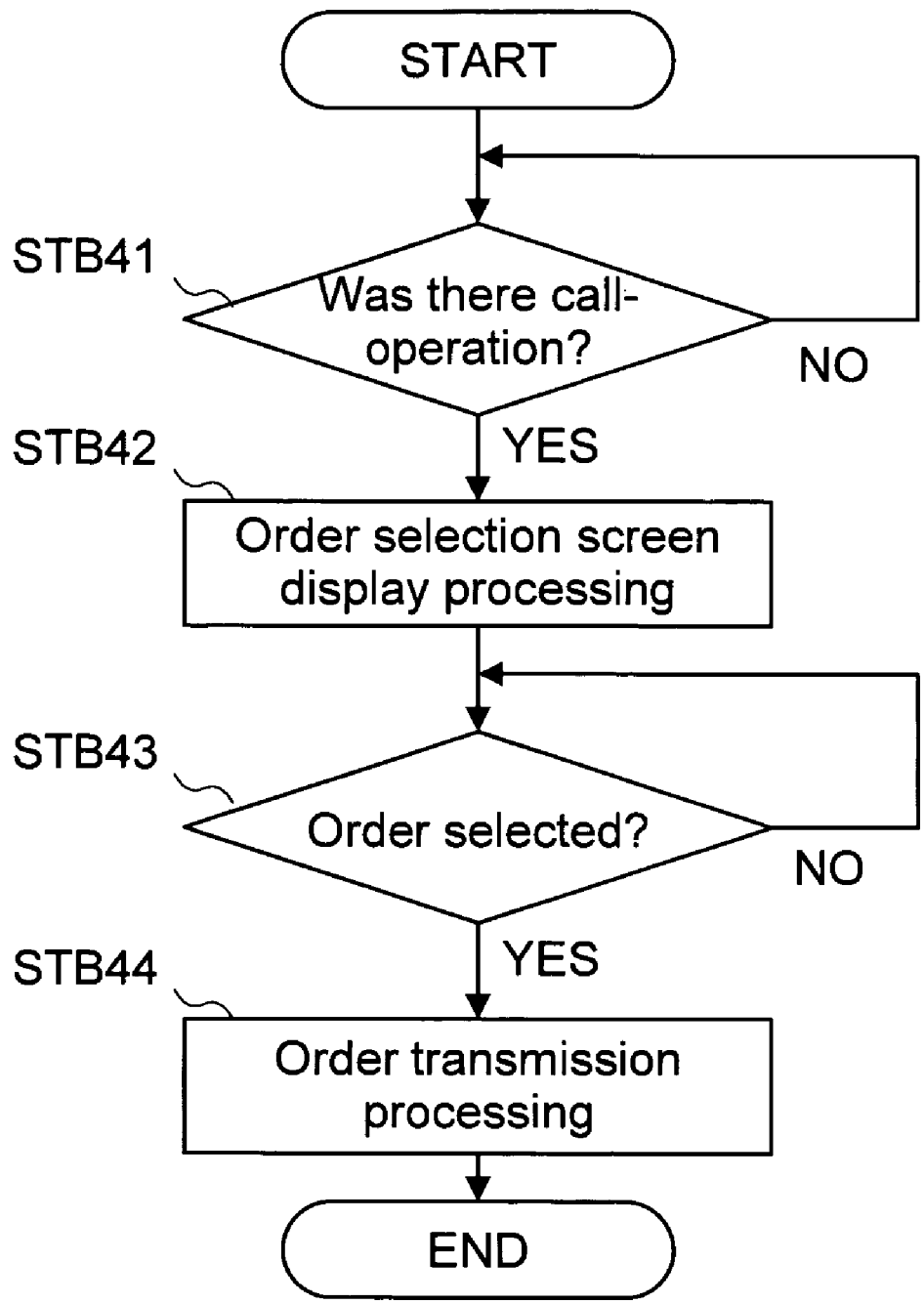
FIG. 22B is a flowchart of an order data transmission processing performed by the sub-control device of the terminal device.

FIG. 22B is a flowchart of an order data transmission processing.

In STB41, the CPU B91 determines whether there has been a calling operation by input from the input operation part B72. If this is determined to be "YES", the process moves to STB42, and if it is "NO", the process moves to STB41. In STB42, the order selection screen display processing is performed. Specifically, the order selection screen (FIG. 13B) is shown in the sub-display part B61, and the selection of order content is prompted. In STB43, the CPU B91 determines whether there has been a selection of the order by input from the input operation part B72. If this is determined to be "YES", the process moves to STB44, and if it is "NO", the process moves to STB43. In STB44, the order transmission processing is performed. Specifically, order data including the content of the selected order, to which the IP address of the terminal device B30 is added, is transmitted as game input data to the main control device B80, and the order data transmission processing is completed.

Figure 23B:
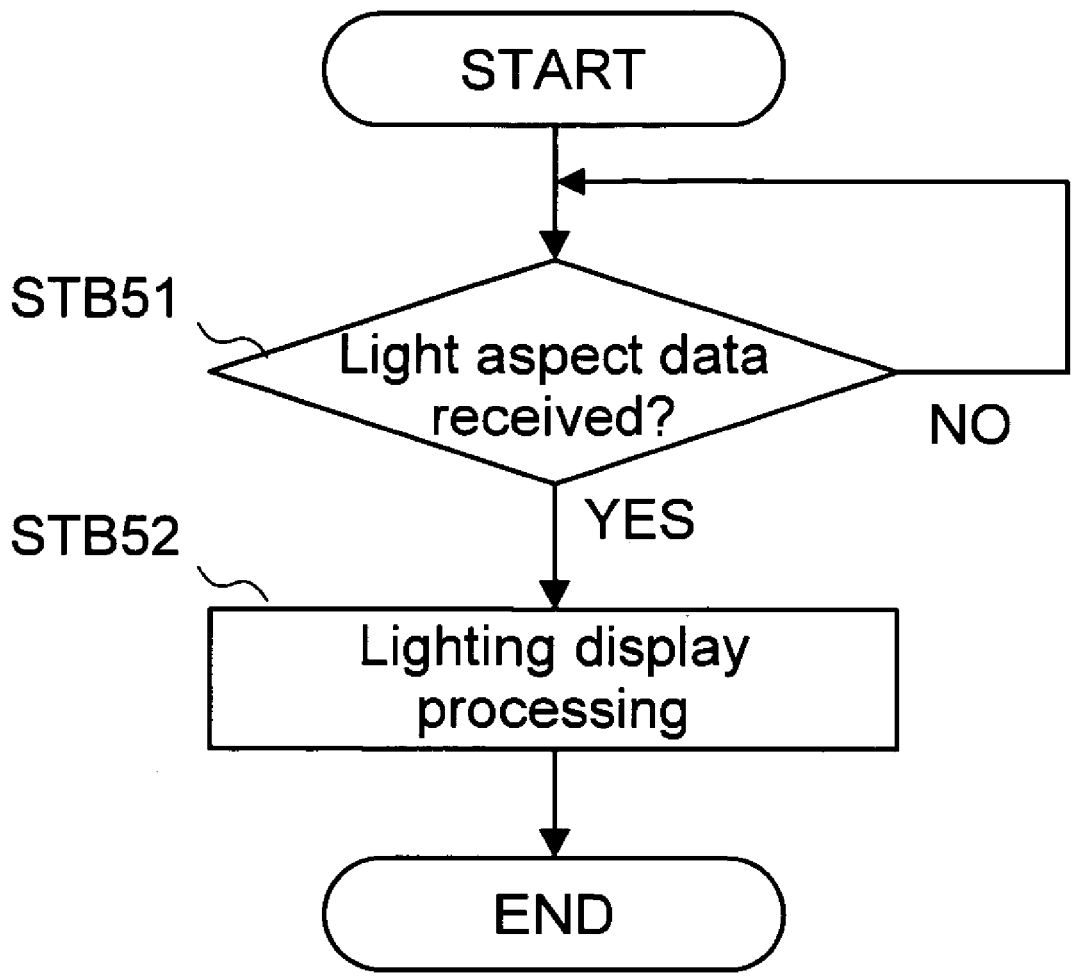
FIG. 23B is a flowchart of a lighting aspect data reception processing performed by the sub-control device of the terminal device.

FIG. 23B is a flowchart of a lighting aspect data reception processing.

In STB51, the CPU B91 determines whether the lighting aspect data is received from the main control device B80. If this is determined to be "YES", the process moves to STB52, and if it is "NO", the process moves to STB51. In STB52, a lighting display processing is performed. Specifically, the light display device B325 is illuminated with the lighting aspect corresponding to the lighting aspect number included in the lighting aspect data, with reference to the lighting aspect table, and the lighting aspect data reception processing is completed.

Figure 24B:
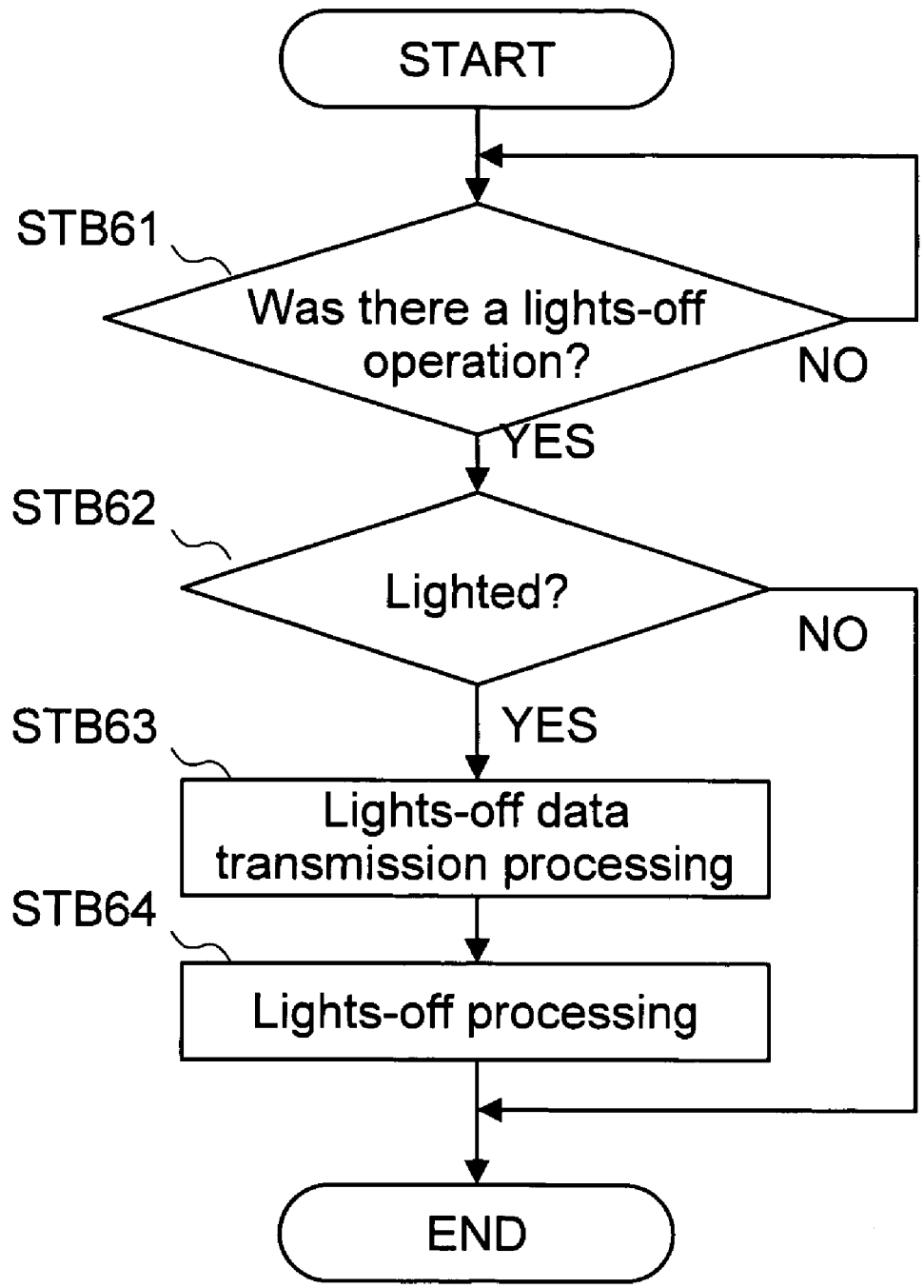
FIG. 24B is a flowchart of a lights-off data transmission processing performed by the sub-control device of the terminal device.

FIG. 24B is a flowchart of a lights-off data transmission processing.

In STB61, the CPU B81 determines whether there has been a light-off operation of the light display device B325 by input from the input operation part B72. If this is determined to be "YES", the process moves to STB62, and if it is "NO", the process moves to STB61. In STB62, the CPU B81 determines whether the light display device B325 is illuminated. If this is determined to be "YES", the process moves to STB63, and if it is "NO", the lights-off data transmission processing is completed. In STB63, a lights-off data transmission processing is performed. Specifically, the lighting aspect number corresponding to the lighting aspect of the light display device B325 is transmitted to the main control device B80 and the process moves to STB64. In STB64, the light in the light display device B325 is turned off and the lights-off data transmission processing is completed.

The control operations of the main control device B80 is explained, with reference to the flowcharts shown in FIG. 25B to FIG. 26B. The processings performed in the flowcharts shown below are interrupt processings by the CPU B81 in the main control device B80 and are performed at predetermined intervals.

Figure 25B:
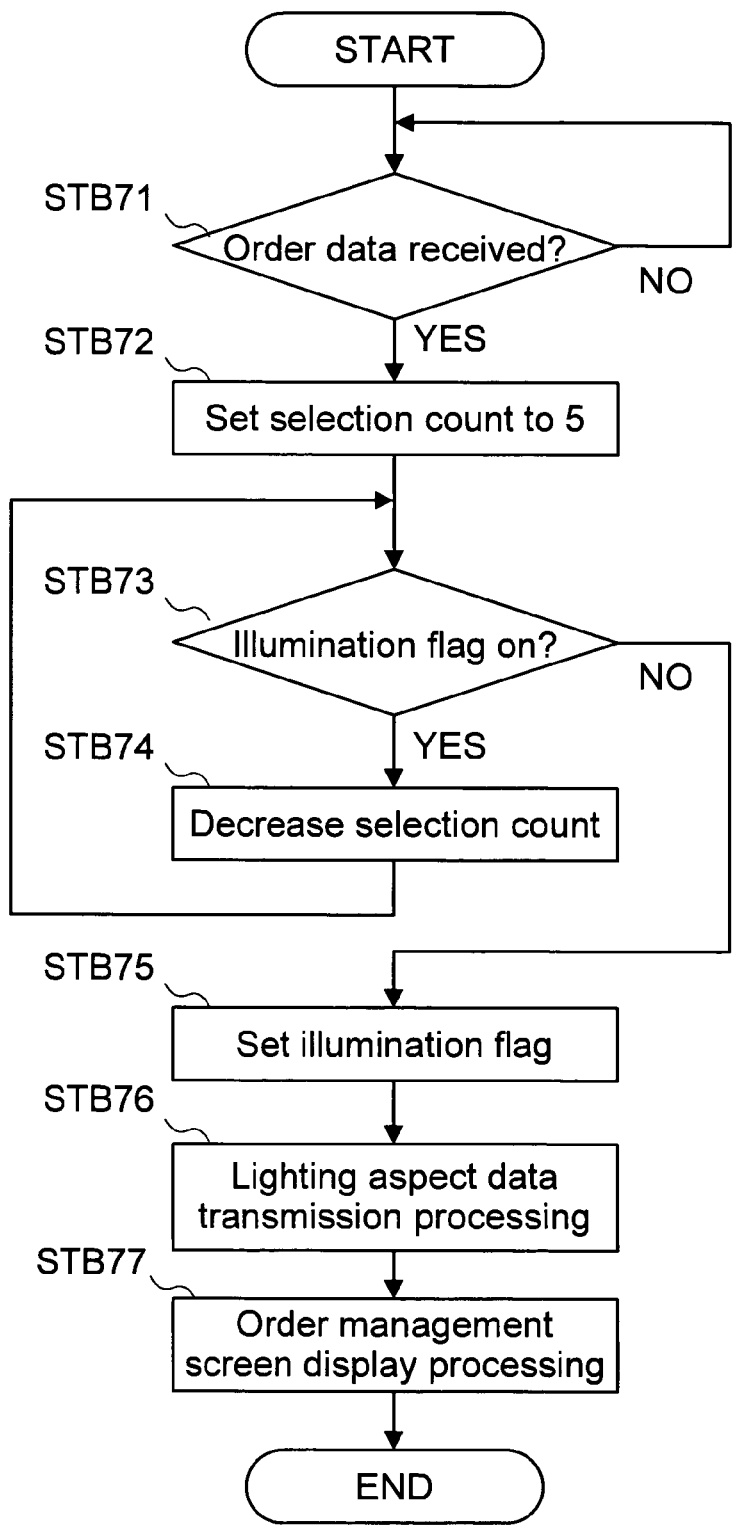
FIG. 25B is a flowchart of a lighting aspect determination processing performed by the main control device of the main game machine body.

FIG. 25B is a flowchart of a lighting aspect determination processing.

In STB71, the CPU B81 determines whether an order data has been received as game input data from the terminal device B30. If this is determined to be "YES", the process moves to STB72, and if it is "NO", the process moves to STB71. In STB72, the selection count is set to 5, and the process moves to STB73. In STB73, the CPU B81 determines whether the illumination flag corresponding to the lighting aspect number of the same value as the selection count is on. If this is determined to be "YES", the process moves to STB74, and if it is "NO", the process moves to STB75. In STB74, the selection count is decreased by 1 and the process moves to STB73.

In STB75, the CPU B91 sets the illumination flag corresponding with the lighting aspect number of the same value as the selection count, and the process moves to STB76. In STB76, the lighting aspect number of the same value as the selection count, to which the IP address of the received order data is attached, is transmitted as lighting aspect data, and the process moves to STB77. In STB77, an order management screen display processing is performed. Specifically, an order management screen (FIG. 14B), to which the order contents corresponding to the received order data and the lighting aspects corresponding to the transmitted lighting aspect numbers are added as un-processed orders, is shown in the management display part B87, and the lighting aspect determination processing is completed.

Figure 26B:
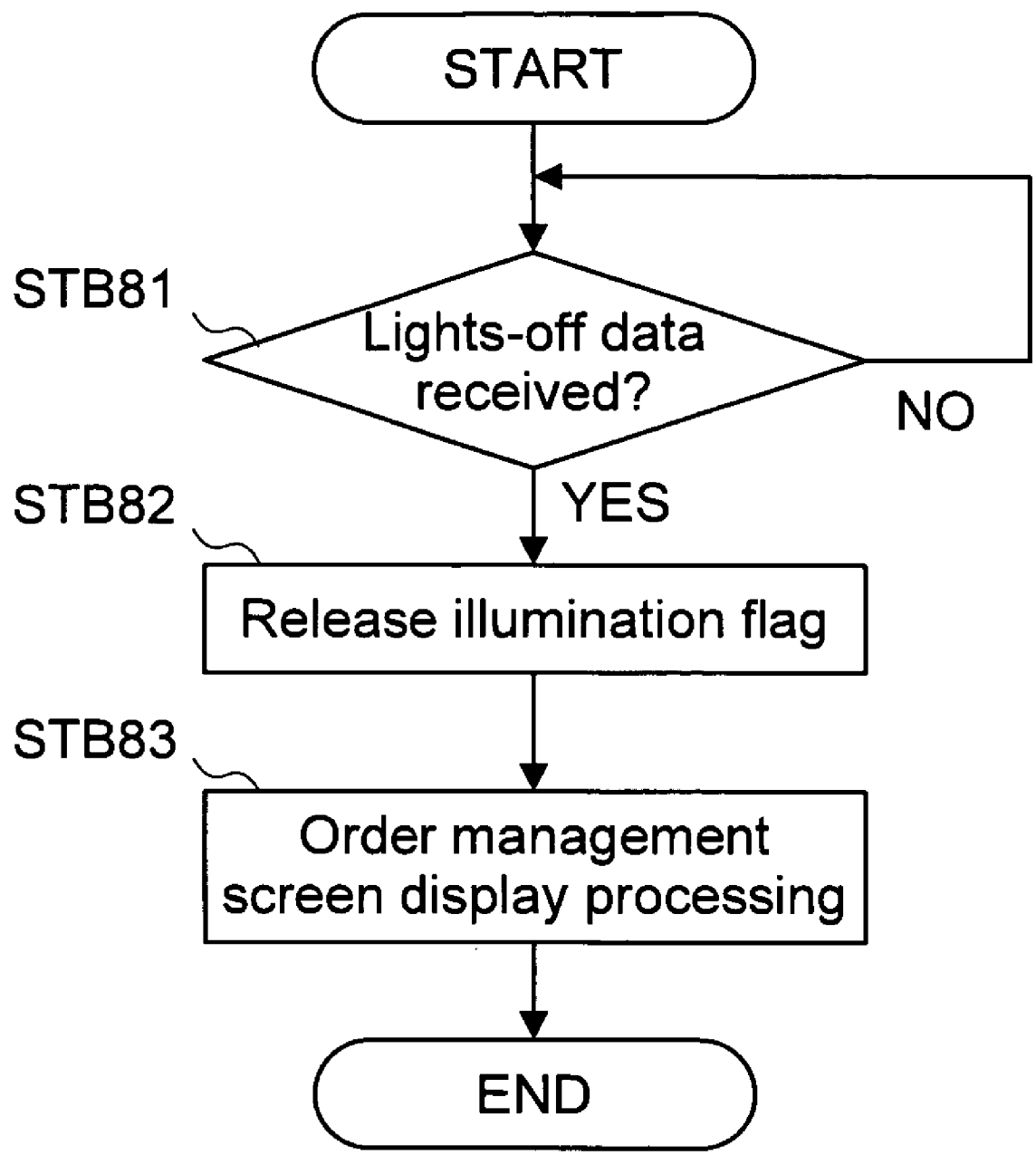
FIG. 26B is a flowchart of an illumination flag update processing performed by the main control device of the main game machine body.

FIG. 26B is a flowchart of an illumination flag update processing.

In STB81, the CPU B91 determines whether lights-off data has been received from the terminal device B30. If this is determined to be "YES", the process moves to STB82, and if it is "NO", the process moves to STB81. In STB82, the illumination flag corresponding to the lighting aspect number included in the received lights-off data is released, and the process moves to STB83. IN STB83, an order management screen display processing is performed. Specifically, an order management screen, in which the lighting aspects corresponding to the received lighting aspect number and the types of orders corresponding to the lighting aspects are changed as completed orders, is shown in the management display part B87, and the illumination flag update processing is completed.

Lighting Processing of the Light display Device by a Product Acquisition Event

Next, a processing performed by the main control device B80, when a player acquires a drink (or a prize related to the game, etc) as a product during the game, is explained. The main control device B80 executes the game program and performs a predetermined product acquisition event during this game. For example, a screen for enabling the player to select a product (drink, etc.) is shown in the sub-display part B61, as shown in FIG. 13B, when the avatar corresponding to the player enters a drink shop. Here, the predetermined product acquisition event can be that in which the avatar of the player opens a treasure chest, acquires a product as a prize after fighting a monster, acquires a product by clearing a mini-game and the like within the game, purchases the product at a shop with currency within the game, obtains the product through the avatar of another player, studies a certain place within the game, opens something (for example, opens drawers, closets, etc. if in a scene inside of a house in the game), and collects a predetermined number of a predetermined item to enable exchange. The player performs the presentation for the acquisition of a product by clearing the predetermined conditions in these product acquisition events.

Figure 27B:
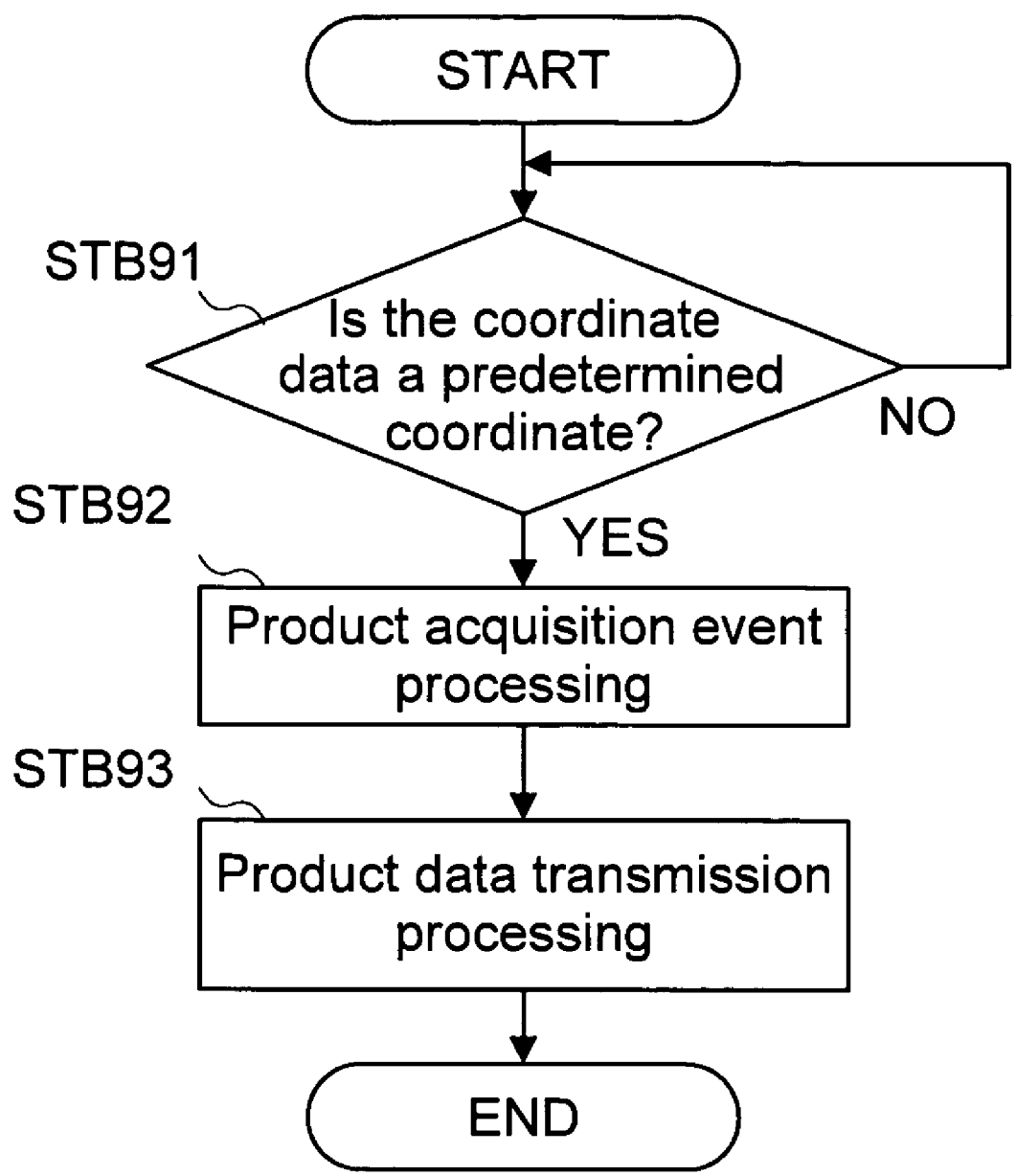
FIG. 27B is a flowchart of a product data transmission processing, based on a product acquisition event performed by the main control device of the main game machine body.

The lighting processing of the lighting display device by the product acquisition event during the game is explained based on FIG. 27B to FIG. 29B. FIG. 27B is a flowchart of a product data transmission processing based on the product acquisition event performed by the main control device B80. The CPU B81 determines whether the coordinate data of the avatar of one player is a predetermined coordinate data (STB91). In this determination, the CPU B81 determines based on the product acquisition event corresponding table in FIG. 28B. For example, the coordinate data pf the avatar is the coordinate data of the drink shop.

The product acquisition event corresponding table is stored in the memory B82 of the main control device B80. Here, the product data which are each corresponding data (information related to the product and product image data) are stored in the data base B84 and are also stored in the memory B82, accordingly. Here, one product data can be a product group including a plurality of products and can be one product only. For example, if the avatar enters a shop as the product acquisition event, because it is an aspect enabling the selection of a product from a plurality of products, one product data is a product group including a plurality of products. On the other hand, if the product acquisition event is an event where one type of product is acquired, the product data is that which includes one type of product. As shown in FIG. 28B, applicable products can be, not only drinks, but also goods and the like.

Although, in FIG. 28B, the product acquisition event and the coordinate data correspond in the product acquisition event corresponding table, the product acquisition event can be corresponded with predetermined conditions, such as the player clearing an event, being met (in other words, winning in a fight against a monster or the like, as described above).

Next, the CPU B81 performs a product acquisition event processing (STB92) when it is determined that the coordinate data of the avatar is a predetermined coordinate data. If the coordinate data of the avatar is not a predetermined coordinate data, the CPU B81 waits for processing in STB91, without performing the next processing. The CPU B81 transmits the product data corresponding to the product acquisition event corresponding table to the corresponding terminal device B30 (STB93) as the product acquisition event processing.

Figure 29B:
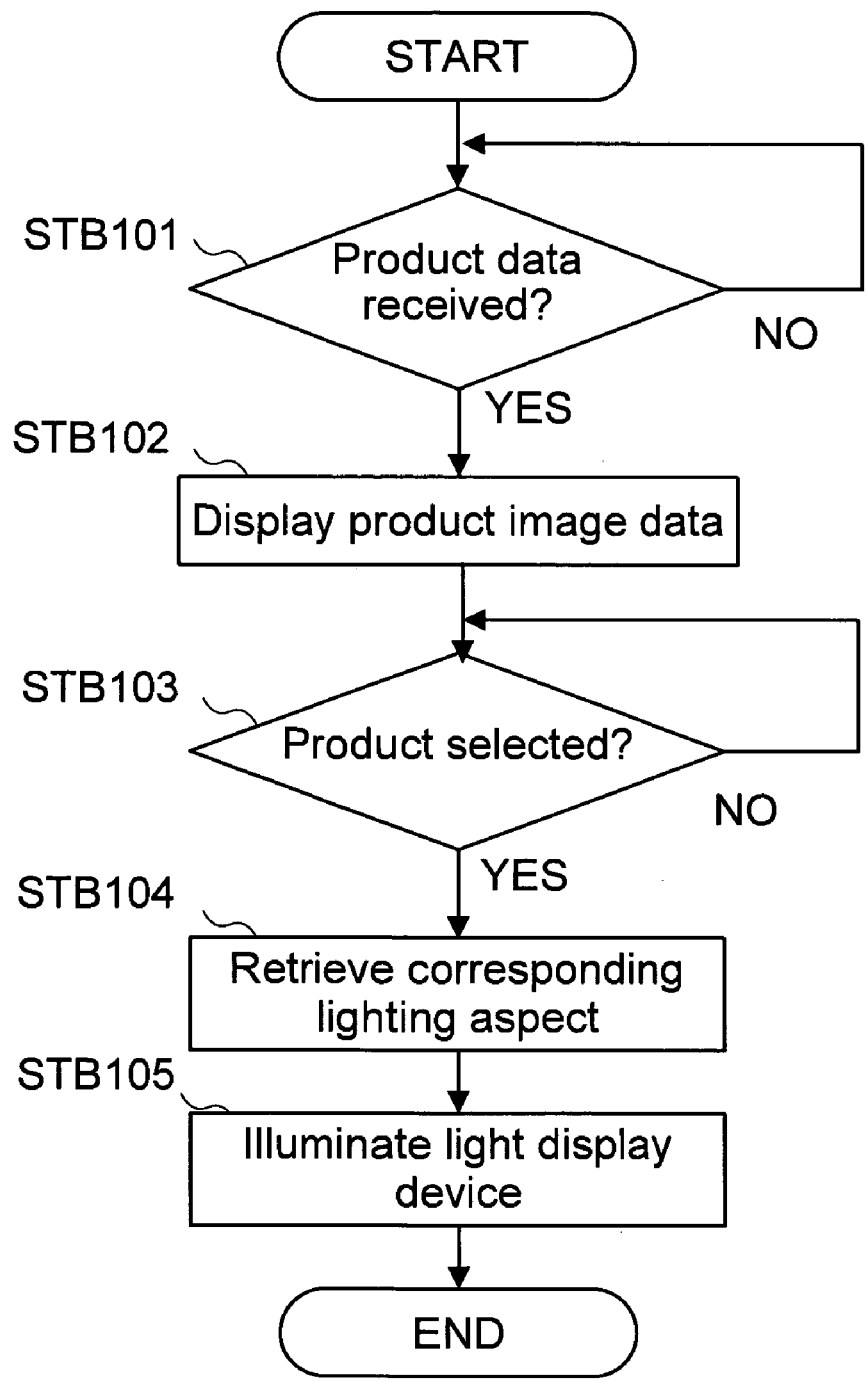
FIG. 29B is a flowchart of a illumination processing of a light display device performed by the sub-control device of the terminal device.

Next, a lighting processing of the light display device B325 performed by the terminal device B30 is explained, based on FIG. 29B. The CPU B91 in the terminal device B30 determines whether product data has been received from the main control device B80 (STB101). The CPU B91 shows the product image data included in the received product data in the sub-display part B61, when it is determined that the product data has been received (STB102). Here, the product image data can be an image data corresponding to one product or image data for enabling the player to select one product from a plurality of products, as in the order selection screen in FIG. 13B. Next, the CPU B91 determines whether the player has selected a product via the input operation part B72 (STB103). The CPU B91 retrieves the lighting aspect corresponding to the selected product from the lighting aspect table (STB104) when it is determined that the player has selected a product via the input operation part B72. FIG. 30B shows an example of the lighting aspect table. For example, when the player selects iced coffee, "red" is selected as the lighting aspect. This lighting aspect table differs from the lighting aspect table in FIG. 12B, and the content of the product and the lighting aspect is corresponded. In order to combine this with the lighting aspect table in FIG. 12B, the product contents can be shown in a flashing state.

Next the CPU B91 performs illumination of the light display device B325 by the lighting aspect retrieved by the lighting aspect table (STB105).

According to the present embodiment, the following effects can be included.

(1) When the player calls for the manager of the game hall in order to receive services, such as delivery of drinks or repair work when a malfunction occurs in the terminal device B30, the player inputs into the input operation part B72 while seated in the seat B31 in the terminal device B30. The light display device B325 illuminates the light display device B325 included in the terminal device B30, based on the input from the input operation part B72. The light display device B325 is provided in a position which is visible from outside of the terminal device B30, which includes the light display device B325, and therefore, the manager can easily notice the light of the light display device and go to the player who is calling for the manager, in response. In other words, the player can smoothly and easily call for the manager.

(2) The player inputs into the input operation part B72 according to the type of service he desires, such as the type of drink he wants delivered or repair work when a malfunction occurs in the terminal device B30. The light display device B325 illuminates the light display device B325 with a differing lighting aspect, based on this input from the input operation part B72. Therefore, the manager can identify the lighting aspect of the light display device B325 and become aware of the type of services the player desires.

(3) The player inputs into the input operation part B72 according to the type of service he desires, such as the delivery of a drink or repair work when a malfunction occurs in the terminal device B30. The sub-control device B90 transmits the game input data corresponding to this input to the main control device B80. The CPU B81 determines the lighting aspect of the light display device B325 in the terminal device which transmitted the game input data, based on this received game input data. In addition, the CPU B81 determines the lighting aspect so that it is not the same as the lighting aspects of each of the light display devices in a plurality of terminal devices B30, when determining the lighting aspect of the light display device B325. Then, the main control device B80 transmits the determined lighting aspect as lighting aspect data to the sub-control device B90. The CPU B91 illuminates the light display device B325 according to the received lighting aspect data. Therefore, because the lighting display devices B325 provided in each terminal device B30 are lit with differing lighting aspects, the manager can identify the content of the order and the lighting aspect of the light display device B325 in pairs.

(4) Because the light display device B325 emits light of differing colors according to the input operation by the player, the manager can identify the light display device B325 with more clarity. In addition, because lights of differing colors are emitted, this is effective in the presentation of the game hall.

The present invention is not limited to the foregoing embodiments and includes modifications, improvements and the like which achieve the objects of the present invention.

Although, in the present embodiment, the light display device B325 is provided in the highest position in the terminal device B30, as a position which can be viewed from outside the terminal device B30, this is not limited thereto. For example, the light display device B325 can be provided anywhere, such as on the back part or side surface of the terminal device B30, as long as it can be viewed from outside the terminal device B30. The manager of the game hall can notice the light display device B325 more easily by changing the position of the light display device B325, according to the shape of the game hall and the shape of the play area B21.

A game machine in a preferred embodiment is described below.

Overall Configuration of the Game Machine

FIG. 1C is a perspective view showing an outward aspect of the game machine C1 according to an embodiment of the present invention.

The game machine C1 is a multi-player game machine, including a main game machine body C20 which includes a flat, rectangular play area C21 and a plurality of terminal devices C30 which are placed on this play area C21.

Aside form the play area C21, the main game machine body C20 includes a main display device C22 which is placed along one side of the play area C21, a speaker device C23 which is placed in the four corners of the play area C21, and a main control device C80 for controlling these main display device C22 and speaker device C23.

The play area C21 is divided into a plurality of sub-areas CB212. As these sub-areas C212, there are city areas C212A, ocean areas C212B, and forest areas C212C. In addition, IC tags C211 are buried in grid-form in the play area C21. Positional information of the inside of the play area C21 is stored to this IC tag C211.

The main display device C22 is a large projector display device showing images based on image data output from the main control device C80. The main display device C22 is not limited thereto and can also be a large monitor.

The main control device C80 can communicate with each terminal device C30 bi-directionally through wireless LAN and can provide each player with a common virtual space by executing the predetermined game program and bi-directionally communicating with each terminal device C30.

Each terminal device C30 is placed facing towards the main display device C22. This terminal device C30 is connected to the main control device C80 through wireless LAN and can be moved over the play area C21 according to the instructions from the main control device C80 or by player operation.

Figure 2C:
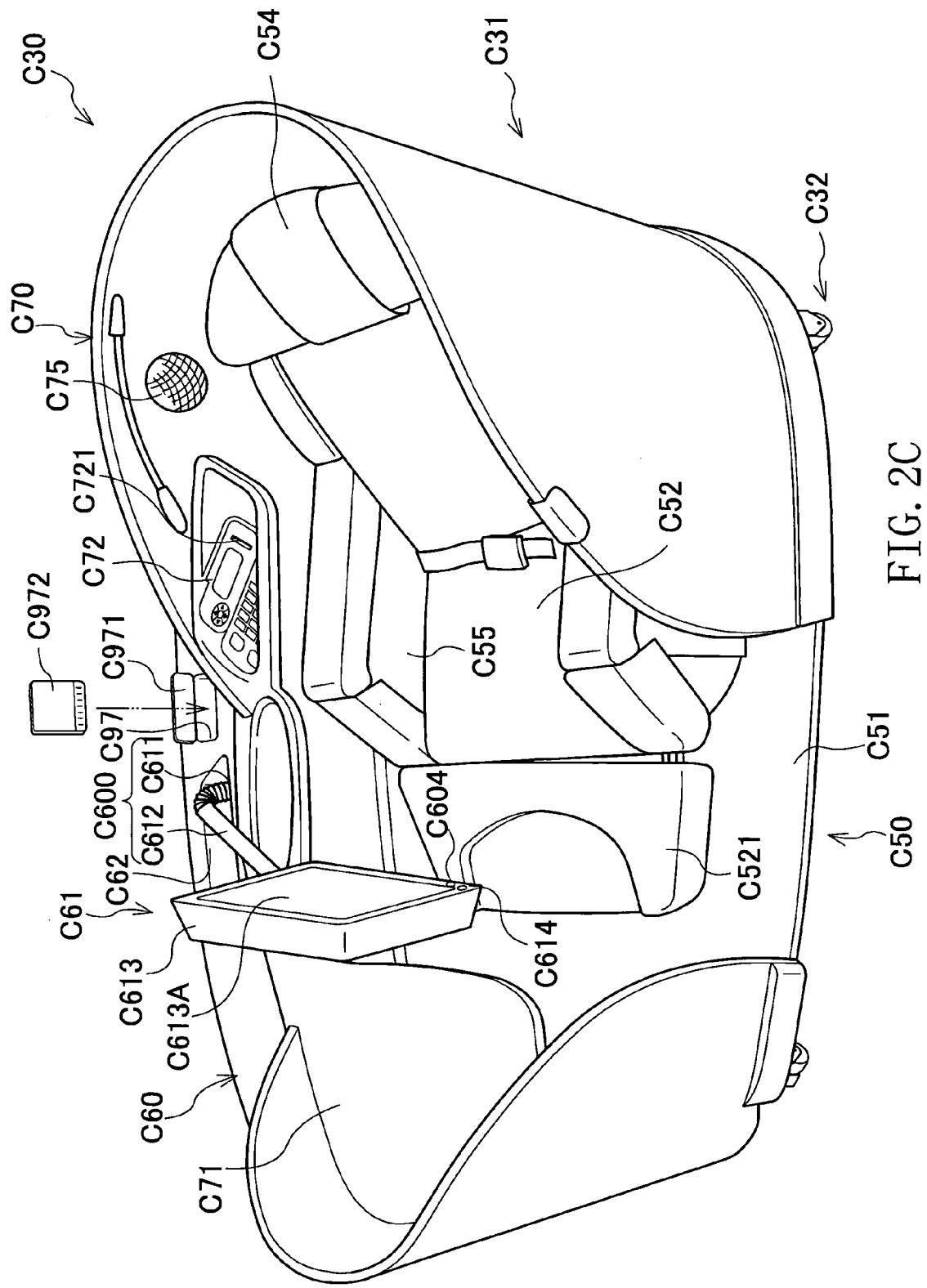
FIG. 2C is a perspective view showing an outward aspect of the terminal device of the game machine.

FIG. 2C is a perspective view showing an outward aspect of each terminal device C30.

The terminal device C30 includes a seat C31, and a traveling part C32, which is provided on the lower part of the seat C31, for moving the seat C31 over the play area C21.

Figure 3C:
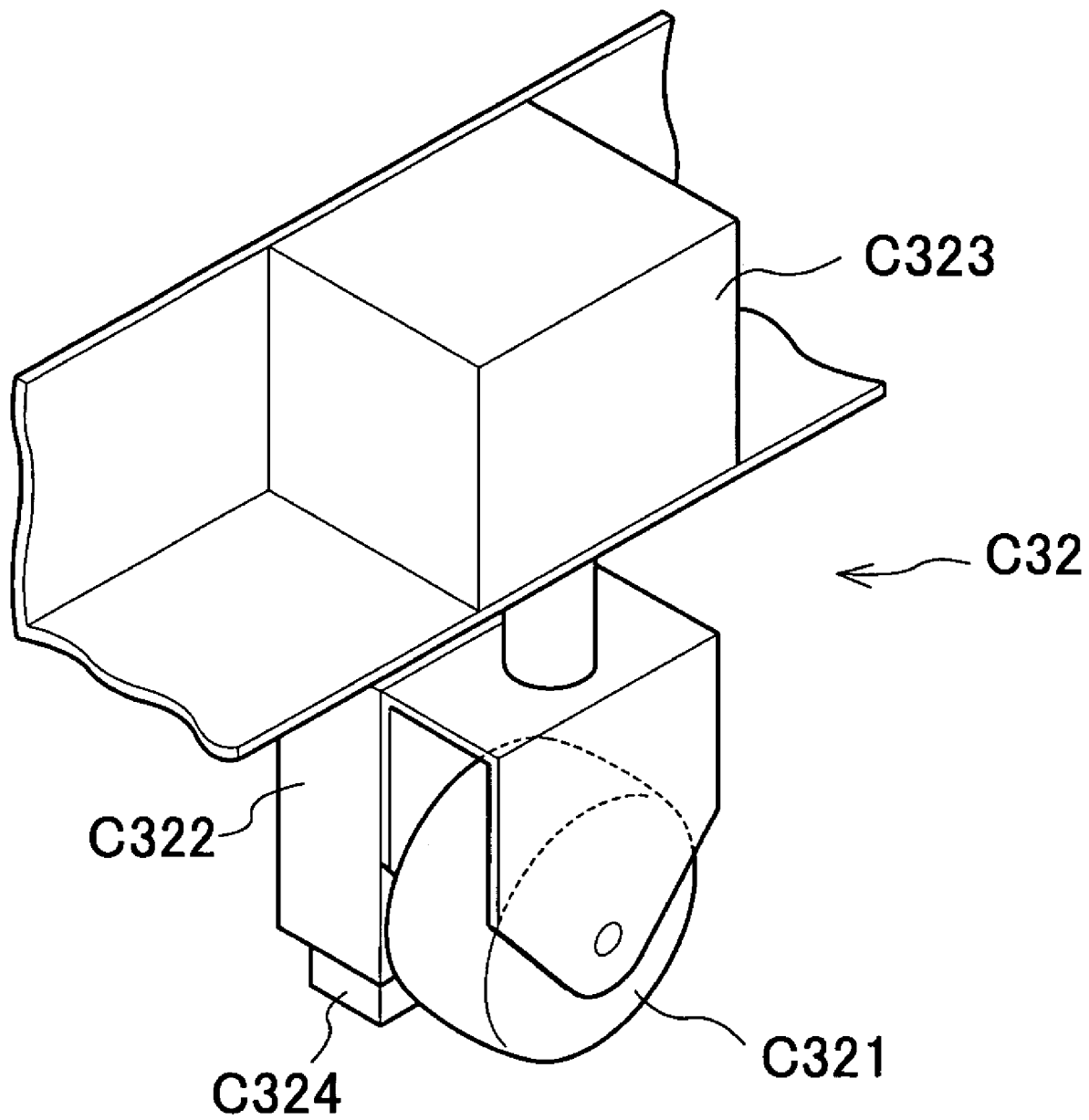
FIG. 3C is an enlarged perspective view of one section of a traveling part of the terminal device.

FIG. 3C is an enlarged perspective view of one section of the traveling part C32.

The traveling part C32 includes four traveling tires C321, a driving control device C322 for rotation-driving these traveling tires C321, a direction control device C323 for controlling the direction of the traveling tires C321, and a rechargeable battery, not shown, for supplying the driving control device C322 and direction control device C323 with power. The traveling part C32 can move a seat C31 to an arbitrary position on the play area C21 by the driving control device C322 and the direction control device B323.

The foregoing rechargeable battery can be recharged through connection to an external power source, but is not limited thereto, and can be recharged by self-induced electromotive force due to a magnetic field, by embedding a magnetic field generating device in the play area C21 and generating a magnetic field by this magnetic field generating device.

In addition, an IC tag detection part C324 for detecting IC tags C211, which are buried in the play area C21, is provided below the driving control device C322 of the traveling part C32.

Configuration of the Seat

Figure 4C:
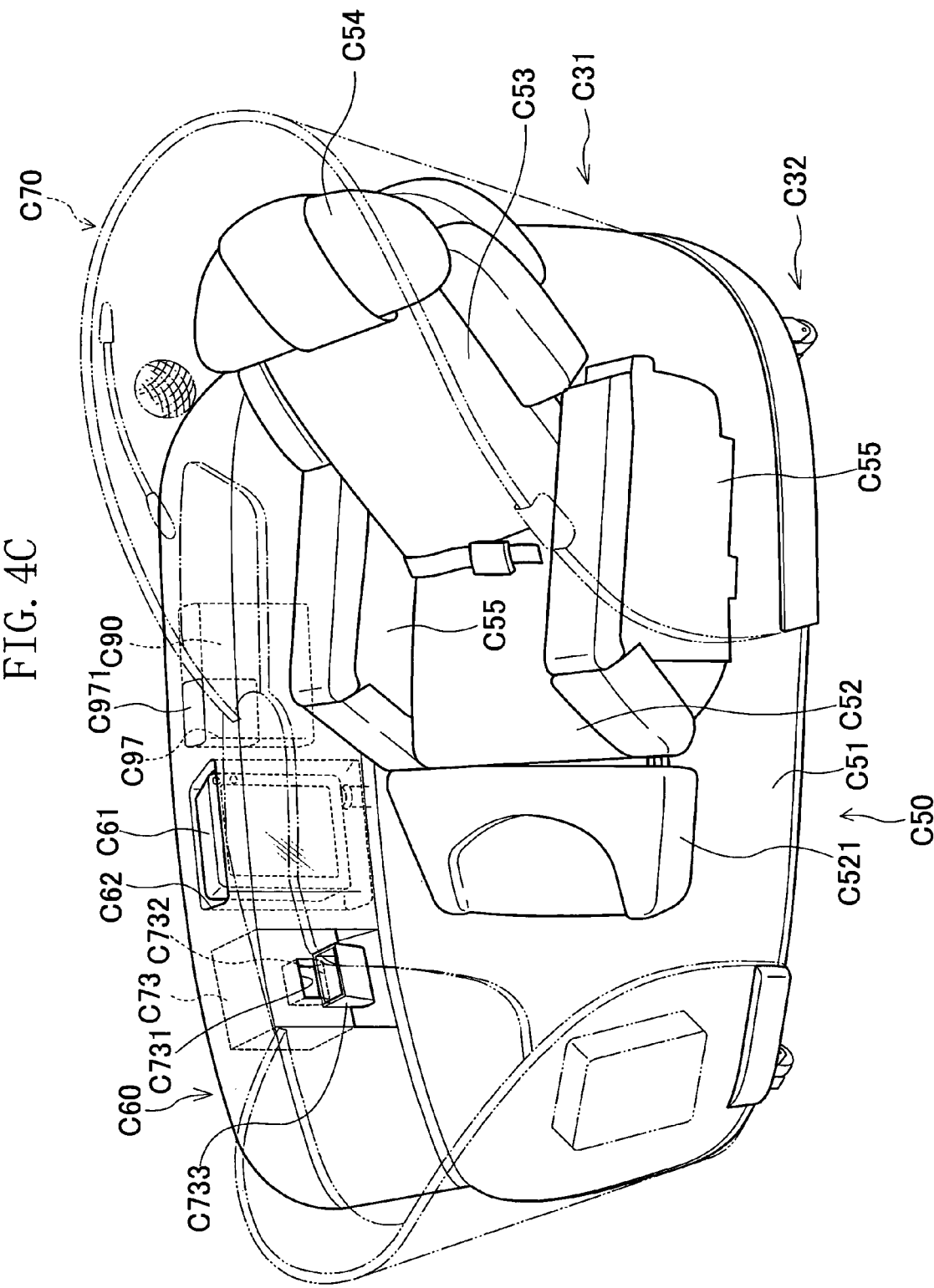
FIG. 4C is a perspective view of the of the seat of the terminal device in seat mode.
Figure 5C:
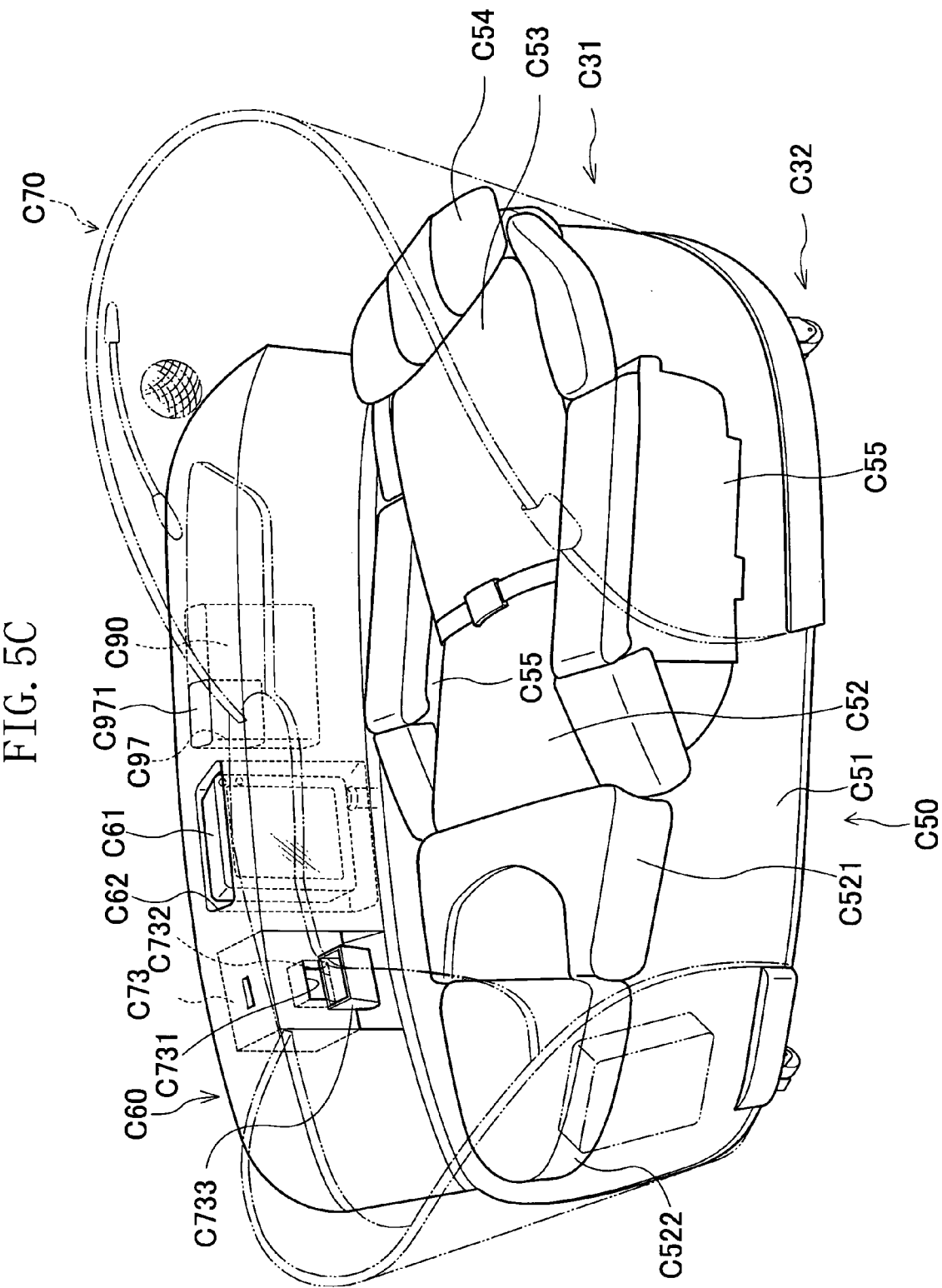
FIG. 5C is a perspective view of the seat of the terminal device in bed mode.

FIG. 4C is a perspective view of the seat C31 in seat mode.
FIG. 5C is a perspective view of the seat C31 in bed mode.

Seat C31 includes a main seat body C50, a side unit C60 which is provided along one side surface of the main seat body C50, and a seat shell C70 which surrounds the main seat body C50 on three sides, excluding the other side surface side. This seat C31 includes a reclining function, and the mode thereof can be adjusted in multiple steps, between the seat mode shown in FIG. 4C and the bed mode shown in FIG. 5C.

The main seat body C50 includes a flat base part C51, a seating part C52 which is provided on this base part C51, a backrest (backrest part) C53 which is attached to enable changing of its angle to the seating part B52, a head rest C54 which is provided on the top part of the backrest C53, and a pair of side arms C55 which are provided in positions on the seat surface of the seating part C52 and both sides of the backrest C53. The seat C31 further includes a reclining driving device 35 for controlling the state of the reclining function of the seat C31. The reclining driving device C35 (refer to FIG. 11C) operates as a reclining driving part and, at the least, tilts the backrest C53.

The seating part C52 moves back and forth on the base part C51 when the player operates the input operation part C72 (refer to FIG. 2C; game controller). The main seat body C50 changes from the seat mode shown in FIG. 4C to the bed mode shown in FIG. 5C, when this seating part C52 is slid forward, and forms a bed. Therefore the input operation part C72 operates as a position operation part for controlling the state of the reclining function of the seat C31. In addition, the input operation part C72 is placed in a position enabling the player to operate even when the seat C31 is in seat mode or bed mode.

The seating part C52 includes a leg rest C521 which is provided on the front surface side and a foot rest C522 which is stored in the tip of this leg rest C521. The leg rest C521 turns upward according to the sliding motion, when the seating part C52 is slid forward, and becomes a seat surface which continues from the seat surface of the seating part C52. At the same time, the foot rest C522 projects from the leg rest C521 and becomes a seat surface which continues from the leg rest C521.

The backrest C53 falls backward, according to the back and forth movement of the seat part C52 on the base part C51.

The front surface side of the side arm C55 turns slightly upward, when the main seat body C50 is placed in bed mode.

A bag component, into which air can be injected, is embedded respectively within the seat surface of the seating part C52, the lower part of the backrest C53 (which comes into contact with the lower back of the player) and the head rest C54. When air is injected into these bag components by an air pump, the surface swells and can support the user while accommodating the contours of the body surface of the user.

The sub-display part C61 which is configured to include a liquid crystal display panel is stored in the side unit C60.

As shown in FIG. 2C, the sub-display part C61 includes a first support component C600 which is supported by the side unit C60, and a flat, rectangular sub-monitor C613 which supported by the support component C600. The support component has a first support arm C611 and a second support arm C612 which is attached to the tip of the first support arm C611. The sub-monitor C613 has a flat, rectangular shape and, furthermore, is attached to the tip of the second support arm C612 and has an image display part C613A for performing liquid crystal display. The first support arm C611 can be extended and retracted freely in the direction vertical to the side unit C60. The second support arm C612 can extend and retract freely and can be fixed to an arbitrary angle to the axis direction of the first support arm C611. The sub-monitor C613 can be fixed to an arbitrary angle to the axis direction of the second support arm C612.

The sub-monitor C613 shows a game screen generated based on the game program executed in the CPU C81 of the main control device C80 and a game screen generated in the terminal device C30. Here, the sub-monitor C613 can combine and show the game screen generated based on the game program executed in the CPU C81 of the main control device C80 and the game screen generated in the terminal device C30. A small CCD camera C614 is embedded into the sub-monitor C613. This CCD camera C614 is used when creating an avatar in the game field. The image taken by the CCD camera C614 is displayed constantly in the sub-display part C61 in the terminal device C30, by operating an input operation part C72 (described hereafter). Because the expressions of the player per se can be viewed during the game in this way, enjoyment increases. In this case, the photographed image can be shown on the entire screen of the sub-monitor C613 or in one section of the screen.

A sub-monitor storage space C62 which extends in the vertical direction is provided in the side unit C60, and the foregoing first support arm C611, a second support arm C612, and a sub-monitor C613 are stored within the sub-monitor storage space C62.

The procedure by which the player pulls out the sub-monitor C613 from the storage space C62 is explained, with reference to FIG. 6C to FIG. 8C.

Figure 6C:
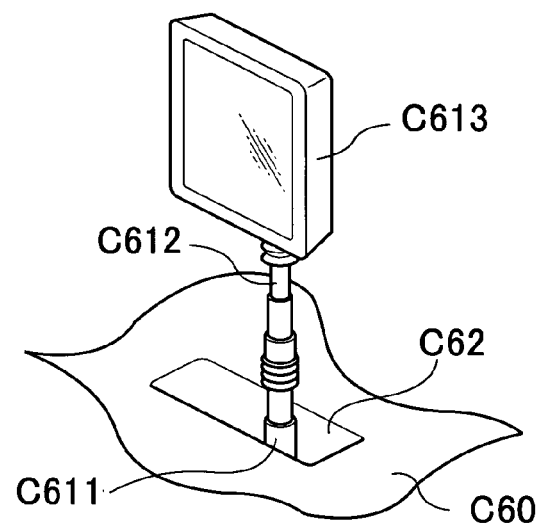
FIG. 6C is a perspective view showing a state in which a sub-monitor of the terminal device is pulled out from within a storage space.
Figure 7C:
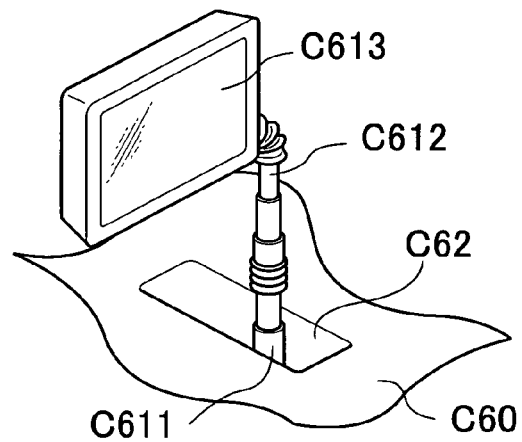
FIG. 7C is a perspective view showing a state in which the display screen of the sub-monitor of the terminal device is turned toward the player.
Figure 8C:
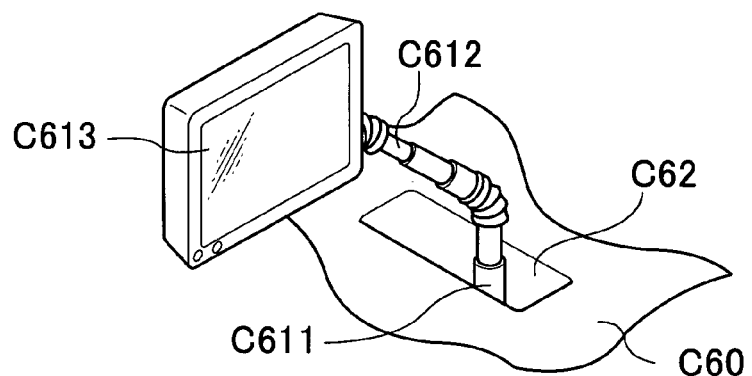
FIG. 8C is a perspective view showing a state in which the position of the sub-monitor of the terminal device is adjusted.

First, as shown in FIG. 6C, the player slides the sub-monitor C613 upward from the sub-monitor storage space C62 and extends the first support arm C611 and the second support arm C612, while seated in the main seat body C50. Then, as shown in FIG. 7C, the display screen of the sub-monitor C613 is turned toward the player by twisting the sub-monitor C613. Subsequently, as shown in FIG. 8C, the sub-monitor C613 is positioned to the player's eye level by adjusting the relative angles of the first support arm C611 and the second support arm C612 and the relative angles of the second support arm C612 and the sub-monitor C613.

A sub-control device C90 which is connected by wireless LAN to the main control device C80 and a plurality of board storage slots C97 which configure this sub-control device C90 are provided within the side unit C60. Here, the sub-control device C90 operates as a sub-control part. The sub-control device C90 controls the sub-display part C61 and the traveling part C32, based on instructions from the main control device C80, as well as transmitting signals input by the input operation part C72 (described hereafter) to the main control device C80.

A cover part C971 is provided to open and close freely on the upper part of the board storage slots C97. By opening the cover part C971 and inserting a terminal control board C972 from above, as shown in FIG. 2C, the terminal control board C972 can be attached to the board storage slot C97. The terminal control board C972 includes, for example, the wireless communication part C93 and the CPU C91.

The back-side of the seat shell C70 extends upward and can support the backrest C53 and the head rest C54. In addition, speakers C75 are provided on both sides of the head rest C54 of the seat shell C70. The back-sides of the side surfaces of the seat shell C70 extends upward so that the player seated in the main seat body C50 cannot be viewed by other players.

A table C71 is attached from one side surface of the main seat body C50 to the front surface, on the upper edge of the seat shell C70. The space beneath this table C71 accepts the leg rest C521 and the foot rest C522 when the main seat body C50 is placed in bed mode.

The input operation part C72 is provided in the vicinity of the side arm C55 on the table C71, or in other words, a position wherein the player can perform operations while seated in the main seat body C50, and includes a keyboard, a jog dial and the like. Other than a coin insertion opening and a start button, a card slot C721 for inserting credit cards and membership cards is provided in this input operation part C72.

Although the input operation part C72 is provided on the table C71 in the present embodiment, this is not limited thereto, and can be provided as a touch-panel on the sub-monitor C613.

A medal payout opening C731 from which medals are paid out from a medal collection part C73 provided within the side unit C60, and a medal receiving part C732 for receiving the medals which are paid out are provided below the table C71 and in front of the side arm C55. A holder, not shown, for attaching a medal storage container C733 is provided in the medal reception part C732. For example, this medal can be paid out according to the odds of the win/loss of a certain event (win/loss of horse-racing, combat, etc.), such as a book-maker, within the game environment. In other words, predetermined odds (betting odds) are stipulated to the participants of the event by a book-maker within the game environment, and the player bets on the object of his choice. Then, medals are paid out based on the odds, according to the win/loss results. The prize resulting from this book-maker is not limited to medals and can be items within the game environment.

Figure 9C:
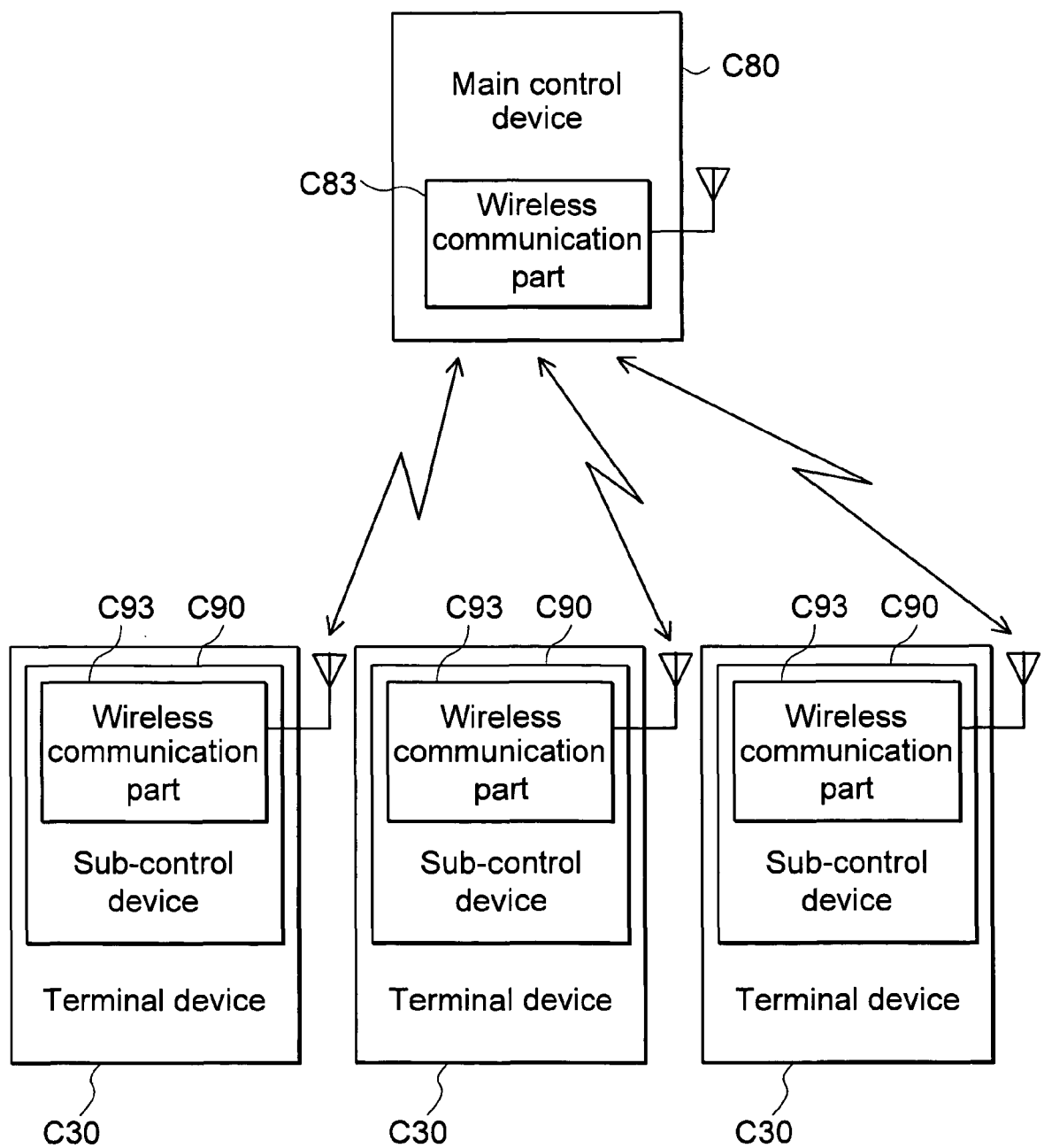
FIG. 9C is a block diagram showing an overall configuration of the game machine.

FIG. 9C is a block diagram of an overall configuration of the game machine C1.

In this game machine C1, the main control device C80 of the main game machine body C20 had a wireless communication part C83 and the sub-control device C90 of the terminal device C30 has a wireless communication part C93. These wireless communication parts C83 and C93 can be interconnected by a wireless LAN, and thus, the transfer of voice data and character data can be performed between the main control device C80 and the sub-control device C90.

Configuration of the Main Control Device

Figure 10C:
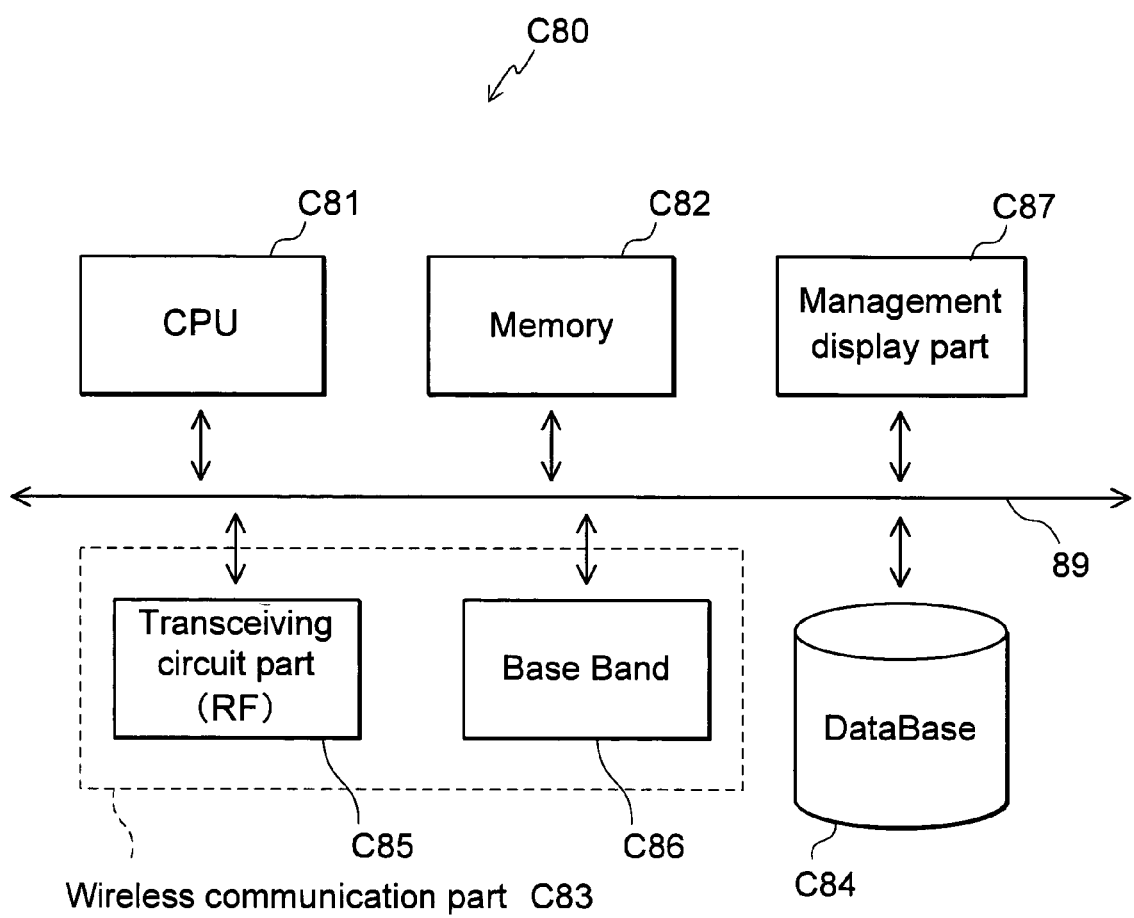
FIG. 10C is a block diagram showing a configuration of a main control device of the main game machine body.

FIG. 10C is a block diagram showing the configuration of the main control device C80.

The main control device C80 has a CPU C81, a memory C82, a wireless communication part C83, and a database C84, which are connected to a data bus C89.

The wireless communication part C83 includes a transceiving circuit part (RF) C85 for transmitting and receiving signals with the sub-control device C90, and a base band processing part C86 for converting RF (Radio Frequency) signals received by the transceiving circuit part C85 into base band signals and also converting base band signals to be transmitted into RF signals.

The database C84 is a circuit board which includes a memory part to which a game program is stored or a storage medium (for example, a hard disk or ROM cassette) to which the game program is stored.

Specifically, a slot to which these circuit boards and storage mediums can be attached and removed is provided in the main control device C80. By attaching and removing these circuit boards and storage mediums from the slot, the game program stored to the database C84 can be replaced, accordingly, and other game programs can be executed. Replacing the game program is not limited to that via hardware, as such, and the game program can be replaced directly by downloading via a communication circuit.

CPU C81 transmits and receives data with the sub-control devices C90 of each terminal device C30, via the wireless communication part C83, by the procedure below.

Specifically, the CPU C81 converts data into packet data when transmitting data to the sub-control device C90 of the terminal device C30. At this time, the IP address of the identified terminal device C30, which is the destination, is added to the packet data.

In addition, the CPU C81 identifies the terminal device C30 which is the transmission source of the data when receiving data from the sub-control device C90 of the terminal device C30, based on the IP address added to the packet data.

The foregoing CPU C81 executes the game program and performs various processing as a result. In other words, the CPU C81 reads the game program stored in database C84 to the memory C82 and runs the game according to this game program.

Specifically, the CPU C81 receives data including game input data, described hereafter, respectively, from the plurality of terminal devices C30, and generates a single game data according to the game program, based on these data. Then, the CPU C81 generates image data which is shared with all of the terminal devices C30, based on the generated single game data, and outputs this data to the main control device C80.

Here, the single game data includes a plurality of operation character data which can be moved within the single game field generated according to the game program, based on the respective game input data of the plurality of terminal devices C30, and the positional data of this plurality of operation characters.

If a plurality of game input data is received from a plurality of terminal devices C30, the CPU C81 identifies the terminal device C30 which transmitted the game input data, based on the IP address, and moves the operation character of this identified terminal device C30 based on this game input data.

Furthermore, if the positional data of operation character of the identified terminal device C30, out of the plurality of terminal devices C30, meets predetermined conditions, the CPU C81 transmits, to the identified terminal device C30, movement signal data which designates the position of the terminal device C30.

In addition, during the game, the CPU C81 extracts the game program, information expressing the game status corresponding to the time-line in the game field at the time (namely, information expressing events and the like occurring in the game field) from the database C84 and transmits this to the terminal device C30, which is the request source, via wireless LAN. In addition, the CPU C81 receives information expressing the operation results of the player from each terminal device C30 and stores this in the memory C82.

The CPU C81 runs the game and stores the progress results of the game program to the database C84, based on the information expressing the operation results of the player stored to the memory C82.

Here, the information expressing the operation results of the player are, for example, selection results by the player from a selection shown to the player via the terminal device C30, based on the progress of the game program, or the results of the operation performed by the player of the character appearing in the game, and is information transmitted from the terminal device C30 as a result of the player operating their respective terminal devices C30. Other players can check the progress status of the current game stored to this database C84 (for example, high-score information, etc.).

As described hereafter, when the CPU C81 receives a signal indicating that a specific player has selected break mode, the CPU C81 places this specific player in a game halt state, for example, so that it is not disadvantageous to the game progression of this specific player. Furthermore, the CPU C81 outputs the information stating that the specific player has selected break mode as a break information signal, so as to show this information in the sub-display parts C61 of other players.

Configuration of the Sub-Control Device

Figure 11C:
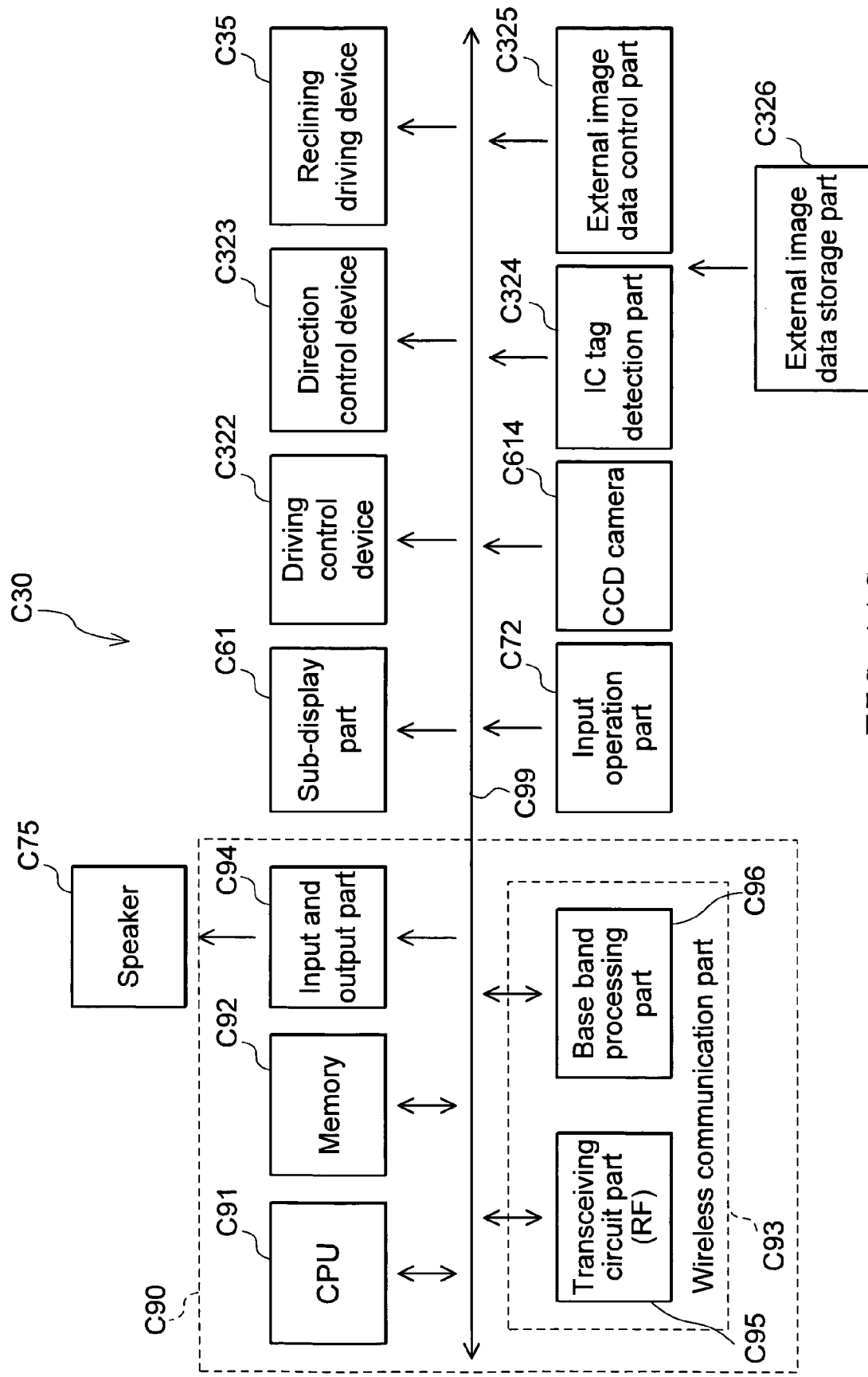
FIG. 11C is a block diagram showing a configuration of a sub-control device of the terminal device.

FIG. 11C is a block diagram showing the configuration of the sub-control device C90.

The sub-control device C90 has a CPU C91, a memory C92, a wireless communication part C93, and an input and output part C94 which is the interface with the speaker C75, which are connected to a data bus C99.

The wireless communication part C93 includes a transceiving circuit part (RF) C95 for transmitting and receiving signals with the main control device C80, and a base band processing part C96 for converting RF (Radio Frequency) signals received by the transceiving circuit part C95 into base band signals and also converting base band signals to be transmitted into RF signals.

The CPU C91 transmits and receives data with the main control device C80, via wireless communication part C93, by the procedure below.

Specifically, the CPU C91 divides data into packet data when transmitting data to the main control device C80. At this time, the IP address of the terminals device C30 which is the transmitting source is added to the packet data as an identifier for identifying respective terminal devices C30.

In addition, the CPU C91 receives the packet data if the IP address added to the packet data matches the IP address of the terminal device, when receiving data from the main control device C80, and destroys the packet data if it does not match.

The CPU C91 not only transmits and receives signals with the main control device C80, via the wireless communication part C93, but also controls the sub-display part C61, driving control device C322, and direction control device C323, based on the input signals from the input operation part C72, the CCD camera C614, and the IC tag detection part C324. The input operation part C72 operates as a reception part. The sub-display part C61 operates as a sub-display part.

Specifically, the IC tag detection part C324 reads positional information from the IC tag C211 and outputs this as current-positional data. The CPU C91 transmits the game input data (data regarding character information, identified selection information, etc.) according to the input from the input operation part C72, the face image data taken by the CCD camera C614, and the current-positional data from the IC tag detection part C324 to the main control device C80.

Furthermore, when receiving movement signal data which designates the position of the terminal device C30 from the main control device C80, the CPU C91 grasps the position of the terminal device C30 on the play area C21, based on current-positional data from the IC tag detection part C324, controls the driving control device C322 and the direction control device C323 of the traveling part C32, and moves the terminal device C30 to the position designated by the movement signal data.

In addition, the CPU C91 can drive the driving control device C322 and the direction control device C323 of the traveling part C32, according to the game input data which is input by operating the input operation part C72.

The CPU C91 executes the operation program stored in memory C92 and performs various processing, according to the program executed in CPU C81. In other words, when receiving a game program or information expressing the status corresponding to the time-line in the game environment at that time from the main control device C80, after storing information on the game program and the like, transmitted by the main control device C80, to the memory C92, the CPU C91 presents the various occurrences, such as events, occurring in the game environment at this time, in the sub-display part C61 and outputs sound effects from the speaker C75.

In addition, the CPU C91 drives the reclining driving device C35 and operates the reclining function of the seat C31, according to the player operation from the input operation part C72. Furthermore, the CPU C91 controls the progress of the game by the CPU C81. In other words, if the backrest C53 of the seat C31 is reclined lower than a predetermined angle by the input operation part C72, the CPU C91 outputs a signal indicating that the player has selected break mode to the CPU C81. Alternately, the CPU C91 outputs a signal indicating that the player has selected break mode to the CPU C81 in the same way, even when the player operates the input operation part C72 and selects break mode.

In addition, by operating the input operation part C72 while viewing the game content (image, letter information, etc.) shown in the sub-display part C61, the players using respective terminal devices C30 can operate the characters shown in the main display device C22, participate in the progress of the game by operations such as selecting from a selection by letters, and move the terminal device C30 to an identified position on the play area C21.

The external image data control part C326 controls external image data. Here, external image data refers to image data which differs from the content of the game progression which develops by the CPU C91 executing the game program (images other than the game screen). The reclining driving device C35 outputs a signal indicating that the backrest C53 of the seat C31 is reclined further than the predetermined angle to the CPU C91. In other words, the reclining driving device C35 includes a sensor (angle detection sensor, etc.) for detecting the predetermined angle. The CPU C91 which received this signal transmits a signal indicating that this terminal device C30 has selected break mode to the CPU C81 in the main control device 80. Alternatively, the CPU C91 outputs the signal indicating that the player has selected break mode to the CPU C81 in the same way, even when the player had operated the input operation part C72 and selected break mode. Here, break mode refers to a state in which an image which is unrelated to the game is output from the sub-display part C61 and the speaker C75. The main control device C80 which received this signal halts the game progression by the game program in the corresponding terminal device C30. Along with the output of this signal, the external image data control part C325 can control to show the external image data in the sub-display part C61. Here, the external image data control part C325 reads the external image data from the external image data memory part C326. In other words, the external image data memory part C326 can be a device to which predetermined video media, such as DVD, video tapes, and the like, are stored. The external image data control part C325 reads the video medium such as this from the external image data memory part C326 and shows the image in the sub-display part C61 (in this case, the sound of the video medium can be output from the speaker).

In addition, this can also be a DVD player or a video player, in which the external image data control part C325 and the external image data memory part are combined, or the external image data control part can include a television image reception part (which can also include audio) and show television images in the sub-display part C61 as the external image data (in this case, sound can be output from the speaker via the input and output part C94).

External image data control part C325 and external image data memory part C326 can be included in the main control device C80. In other words, it can be an aspect in which the CPU C91 of the terminal device C30 outputs the signal indicating that the break mode has been selected to the main control device C80, the main control device C80 halts the game in progress by the game program in the terminal device C30 (or, without halting), the CPU C81 in the main control device C80 transmits external image data to the terminal device C30, and the terminal device C30 which receives this transmitted external image data shows the image in the sub-display part C61. In this case, the main control device C80 can switch the image to an image other than the game image by the external image data control part C325 and the external image data memory part C326 in the terminal device C30, without halting the game progression by the game program in this terminal device C30. If the main control device C80 provides external image data to the terminal device C30, it is not necessary for each terminal device C30 to include an external image data control part C325 and an external image data memory part C326 and therefore, the number of components of the overall game machine can be reduced.

Configuration of the Game Program

Next, a game program provided by the game machine C1 is explained. This game program is a role-playing game which is set in a fictional game environment which runs continuously by its own time-line. A plurality of towns exists in this fictional game environment, and guilds are formed respectively in each town.

Each player becomes an adventurer, visits each town, and aims to clear numerous events (quests) waiting in each guild by operating the avatar.

On the other hand, this game program generates a plurality of large events (macroquests) in the game field and forms a large plot to the story. Each player becomes involved in the large events (macroquests), while solving the foregoing events (quests), and solves the macroquest with other players while sometimes cooperating, sometimes fighting, and sometimes competing with each other.

This game program changes the plot of the game field by the operations of the terminal devices C30 of the players (game-play). In other words, the accumulation of the game-play (adventures) of each individual player creates the history of this game field.

In this way, this game program is a role-playing game wherein a plurality of players can all experience the flow of history in a fictional world. In addition, in this game field, history is created by a unique time-line which cannot be stopped, and therefore, the people appearing within this game field are not immortal, but will grow old as in the real world.

The game program is configured to write the name of the player who has solved an event in the macroquest or achieved accomplishments such as winning in a competition against another player to a chronology which is stored to the database C84. In this way, players who were successful in the macroquest can leave their name in the history of the game field.

Figure 12C:
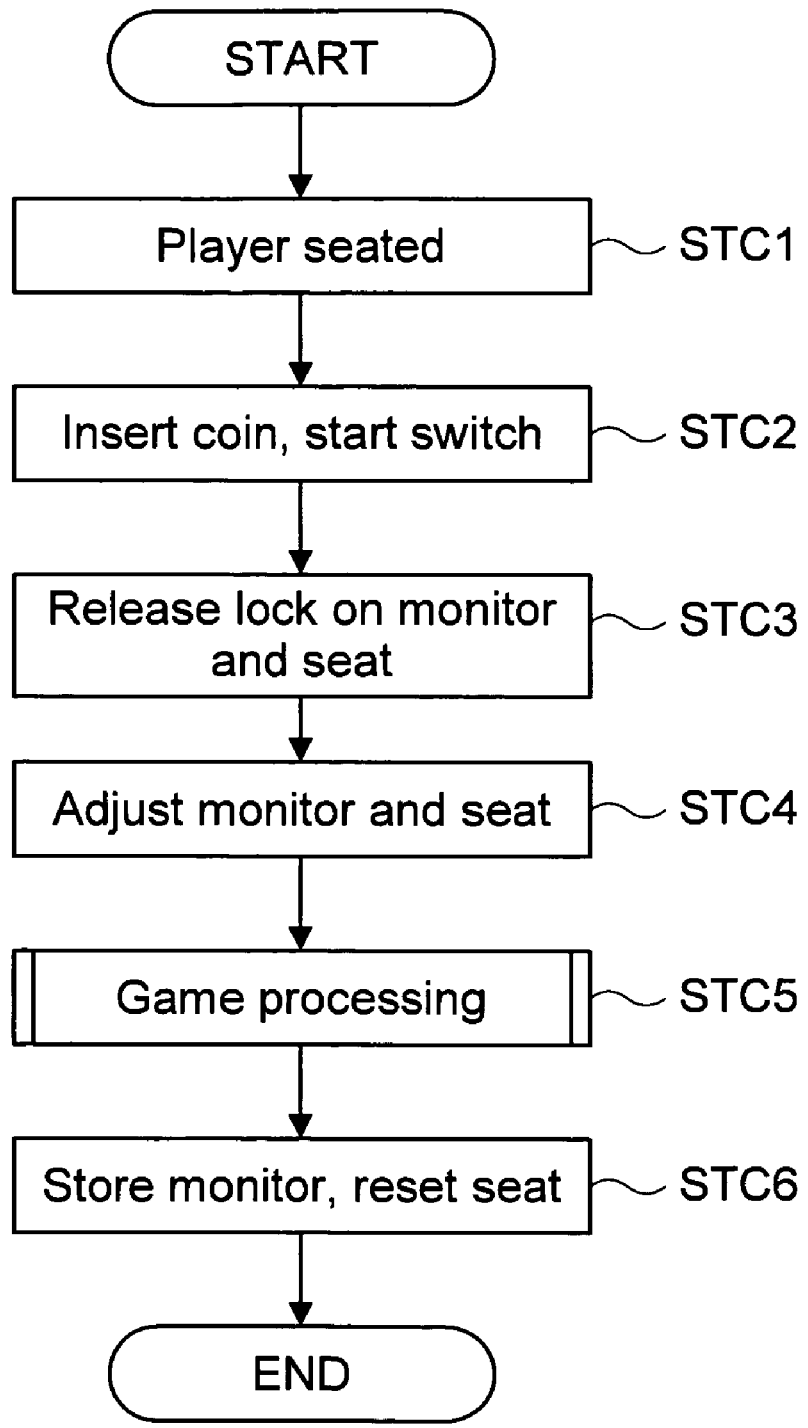
FIG. 12C is a main flowchart of a game executed in the game machine.

The operation of the game machine C1 is explained, with reference to the main flow chart shown in FIG. 12C.

In STC1, each player selects a terminal device C30 of their choice from the terminal devices C30 placed on the play area C21 and sits in the seat C31 of the selected terminal device C30. Next, in STC2, each player inserts a coin into a coin insertion opening in the input operation part C72 and presses the start switch. Then, in STC3, the locks of the sub-monitor C613 and the seat C31 of the game machine C1 are released and, in STC4, the player can pull out the sub-monitor C613 from the storage space C62 in the side unit C60 and adjust the mode of the seat C31.

In STC5, the game machine C1 performs a game processing described hereafter. After the game is completed, in STC6, the game machine C1 stores the sub-monitor C613 and also returns the mode of the seat C31 to seat mode.

Figure 13C:
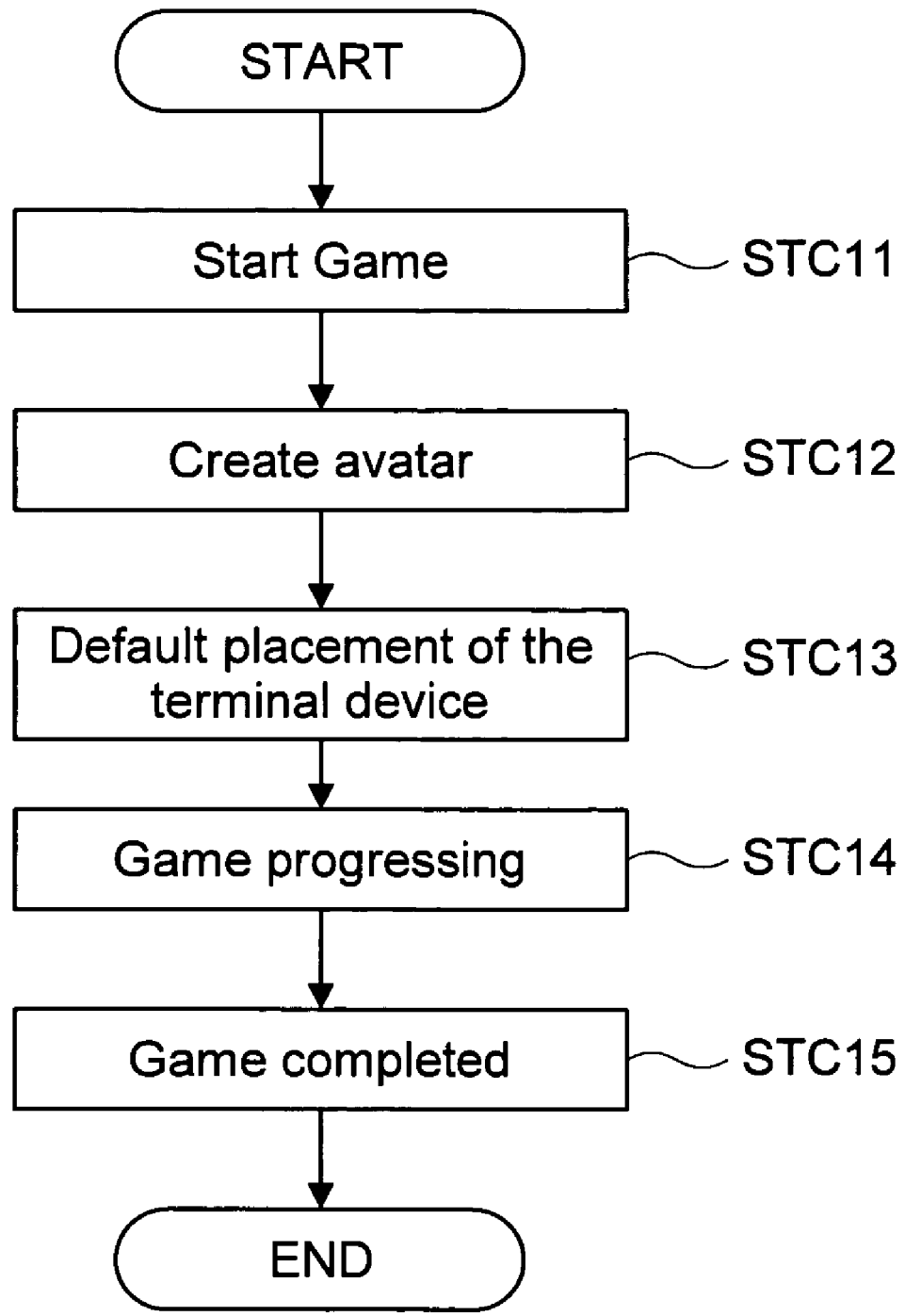
FIG. 13C is a flowchart of the game processing of the game program executed in the game machine.

FIG. 13C is a flowchart of the game processing. When the game is started in STC11, the game program creates an avatar of the player on STC12.

In other words, the game program shows an avatar creating screen in the sub-display part C61. In this avatar creation screen, the player creates an avatar, which is an alter-ego of the player, when participating in the game program. When an image of the players face is taken by the CCD camera C614 and the player enters personal information and the name to be used in the game field to the input operation part C72, the game program creates an avatar based on this information and registers it to the database C84 of the main control device C80.

In STC13, the game program places the terminal device C30 in which the player is seated in the default position on the play area C21.

In other words, the towns in the game field are surrounded by the ocean or forests, or are large cities. Each game area is an ocean, a forest, or a large city. The play area C21 includes a plurality of sub-areas C212, such as a city area C212A, an ocean area C212B, and a forest area C212C, as stated earlier. These sub-areas C212 are quasi-spaces corresponding to the environment of the towns in the game environment.

Therefore, the game program sets the town each player is in, in the game field, and moves the terminal device C30 of the player to the sub-areas C212A, C212B, and C212C, corresponding to the town in which each player is, when the game begins. Alternatively, the terminal device C30 of the player is moved according to the operations of each player of the input operation part C72, and the town in which the player is in the game field is set according to this movement.

In STC14, the game program runs the game according to a unique time-line, generating macroquests in which a plurality of players participate and quests in which only one player participates, and completed the game in STC15.

Figure 14C:
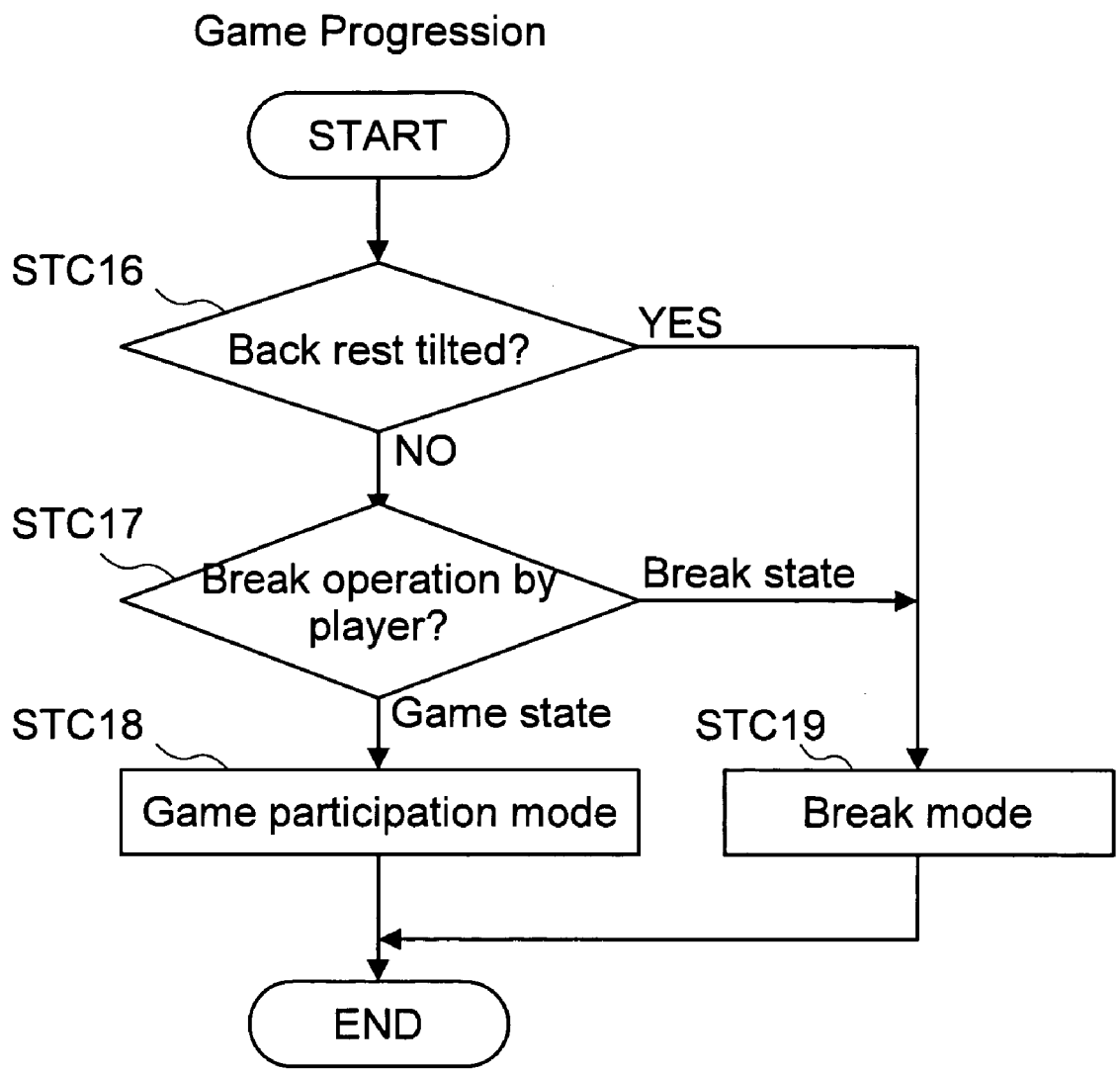
FIG. 14C is a flowchart of the game progression in the game program executed in the game machine.

FIG. 14C is a flowchart of the game progression in the game program with regards to each player. In STC16, the CPU C91 detects whether the backrest C53 of a specific player is reclined farther than a predetermined angle. If the CPU C91 determines that the backrest C53 of the seat C31 is reclined farther than a predetermined angle by the input operation part C27, the CPU C91 outputs a signal indicating that the player has selected break mode to the CPU C81. If it is determined that the break mode has been selected, regardless of the operation by the player of the input operation part C72, the game program performs STC19 and, if it is not determined as such, the game program performs STC17.

In STC17, the game program determines whether the player has selected break mode by operating the input operation part C72. If it is determined that the break mode has been selected, regardless of the state of the reclining function, the game program performs STC19 and, if it is not determined as such, the game program performs STC18.

In STC18, the game program provides a game via the sub-display part C61, the speaker C75 and the like so as to enable the player to participate in the overall game and run the game with other players.

In STC19, the game program provides images and sound differing from the game (for example, images and music which enables the player to relax) as break mode, via the sub-display part C61, the speaker C75 and the like. Images and sound which differ from the game can be an aspect in which a demonstration image and music of the game are reproduced, an aspect in which external image data stored to the external image data memory part C326 is reproduced, as described above, or an aspect in which video, such as television, is output.

Figure 15C:
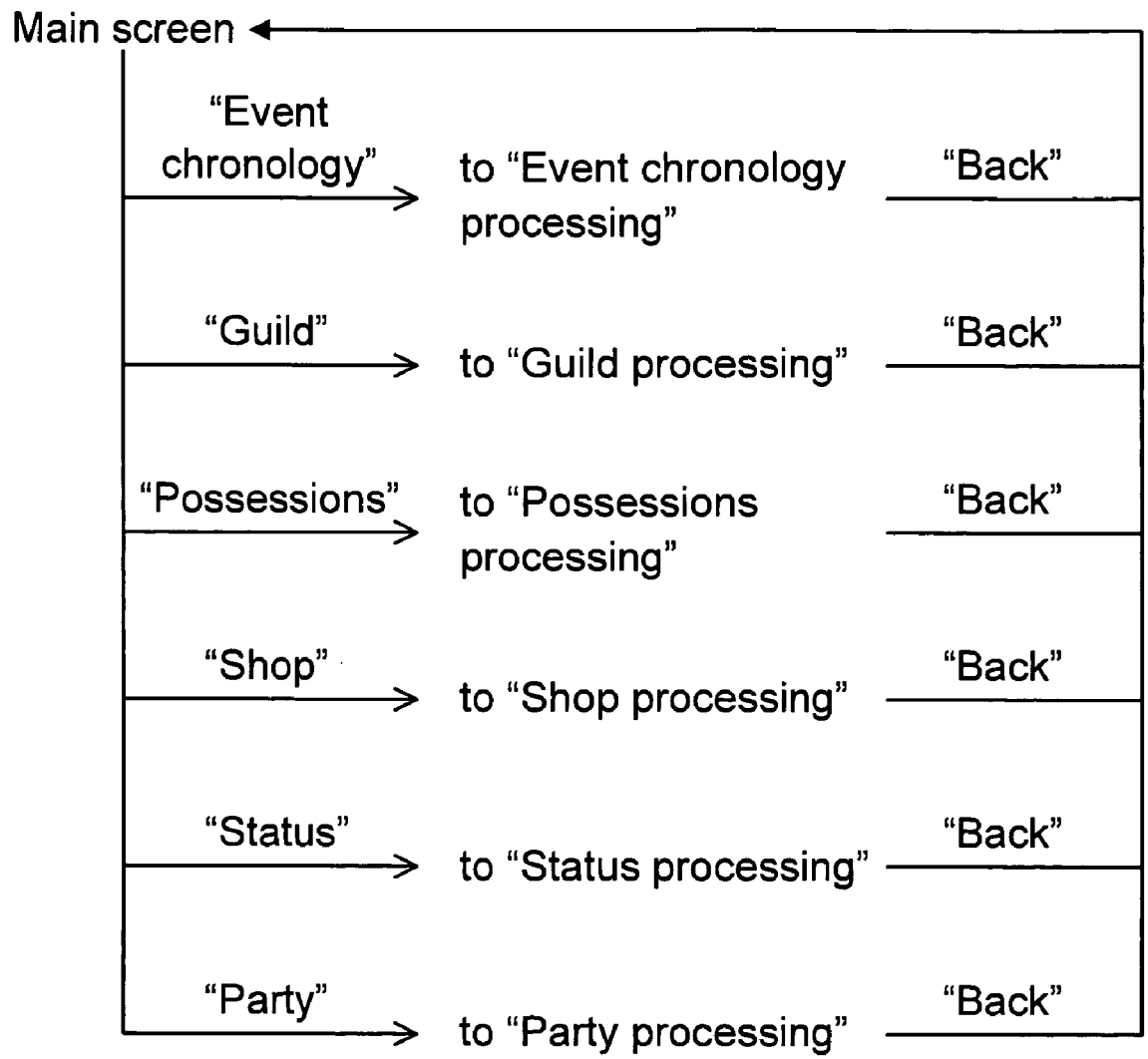
FIG. 15C is a flowchart of each player in the game program executed in the game machine.

FIG. 15C is a flowchart of each player in the game program.

Each player can perform an event chronology processing, guild processing, possessions processing, shop processing, status processing, and party processing, when the game participation mode (STC18) in FIG. 14C is selected.

When the player selects "event chronology processing", the game program shows the event chronology in the sub-display part C61 by reading the event chronology from the database C84 in the main control device C80 and performing event chronology processing.

In this event chronology, the respective dates and quest name of each quest solved in the game field is shown. Furthermore, when the player selects a quest name (event name), the game program shows the details of the selected event. Here, the details of the event are, for example, showing the player who solved the quest most quickly, if the winner is the player who solves the event (quest) most quickly, and shows the party if the winner is the party with the most number of cooperating players who have solved the event (quest).

When the player selects "guild", the game program performs a guild processing and shows a guild screen in the sub-display part C61. In this guild screen, the player can view the quests the player can try in the guild and select to go to another town in the game field.

When the player selects "quest" in the guild screen, the game program shows a list of selectable quests in the sub-display part C61. If the player selects the desired "quest" from this list, the game program executes the selected quest.

When the player selects "Go to another town" in the guild screen, the game program shows a list of towns which can be selected as a transfer destination in the sub-display part C61.

If the player selects a desired town from this list, the game program moves the player to the selected town. When the game program moves the player to another town within the game environment, the terminal device C30 of each player is moved to the sub-areas C212 of the corresponding transfer destination town.

The player can select menus such as "guild", "possessions", and "shop", even in the transfer destination town.

When the player selects "possessions", the game program performs a possessions processing and shows a possessions (list of contents) screen, of weapons, tools, shoes, and the like in the sub-display part C61. If the player selects a specific possession in this possessions (list of contents) screen, the game program shows a plurality of items included in the selected possessions in the sub-display part C61. The player selects the desired item from these items and either "wear" or "dispose of" the selected item.

When the player selects "shop", the game program performs a shop processing and shows a shop screen in the sub-display part C61. This shop screen is a screen for barter exchanging items in possession or acquiring information from the shop owner, and the player can select either "listen" or "exchange".

When the player selects "exchange" in the shop screen, the game program shows a list of products in the sub-display part C61. The player can select a desired item from this product list.

When the player selects the desired item, the game program shows the items possessed by the player for exchanging with the selected desired item. When the player selects an item in possession for exchange, the game program shows the item posses by the player and the price thereof in the sub-display part C61.

When the player selects the desired item for exchange from the items in possession, shown here, the desired items in possession to be exchange are collected, and the player selects "execute", the game program executes an exchange of the desired item and the desired item in possession to be exchanged.

On the other hand, if the player selects "listen" in the shop screen, the game program shows "rumors" in the sub-display part C61. The player can acquire information in the game environment by the "rumors" shown in this screen.

When the player selects "status", the game program performs a status processing and shows a status screen in the sub-display part C61. This status screen shows the results of the player's accomplishments in the game environment, the possessions thereof and the like. Specifically, it shows name, title, fame, power, intelligence, number of monsters slain, number of quests cleared, number of people saved, and the like.

If the player selects any one of the items above, the game program shows the rankings related to this item in the sub-display part C61.

When the player selects "party", the game program performs a party processing and shows the names of fellow players in the sub-display part C61, if there are fellow players, and furthermore, shows "read mail", "send mail", "exchange item", "view status" and the like.

By selecting any one of the items above, the player can send and receive mail with fellow players, exchange items with fellow players, and view the status of fellow players.

Figure 16C:
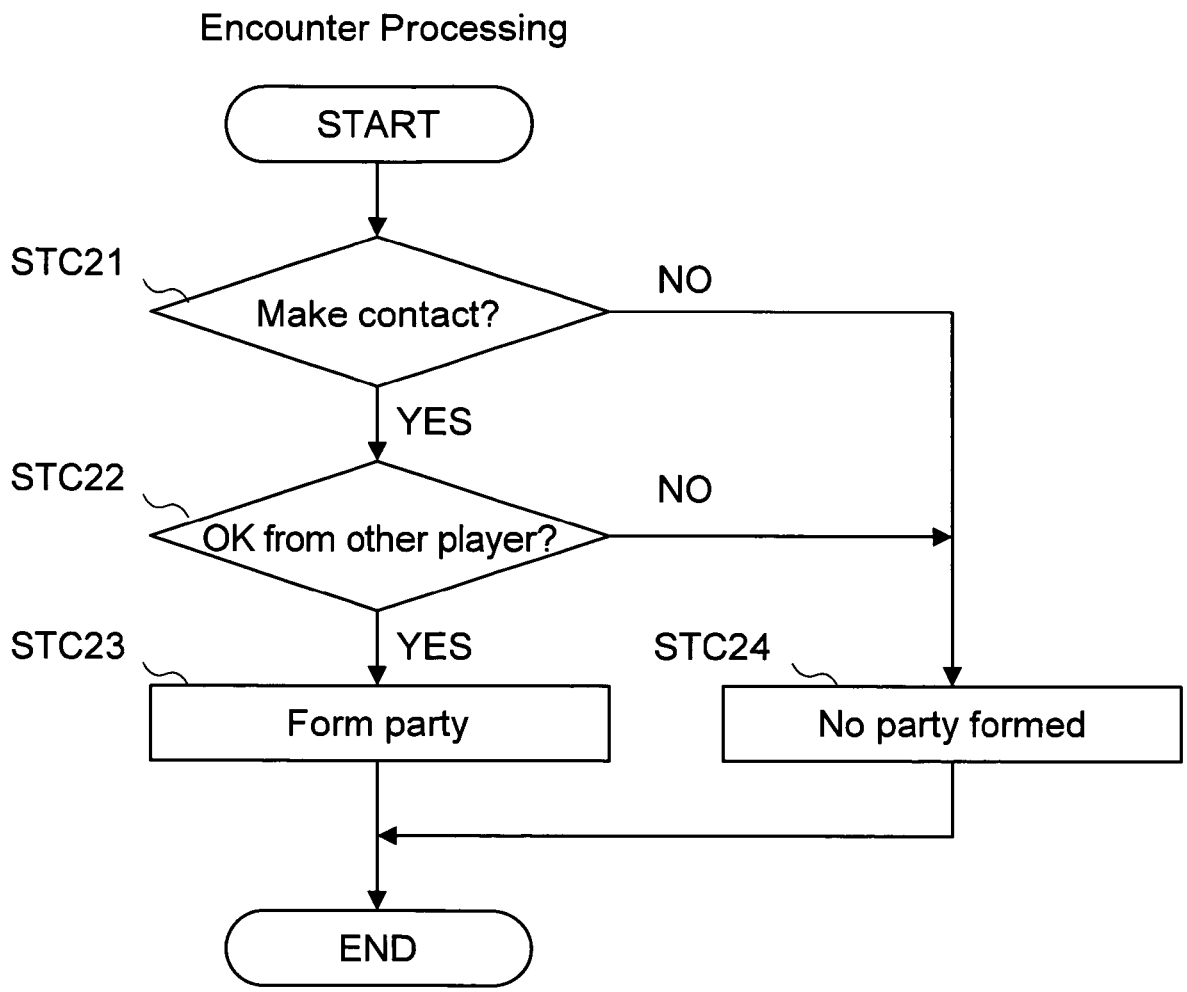
FIG. 16C is a flowchart of when a player encounters another player in a game field in the game program.

FIG. 16C is a flowchart of the encounter processing when the player encounters another player on the game field.

In the progress of the game in STC14, the game program executes an encounter processing when the player encounters another player on the game environment.

In other words, in STC21, an encounter screen is shown in the sub-display part C61, and the player is prompted to select whether to make contact.

If the player selects "No", the process moves to STC24 and the encounter processing is terminated without forming a party. On the other hand, if the player selects "Yes", the process moves to STC22, and the game program transmits mail to the other player, and shows that the player is being invited to become a fellow player in the sub-display part C61 in the terminal device C30 of this player. Then, the game program prompts the other player to select whether to accept the invitation.

If the player receiving the invitation selects "Yes", the process moves to STC23 and the game program transmits the selected result to the player who is the inviter, shows that the player has become a fellow player in the sub-display part C61 of the player who is the inviter, a party is formed and the process is completed.

On the other hand, if the player receiving the invitation selects "No", the game program shows that the player could not be a fellow player to the player who is the inviter in the sub-display part C61, and the process moves to STC24, and terminates the encounter processing without forming a party.

Figure 17C:
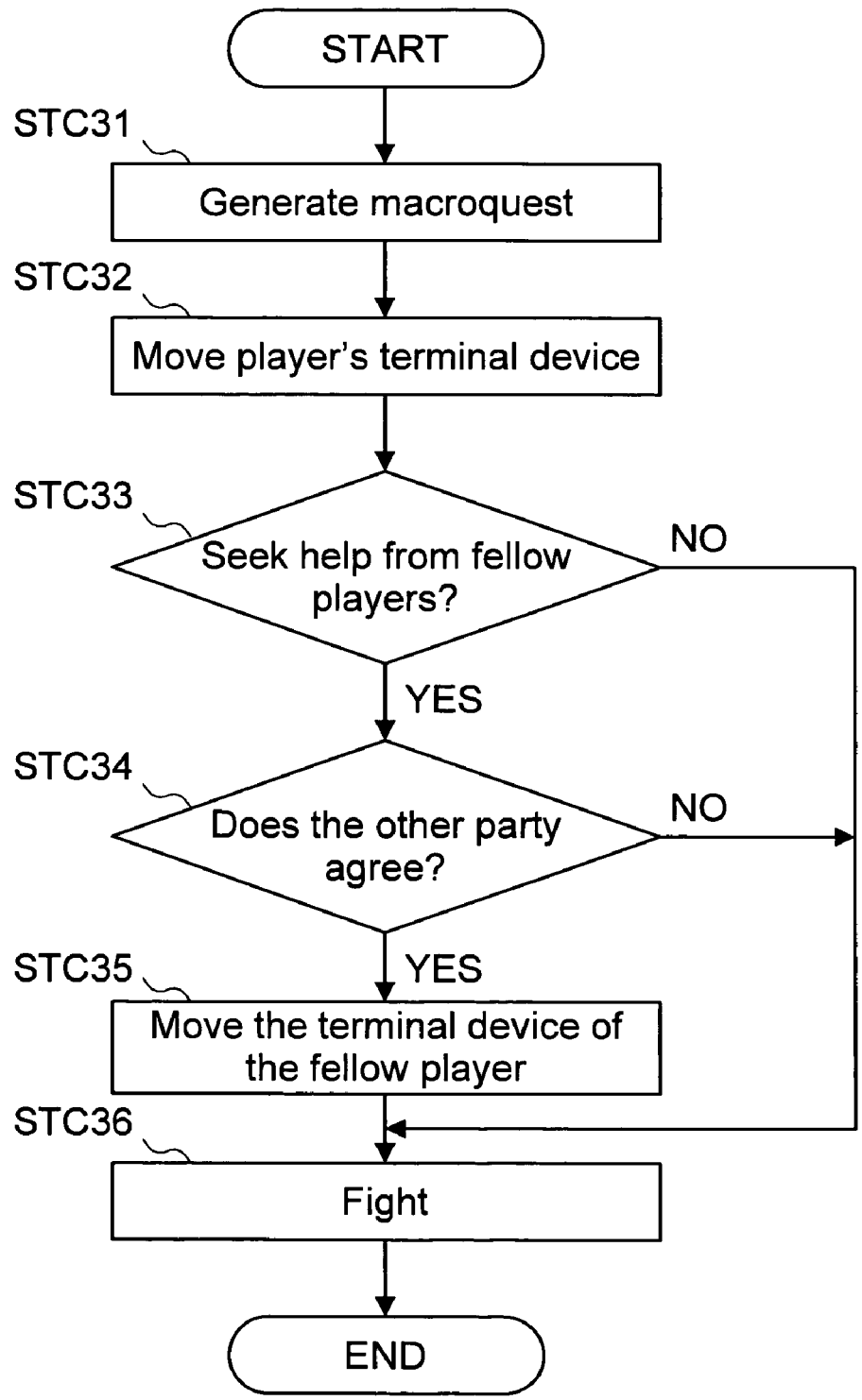
FIG. 17C is a flowchart of when a macroquest is generated in the game field in the game program.

FIG. 17C is a flowchart of the macroquest processing when a macroquest is generated in the game field.

If a macroquest involving a plurality of players is generated in STC31, the game program executes a macroquest processing.

In other words, if a macroquest is generated in STC31, the process moves to STC32, shows the players involved in this macroquest in the main display device C22, also moves the terminal devices C30 of the players involved in this macroquest to the sub-area C212A in front of the main display device C22, and places them so that the terminal devices C30 of opposing players are close to and facing each other.

Specifically, as shown in FIG. 18C, there are six terminal devices, C30A to C30F, placed on the play area C21. Among these, the players of terminal devices C30A, C30B, and C30E are one party, and the players of terminal devices C30C, C30D, and C30F are another party. Then, each player in terminal devices C30A to C30D are caught in the macroquest in the city area C212A and are placed such that the parties oppose each other. In contrast, because the players in terminal devices C30E and C30F are respectively in the ocean area C212B and the forest area C212C, they are not involved in the macroquest, and thus, view the battle between the terminal devices C30A to C30D.

In order to clear the macroquest, the players caught in the macroquest select whether to call for help from fellow players in STC33.

If the player selects "No", the process moves to STC36.

On the other hand, if the player selects "Yes", the process moves to STC34, the game program transmits mail calling for help to the fellow players, and shows that help is being called for in the sub-display part C61 in the terminal device C30 of the player. Then, the game program prompts the fellow players to select whether to help the player.

If the fellow player whose help is requested selects "Yes", the process moves to STC35, and the game program transmits the selection results to the player requesting help and that the fellow player will participate is shown in the sub-display part C61 of the player. In addition, the game program shows the status of the gathering of newly participating fellow players in the main display device C22, and the terminal devices C30 of the newly participating fellow players are moved to the city area C212A in front of the main display device C22 and placed such that the terminal devices C30 of opposing players are close to and facing each other.

On the other hand, if the player whose help is requested selects "No", the game program shows that help had been denied in the sub-display part C61 of the player requesting for help, and the process moves to STC36.

Figure 19C:
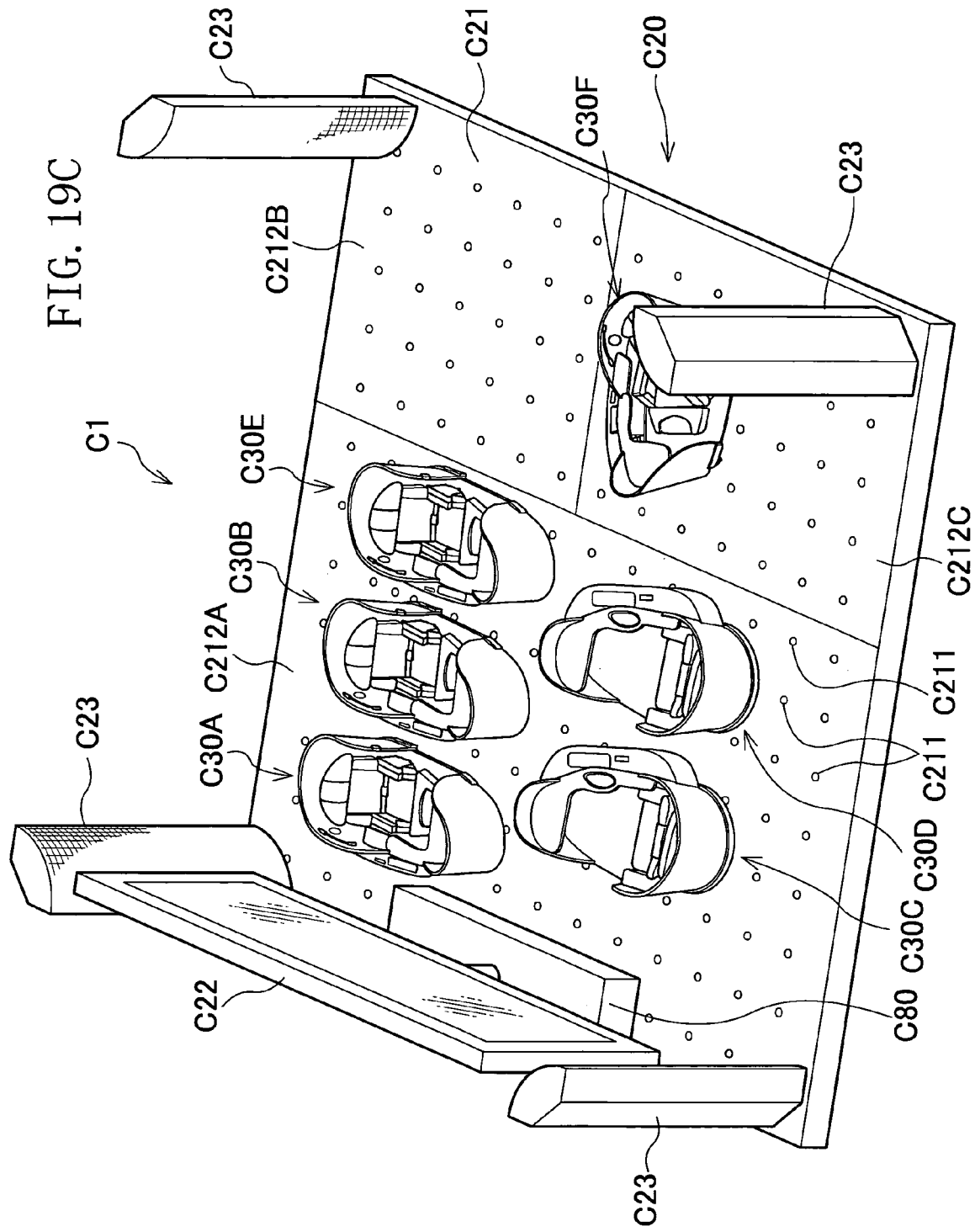
FIG. 19C is a perspective view showing a state in which fellow players participate in a macroquest generated in the game field in the game program of the game machine.

Specifically, as shown in FIG. 19C, because the player in terminal device C30E is fellow players with the players in terminal devices C30A and C30B, this player's help is requested by the terminal devices C30A and C30B. The player in terminal device C30E, having agreed to help, is moved to the city area C212A and is placed in alignment with the terminal devices C30A and C30B.

On the other hand, although the player in terminal device C30F is fellow players with the players in terminal devices C30C and C30D, and this player's help is requested by the terminal devices C30C and C30D, he refuses to help and, therefore, remains in the forest area C212C.

In STC36, each player fights the opposing player or opposing party. Specifically, as shown in FIG. 19C, the players of terminal devices C30A, C30B, and C30E and the players of terminal devices C30C and C30D fight in the city area C212A.

In this way, each player gets caught in a macroquest or is requested to help by fellow players caught in the macroquest, and whether to watch the battle between other players or to personally participate can be selected.

Therefore, because a traveling part C32 is provided in the terminal device C30 and is driven according to input from the input operation part C72, the terminal device C30 can be moved to a desired position on the player area C21 at the beginning of the game, and thus, each player can play the game by changing the position of the terminal device C30.

In addition, because the IP address is attached to the game input data by the sib-control device C90 of the terminal device C30 and the terminal device C30 to which the game input data is transmitted based on the IP address is identified by the main control device C80 of the main game machine body C20, the main game machine body C20 can accurately identify each terminal device C30, regardless of the position to which the terminal device C30 moves on the player area C21.

In addition, because the terminal device C30 includes a traveling part C32, this traveling part is driven according to the movement signal data from the main control device C80, and the terminal device C30 moves to a predetermined sub area C212 according to the progression of the game, each player can play the game by changing the position of the terminal device C30.

In addition, by reflecting the positional relationship of a plurality of operation characters within the game area in the positional relationship of the plurality of terminal devices, the positional relationships between the operation characters in the game area can be presented more realistically on the play area, and thus, the enjoyment of the player is further enhanced. For example, if a plurality of players fight against each other, the players can be made aware that they are enemies by bringing the terminal devices C30 of the competing players closer together, and tension between the opposing players can be enhanced.

In addition, because the movement signal data is transmitted to a specific terminal device C30 from the main control device C80 using the IP address, each terminal device C30 can accurately identify movement signal data from the main game machine body C20, regardless of the position of the terminal device C30 on the play area C21.

In addition, because an IC tag detection part C324 is included in the terminal device C30, and the terminal device C30 is moved so as to become closer to the position designated by the movement signal data, while verifying the current position of the terminal device C30 by the current positional data detected by the IC tag detection part C324, the terminal device C30 can be moved to the designated position accurately.

Furthermore, because the game machine C1 includes a reclining function in the seat C31 of the terminal device C30, the player seated in the seat C31 of the terminal device C30 can take a break without leaving the terminal device of the game machine. In addition, according to the state of the reclining function in the terminal device C30, when it is determined that the player has operated the reclining function and is in a break state, the CPU C81 can, for example, control this player only in break mode. In this way, because it is not disadvantageous to the game progression of this player, even if the game operation is halted, the player can take a break at ease.

The present invention is not limited to the foregoing embodiments and includes modifications, improvements and the like which achieve the objects of the present invention.

A game machine in a preferred embodiment is described below.

Overall Configuration of the Game Machine

Figure 1D:
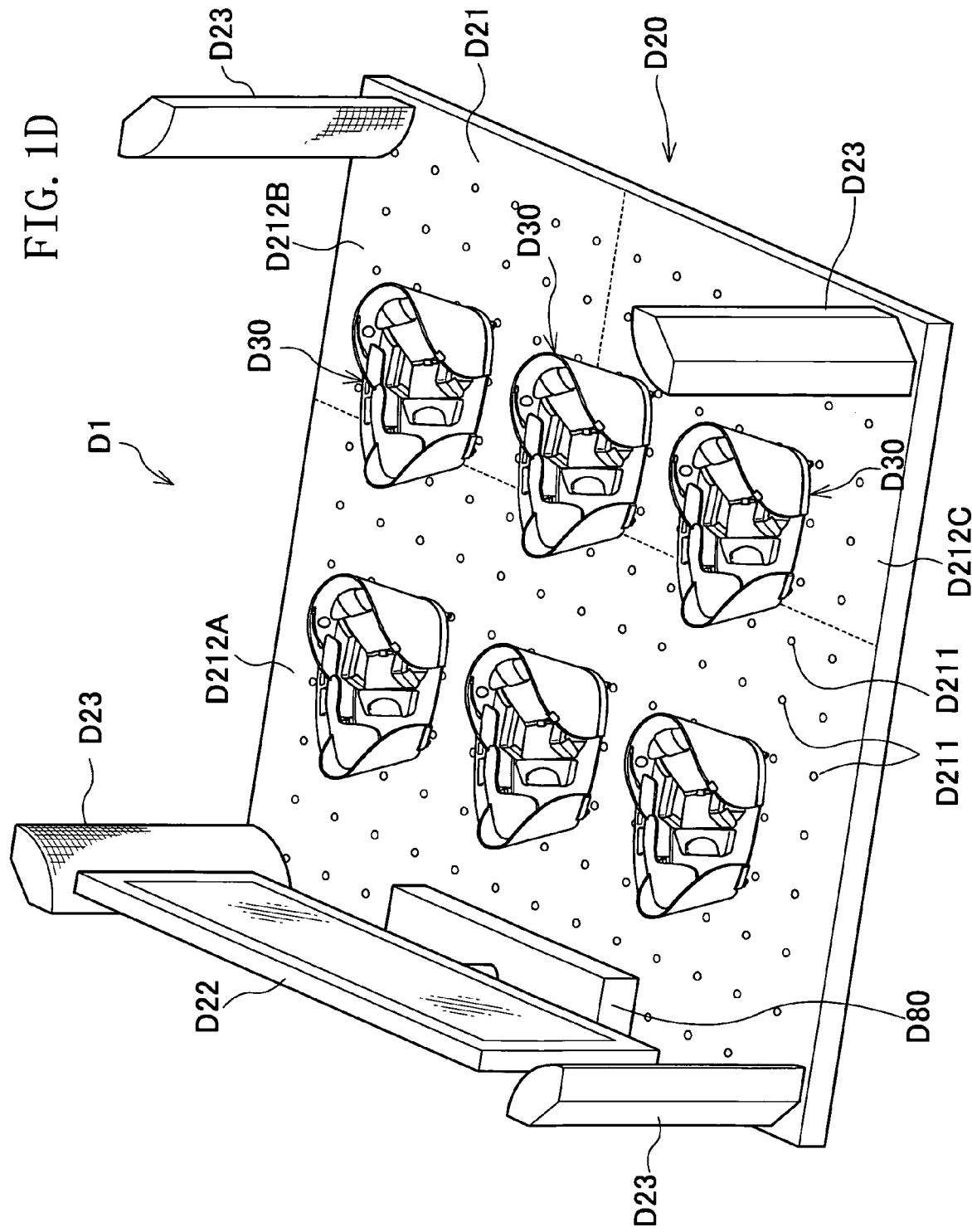
FIG. 1D is a perspective view showing an outward aspect of the game machine according to an embodiment of the present invention.

FIG. 1D is a perspective view showing an outward aspect of the game machine D1 according to an embodiment of the present invention.

The game machine D1 is a multi-player game machine, including a main game machine body D20 which includes a flat, rectangular play area D21 and a plurality of terminal devices D30 which are placed on this play area D21.

Aside form the play area D21, the main game machine body D20 includes a main display device D22 which is placed along one side of the play area D21, a speaker device D23 which is placed in the four corners of the play area D21, and a main control device D80 for controlling these main display device D22 and speaker device D23.

The play area D21 is divided into a plurality of sub-areas D212. As these sub-areas D212, there are city areas D212A, ocean areas D212B, and forest areas D212C. In addition, IC tags D211 are buried in grid-form in the play area D21. Positional information of the inside of the play area D21 is stored to this IC tag D211.

The main display device D22 is a large projector display device showing images based on image data output from the main control device D80. The main display device D22 is not limited thereto and can also be a large monitor.

The main control device D80 can communicate with each terminal device D30 bi-directionally through wireless LAN and can provide each player with a common virtual space by executing the predetermined game program and bi-directionally communicating with each terminal device D30.

Each terminal device D30 is placed facing towards the main display device D22. This terminal device D30 is connected to the main control device D80 through a wireless LAN and can be moved over the play area D21 according to the instructions from the main control device D80 or by player operation.

Figure 2D:
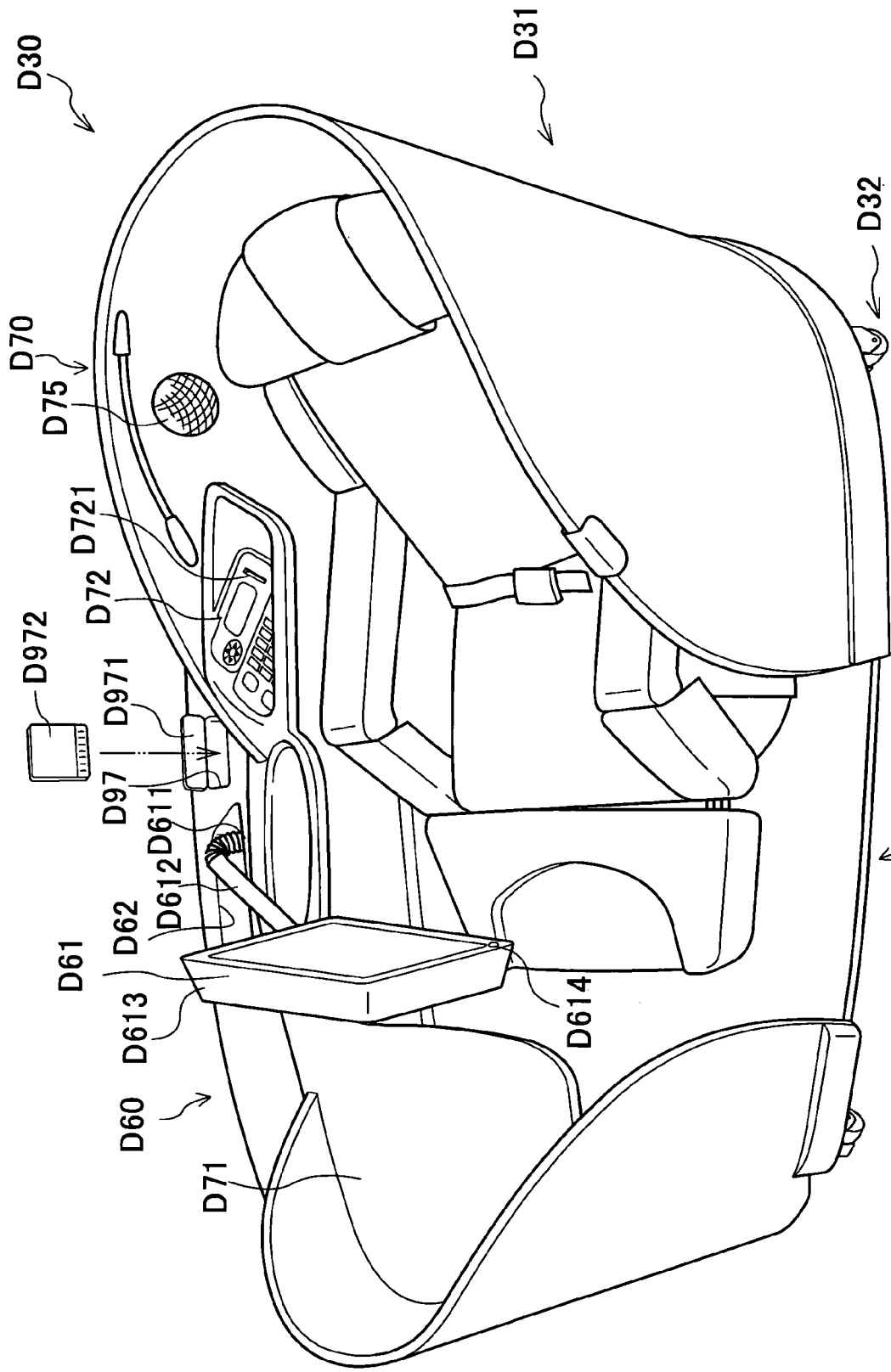
FIG. 2D is a perspective view showing an outward aspect of the terminal device of the game machine.

FIG. 2D is a perspective view showing an outward aspect of each terminal device D30.

The terminal device D30 includes a seat D31, and a traveling part D32, which is provided on the lower part of the seat D31, for moving the seat D31 over the play area D21.

Figure 3D:
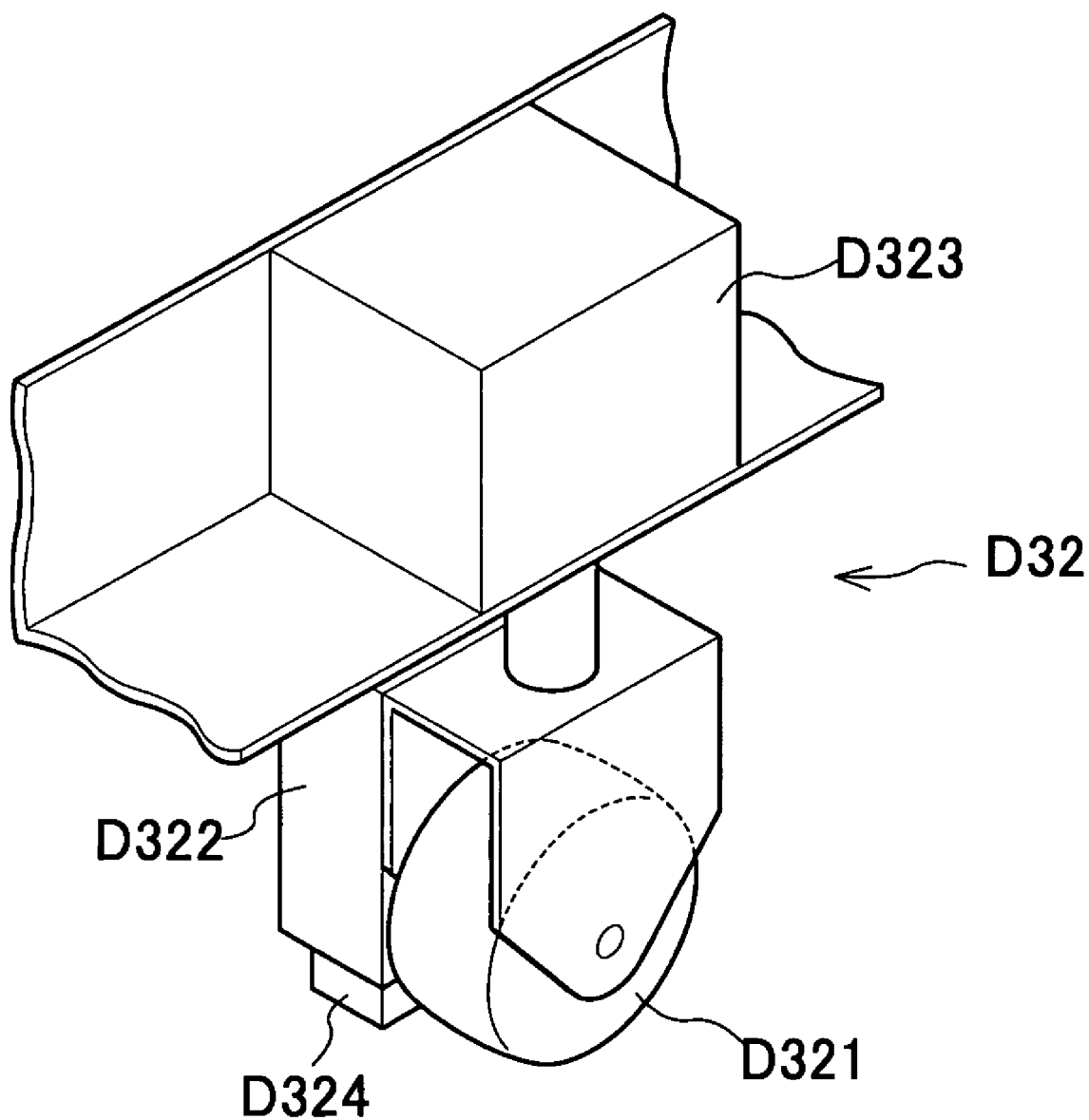
FIG. 3D is an enlarged perspective view of one section of a traveling part of the terminal device.

FIG. 3D is an enlarged perspective view of one section of the traveling part D32.

The traveling part D32 includes four traveling tires D321, a driving control device D322 for rotation-driving these traveling tires D321, a direction control device D323 for controlling the direction of the traveling tires D321, and a rechargeable battery, not shown, for supplying the driving control device D322 and direction control device D323 with power.

The traveling part D32 can move a seat D31 to an arbitrary position on the play area D21 by the driving control device D322 and the direction control device D323.

The foregoing rechargeable battery can be recharged through connection to an external power source, but is not limited thereto, and can be recharged by self-induced electromotive force due to a magnetic field, by embedding a magnetic field generating device in the play area D21 and generating a magnetic field by this magnetic field generating device.

In addition, an IC tag detection part D324 for detecting IC tags D211, which are buried in the play area D21, is provided below the driving control device D322 of the traveling part D32.

Configuration of the Seat

Figure 4D:
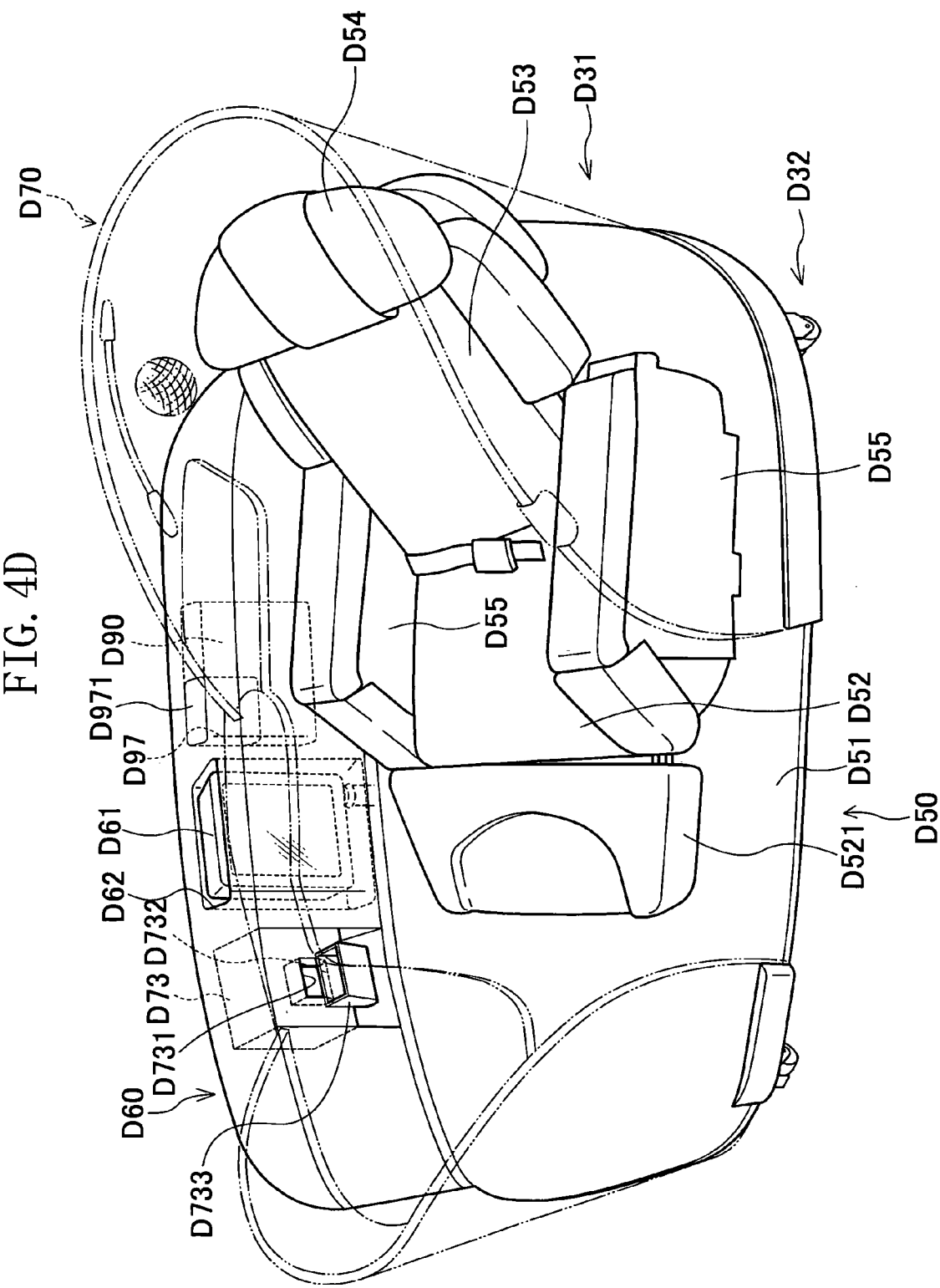
FIG. 4D is a perspective view of the of the seat of the terminal device in seat mode.

FIG. 4D is a perspective view of the seat D31 in seat mode.

Figure 5D:
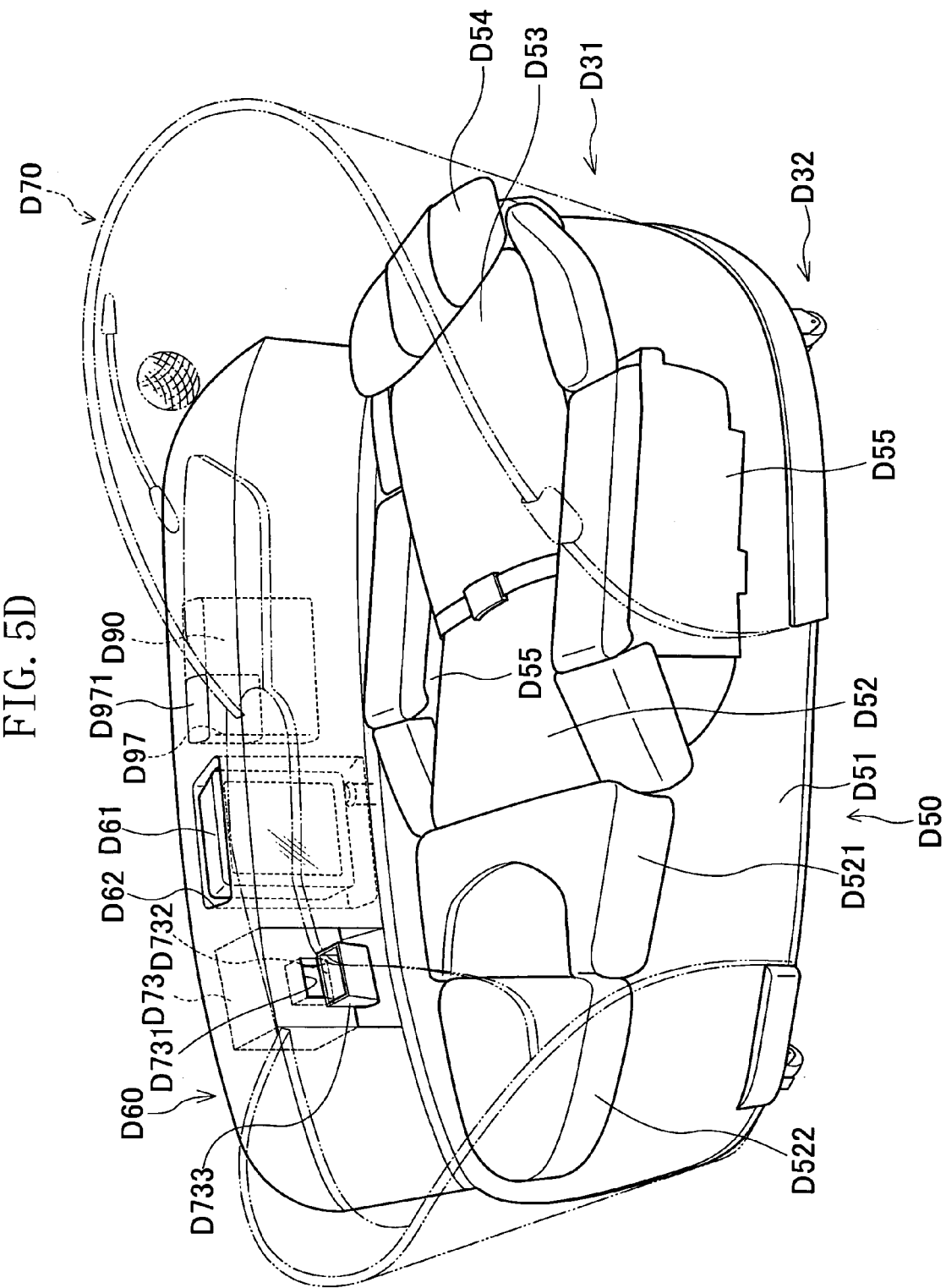
FIG. 5D is a perspective view of the seat of the terminal device in bed mode.

FIG. 5D is a perspective view of the seat D31 in bed mode.

Seat D31 includes a main seat body D50, a side unit D60 which is provided along one side surface of the main seat body D50, and a seat shell D70 which surrounds the main seat body D50 on three sides, excluding the other side surface side.

The mode of this seat D31 can be adjusted in multiple steps, between the seat mode shown in FIG. 4D and the bed mode shown in FIG. 5D.

The main seat body D50 includes a flat base part D51, a seating part D52 which is provided on this base part D51, a backrest D53 which is attached to enable changing of its angle to the seating part D52, a head rest D54 which is provided on the top part of the backrest D53, and a pair of side arms D55 which are provided in positions on the seat surface of the seating part D52 and both sides of the backrest D53.

The seating part D52 moves back and forth on the base part D51 when the player operates the input operation part D72. The main seat body D50 changes from the seat mode shown in FIG. 4D to the bed mode shown in FIG. 5D, when this seating part D52 is slid forward, and forms a bed.

The seating part D52 includes a leg rest D521 which is provided on the front surface side and a foot rest D522 which is stored in the tip of this leg rest D521. The leg rest D521 turns upward according to the sliding motion, when the seating part D52 is slid forward, and becomes a seat surface which continues from the seat surface of the seating part D52. At the same time, the foot rest D522 projects from the leg rest D521 and becomes a seat surface which continues from the leg rest D521.

The backrest D53 falls backward, according to the back and forth movement of the seat part D52 on the base part D51.

The front surface side of the side arm D55 turns slightly upward, when the main seat body D50 is placed in bed mode.

A bag component, into which air can be injected, is embedded respectively within the seat surface of the seating part D52, the lower part of the backrest D53 (which comes into contact with the lower back of the player) and the head rest D54. When air is injected into these bag components by an air pump, the surface swells and can support the user while accommodating the contours of the body surface of the user.

The sub-display part D61 which is configured to include a liquid crystal display panel is stored in the side unit D60.

As shown in FIG. 2D, the sub-display part D61 includes a first support arm D611 which is supported by the side unit D60, a second support arm D612 which is attached to the tip of the first support arm D611, and a flat, rectangular sub-monitor D613 which is attached to the tip of the second support arm D612 and performs liquid crystal display.

The first support arm D611 can be extended and retracted freely in the direction vertical to the side unit D60. The second support arm D612 can extend and retract freely and can be fixed to an arbitrary angle to the axis direction of the first support arm D611. The sub-monitor D613 can be fixed to an arbitrary angle to the axis direction of the second support arm D612.

A small CCD camera D614 is embedded into the sub-monitor D613. This CCD camera D614 is used when creating an avatar in the game field.

The image taken by the CCD camera D614 is displayed constantly in the sub-display part D61 in the terminal device D30, by operating an input operation part D72 (described hereafter). Because the expressions of the player per se can be viewed during the game in this way, enjoyment increases. In this case, the photographed image can be shown on the entire screen of the sub-monitor D613 or in one section of the screen.

A sub-monitor storage space D62 which extends in the vertical direction is provided in the side unit D60, and the foregoing first support arm D611, a second support arm D612, and a sub-monitor D613 are stored within the sub-monitor storage space D62.

The procedure by which the player pulls out the sub-monitor D613 from the storage space D62 is explained, with reference to FIG. 6D to FIG. 8D.

Figure 6D:
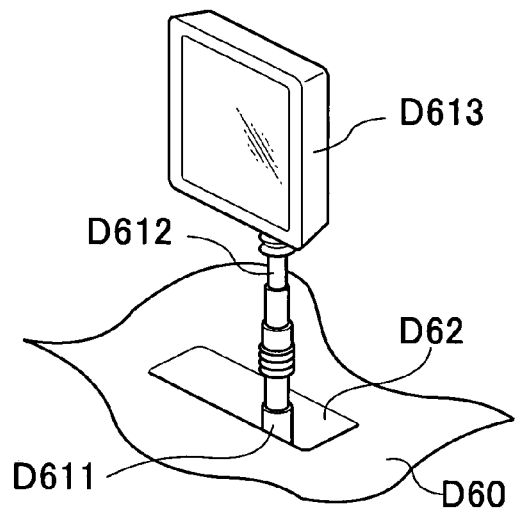
FIG. 6D is a perspective view showing a state in which a sub-monitor of the terminal device is pulled out from within a storage space.
Figure 7D:
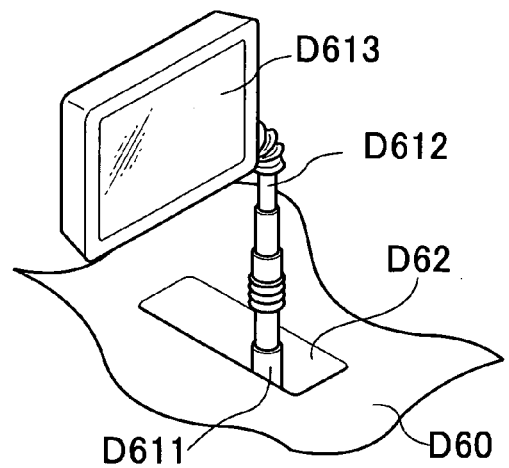
FIG. 7D is a perspective view showing a state in which the display screen of the sub-monitor of the terminal device is turned toward the player.
Figure 8D:
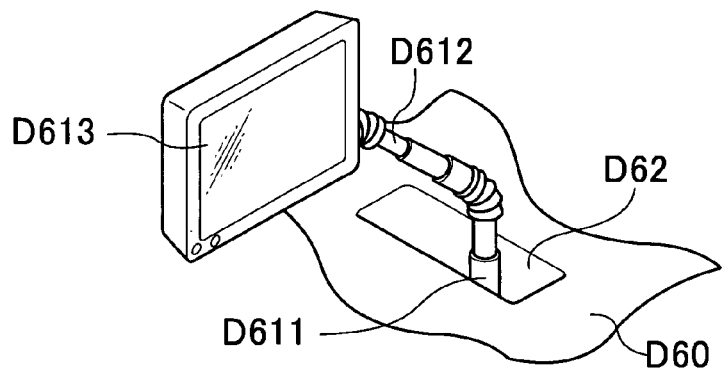
FIG. 8D is a perspective view showing a state in which the position of the sub-monitor of the terminal device is adjusted.

First, as shown in FIG. 6D, the player slides the sub-monitor D613 upward from the sub-monitor storage space D62 and extends the first support arm D611 and the second support arm D612, while seated in the main seat body D50. Then, as shown in FIG. 7D, the display screen of the sub-monitor D613 is turned toward the player by twisting the sub-monitor D613. Subsequently, as shown in FIG. 8D, the sub-monitor D613 is positioned to the player's eye level by adjusting the relative angles of the first support arm D611 and the second support arm D612 and the relative angles of the second support arm D612 and the sub-monitor D613.

A sub-control device D90 which is connected by wireless LAN to the main control device D80 and a plurality of board storage slots D97 which configure this sub-control device D90 are provided within the side unit D60.

The sub-control device D90 controls the sub-display part D61 and the traveling part D32, based on instructions from the main control device D80, as well as transmitting signals input by the input operation part D72 (described hereafter) to the main control device D80.

A cover part D971 is provided to open and close freely on the upper part of the board storage slots D97. By opening the cover part D971 and inserting a terminal control board D972 from above, as shown in FIG. 2D, the terminal control board D972 can be attached to the board storage slot D97.

The back-side of the seat shell D70 extends upward and can support the backrest D53 and the head rest D54. In addition, speakers D75 are provided on both sides of the head rest D54 of the seat shell D70.

The back-sides of the side surfaces of the seat shell D70 extends upward so that the player seated in the main seat body D50 cannot be viewed by other players.

A table D71 is attached from one side surface of the main seat body D50 to the front surface, on the upper edge of the seat shell D70. The space beneath this table D71 accepts the leg rest D521 and the foot rest D522 when the main seat body D50 is placed in bed mode.

The input operation part D72 is provided in the vicinity of the side arm D55 on the table D1, or in other words, a position wherein the player can perform operations while seated in the main seat body D50, and includes a keyboard, a jog dial and the like. A card slot D721 for inserting credit cards and membership cards is provided in this input operation part D72.

Although the input operation part D72 is provided on the table D71 in the present embodiment, this is not limited thereto, and can be provided as a touch-panel on the sub-monitor D613.

A medal payout opening D731 from which medals are paid out from a medal collection part D73 provided within the side unit D60, and a medal receiving part D732 for receiving the medals which are paid out are provided below the table D71 and in front of the side arm D55. A holder, not shown, for attaching a medal storage container D733 is provided in the medal reception part D732. For example, this medal can be paid out according to the odds of the win/loss of a certain event (win/loss of horse-racing, combat, etc.), such as a book-maker, within the game environment. In other words, predetermined odds (betting odds) are stipulated to the participants of the event by a book-maker within the game environment, and the player bets on the object of his choice. Then, medals are paid out based on the odds, according to the win/loss results. The prize resulting from this book-maker is not limited to medals and can be items within the game environment.

Figure 9D:
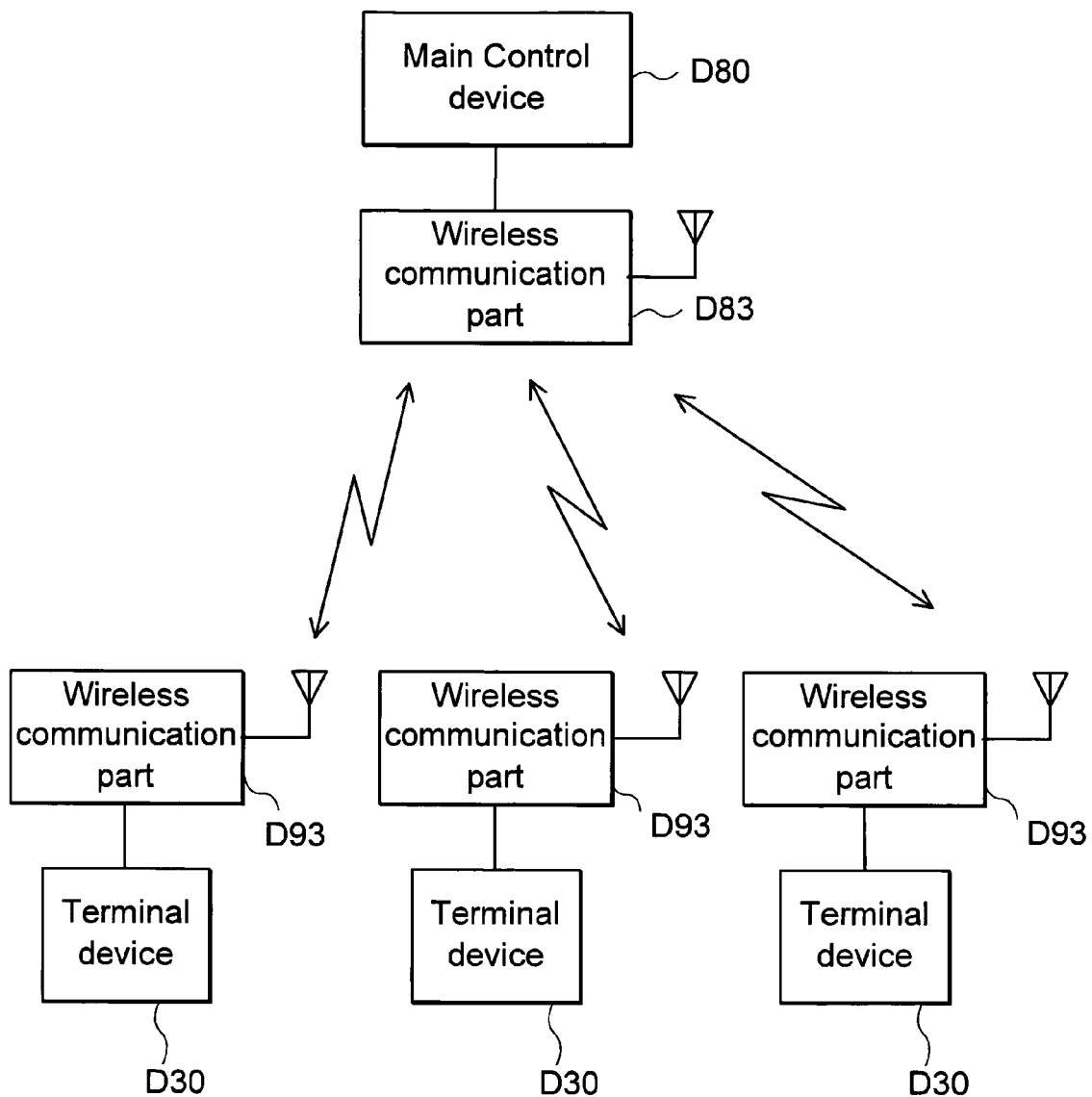
FIG. 9D is a block diagram showing an overall configuration of the game machine.

FIG. 9D is a block diagram of an overall configuration of the game machine D1.

In this game machine D1, the main control device D80 of the main game machine body D20 had a wireless communication part D83 and the sub-control device D90 of the terminal device D30 has a wireless communication part D93. These wireless communication parts D83 and D93 can be interconnected by a wireless LAN, and thus, the transfer of voice data and character data can be performed between the main control device D80 and the sub-control device D90.

Configuration of the Main Control Device

Figure 10D:
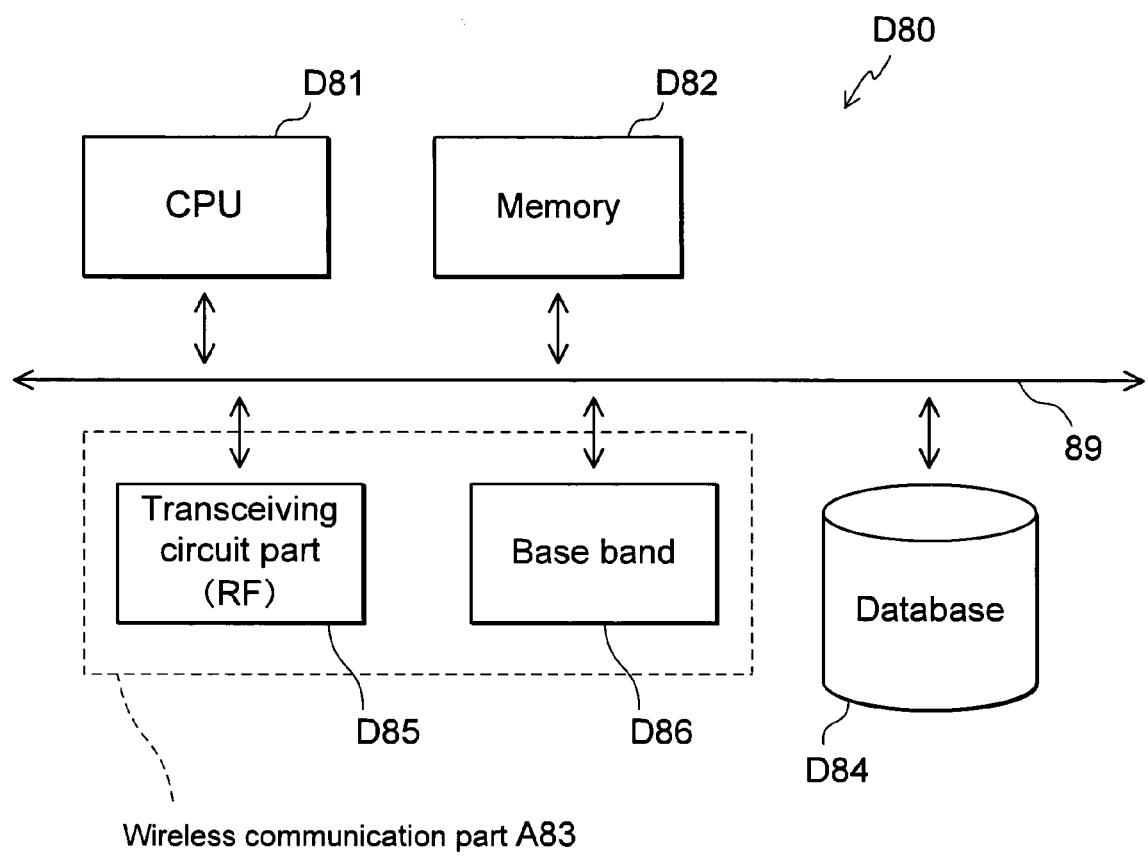
FIG. 10D is a block diagram showing a configuration of a main control device of the main game machine body.

FIG. 10D is a block diagram showing the configuration of the main control device D80.

The main control device D80 has a CPU D81, a memory D82, a wireless communication part D83, and a database D84, which are connected to a data bus D89.

The wireless communication part D83 includes a transceiving circuit part (RF) D85 for transmitting and receiving signals with the sub-control device D90, and a base band processing part D86 for converting RF (Radio Frequency) signals received by the transceiving circuit part D85 into base band signals and also converting base band signals to be transmitted into RF signals.

The database D84 is a circuit board which includes a memory part to which a game program is stored or a storage medium (for example, a hard disk or ROM cassette) to which the game program is stored.

Specifically, a slot to which these circuit boards and storage mediums can be attached and removed is provided in the main control device D80. By attaching and removing these circuit boards and storage mediums from the slot, the game program stored to the database D84 can be replaced, accordingly, and other game programs can be executed. Replacing the game program is not limited to that via hardware, as such, and the game program can be replaced directly by downloading via a communication circuit.

CPU D81 transmits and receives data with the sub-control devices D90 of each terminal device D30, via the wireless communication part D83, by the procedure below.

Specifically, the CPU D81 converts data into packet data when transmitting data to the sub-control device D90 of the terminal device D30. At this time, the IP address of the identified terminal device D30, which is the destination, is added to the packet data.

In addition, the CPU D81 identifies the terminal device D30 which is the transmission source of the data when receiving data from the sub-control device D90 of the terminal device D30, based on the IP address added to the packet data.

The foregoing CPU D81 executes the game program and performs various processing as a result. In other words, the CPU D81 reads the game program stored in database D84 to the memory D82 and runs the game according to this game program.

Specifically, the CPU D81 receives data including game input data, described hereafter, respectively, from the plurality of terminal devices D30, and generates a single game data according to the game program, based on these data. Then, the CPU D81 generates image data which is shared with all of the terminal devices D30, based on the generated single game data, and outputs this data to the main control device D80.

Here, the single game data includes a plurality of operation character data which can be moved within the single game field generated according to the game program, based on the respective game input data of the plurality of terminal devices D30, and the positional data of this plurality of operation characters.

If a plurality of game input data is received from a plurality of terminal devices D30, the CPU D81 identifies the terminal device D30 which transmitted the game input data, based on the IP address, and moves the operation character of this identified terminal device D30 based on this game input data.

Furthermore, if the positional data of operation character of the identified terminal device D30, out of the plurality of terminal devices DB30, meets predetermined conditions, the CPU D81 transmits, to the identified terminal device D30, movement signal data which designates the position of the terminal device D30.

In addition, during the game, the CPU D81 extracts the game program, information expressing the game status corresponding to the time-line in the game field at the time (namely, information expressing events and the like occurring in the game field) from the database D84 and transmits this to the terminal device D30, which is the request source, via wireless LAN. In addition, the CPU D81 receives information expressing the operation results of the player from each terminal device D30 and stores this in the memory D82.

The CPU D81 runs the game and stores the progress results of the game program to the database D84, based on the information expressing the operation results of the player stored to the memory D82.

Here, the information expressing the operation results of the player are, for example, selection results by the player from a selection shown to the player via the terminal device D30, based on the progress of the game program, or the results of the operation performed by the player of the character appearing in the game, and is information transmitted from the terminal device D30 as a result of the player operating their respective terminal devices D30. Other players can check the progress status of the current game stored to this database D84 (for example, high-score information, etc.)

Configuration of the Sub-Control Device

Figure 11D:
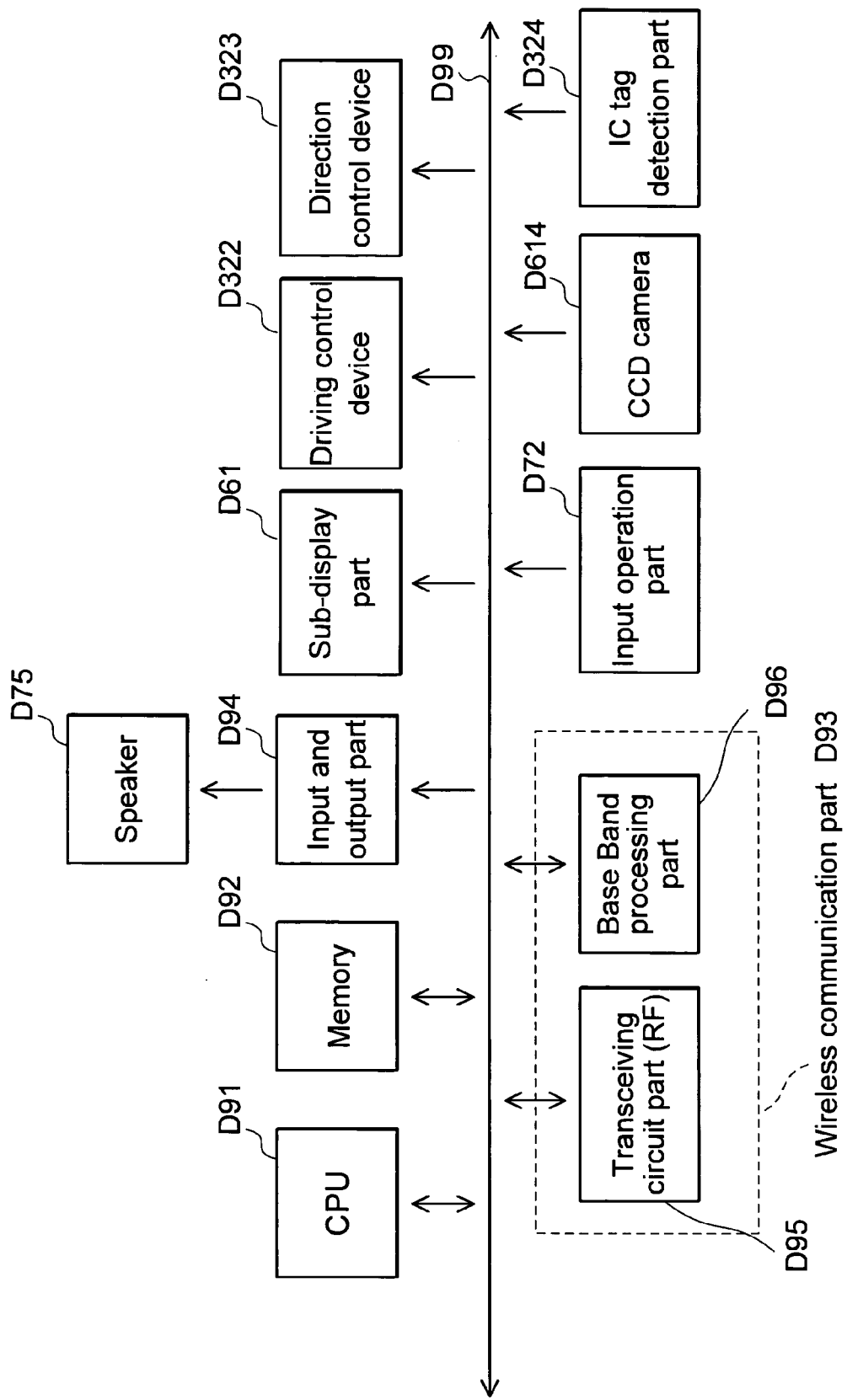
FIG. 11D is a block diagram showing a configuration of a sub-control device of the terminal device.

FIG. 11D is a block diagram showing the configuration of the sub-control device D90.

The sub-control device D90 has a CPU D91, a memory D92, a wireless communication part D93, and an input and output part D94 which is the interface with the speaker D75, which are connected to a data bus D99.

The wireless communication part D93 includes a transceiving circuit part (RF) D95 for transmitting and receiving signals with the main control device D80, and a base band processing part D96 for converting RF (Radio Frequency) signals received by the transceiving circuit part D95 into base band signals and also converting base band signals to be transmitted into RF signals.

The CPU D91 transmits and receives data with the main control device D80, via wireless communication part D93, by the procedure below.

Specifically, the CPU D91 divides data into packet data when transmitting data to the main control device D80. At this time, the IP address of the terminals device D30 which is the transmitting source is added to the packet data as an identifier for identifying respective terminal devices D30.

In addition, the CPU D91 receives the packet data if the IP address added to the packet data matches the IP address of the terminal device, when receiving data from the main control device D80, and destroys the packet data if it does not match.

The CPU D91 not only transmits and receives signals with the main control device D80, via the wireless communication part A93, but also controls the sub-display part D61, driving control device D322, and direction control device D323, based on the input signals from the input operation part D72, the CCD camera D614, and the IC tag detection part D324.

Specifically, the IC tag detection part D324 reads positional information from the IC tag D211 and outputs this as current-positional data. The CPU D91 transmits the game input data (data regarding character information, identified selection information, etc.) according to the input from the input operation part D72, the face image data taken by the CCD camera D614, and the current-positional data from the IC tag detection part D324 to the main control device D80.

Furthermore, when receiving movement signal data which designates the position of the terminal device D30 from the main control device D80, the CPU D91 grasps the position of the terminal device D30 on the play area D21, based on current-positional data from the IC tag detection part D324, controls the driving control device D322 and the direction control device D323 of the traveling part D32, and moves the terminal device D30 to the position designated by the movement signal data.

In addition, the CPU D91 can drive the driving control device D322 and the direction control device D323 of the traveling part D32, according to the game input data which is input by operating the input operation part D72.

The CPU D91 executes the operation program stored in memory D92 and performs various processing, according to the program executed in CPU D81.

In other words, when receiving a game program or information expressing the status corresponding to the time-line in the game environment at that time from the main control device D80, after storing information on the game program and the like, transmitted by the main control device D80, to the memory D92, the CPU D91 presents the various occurrences, such as events, occurring in the game environment at this time, in the sub-display part D61 and outputs sound effects from the speaker D75.

In addition, by operating the input operation part D72 while viewing the game content (image, letter information, etc.) shown in the sub-display part D61, the players using respective terminal devices D30 can operate the characters shown in the main display device D22, participate in the progress of the game by operations such as selecting from a selection by letters, and move the terminal device D30 to an identified position on the play area D21.

Configuration of the Game Program

Next, a game program provided by the game machine D1 is explained. This game program is a role-playing game which is set in a fictional game environment which runs continuously by its own time-line. A plurality of towns exists in this fictional game environment, and guilds are formed respectively in each town.

Each player becomes an adventurer, visits each town, and aims to clear numerous events (quests) waiting in each guild by operating the avatar.

On the other hand, this game program generates a plurality of large events (macroquests) in the game field and forms a large plot of the story. Each player becomes involved in the large events (macroquests), while solving the foregoing events (quests), and solves the macroquest with other players while sometimes cooperating, sometimes fighting, and sometimes competing with each other.

This game program changes the plot of the game field by the operations of the terminal devices D30 of the players (game-play). In other words, the accumulation of the game-play (adventures) of each individual player creates the history of this game field.

In this way, this game program is a role-playing game wherein a plurality of players can all experience the flow of history in a fictional world. In addition, in this game field, history is created by a unique time-line which cannot be stopped, and therefore, the people appearing within this game field are not immortal, but will grow old as in the real world.

The game program is configured to write the name of the player who has solved an event in the macroquest or achieved accomplishments such as winning in a competition against another player to a chronology which is stored to the database D84. In this way, players who were successful in the macroquest can leave their name in the history of the game field.

Figure 12D:
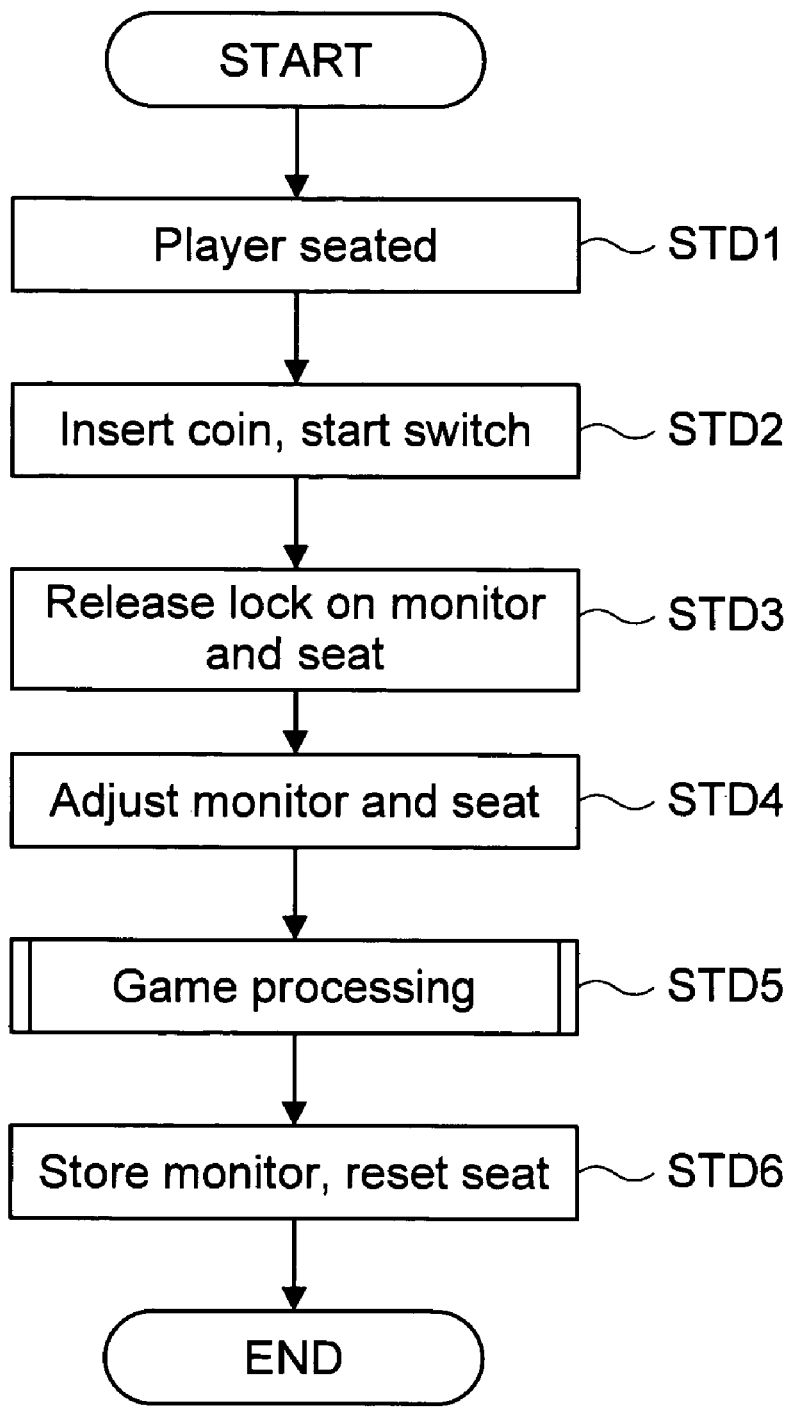
FIG. 12D is a main flowchart of a game executed in the game machine.

The operation of the game machine D1 is explained, with reference to the main flow chart shown in FIG. 12D.

In STD1, each player selects a terminal device D30 of their choice from the terminal devices D30 placed on the play area D21 and sits in the seat D31 of the selected terminal device D30. Next, in STD2, each player inserts a coin into a coin insertion opening in the input operation part D72 and presses the start switch. Then, in STD3, the locks of the sub-monitor D613 and the seat D31 of the game machine D1 are released and, in STD4, the player can pull out the sub-monitor D613 from the storage space D62 in the side unit D60 and adjust the mode of the seat D31.

In STD5, the game machine D1 performs a game processing described hereafter. After the game is completed, in STD6, the game machine D1 stores the sub-monitor D613 and also returns the mode of the seat D31 to seat mode.

Figure 13D:
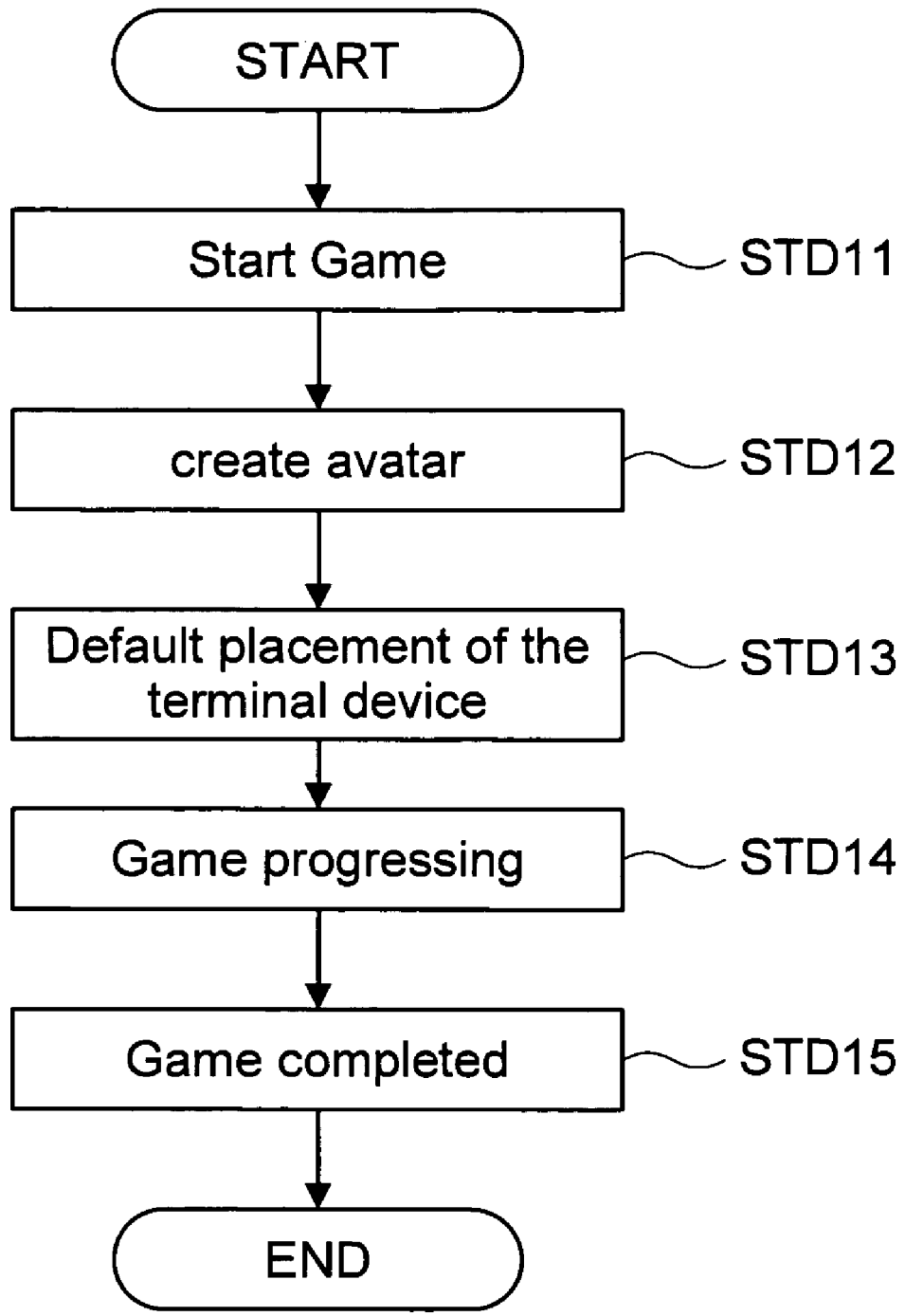
FIG. 13D is a flowchart of the game processing of the game program executed in the game machine.

FIG. 13D is a flowchart of the game processing.

When the game is started in STD11, the game program creates an avatar of the player on STD12.

In other words, the game program shows an avatar creating screen in the sub-display part D61. In this avatar creation screen, the player creates an avatar, which is an alter-ego of the player, when participating in the game program. When an image of the players face is taken by the CCD camera D614 and the player enters personal information and the name to be used in the game field to the input operation part D72, the game program creates an avatar based on this information and registers it to the database D84 of the main control device D80.

In STD13, the game program places the terminal device D30 in which the player is seated in the default position on the play area D21.

In other words, the towns in the game field are surrounded by the ocean or forests, or are large cities. Each game area is an ocean, a forest, or a large city. The play area D21 includes a plurality of sub-areas D212, such as a city area D212A, an ocean area D212B, and a forest area D212C, as stated earlier. These sub-areas D212 are quasi-spaces corresponding to the environment of the towns in the game environment.

Therefore, the game program sets the town each player is in, in the game field, and moves the terminal device D30 of the player to the sub-areas D12, corresponding to the town in which each player is, when the game begins. Or, the terminal device D30 of the player is moved according to the operations of each player of the input operation part D72, and the town in which the player is in the game field is set according to this movement.

In STD14, the game program runs the game according to a unique time-line, generating macroquests in which a plurality of players participate and quests in which only one player participates, and completed the game in STD15.

Figure 14D:
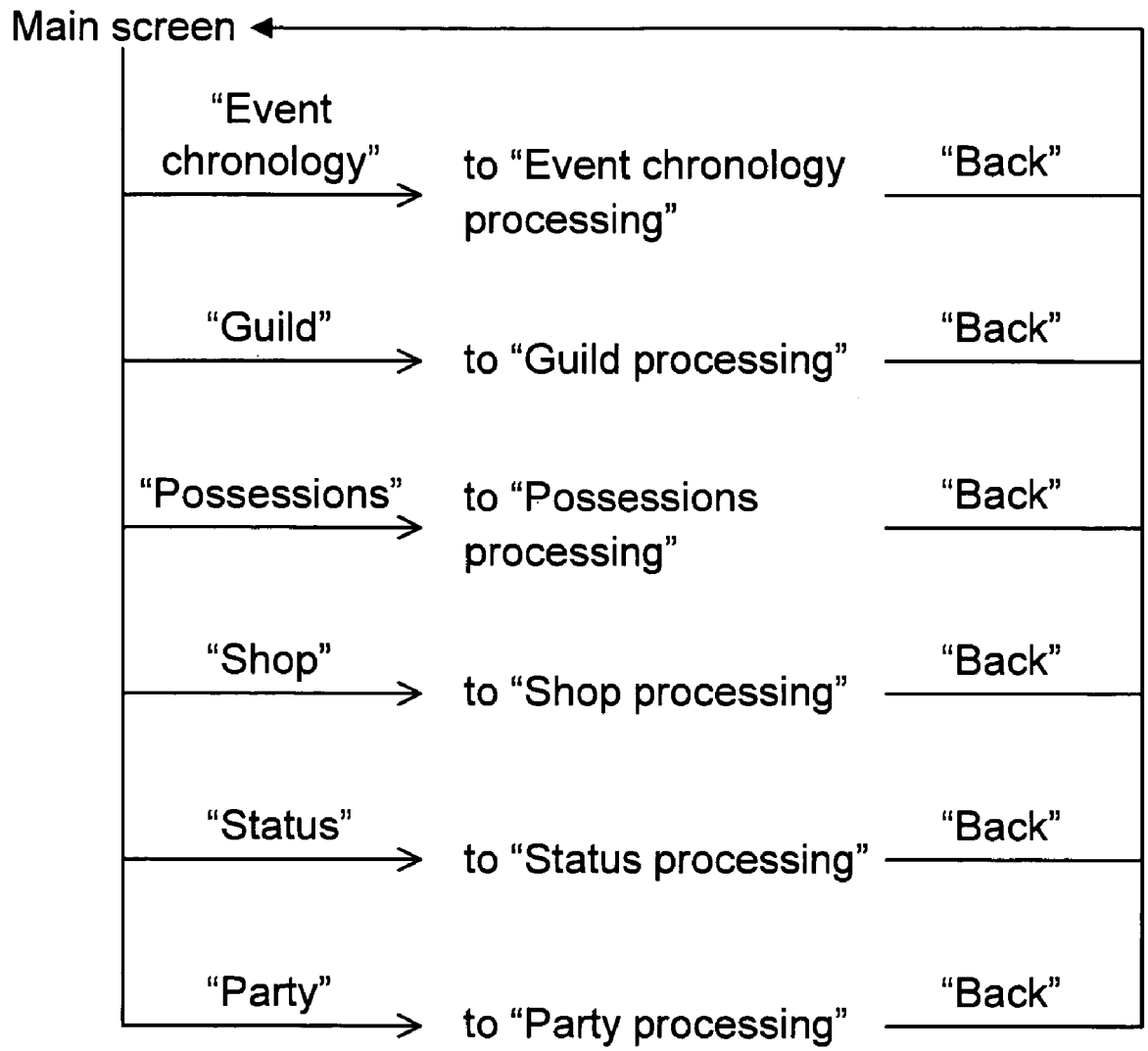
FIG. 14D is a flowchart of each player in the game program executed in the game machine.

FIG. 14D is a flowchart of each player in the game program.

Each player can perform an event chronology processing, guild processing, possessions processing, shop processing, status processing, and party processing.

When the player selects "event chronology processing", the game program shows the event chronology in the sub-display part D61 by reading the event chronology from the database D84 in the main control device D80 and performing event chronology processing.

In this event chronology, the respective dates and quest name of each quest solved in the game field is shown. Furthermore, when the player selects a quest name (event name), the game program shows the details of the selected event. Here, the details of the event are, for example, showing the player who solved the quest most quickly, if the winner is the player who solves the event (quest) most quickly, and shows the party if the winner is the party with the most number of cooperating players who have solved the event (quest).

When the player selects "guild", the game program performs a guild processing and shows a guild screen in the sub-display part D61. In this guild screen, the player can view the quests the player can try in the guild and select to go to another town in the game field.

When the player selects "quest" in the guild screen, the game program shows a list of selectable quests in the sub-display part D61. If the player selects the desired "quest" from this list, the game program executes the selected quest.

When the player selects "Go to another town" in the guild screen, the game program shows a list of towns which can be selected as a transfer destination in the sub-display part D61. If the player selects a desired town from this list, the game program moves the player to the selected town. When the game program moves the player to another town within the game environment, the terminal device D30 of each player is moved to the sub-areas D212 of the corresponding transfer destination town.

The player can select menus such as "guild", "possessions", and "shop", even in the transfer destination town.

When the player selects "possessions", the game program performs a possessions processing and shows a possessions (list of contents) screen, of weapons, tools, shoes, and the like in the sub-display part D61. If the player selects a specific possession in this possessions (list of contents) screen, the game program shows a plurality of items included in the selected possessions in the sub-display part D61. The player selects the desired item from these items and either "wear" or "dispose of" the selected item.

When the player selects "shop", the game program performs a shop processing and shows a shop screen in the sub-display part D61. This shop screen is a screen for barter exchanging items in possession or acquiring information from the shop owner, and the player can select either "listen" or "exchange".

When the player selects "exchange" in the shop screen, the game program shows a list of products in the sub-display part D61. The player can select a desired item from this product list.

When the player selects the desired item, the game program shows the items possessed by the player for exchanging with the selected desired item. When the player selects an item in possession for exchange, the game program shows the item possessed by the player and the price thereof in the sub-display part D61

When the player selects the desired item for exchange from the items in possession, shown here, the desired items in possession to be exchange are collected, and the player selects "execute", the game program executes an exchange of the desired item and the desired item in possession to be exchanged.

On the other hand, if the player selects "listen" in the shop screen, the game program shows "rumors" in the sub-display part D61. The player can acquire information in the game environment by the "rumors" shown in this screen.

When the player selects "status", the game program performs a status processing and shows a status screen in the sub-display part D61. This status screen shows the results of the player's accomplishments in the game environment, the possessions thereof and the like. Specifically, it shows name, title, fame, power, intelligence, number of monsters slain, number of quests cleared, number of people saved, and the like.

If the player selects any one of the items above, the game program shows the rankings related to this item in the sub-display part D61.

When the player selects "party", the game program performs a party processing and shows the names of fellow players in the sub-display part D61, if there are fellow players, and furthermore, shows "read mail", "send mail", "exchange item", "view status" and the like.

By selecting any one of the items above, the player can send and receive mail with fellow players, exchange items with fellow players, and view the status of fellow players.

Figure 15D:
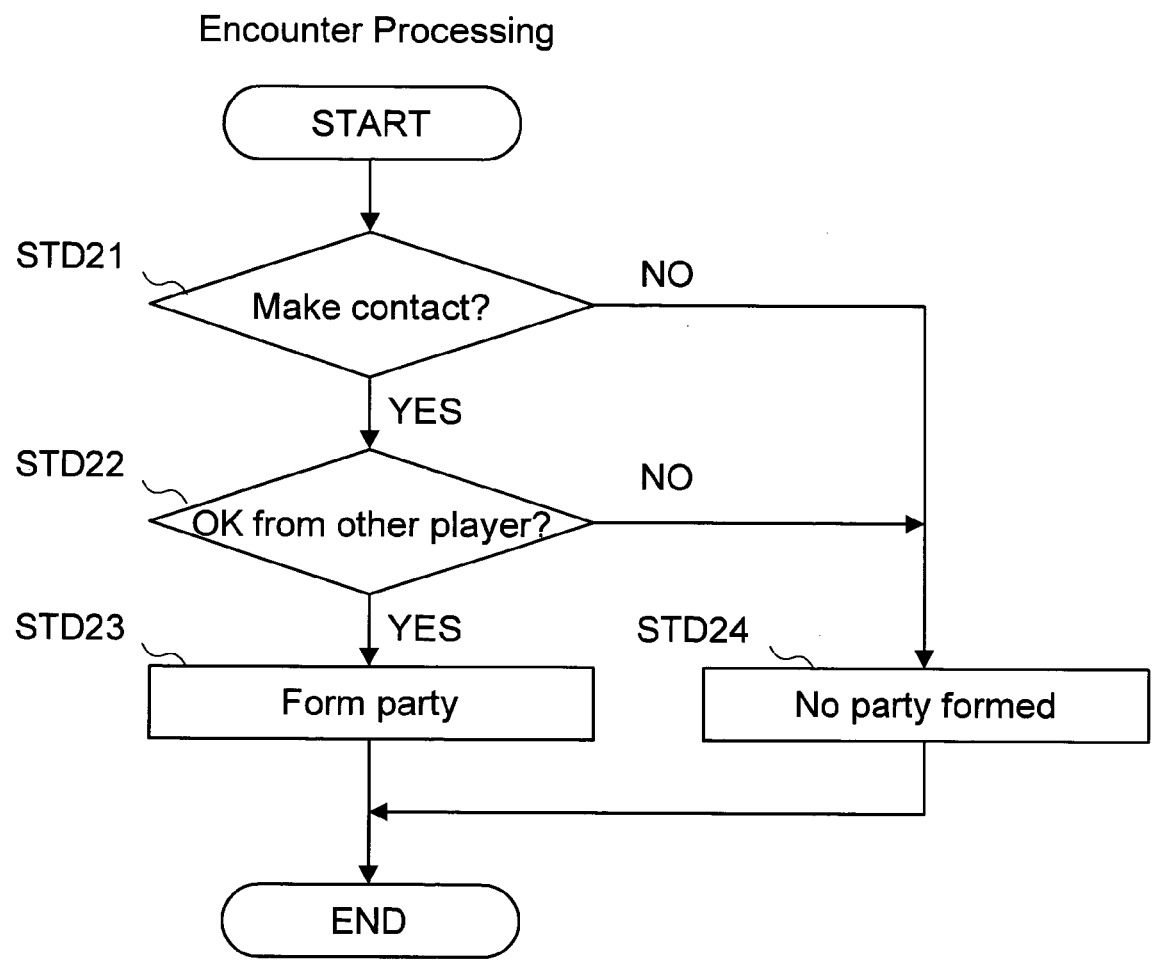
FIG. 15D is a flowchart of when a player encounters another player in a game field in the game program.

FIG. 15D is a flowchart of the encounter processing when the player encounters another player on the game field.

In the progress of the game in STD14, the game program executes an encounter processing when the player encounters another player on the game environment.

In other words, in STD21, an encounter screen is shown in the sub-display part D61, and the player is prompted to select whether to make contact.

If the player selects "No", the process moves to STD24 and the encounter processing is terminated without forming a party. On the other hand, if the player selects "Yes", the process moves to STD22, and the game program transmits mail to the other player, and shows that the player is being invited to become a fellow player in the sub-display part D61 in the terminal device D30 of this player. Then, the game program prompts the other player to select whether to accept the invitation.

If the player receiving the invitation selects "Yes", the process moves to STD23 and the game program transmits the selected result to the player who is the inviter, shows that the player has become a fellow player in the sub-display part D61 of the player who is the inviter, a party is formed and the process is completed.

On the other hand, if the player receiving the invitation selects "No", the game program shows that the player could not be a fellow player to the player who is the inviter in the sub-display part D61, and the process moves to STD24, and terminates the encounter processing without forming a party.

Figure 16D:
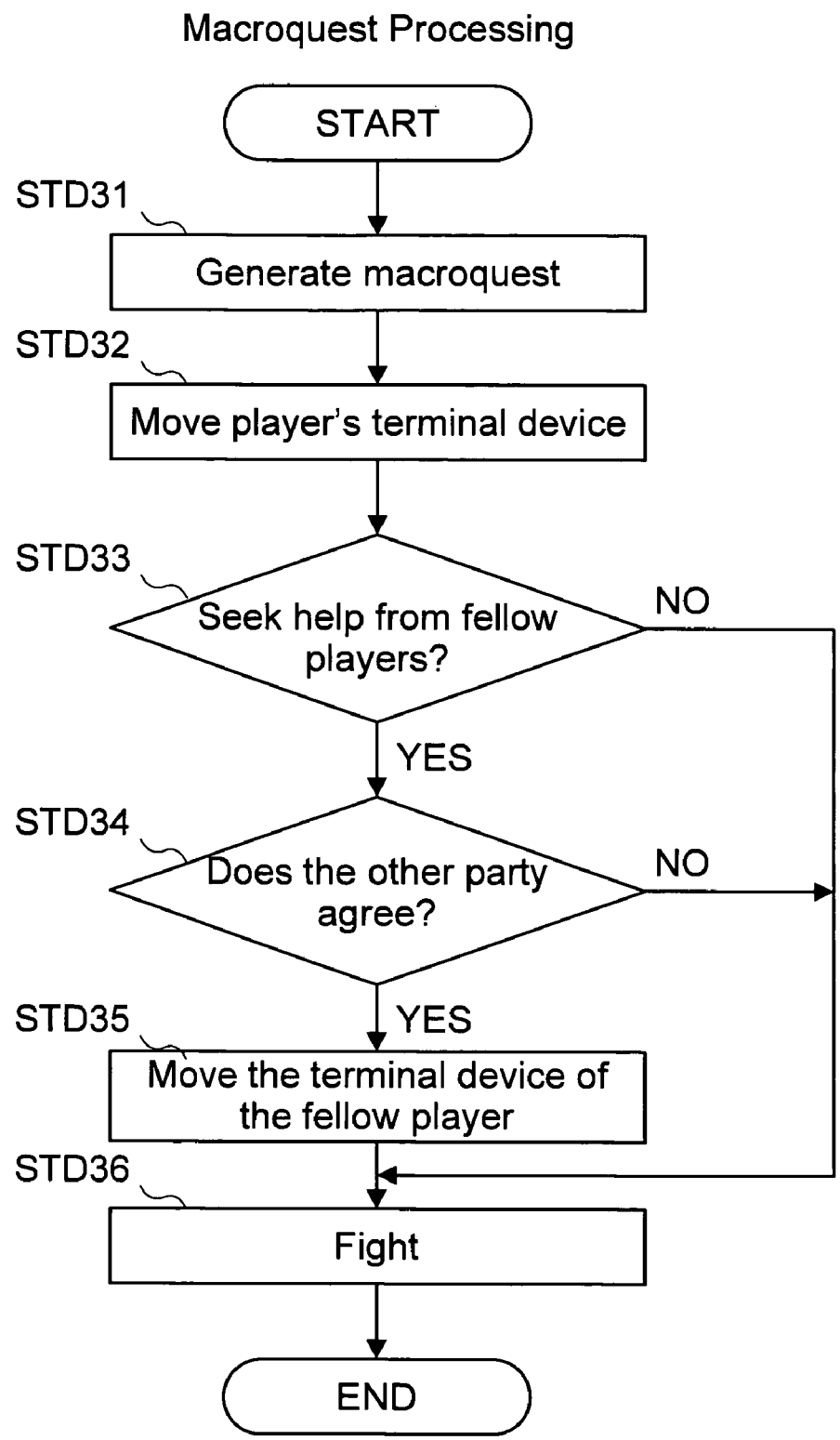
FIG. 16D is a flowchart of when a macroquest is generated in the game field in the game program.

FIG. 16D is a flowchart of the macroquest processing when a macroquest is generated in the game environment.

If a macroquest involving a plurality of players is generated in STD31, the game program executes a macroquest processing.

In other words, if a macroquest is generated in STD31, the process moves to STD32, shows the players involved in this macroquest in the main display device D22, also moves the terminal devices D30 of the players involved in this macroquest to the sub-area D212A in front of the main display device D22, and places them so that the terminal devices D30 of opposing players are close to and facing each other.

Figure 17D:
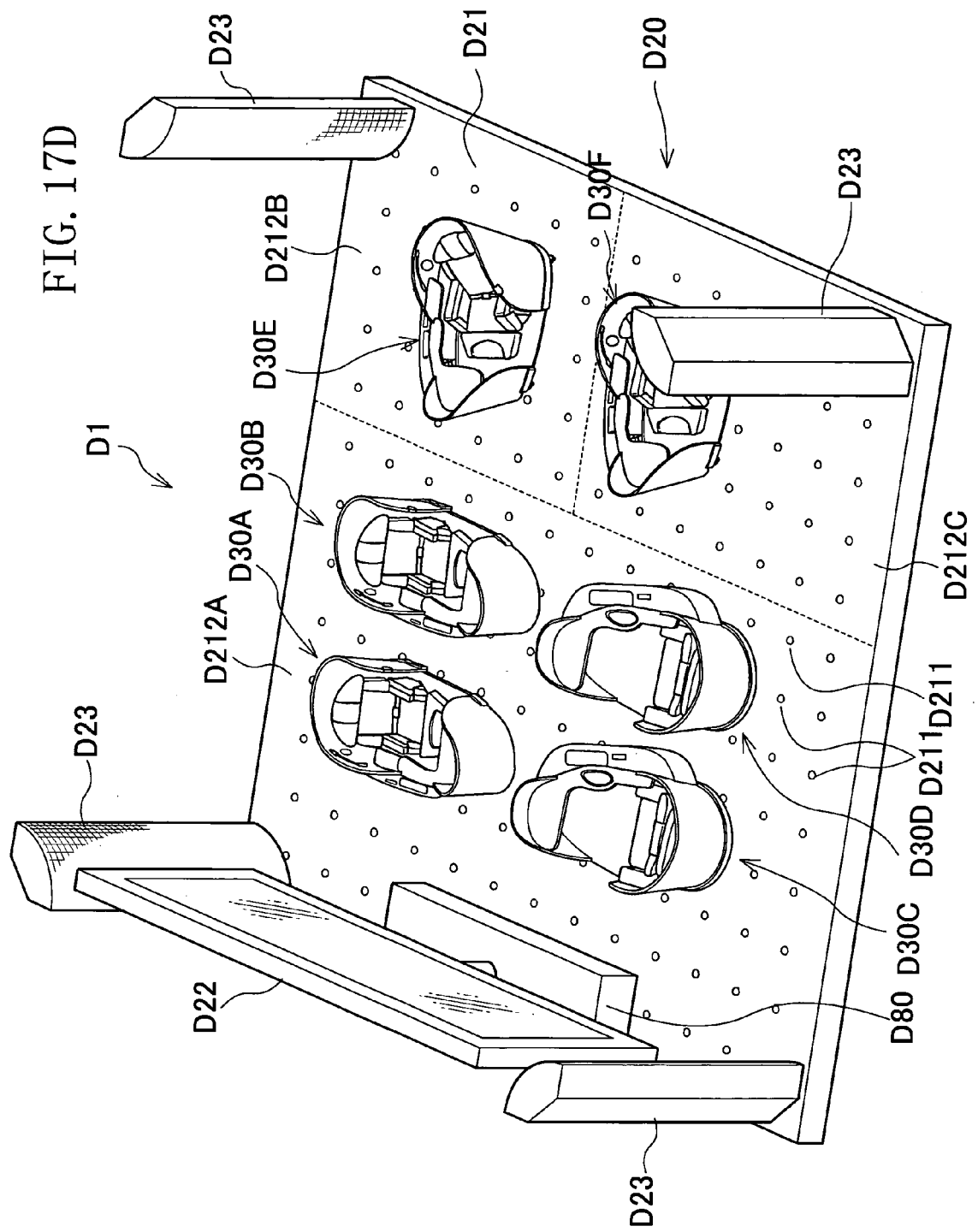
FIG. 17D is a perspective view showing a state in which a macroquest is generated in the game field in the game program of the game machine.

Specifically, as shown in FIG. 17D, there are six terminal devices, D30A to D30F, placed on the play area D21. Among these, the players of terminal devices D30A, D30B, and D30E are one party, and the players of terminal devices D30C, D30D, and D30F are another party. Then, each player in terminal devices D30A to D30D are caught in the macroquest in the city area D212A and are placed such that the parties oppose each other. In contrast, because the players in terminal devices D30E and D30F are respectively in the ocean area D212B and the forest area D212C, they are not involved in the macroquest, and thus, view the battle between the terminal devices D30A to D30D.

In order to clear the macroquest, the players caught in the macroquest select whether to call for help from fellow players in STD33.

If the player selects "No", the process moves to STD36.

On the other hand, if the player selects "Yes", the process moves to STD34, the game program transmits mail calling for help to the fellow players, and shows that help is being called for in the sub-display part D61 in the terminal device D30 of the player. Then, the game program prompts the fellow players to select whether to help the player.

If the fellow player whose help is requested selects "Yes", the process moves to STD35, and the game program transmits the selection results to the player requesting help and that the fellow player will participate is shown in the sub-display part D61 of the player. In addition, the game program shows the status of the gathering of newly participating fellow players in the main display device D22, and the terminal devices D30 of the newly participating fellow players are moved to the city area D212A in front of the main display device D22 and placed such that the terminal devices D30 of opposing players are close to and facing each other.

On the other hand, if the player whose help is requested selects "No", the game program shows that help had been denied in the sub-display part D61 of the player requesting for help, and the process moves to STD36.

Figure 18D:
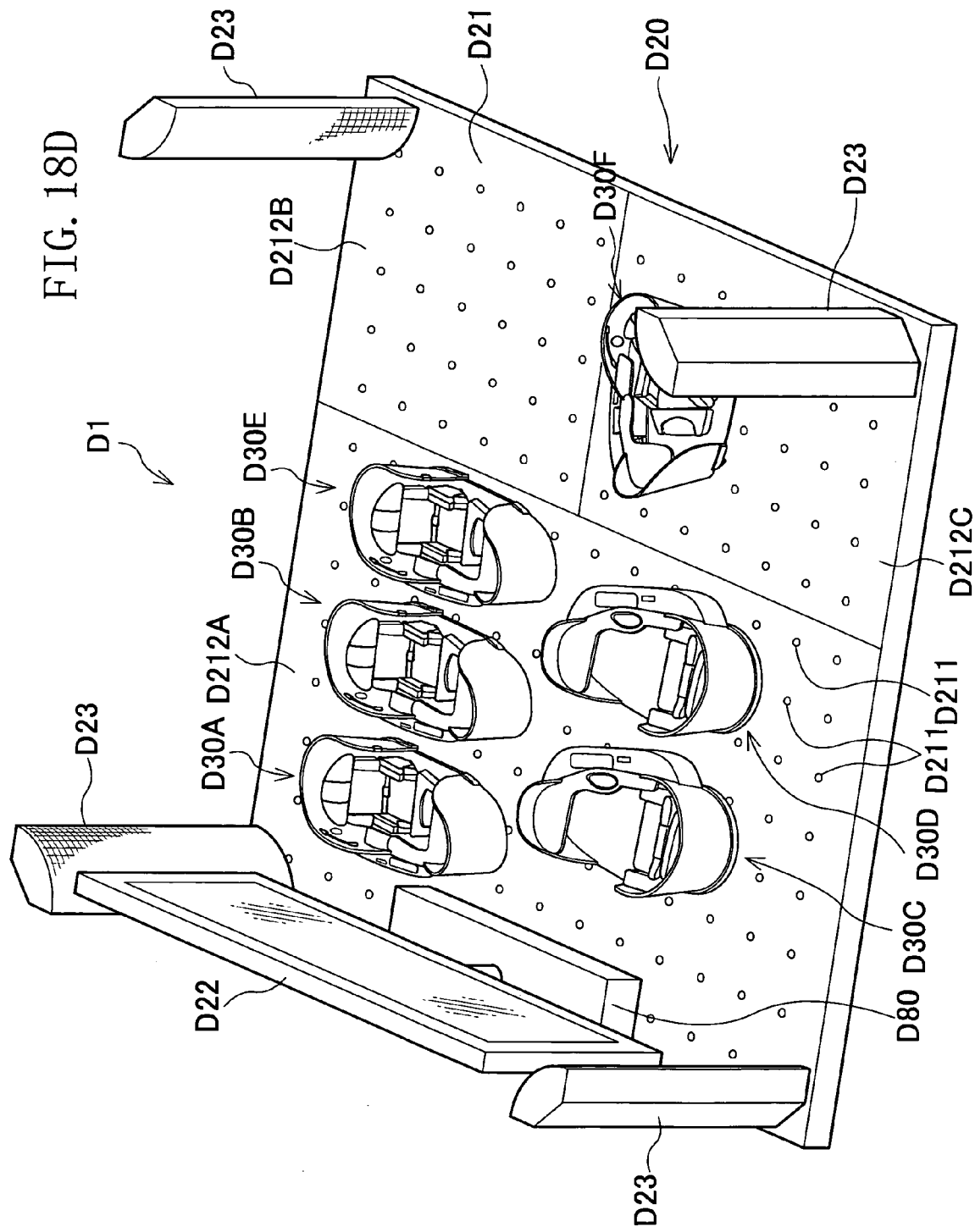
FIG. 18D is a perspective view showing a state in which fellow players participate in a macroquest generated in the game field in the game program of the game machine.

Specifically, as shown in FIG. 18D, because the player in terminal device D30E is fellow players with the players in terminal devices D30A and D30B, this player's help is requested by the terminal devices D30A and D30B. The player in terminal device D30E, having agreed to help, is moved to the city area D212A and is placed in alignment with the terminal devices D30A and D30B.

On the other hand, although the player in terminal device D30F is fellow players with the players in terminal devices D30C and D30D, and this player's help is requested by the terminal devices D30C and D30D, he refuses to help and, therefore, remains in the forest area D212C.

In STD36, each player fights the opposing player or opposing party. Specifically, as shown in FIG. 18D, the players of terminal devices D30A, D30B, and D30E and the players of terminal devices D30C and D30D fight in the city area D212A.

In this way, each player gets caught in a macroquest or is requested to help by fellow players caught in the macroquest, and whether to watch the battle between other players or to personally participate can be selected.

Figure 19D:
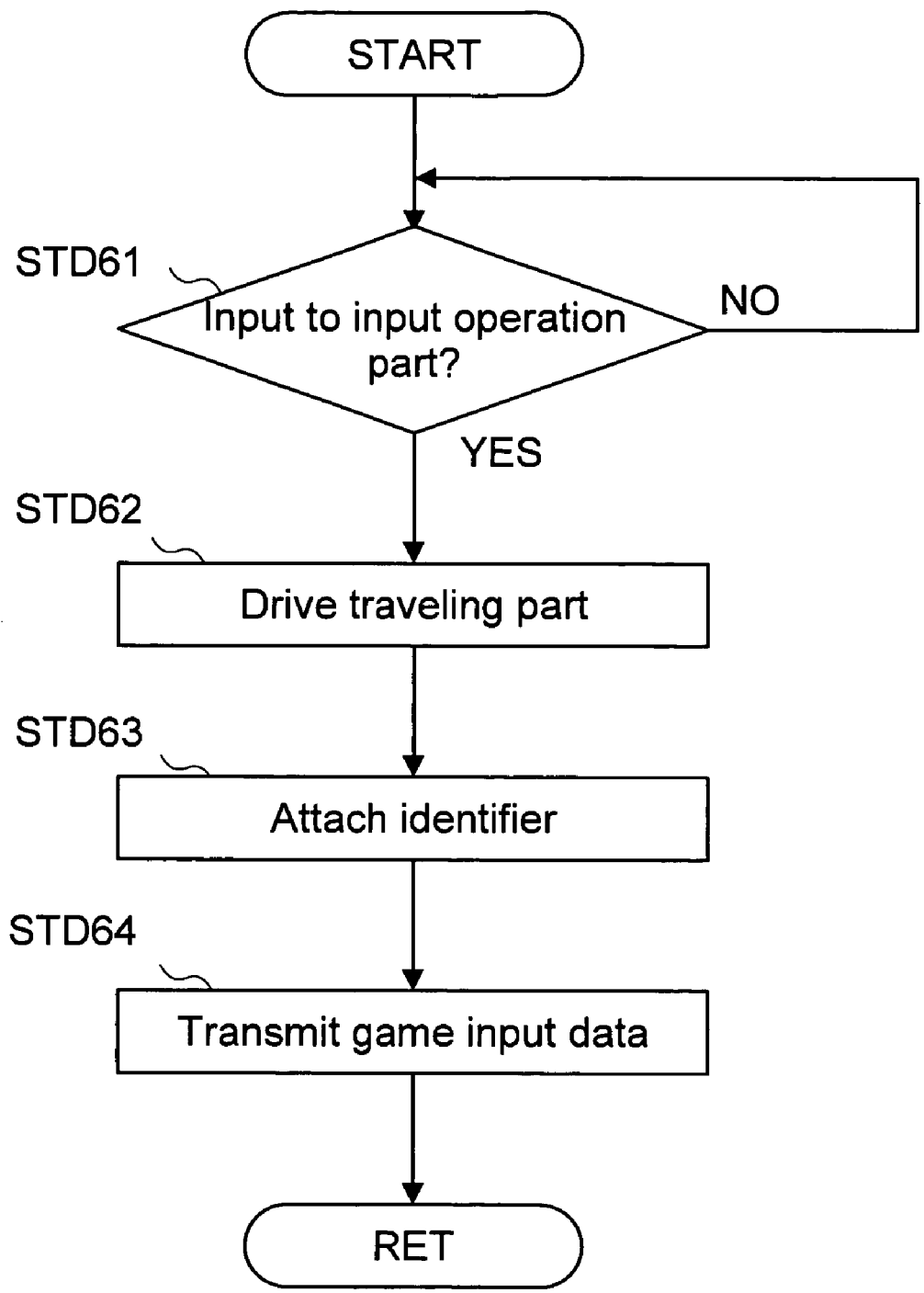
FIG. 19D is a flowchart of a game input data transmission processing performed in the terminal device.

Embodiment in Which the Traveling Part is Driven Based on Input from the Input Operation Part An embodiment in which the traveling part D32 is driven based on input from the input operation part D72 in the terminal device D30 is explained based on FIG. 19D. The CPU D91 of the terminal device D30 determines whether there has been an input operation to the input operation part D72 (STD61). For example, the CPU D91 determines whether the player input into the input operation part in order to move the operation character. If the CPU D91 determines that there is input to the input operation part D72, the traveling part D32 is driven according to this input. For example, the CPU D91 determines the movement direction and distance according to the input to the input operation part D72, and drives the traveling part D32 (STD62). Then, the CPU D91 attached an identifier to the game input data, with the input from the input operation part D72 as the game input data (STD 63). Next, the CPU D91 transmits the game input data to which an identifier is attached to the main control device D80 (STD64).

Figure 20D:
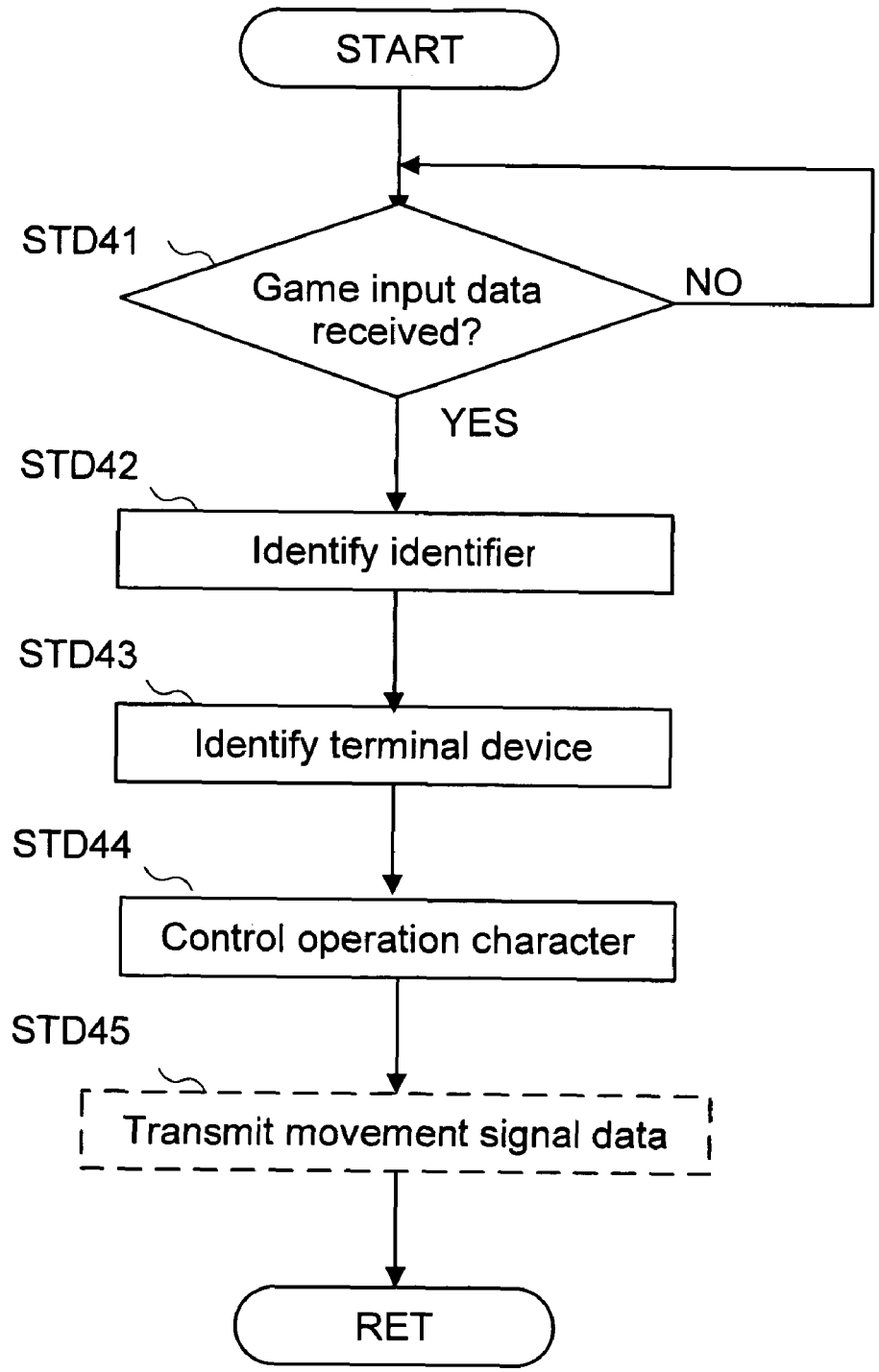
FIG. 20D is a flowchart of a movement signal data transmission processing performed in the main game machine body.

Next, a processing performed when the main control device D80 receives the foregoing game input data is explained, based on FIG. 20D. The CPU D81 of the main control device D80 determines whether the game input data has been received from a certain terminal device D30 (STD41). Then, the CPU D81 identifies the identifier from the game input data (STD42). Based on the identified identifier, the CPU D81 identifies the terminal device from which the game input data was sent (STD43). The CPU D81 operates the operation character of the identified terminal device D30 within the game environment, based on the game input data (STD44). In the "Embodiment in which the traveling part is driven based on input from the input operation part", the CPU D91 does not transmit movement signal data to the terminal device D30.

Figure 21D:
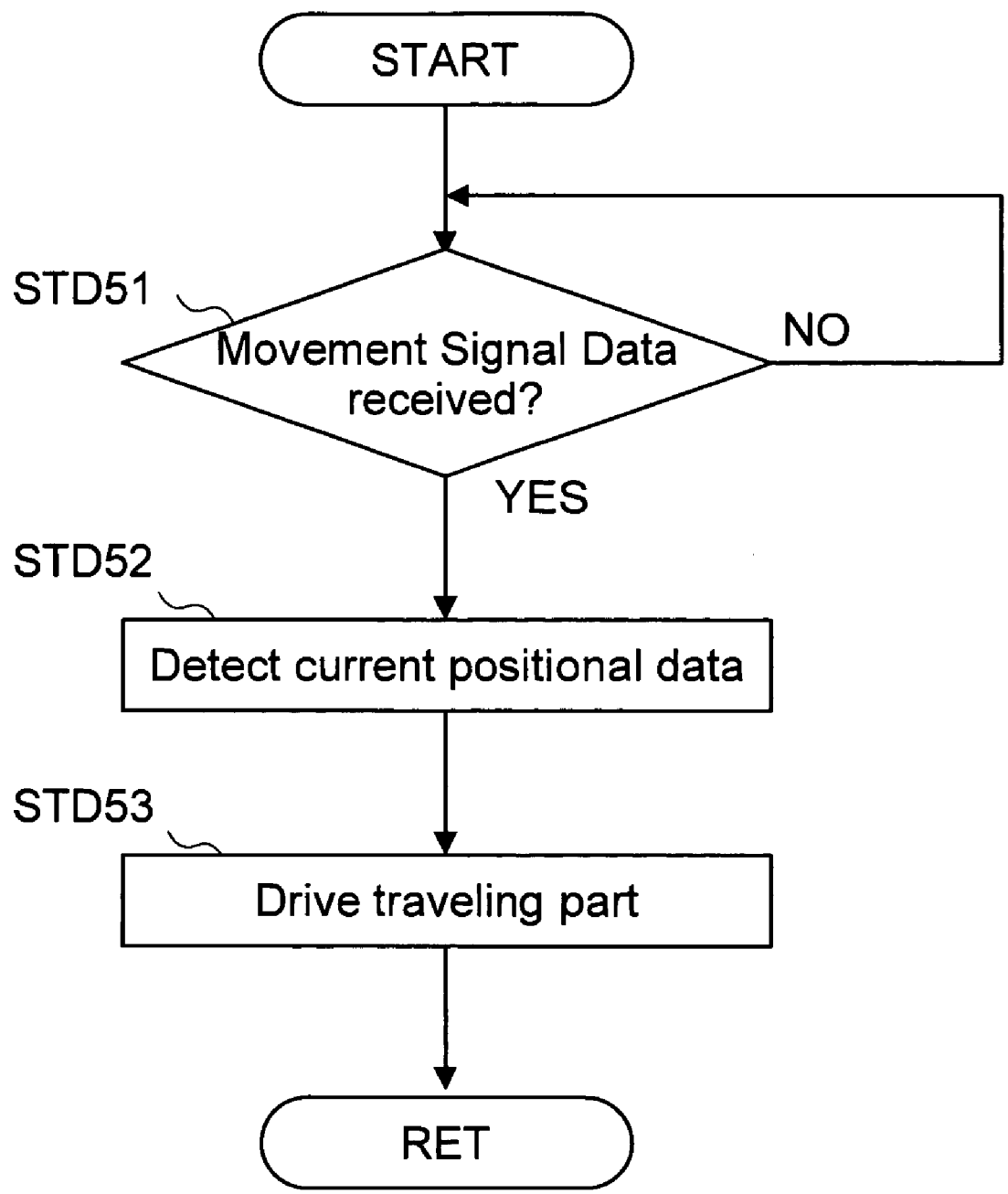
FIG. 21D is a flowchart of a traveling part driving processing performed in the terminal device.

Embodiment in Which the Traveling Part is Driven by Reception of the Movement Signal Data An embodiment in which the traveling part S32 is driven by the reception of the movement signal data from the main control device D80 is explained based on FIG. 20D and FIG. 21D. Based on input from the input operation part D72 from the player operating the terminal device D30, the terminal device D30 transmits input from the input operation part D72 as the game input data to the main control device D80. At this time, the CPU D91 of the terminal device D30 attached an identifier, such as an IP address, to the game input data.

The CPU D81 of the main control device D80 determines whether game input data has been received from the predetermined terminal device D30 (STD 41). Then, the CPU D81 identifies the game input data from the identifier (STD42). Based on the identified identifier, the CPU D81 identifies the terminal device from which the game input data was transmitted (STD 43). The SPU D81 operates the operation character of the identified terminal device D30 within the game environment, based on the game input data (STD44). Next, the CPU D81 transmits a movement signal data to the identified terminal device D30 (STD45).

Next, a traveling part driving processing of the terminal device D30 is explained based on FIG. 21D. The CPU D91 of the terminal device D30 determines whether the movement signal data has been received via the wireless communication part D93 (STD51). Then, when the CPU D91 determines that the movement signal data has been received, the CPU D91 requests the detection of current positional data from the IC tag detection part D324. The IC tag detection part D324 receives this request and performs the detection of current positional data (STD52). The CPU D91 receives current positional data from the IC tag detection part D324 and drives the traveling part D32 to the position designated by the movement signal data, based on the current positional data (STD53).

According to the present embodiment, the following effects can be obtained.

(1) Because a traveling part D32 is included in the terminal device D30 and this traveling part D32 is driven according to input from the input operation part D72, the terminal device D30 can be moved to a desired position on the player area D21 at the beginning of the game, and thus, each player can play the game by changing the position of the terminal device D30.

In addition, because the IP address is attached to the game input data by the sub-control device D90 of the terminal device D30 and the terminal device D30 to which the game input data is transmitted based on the IP address is identified by the main control device D80 of the main game machine body D20, the main game machine body D20 can accurately identify each terminal device D30, regardless of the position to which the terminal device D30 moves on the player area D21.

(2) In addition, because the terminal device D30 includes a traveling part D32, this traveling part is driven according to the movement signal data from the main control device D80, and the terminal device D30 moves to a predetermined sub area D212 according to the progression of the game, each player can play the game by changing the position of the terminal device D30.

In addition, by reflecting the positional relationship of a plurality of operation characters within the game area in the positional relationship of the plurality of terminal devices, the positional relationships between the operation characters in the game area can be presented more realistically on the play area, and thus, the enjoyment of the player is further enhanced. For example, if a plurality of players fight against each other, the players can be made aware that they are enemies by bringing the terminal devices D30 of the competing players closer together, and tension between the opposing players can be enhanced.

In addition, because the movement signal data is transmitted to a specific terminal device D30 from the main control device D80 using the IP address, each terminal device D30 can accurately identify movement signal data from the main game machine body D20, regardless of the position of the terminal device D30 on the play area D21.

(3) Because an IC tag detection part D324 is included in the terminal device D30, and the terminal device D30 is moved so as to become closer to the position designated by the movement signal data, while verifying the current position of the terminal device D30 by the current positional data detected by the IC tag detection part D324, the terminal device D30 can be moved to the designated position accurately.

The present invention is not limited to the foregoing embodiments and includes modifications, improvements and the like which achieve the objects of the present invention.

What is claimed is:

1. A game machine comprising:
a main game machine body which comprises a memory part for storing a game program and a main control part for executing said game program stored in said memory part; and a plurality of terminal devices which comprise an input part, a sensation generating device for generating sensations in a player, a sub-control part connected to said main game machine body through wireless or wired connection, for transmitting game input data according to input from said input part to said main game machine body, and a sub-display part for showing image data; wherein said main control part receives a plurality of game input data from said plurality of terminal devices, generates image data corresponding to each terminal device based on the game input data, transmits the generated image data to the corresponding terminal device; wherein said sub-control part shows the received said image data in said sub-display part; said terminal device comprises a seat for enabling the player to operate said input part while seated; wherein said sub-control part includes a sensation generating device control part for controlling said sensation generating device; wherein said game input data includes positional data of an operation character which can be moved over a single game area generated according to said game program; and wherein in order to drive said sensation generating devices in said one terminal device and said other terminal devices according to the positional data of the said operation character and an environment data set for each of a plurality of game areas in said game area, said main control part transmits, to respective sub-control parts, one or more sensation generating control signals stored according to the environment data set beforehand for each of a plurality of game areas.

2. The game machine according to claim 1, wherein:
said sensation generating device in said terminal device comprises:
a plurality of storage containers for storing plural types of fragrances of differing scents; a spray part for selectively spraying said fragrances stored in the plurality storage containers; a memory part for storing table data in which the environment data set for each game area and the sensation generating control signal for providing sensation corresponding to this environment data are correlated; and a sensation generating device driving part for selecting one storage container from said storage containers, based on said sensation generating control signal, and spraying the fragrance stored in the selected storage container with said spray part.

3. The game machine according to any one of claim 1 or 2, wherein: said terminal device comprises a traveling part for enabling movement in predetermined regions; said main control part transmits a movement-control signal to said terminal device so that said plurality of terminal devices have a predetermined positional relationship through said traveling part and outputs a spotlight lighting control signal for lighting a spotlight to said plurality of terminal devices.

4. The game machine according to claim 3, wherein:
said sensation generating device in said terminal device comprises a mist generating device for generating fog-like mist; and a sensation generating device driving part for driving said mist generating device driving part in response to the reception of said sensation generating control signal by said terminal device.

5. The game machine according to claim 4, wherein:
said mist generating device comprises a water storage container for storing water and a mist spray part for spraying water stored in the water storage container from the lower part of the seat; and said sensation generating device driving part drives said mist spray part based on said sensation generating control signal.

6. A gaming machine comprising:
a main game machine body including a memory part for storing a game program and a main control part for executing said game program stored in said memory part; and
a plurality of terminal devices including an input part, a sensation generating device for generating sensations in a player, and a sub-control part, connected to said main game machine body through wireless or wired connection, for transmitting game input data according to input from said input part to said main game machine body; and display part for displaying image based on image data output from said main control part;
wherein said main control part receives said plurality of game input data from said plurality of terminal devices, generates a single game data according to said game program based on this plurality of game input data, and generates and outputs to said display part image data which is shared by all terminal devices based on this single game data; said terminal device includes a seat for enabling the player to operate said input part while seated; said sub-control part includes a sensation generating device control part for controlling said sensation generating device; the single game data generated in said main control part comprises positional data of a plurality of operation characters, which can be moved within a single game area generated according to the game program based on respective game input data input by the input part of said plurality of terminal devices; and when the positional data of one operation character which is motion-operated by one terminal device among said plurality of terminal devices and positional data of another operation character which is motion-operated by another terminal device among said plurality of terminal devices meet predetermined conditions, said main control part transmits one or more sensation generating control signals stored beforehand to respective sub-control parts, in order to drive said sensation generating devices in the one terminal device and the other terminal devices.

7. The game machine according to claim 6 wherein:
said main gaming body comprises a play area in which said plurality of terminal devices is placed; said terminal device comprises a moving part, which is provided on the lower part of said seat, for moving said terminal device on said play area; said sub-control part comprises a movement control part for driving a moving part according to a movement—control signal from an external source and moving said terminal device to the predetermined position; and said main control part comprises a movement-control signal transmitting part for transmitting said movement-control signal to the specified terminal device, when the positional data of the operation character of a specific terminal device among said plurality of terminal devices meet the predetermined condition.

8. A game machine that is installed at premises, comprising:
   a main game machine body which comprises a memory part for storing a game program and a main control part for executing said game program stored in said memory part; and
   a plurality of terminal devices, each comprising an input part, and a sub-control part, connected to said main game machine body through wireless or wired connection, for transmitting game input data according to an input by a player through said input part to a main control part of said main game machine body; each of the plurality of terminal devices being arranged on a floor of the game machine, and
   a display part for showing images based on an image data sent from said main control part,
   wherein each of the plurality of terminal devices comprises:
   a seat for enabling the player to operate said input part while seated; and
   a light display part for emitting light,
   wherein said sub-control part comprises a light control part for lighting said light display part, based on the game input data; and said light display part is provided in a position which can be viewed by attendants of the premises.

9. The game machine according to claim 8, wherein;
   said light display part is illuminated with a plurality of lighting aspects; and
   said light control part which illuminates said light display part in a predetermined lighting aspect, according to the game input data.

10. The game machine according to claim 9, wherein:
    each of the plurality of terminal devices further comprises a moving part which is provided on a lower part of said seat, for allowing each of the plurality of terminal devices to move from a place to another on the floor of the game machine;
    said sub-control part further comprises:
    a movement control part, connected to said main game machine body through wireless or wired connection, for driving said moving part according to a input from said input part;
    said light control part illuminates said light display part according to a lighting aspect data from an external source;
    said main control part further comprises a lighting aspect determination part for determining a lighting aspect of a light display part of a particular terminal device which has transmitted the game input data, based on the game input data received from said sub-control part; and
    said main control part transmits said determined lighting aspect as lighting aspect data.

11. The game machine according to claim 10, wherein;
    said light display part comprises a light emission part for emitting light of differing colors.

12. The game machine according to claim 11, wherein:
    each of the plurality of terminal devices comprises a sub-display part for showing said image data;
    said game program includes an event to provide the player with a chance to acquire a product, the event being generated according to the operation of said input part by the player;
    said main control part comprises a product memory part for storing a data of the product corresponding to said event, and the player operating a terminal device transmits the data of the product to said terminal device, within a game environment realized by said game program;
    said sub-control part displays an image data of the product included in said data of the product in said sub-display part according to the received data of the product; and
    said light control part illuminates said light display part with a lighting aspect corresponding to said product, according to the selection of said product made by said player, based on said image data of the product.

13. The game machine according to claim 12, wherein:
    said light control part enables said light emission part of differing colors to illuminate according to the product acquired by said player in said game program.

14. A game machine comprising:
    a main game machine body; and
    a terminal device;
    wherein the main game machine body comprises:
    a main control part for generating an image data according to a game program regulating the progress of a game, a game input data, and said progress of the game; and
    a main display part for showing images based on said image data;
    wherein the terminal device comprises:
    a reception part for receiving an input from a player and outputting said game input data;
    a sub-display part which is provided so as to face said player;
    a seat which enables said player to operate said reception part while seated and includes a reclining function for changing a position of said player; and
    a position operation part for operating the reclining function;
    wherein the seat comprises the reclining function and a control part having a sensor for detecting an angle at which a backrest of said seat for supporting the back of said player is reclined by said reclining function, and
    wherein the control part discontinues a game in progress controlled by the game program or switches a game screen shown in said sub-display part to another image, according to the angle detected by said sensor.

15. The game machine according to 14,
    wherein said seat further comprises a reclining driving part for tilting said backrest, and a reclining operation part for operating said reclining driving part, and
    wherein said main control part is permitted to operate when a gradient angle of said backrest is within a predetermined range of angles.

16. A game machine comprising:
    a game controller for receiving an input from a player;
    a monitor for receiving externally or generating internally a game screen and showing the game screen, generated according to a game program; and
    a seat for seating the player;
    wherein said seat comprises:
    an engine mechanism for enabling said seat to move from a place to another on a floor of the game machine while said player is seated; and
    a control part for controlling a movement of the seat by the motive energy of said engine mechanism, in correlation with a movement of an operation character according to the input from the player through said game controller within a game environment generated based on said game program.

17. A game machine comprising:

a main game machine body which comprises a memory part for storing a game program and a main control part for executing said game program stored in said memory part; and a plurality of terminal devices which comprise an input part, a sub-control part, connected to said main game machine body through wireless or wired connection, for transmitting game input data according to input from said input part to the main control part of said main game machine body, and a display part for showing images based on image data output from said main control part; wherein said main control part receives a plurality of game input data from said plurality of terminal devices, generates a single game data according to said game program based on this plurality of game input data, and generates and outputs to the display part image data which is shared by all terminal devices based on this single game data; said main game machine body comprises a play area on which said plurality of terminal devices and said display part is placed; said terminal device includes a seat for enabling the player to operate said input part while seated and a moving part which is provided on the lower part of said seat, for moving said terminal device on said play area; said sub-control part comprises a movement control part for driving the moving part according to input from said input part and a identifier attachment part for attaching an identifier to identify individual terminal devices; a single game data generated in said main control part includes data of a plurality of operation characters, which can be moved within a single game field generated according to said game program, based on respective game input data of said plurality of terminal devices; and said main control part identifies the terminal device which transmitted the game input data, based on said identifier attached to said game input data, when said plurality of game input data is received from said plurality of terminal devices, and operates the operation character of the identified terminal device according to said game input data.

18. A game machine comprising:

a main game machine body which comprises a memory part for storing a game program and a main control part for executing said game program stored in said memory part; and a plurality of terminal devices which comprises an input part, and a sub-control part, connected to said main game machine body through wireless or wired connection, for transmitting game input data according to input from said input part to the main control part of said main game machine body; and a display part for showing images based on image data output from said main control part; wherein said main control part receives a plurality of game input data from said plurality of terminal devices, generates a single game data according to said game program based on this plurality of game input data, and generates and outputs to the display part image data which is shared by all terminal devices based on this single game data; said main game machine body comprises a play area on which said plurality of terminal devices and said display part is placed; said terminal device comprises a seat for enabling the player to operate said input part while seated and a moving part which is provided on the lower part of said seat, for moving said terminal device on said play area; said sub-control part comprises a movement control part for driving the moving part according to movement signal data from an external source and moving said terminal device to a predetermined position, and an identifier attachment part for attaching an identifier to identify individual terminal devices; a single game data generated in said main control part includes positional data of a plurality of operation characters, which can be moved within a single game field generated according to said game program, based on respective game input data of said plurality of terminal devices; and when the positional data of the operation character of a specific terminal among said plurality of terminal devices meets predetermined conditions, said main control part transmits movement signal data to said specific terminal device, using said identifier; and in response to said terminal device receiving said movement signal data, said movement control part drives said moving part based on the movements of said operation character.

19. The game machine according to claim 18, wherein:

said terminal device comprises a position detection part for detecting the position of each terminal device on said play area as the current positional data; said movement signal data is data designating the position of said terminal device; and said movement control part in said terminal device drives said moving part to move said terminal device to a position designated by said movement signal data, based on the current positional data detected by said position detection part.

* * * * *